United States Patent
Berliner et al.

(10) Patent No.: US 11,516,297 B2
(45) Date of Patent: Nov. 29, 2022

(54) LOCATION-BASED VIRTUAL CONTENT PLACEMENT RESTRICTIONS

(71) Applicant: Multinarity Ltd, Tel Aviv (IL)

(72) Inventors: Tamir Berliner, Tel Aviv (IL); Tomer Kahan, Ramat Hasharon (IL); Orit Dolev, Tel Aviv (IL)

(73) Assignee: Multinarity Ltd, Tel Aviv (IL)

( * ) Notice: Subject to any disclaimer, the term of this patent is extended or adjusted under 35 U.S.C. 154(b) by 0 days.

(21) Appl. No.: 17/710,189

(22) Filed: Mar. 31, 2022

(65) Prior Publication Data

US 2022/0254119 A1 Aug. 11, 2022

Related U.S. Application Data

(63) Continuation of application No. PCT/US2022/015547, filed on Feb. 8, 2022.
(Continued)

(51) Int. Cl.
*G06T 19/00* (2011.01)
*H04L 67/131* (2022.01)
(Continued)

(52) U.S. Cl.
CPC ........ *H04L 67/131* (2022.05); *G02B 27/0093* (2013.01); *G02B 27/017* (2013.01);
(Continued)

(58) Field of Classification Search
None
See application file for complete search history.

(56) References Cited

U.S. PATENT DOCUMENTS 5,168,531 A 12/1992 Sigel
5,977,935 A 11/1999 Yasukawa et al.
(Continued)

FOREIGN PATENT DOCUMENTS

CN 110442245 11/2019
EP 3188075 7/2017
(Continued)

OTHER PUBLICATIONS

International Search Report and Written Opinion for International Application No. PCT/US2022/015546, dated Jun. 29, 2022, 16 pages.
(Continued)

*Primary Examiner* — Nicholas R Wilson
(74) *Attorney, Agent, or Firm* — Finnegan, Henderson, Farabow, Garrett & Dunner LLP

(57) ABSTRACT

Systems, methods, and non-transitory computer readable media configured for managing content placement in extended reality environments are provided. In one implementation, at least one processor associated with the non-transitory computer readable medium may receive a request from an entity to place virtual content at a specific geographic location in at least one shared extended reality environment that includes a plurality of virtual objects, wherein the virtual objects are viewable by a plurality of users. Different content placement rules may define where content may be placed. Based on the obtained information, the processor may determine that the request meets or does not meet the specific content placement rule. The at least one processor may implement the specific content placement rule to prevent content from being displayed when the specific content placement rule is not met and may enable content to be displayed when the specific content placement rule is met.

19 Claims, 57 Drawing Sheets

Related U.S. Application Data

(60) Provisional application No. 63/307,203, filed on Feb. 7, 2022, provisional application No. 63/307,217, filed on Feb. 7, 2022, provisional application No. 63/307,207, filed on Feb. 7, 2022, provisional application No. 63/300,005, filed on Jan. 16, 2022, provisional application No. 63/226,977, filed on Jul. 29, 2021, provisional application No. 63/216,335, filed on Jun. 29, 2021, provisional application No. 63/215,500, filed on Jun. 27, 2021, provisional application No. 63/213,019, filed on Jun. 21, 2021, provisional application No. 63/173,095, filed on Apr. 9, 2021, provisional application No. 63/157,768, filed on Mar. 7, 2021, provisional application No. 63/147,051, filed on Feb. 8, 2021.

(51) Int. Cl.
*G06T 19/20* (2011.01)
*G02B 27/00* (2006.01)
*G02B 27/01* (2006.01)
*G06F 3/01* (2006.01)
*G06F 3/04815* (2022.01)
*H04L 65/401* (2022.01)
*H04L 65/403* (2022.01)
*G06T 7/70* (2017.01)
*G06V 30/228* (2022.01)
*G06V 30/14* (2022.01)
*G06K 7/14* (2006.01)
*G06T 7/20* (2017.01)
*G06T 11/00* (2006.01)
*H04W 4/70* (2018.01)
*H04W 4/80* (2018.01)
*H04W 4/02* (2018.01)
*G06F 3/14* (2006.01)
*G06T 15/20* (2011.01)

(52) U.S. Cl.
CPC .............. *G06F 3/011* (2013.01); *G06F 3/017* (2013.01); *G06F 3/04815* (2013.01); *G06F 3/1454* (2013.01); *G06K 7/1417* (2013.01); *G06T 7/20* (2013.01); *G06T 7/70* (2017.01); *G06T 11/00* (2013.01); *G06T 15/20* (2013.01); *G06T 19/006* (2013.01); *G06T 19/20* (2013.01); *G06V 30/14* (2022.01); *G06V 30/228* (2022.01); *H04L 65/403* (2013.01); *H04L 65/4015* (2013.01); *H04W 4/02* (2013.01); *H04W 4/70* (2018.02); *H04W 4/80* (2018.02); *G02B 2027/014* (2013.01); *G02B 2027/0138* (2013.01); *G02B 2027/0178* (2013.01); *G06T 2219/024* (2013.01); *H04W 4/026* (2013.01)

(56) References Cited

U.S. PATENT DOCUMENTS

| | | |
|---|---|---|
| 6,023,275 A | 2/2000 | Horvitz et al. |
| 6,388,657 B1 | 5/2002 | Natoli |
| 6,445,364 B2 | 9/2002 | Zwern |
| 7,119,819 B1 | 10/2006 | Robertson et al. |
| 7,542,040 B2 | 6/2009 | Templeman |
| 8,751,969 B2 | 6/2014 | Matsuda et al. |
| 8,947,322 B1 | 2/2015 | Chi et al. |
| 8,947,323 B1 | 2/2015 | Raffle et al. |
| 9,081,177 B2 | 7/2015 | Wong et al. |
| 9,244,533 B2 | 1/2016 | Friend et al. |
| 9,613,443 B2 | 4/2017 | Margolin |
| 9,613,448 B1 | 4/2017 | Margolin |
| 9,696,795 B2 | 7/2017 | Marcolina et al. |
| 9,726,896 B2 | 8/2017 | von und zu Liechtenstein |
| 9,779,517 B2 | 10/2017 | Ballard et al. |
| 9,996,797 B1 | 6/2018 | Holz et al. |
| 10,007,359 B2 | 6/2018 | Chung et al. |
| 10,353,532 B1 | 7/2019 | Holz et al. |
| 10,430,018 B2 | 10/2019 | Black et al. |
| 10,516,853 B1 | 12/2019 | Gibson et al. |
| 10,706,111 B1 | 7/2020 | Nasserbakht et al. |
| 10,948,997 B1 | 3/2021 | Victor-Faichney et al. |
| 11,003,307 B1 | 5/2021 | Ravasz et al. |
| 11,042,028 B1 | 6/2021 | Welch et al. |
| 11,060,858 B2 | 7/2021 | Abovitz et al. |
| 11,106,328 B1 | 8/2021 | Holland et al. |
| 11,178,376 B1 | 11/2021 | Tichenor et al. |
| 11,210,851 B1 | 12/2021 | Nussbaum et al. |
| 11,227,445 B1 | 1/2022 | Tichenor et al. |
| 11,294,475 B1 | 4/2022 | Pinchon et al. |
| 11,308,686 B1 | 4/2022 | Boissière et al. |
| 11,334,212 B2 | 5/2022 | Ravasz et al. |
| 2003/0058215 A1 | 3/2003 | Yamaji et al. |
| 2003/0063132 A1 | 4/2003 | Sauer et al. |
| 2004/0100556 A1 | 5/2004 | Stromme |
| 2004/0113888 A1 | 6/2004 | De Waal |
| 2007/0133788 A1 | 6/2007 | Ladouceur et al. |
| 2007/0223792 A1 | 9/2007 | Morimoto et al. |
| 2008/0270947 A1 | 10/2008 | Elber et al. |
| 2009/0015559 A1 | 1/2009 | Day et al. |
| 2009/0183125 A1 | 7/2009 | Magal et al. |
| 2009/0303984 A1 | 12/2009 | Clark et al. |
| 2010/0034457 A1 | 2/2010 | Berliner et al. |
| 2011/0216060 A1 | 9/2011 | Weising et al. |
| 2012/0194418 A1 | 8/2012 | Osterhout et al. |
| 2012/0202569 A1 | 8/2012 | Maizels et al. |
| 2012/0204133 A1 | 8/2012 | Guendelman et al. |
| 2012/0242603 A1 | 9/2012 | Engelhardt et al. |
| 2012/0249587 A1 | 10/2012 | Anderson et al. |
| 2012/0249741 A1 | 10/2012 | Maciocci et al. |
| 2012/0272179 A1 | 10/2012 | Stafford |
| 2012/0326961 A1 | 12/2012 | Bromer |
| 2013/0106692 A1 | 5/2013 | Maizels et al. |
| 2013/0107021 A1 | 5/2013 | Maizels et al. |
| 2013/0246955 A1 | 9/2013 | Schwesig et al. |
| 2013/0260822 A1 | 10/2013 | Wu |
| 2013/0278631 A1 | 10/2013 | Border et al. |
| 2013/0283208 A1 | 10/2013 | Bychkov et al. |
| 2013/0321265 A1 | 12/2013 | Bychkov et al. |
| 2013/0321271 A1 | 12/2013 | Bychkov et al. |
| 2013/0328914 A1 | 12/2013 | Smith et al. |
| 2013/0342570 A1 | 12/2013 | Kinnebrew et al. |
| 2014/0002496 A1 | 1/2014 | Lamb et al. |
| 2014/0028548 A1 | 1/2014 | Bychkov et al. |
| 2014/0062875 A1 | 3/2014 | Rafey et al. |
| 2014/0063055 A1 | 3/2014 | Osterhout et al. |
| 2014/0082526 A1 | 3/2014 | Park et al. |
| 2014/0123077 A1 | 5/2014 | Kutliroff et al. |
| 2014/0152552 A1 | 6/2014 | Berliner et al. |
| 2014/0208274 A1 | 7/2014 | Smyth et al. |
| 2014/0258942 A1 | 9/2014 | Kutliroff et al. |
| 2014/0272845 A1 | 9/2014 | Hendriks et al. |
| 2014/0282105 A1 | 9/2014 | Nordstrom |
| 2014/0327611 A1 | 11/2014 | Ono et al. |
| 2014/0380230 A1 | 12/2014 | Venable et al. |
| 2015/0067580 A1 | 3/2015 | Um et al. |
| 2015/0091780 A1 | 4/2015 | Lyren |
| 2015/0121287 A1 | 4/2015 | Fermon |
| 2015/0133193 A1 | 5/2015 | Stotler |
| 2015/0160825 A1 | 6/2015 | Dolbier et al. |
| 2015/0205106 A1 | 7/2015 | Norden |
| 2015/0206349 A1 | 7/2015 | Rosenthal et al. |
| 2015/0268721 A1 | 9/2015 | Joo |
| 2015/0294480 A1 | 10/2015 | Marks et al. |
| 2015/0324001 A1 | 11/2015 | Yanai et al. |
| 2015/0338886 A1 | 11/2015 | Seo |
| 2016/0005229 A1 | 1/2016 | Lee et al. |
| 2016/0018985 A1 | 1/2016 | Bennet et al. |
| 2016/0026242 A1 | 1/2016 | Burns et al. |
| 2016/0026253 A1 | 1/2016 | Bradski et al. |
| 2016/0027214 A1 | 1/2016 | Memmott et al. |
| 2016/0027216 A1 | 1/2016 | da Veiga et al. |

(56) References Cited

U.S. PATENT DOCUMENTS

| | | |
|---|---|---|
| 2016/0041625 A1 | 2/2016 | Maizels et al. |
| 2016/0071325 A1 | 3/2016 | Callaghan |
| 2016/0093108 A1 | 3/2016 | Mao et al. |
| 2016/0191910 A1 | 6/2016 | von und zu Liechtenstein |
| 2016/0209928 A1 | 7/2016 | Kandur Raja et al. |
| 2016/0255748 A1 | 9/2016 | Kim et al. |
| 2016/0259548 A1 | 9/2016 | Ma |
| 2016/0306431 A1 | 10/2016 | Stafford et al. |
| 2016/0313890 A1 | 10/2016 | Walline et al. |
| 2016/0328590 A1 | 11/2016 | Fefferman |
| 2016/0370860 A1 | 12/2016 | Bychkov et al. |
| 2016/0379409 A1 | 12/2016 | Gavriliuc et al. |
| 2017/0039770 A1 | 2/2017 | Lanier et al. |
| 2017/0109516 A1 | 4/2017 | Engelhardt et al. |
| 2017/0131964 A1 | 5/2017 | Baek et al. |
| 2017/0132199 A1 | 5/2017 | Vescovi et al. |
| 2017/0153866 A1 | 6/2017 | Grinberg et al. |
| 2017/0185261 A1 | 6/2017 | Perez et al. |
| 2017/0195629 A1 | 7/2017 | Wexler et al. |
| 2017/0220134 A1 | 8/2017 | Burns |
| 2017/0221264 A1 | 8/2017 | Perry |
| 2017/0242480 A1 | 8/2017 | Dees et al. |
| 2017/0243403 A1 | 8/2017 | Daniels et al. |
| 2017/0262045 A1 | 9/2017 | Rouvinez et al. |
| 2017/0266554 A1 | 9/2017 | Marks et al. |
| 2017/0285758 A1 | 10/2017 | Hastings et al. |
| 2017/0315627 A1 | 11/2017 | Yao |
| 2017/0315722 A1 | 11/2017 | Yao |
| 2017/0351097 A1 | 12/2017 | Memmott et al. |
| 2017/0352083 A1 | 12/2017 | Ruck et al. |
| 2018/0075658 A1 | 3/2018 | Lanier et al. |
| 2018/0088682 A1 | 3/2018 | Tsang |
| 2018/0090018 A1 | 3/2018 | Gavrilets et al. |
| 2018/0101994 A1 | 4/2018 | Da Veiga et al. |
| 2018/0131847 A1 | 5/2018 | Kokonaski et al. |
| 2018/0131907 A1 | 5/2018 | Schmirler et al. |
| 2018/0150997 A1 | 5/2018 | Austin |
| 2018/0173323 A1 | 6/2018 | Harvey et al. |
| 2018/0189568 A1 | 7/2018 | Powderly et al. |
| 2018/0197341 A1 | 7/2018 | Loberg et al. |
| 2018/0267762 A1 | 9/2018 | Aurongzeb et al. |
| 2018/0300952 A1 | 10/2018 | Evans et al. |
| 2018/0314329 A1 | 11/2018 | Bychkov et al. |
| 2018/0314406 A1 | 11/2018 | Powderly et al. |
| 2018/0350119 A1 | 12/2018 | Kocharlakota et al. |
| 2018/0350150 A1 | 12/2018 | Powderly et al. |
| 2018/0357472 A1 | 12/2018 | Dreessen |
| 2019/0073109 A1 | 3/2019 | Zhang et al. |
| 2019/0087015 A1 | 3/2019 | Lam et al. |
| 2019/0107944 A1 | 4/2019 | Glass et al. |
| 2019/0107991 A1 | 4/2019 | Spivack et al. |
| 2019/0114802 A1 | 4/2019 | Lazarow |
| 2019/0174088 A1 | 6/2019 | Kim et al. |
| 2019/0229495 A1 | 7/2019 | Pierer et al. |
| 2019/0236842 A1 | 8/2019 | Bennett et al. |
| 2019/0237044 A1 | 8/2019 | Day et al. |
| 2019/0265781 A1 | 8/2019 | Kehoe et al. |
| 2019/0295323 A1 | 9/2019 | Gutierrez et al. |
| 2019/0311460 A1 | 10/2019 | Mandy |
| 2019/0318065 A1* | 10/2019 | Brent .................. G06F 21/121 |
| 2019/0324277 A1 | 10/2019 | Kohler et al. |
| 2019/0333275 A1 | 10/2019 | Wang et al. |
| 2019/0335083 A1 | 10/2019 | DiGiantomasso et al. |
| 2019/0340816 A1 | 11/2019 | Rogers |
| 2019/0362557 A1 | 11/2019 | Lacey et al. |
| 2019/0362562 A1 | 11/2019 | Benson |
| 2019/0380792 A1 | 12/2019 | Poltaretskyi et al. |
| 2019/0384406 A1 | 12/2019 | Smith et al. |
| 2020/0004401 A1 | 1/2020 | Hwang et al. |
| 2020/0019156 A1 | 1/2020 | Drew et al. |
| 2020/0035203 A1 | 1/2020 | Kosik et al. |
| 2020/0043243 A1 | 2/2020 | Bhushan et al. |
| 2020/0051527 A1 | 2/2020 | Ngo |
| 2020/0110928 A1 | 4/2020 | Al Jazaery et al. |
| 2020/0111255 A1 | 4/2020 | Brodsky et al. |
| 2020/0117267 A1 | 4/2020 | Gibson et al. |
| 2020/0117270 A1 | 4/2020 | Gibson et al. |
| 2020/0125322 A1 | 4/2020 | Wilde |
| 2020/0135419 A1 | 4/2020 | Nakano et al. |
| 2020/0174660 A1 | 6/2020 | Klein et al. |
| 2020/0193938 A1 | 6/2020 | Estruch Tena et al. |
| 2020/0209628 A1 | 7/2020 | Sztuk et al. |
| 2020/0213632 A1 | 7/2020 | Goldberg |
| 2020/0364915 A1 | 11/2020 | Ruth et al. |
| 2020/0387215 A1 | 12/2020 | Smathers et al. |
| 2021/0008413 A1 | 1/2021 | Asikainen et al. |
| 2021/0041951 A1 | 2/2021 | Gibson et al. |
| 2021/0121136 A1 | 4/2021 | Dobson et al. |
| 2021/0132683 A1 | 5/2021 | Herling et al. |
| 2021/0191600 A1 | 6/2021 | Lemay et al. |
| 2021/0201581 A1 | 7/2021 | Xie et al. |
| 2021/0232211 A1 | 7/2021 | McCall |
| 2021/0255458 A1 | 8/2021 | Yoon |
| 2021/0272373 A1 | 9/2021 | Fradet et al. |
| 2021/0366440 A1 | 11/2021 | Burns et al. |
| 2021/0373672 A1 | 12/2021 | Schwarz et al. |
| 2022/0012920 A1 | 1/2022 | Beith et al. |
| 2022/0084288 A1 | 3/2022 | LeBeau et al. |
| 2022/0107632 A1 | 4/2022 | Sinha et al. |
| 2022/0121344 A1 | 4/2022 | Pastrana Vicente et al. |
| 2022/0130077 A1 | 4/2022 | Rajarathnam et al. |
| 2022/0155853 A1 | 5/2022 | Fan et al. |

FOREIGN PATENT DOCUMENTS

| | | |
|---|---|---|
| EP | 3584692 | 12/2019 |
| WO | WO 2019/126175 | 6/2019 |
| WO | WO 2021/239223 | 12/2021 |

OTHER PUBLICATIONS

International Search Report and Written Opinion for International Application No. PCT/US2022/015547, dated Jul. 1, 2022, 16 pages.

International Search Report and Written Opinion for International Application No. PCT/US2022/015548, dated Jun. 30, 2020, 13 pages.

Kimberly Ruth, Tadayoshi Kohno, Franziska Roesner, "Secure Multi-User Content Sharing for Augmented Reality Applications", Aug. 2019, USENIX Association, Proceedings of 28th USENIX Security Symposium (USENIX Security 19), pp. 141-158.

Yehia ElRakaiby, Frederic Cuppens, Nora Cuppens-Boulahia, "Interactivity for Reactive Access Control", 2008, International Conference on Security and Cryptography (SECRYPT), pp. 57-64.

* cited by examiner

1900

```
┌─────────────────────────────────────────────────────┐
│ RECEIVE WIRELESSLY, INDICATION OF LOCATION OF FIRST │── 1910
│ WEARABLE EXTENDED REALITY APPLIANCE (WER-APPLIANCE) │
└─────────────────────────────────────────────────────┘
                          ▼
┌─────────────────────────────────────────────────────┐
│   DETERMINE THAT LOCATION OF FIRST WER-APPLIANCE    │── 1912
│  CORRESPONDS TO LOCATION OF VIRTUAL WHITEBOARD      │
└─────────────────────────────────────────────────────┘
                          ▼
┌─────────────────────────────────────────────────────┐
│ TRANSMIT TO FIRST WER-APPLIANCE, CONTENT OF VIRTUAL │
│   WHITEBOARD TO ENABLE FIRST USER OF FIRST WER-     │── 1914
│    APPLIANCE TO VIRTUALLY VIEW CONTENT OF VIRTUAL   │
│   WHITEBOARD AND TO ADD VIRTUAL CONTENT TO VIRTUAL  │
│                      WHITEBOARD                     │
└─────────────────────────────────────────────────────┘
                          ▼
┌─────────────────────────────────────────────────────┐
│    RECEIVE, DURING FIRST TIME PERIOD, VIRTUAL CONTENT│── 1916
│                ADDED BY FIRST USER                  │
└─────────────────────────────────────────────────────┘
                          ▼
┌─────────────────────────────────────────────────────┐
│  RECEIVE WIRELESSLY AT SECOND TIME PERIOD AFTER FIRST│
│    WER-APPLIANCE IS NO LONGER IN LOCATION OF VIRTUAL │── 1918
│  WHITEBOARD, INDICATION THAT SECOND WER-APPLIANCE IS IN│
│             LOCATION OF VIRTUAL WHITEBOARD          │
└─────────────────────────────────────────────────────┘
                          ▼
┌─────────────────────────────────────────────────────┐
│  TRANSMIT TO SECOND WER-APPLIANCE, CONTENT AND ADDED │
│  CONTENT OF VIRTUAL WHITEBOARD, TO ENABLE SECOND USER│
│  OF SECOND WER-APPLIANCE TO VIEW CONTENT AND ADDED  │── 1920
│  CONTENT WHILE FIRST USER IS ABSENT FROM LOCATION OF │
│                  VIRTUAL WHITEBOARD                 │
└─────────────────────────────────────────────────────┘
```

FIG. 19

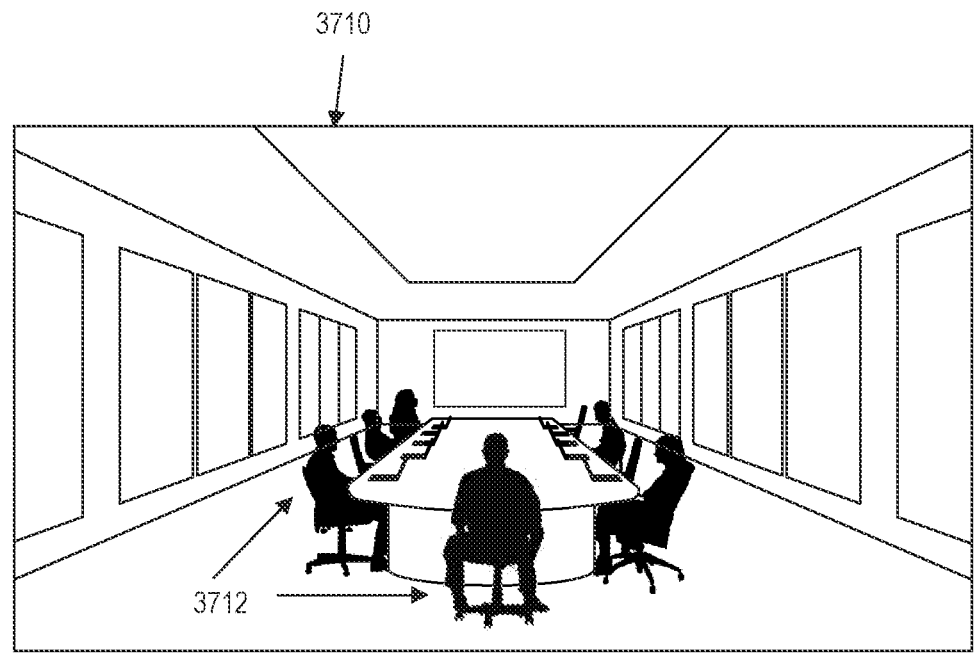
FIG. 37A
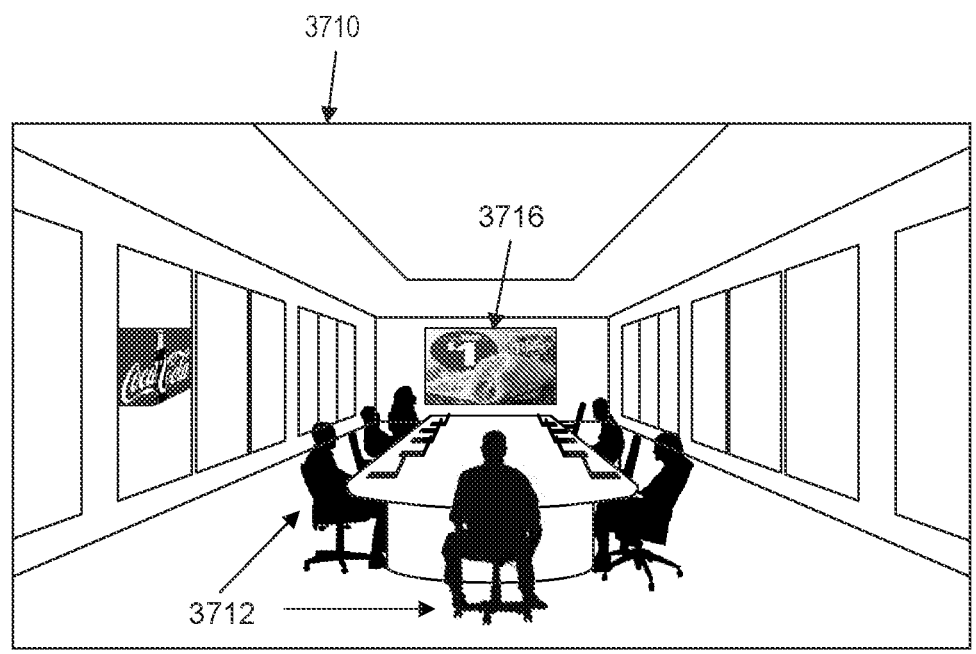
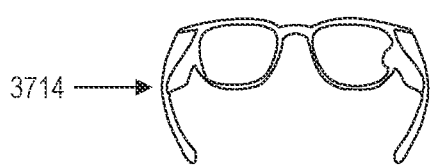
FIG. 37B

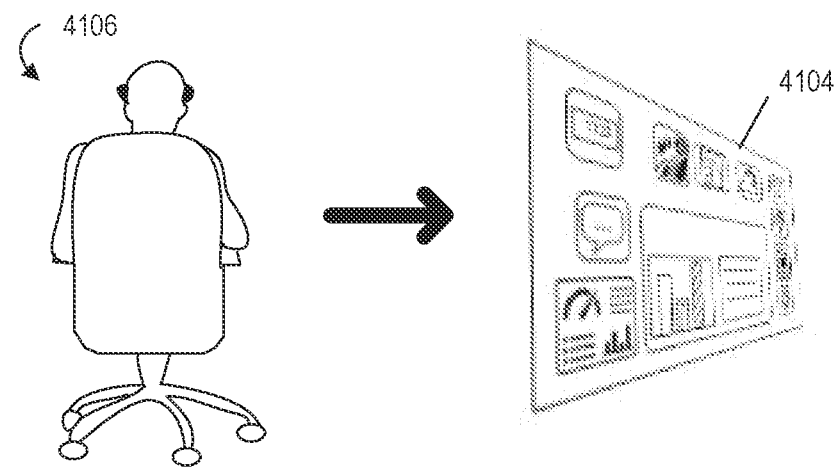
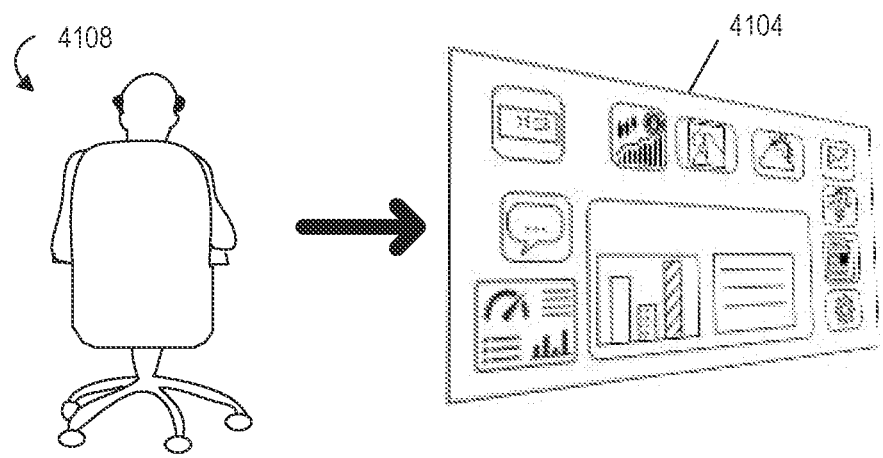
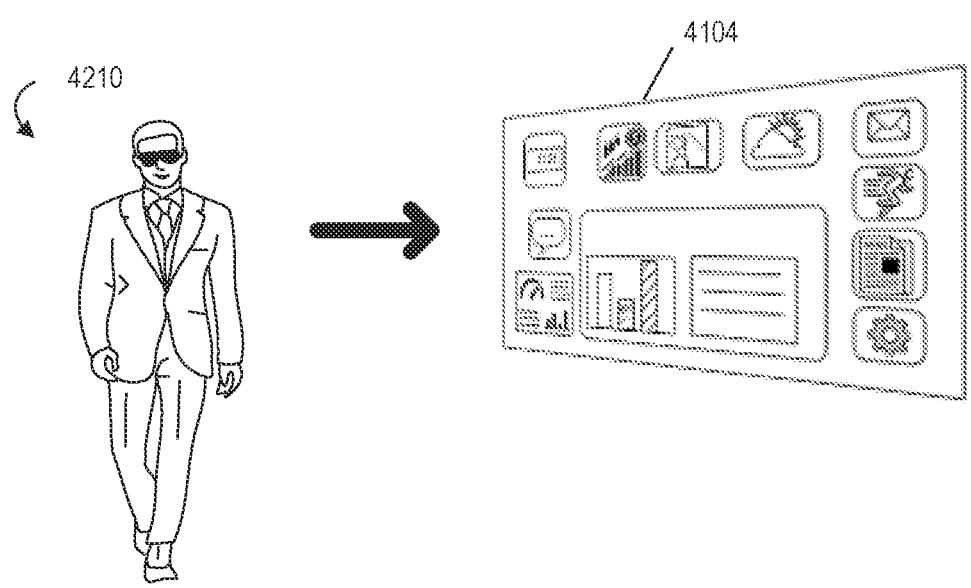
FIG. 42B

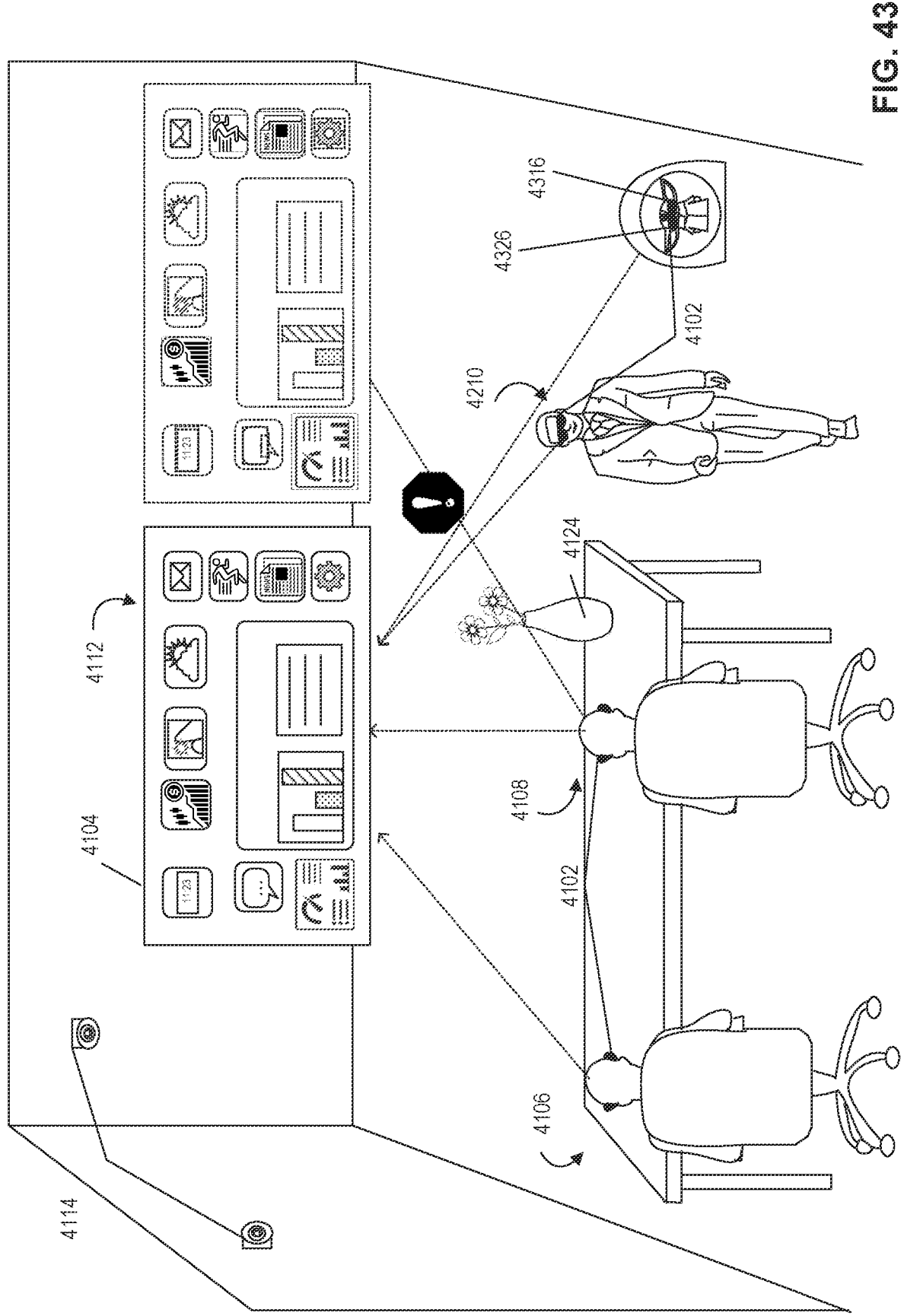

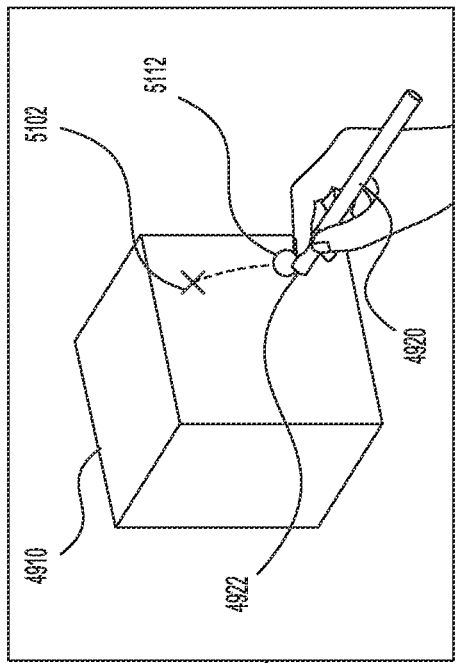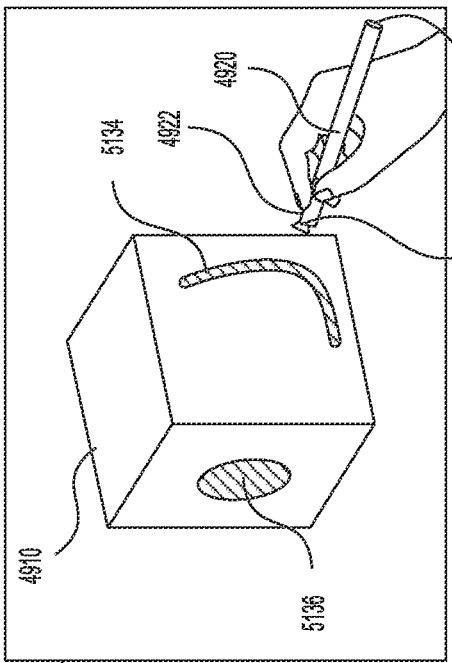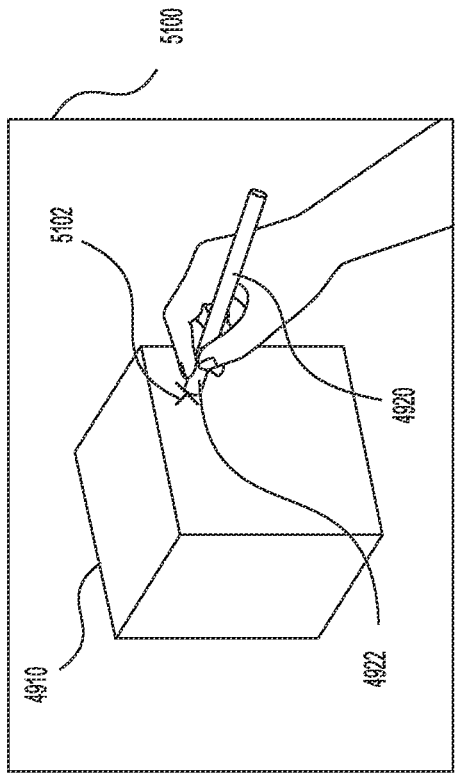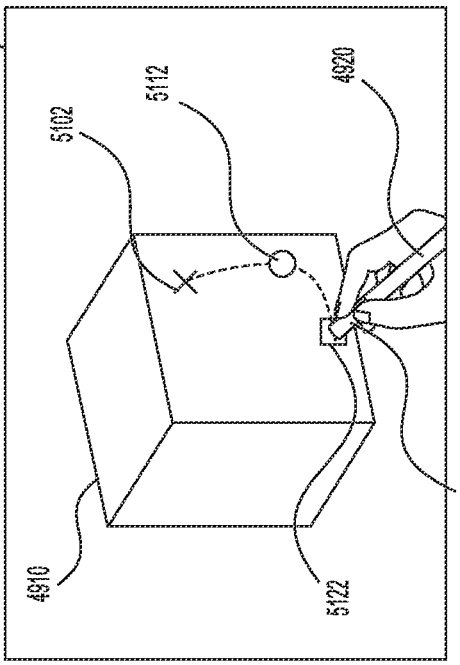

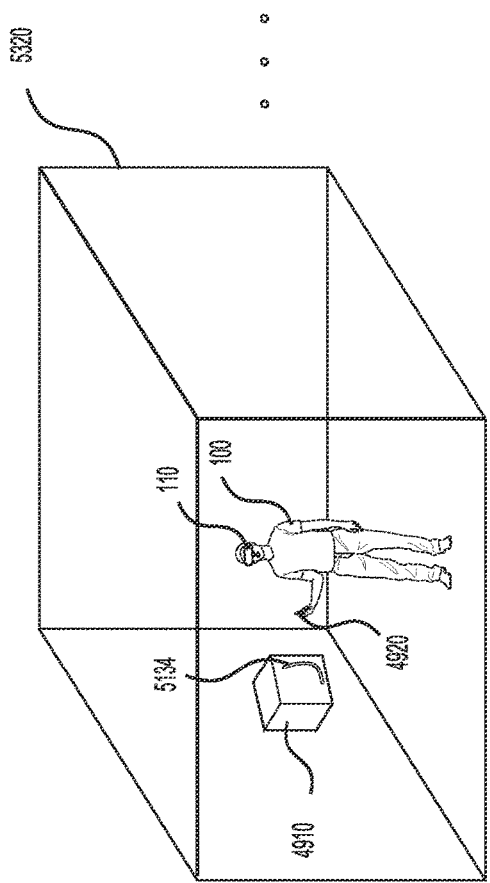
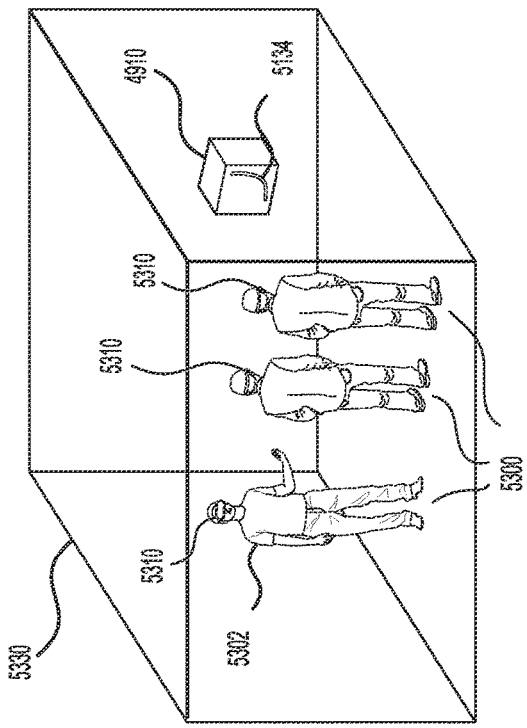
FIG. 53
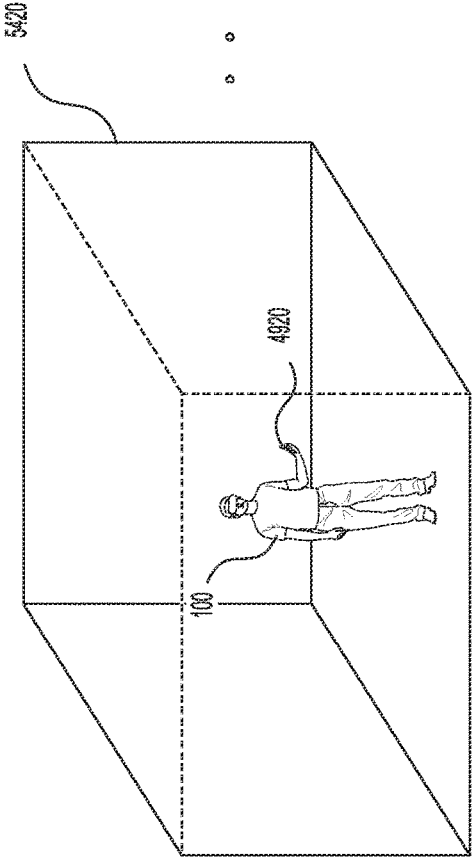
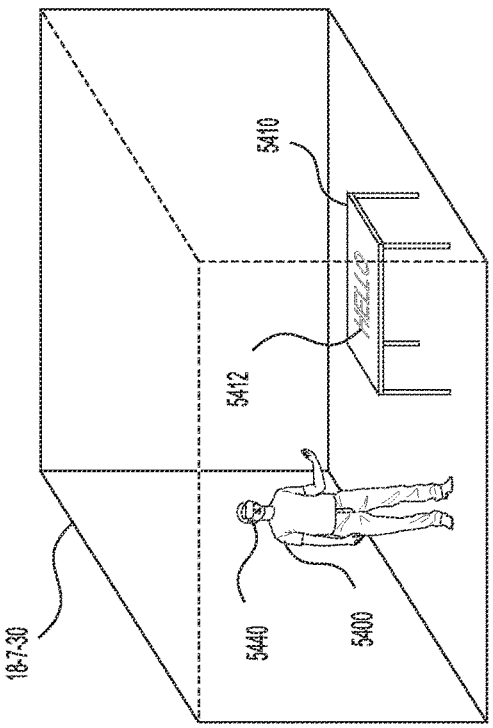
FIG. 54

LOCATION-BASED VIRTUAL CONTENT PLACEMENT RESTRICTIONS

CROSS REFERENCES TO RELATED APPLICATIONS

This application is a continuation of PCT International Application No. PCT/US2022/015547, filed Feb. 8, 2022, which claims the benefit of priority of U.S. Provisional Patent Application No. 63/147,051, filed on Feb. 8, 2021, U.S. Provisional Patent Application No. 63/157,768, filed on Mar. 7, 2021, U.S. Provisional Patent Application No. 63/173,095, filed on Apr. 9, 2021, U.S. Provisional Patent Application No. 63/213,019, filed on filed on Jun. 21, 2021, U.S. Provisional Patent Application No. 63/215,500, filed on Jun. 27, 2021, U.S. Provisional Patent Application No. 63/216,335, filed on Jun. 29, 2021, U.S. Provisional Patent Application No. 63/226,977, filed on Jul. 29, 2021, U.S. Provisional Patent Application No. 63/300,005, filed on Jan. 16, 2022, U.S. Provisional Patent Application No. 63/307,207, filed on Feb. 7, 2022, U.S. Provisional Patent Application No. 63/307,203, filed on Feb. 7, 2022, and U.S. Provisional Patent Application No. 63/307,217, filed on Feb. 7, 2022 all of which are incorporated herein by reference in their entirety.

BACKGROUND

I. Technical Field

The present disclosure generally relates to the field of extended reality. More specifically, the present disclosure relates to systems, methods, and devices for providing productivity applications using an extended reality environment.

II. Background Information

For many years, PC users were faced with a productivity dilemma: either to limit their mobility (when selecting a desktop computer) or to limit their screen size (when selecting a laptop computer). One partial solution to this dilemma is using a docking station. A docking station is an interface device for connecting a laptop computer with other devices. By plugging the laptop computer into the docking station, laptop users can enjoy the increased visibility provided by a larger monitor. But because the large monitor is stationary, the mobility of the user—while improved—is still limited. For example, even laptop users with docking stations do not have the freedom of using two 32" screens anywhere they want.

Some of the disclosed embodiments are directed to providing a new approach for solving the productivity dilemma, one that uses extended reality (XR) to provide a mobile environment that enables users to experience the comfort of a stationary workspace anywhere they want by providing virtual desktop-like screens.

SUMMARY

Embodiments consistent with the present disclosure provide systems, methods, and devices for providing and supporting productivity applications using an extended reality environment.

Some disclosed embodiments may include systems, methods and non-transitory computer readable media for enabling content sharing between users of wearable extended reality appliances. Some of these embodiments may involve establishing a link between a first wearable extended reality appliance and a second wearable extended reality appliance; presenting through the first wearable extended reality appliance first virtual content; obtaining a first command to display the first virtual content via the second wearable extended reality appliance; in response to the first command, causing the first virtual content to be transmitted for display to the second wearable extended reality appliance; receiving from the second wearable extended reality appliance, second virtual content for display via the first wearable extended reality appliance; and presenting via the first wearable extended reality appliance the second virtual content received from the second wearable extended reality appliance.

Some disclosed embodiments may include systems, methods and non-transitory computer readable media for providing situational awareness to users of wearable extended reality appliances. Some of these embodiments may involve causing virtual content to be displayed through a first wearable extended reality appliance; detecting a second wearable extended reality appliance in proximity to the first wearable extended reality appliance; establishing a link between the first wearable extended reality appliance and the second wearable extended reality appliance; and transmitting data representing at least a portion of the virtual content in an obscured form to the second wearable extended reality appliance, wherein the obscured form provides an indication of a position of the at least a portion of the virtual content in a three-dimensional space without revealing substance of the virtual content in obscured form.

Some disclosed embodiments may include systems, methods and non-transitory computer readable media for tying a virtual whiteboard to a physical space. Some of these embodiments may involve receiving via a wireless network, an indication of a location of a first wearable extended reality appliance; performing a lookup in a repository of virtual whiteboards and locations thereof to determine that the location of the first wearable extended reality appliance corresponds to a location of a particular virtual whiteboard; transmitting to the first wearable extended reality appliance, data corresponding to content of the particular virtual whiteboard to thereby enable a first user of the first wearable extended reality appliance to virtually view the content of the particular virtual whiteboard and to add virtual content to the particular virtual whiteboard; receiving, during a first time period, the virtual content added by the first user; receiving via the wireless network at a second time period after the first wearable extended reality appliance is no longer in the location of the particular virtual whiteboard, an indication that a second wearable extended reality appliance is in the location of the particular virtual whiteboard; and transmitting to the second wearable extended reality appliance, data corresponding to the content and the added content of the particular virtual whiteboard, to thereby enable a second user of the second wearable extended reality appliance to view the content and the added content while the first user is absent from the location of the particular virtual whiteboard.

Some disclosed embodiments may include systems, methods and non-transitory computer readable media for transferring virtual content to a physical display device. Some of these embodiments may involve presenting an extended reality environment in a room via a wearable extended reality appliance, the wearable extended reality appliance being configured to be paired with multiple display devices located in the room, wherein each display device is associated with a unique network identifier; receiving input associated with the wearable extended reality appliance to cause presentation of a specific virtual object in the extended reality environment on a target display device; receiving image data from an image sensor associated with the wearable extended reality appliance, the image data depicting the target display device; analyzing the image data to identify the target display device; upon identifying the target display device, determining a network identifier of the target display device; using the determined network identifier of the target display device to establish a communications link with the target display device; and transmitting data representing the specific virtual object to the target display device, wherein the transmitted data enables the target display device to present the specific virtual object.

Some disclosed embodiments may include systems, methods and non-transitory computer readable media for simulating user interactions with shared content. Some of these embodiments may involve establishing a communication channel for sharing content and user interactions between a first wearable extended reality appliance and at least one second wearable extended reality appliance; transmitting to the at least one second wearable extended reality appliance, first data representing an object associated with the first wearable extended reality appliance, the first data enabling a virtual representation of the object to be displayed through the at least one second wearable extended reality appliance; receiving image data from an image sensor associated with the first wearable extended reality appliance; detecting in the image data at least one user interaction associated with the object, the at least one user interaction including a human hand pointing to a specific portion of the object; and based on the detection of the at least one user interaction in the image data, transmitting to the at least one second wearable extended reality appliance second data indicating an area of the specific portion of the object.

Some disclosed embodiments may include systems, methods and non-transitory computer readable media for managing content placement in extended reality environments. Some of these embodiments may involve receiving a request from an entity to place a virtual content at a specific geographic location in at least one shared extended reality environment that includes a plurality of virtual objects, wherein the plurality of virtual objects are viewable by a plurality of wearable extended reality appliances registered to the at least one shared extended reality environment; obtaining information associated with the request; accessing a plurality of content placement rules defining geographical restrictions on extended reality environment content placement; based on the obtained information, determining that the request from the entity to place the virtual content at the specific geographic location corresponds to a specific content placement rule; implementing the specific content placement rule to prevent a display of the virtual content at the specific geographic location in the at least one shared extended reality environment by at least some of the plurality of wearable extended reality appliances when a condition of the specific content placement rule is not met; and implementing the specific content placement rule to enable the display of the virtual content at the specific geographic location in the at least one shared extended reality environment by at least some of the plurality of wearable extended reality appliances when the condition of the specific content placement rule is met.

Some disclosed embodiments may include systems, methods and non-transitory computer readable media for presenting virtual content to multiple viewers. Some of these embodiments may involve receiving sensor data indicative of a plurality of wearable extended reality appliances located in a room; receiving a command to share a virtual object with the plurality of wearable extended reality appliances; analyzing the sensor data to determine a first location in the room of a first wearable extended reality appliance, a second location in the room of a second wearable extended reality appliance, and a third location in the room of a third wearable extended reality appliance; determining a position for displaying the virtual object in the room based on the determined first location, the determined second location, and the determined third location; causing a first display of the virtual object at the determined position through the first wearable extended reality appliance, the first display being rendered from a first perspective; causing a second display of the virtual object at the determined position through the second wearable extended reality appliance, the second display being rendered from a second perspective different from the first perspective; and causing a third display of the virtual object at the determined position through the third wearable extended reality appliance, the third display being rendered from a third perspective different from the first perspective and the second perspective.

Some disclosed embodiments may include systems, methods and non-transitory computer readable media for making virtual colored markings on objects. Some of these embodiments may involve receiving an indication of an object; receiving from an image sensor an image of a hand of an individual holding a physical marking implement; detecting in the image a color associated with the marking implement; receiving from the image sensor image data indicative of movement of a tip of the marking implement and locations of the tip; determining from the image data when the locations of the tip correspond to locations on the object; and generating, in the detected color, virtual markings on the object at the corresponding locations.

Some disclosed embodiments may include systems, methods and non-transitory computer readable media for enabling wearable extended reality appliances to share virtual content. Some of these embodiments may involve generating a visual code reflecting a first physical position of a mobile device, the visual code being configured to be read by a plurality of wearable extended reality appliances; presenting the visual code on a display of the mobile device for detection by the plurality of wearable extended reality appliances, to thereby enable the plurality of wearable extended reality appliances to share content in a common coordinate system upon the detection of the visual code; detecting movement of the mobile device to a second physical position different from the first physical position; and upon detecting movement of the mobile device, altering the presentation of the visual code so that the visual code is unavailable for use in content sharing.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 19 is a flowchart illustrating an exemplary process for tying a virtual whiteboard to a physical space, consistent with some embodiments of the present disclosure.

FIG. 37A depicts an exemplary geographic location that is not yet registered to any extended reality environment.

FIG. 37B depicts the exemplary geographic location described in FIG. 37A after it is registered to the public extended reality environment, consistent with some embodiments of the disclosure.

FIG. 42B illustrates an exemplary display of a virtual object through a wearable extended reality appliance rendered from different perspectives, consistent with some embodiments of the present disclosure.

FIG. 43 illustrates a further exemplary presentation of virtual content to multiple viewers, consistent with some embodiments of the present disclosure.

FIGS. 51A to 51D are examples of several images taken from a wearable extended reality appliance at different times depicting the movement of a physical marking implement with respect to an object, consistent with some embodiments of the present disclosure.

FIG. 53 is a schematic illustration of an individual holding a physical marking implement and a plurality of individuals in a remote location interacting with the same virtual color markings on the same object, consistent with some embodiments of the present disclosure.

FIG. 54 is a schematic illustration of an individual viewing a virtual color marking on an object made by an individual holding a physical marking implement who has since left the environment of the object, consistent with some embodiments of the present disclosure.

DETAILED DESCRIPTION

Figure 1:
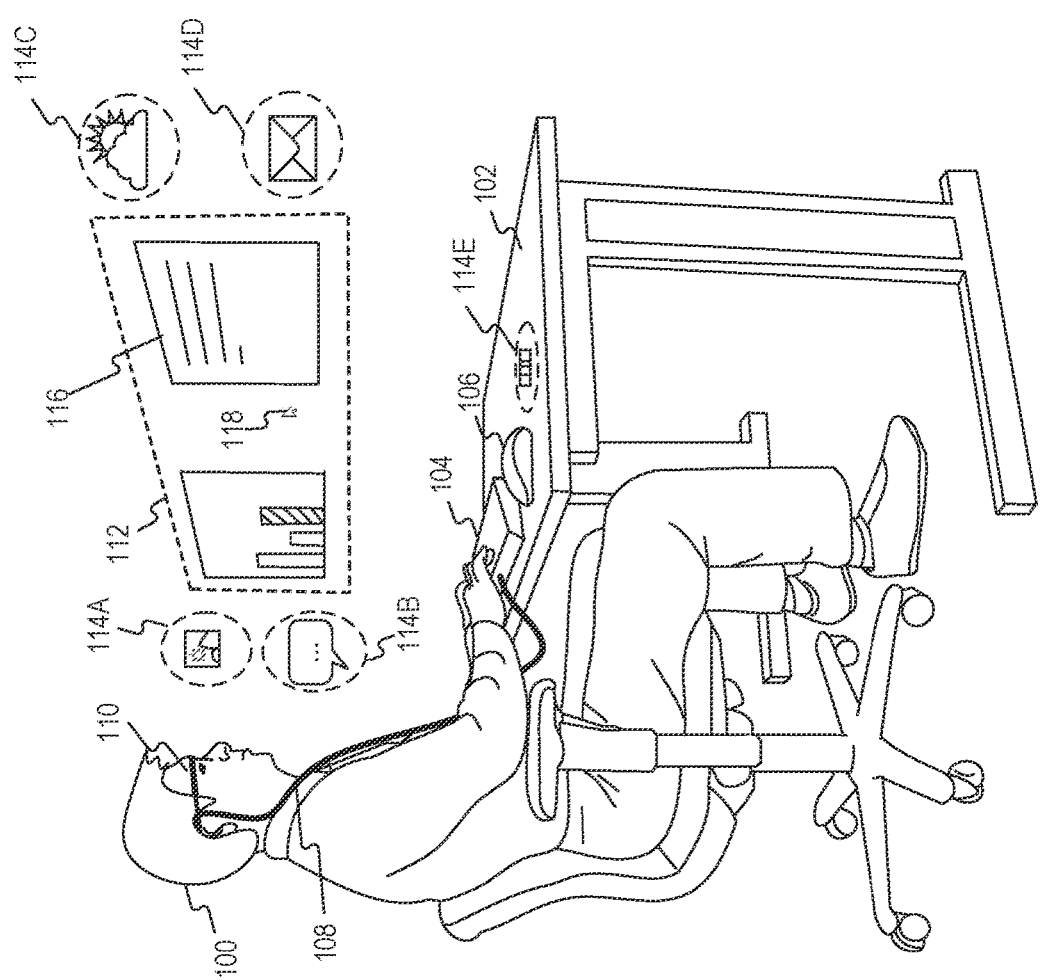
FIG. 1 is a schematic illustration of a user, using an example extended reality system, consistent with the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

The present disclosure is directed to systems and methods for providing users an extended reality environment. The term "extended reality environment," which may also be referred to as "extended reality," "extended reality space," or "extended environment," refers to all types of real-and-virtual combined environments and human-machine interactions at least partially generated by computer technology. The extended reality environment may be a completely simulated virtual environment or a combined real- and-virtual environment that a user may perceive from different perspectives. In some examples, the user may interact with elements of the extended reality environment. One non-limiting example of an extended reality environment may be a virtual reality environment, also known as "virtual reality" or a "virtual environment." An immersive virtual reality environment may be a simulated non-physical environment which provides to the user the perception of being present in the virtual environment. Another non-limiting example of an extended reality environment may be an augmented reality environment, also known as "augmented reality" or "augmented environment." An augmented reality environment may involve live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both augmented reality environments and mixed reality environments may include a combination of real and virtual worlds, real-time interactions, and accurate 3D registration of virtual and real objects. In some examples, both augmented reality environment and mixed reality environments may include constructive overlaid sensory information that may be added to the physical environment. In other examples, both augmented reality environment and mixed reality environments may include destructive virtual content that may mask at least part of the physical environment.

In some embodiments, the systems and methods may provide the extended reality environment using an extended reality appliance. The term extended reality appliance may include any type of device or system that enables a user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets or any other device worn by a human for purposes of presenting an extended reality to the human. Other extended reality appliances may include holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality appliance may be a non-wearable extended reality appliance. Specifically, the non-wearable extended reality appliance may include multi-projected environment appliances. In some embodiments, an extended reality appliance may be configured to change the viewing perspective of the extended reality environment in response to movements of the user and in response to head movements of the user in particular. In one example, a wearable extended reality appliance may change the field-of-view of the extended reality environment in response to a change of the head pose of the user, such as by changing the spatial orientation without changing the spatial position of the user in the extended reality environment. In another example, a non-wearable extended reality appliance may change the spatial position of the user in the extended reality environment in response to a change in the position of the user in the real world, for example, by changing the spatial position of the user in the extended reality environment without changing the direction of the field-of-view with respect to the spatial position.

According to some embodiments, an extended reality appliance may include a digital communication device configured to at least one of: receiving virtual content data configured to enable a presentation of the virtual content, transmitting virtual content for sharing with at least one external device, receiving contextual data from at least one external device, transmitting contextual data to at least one external device, transmitting of usage data indicative of usage of the extended reality appliance, and transmitting of data based on information captured using at least one sensor included in the extended reality appliance. In additional embodiments, the extended reality appliance may include memory for storing at least one of virtual data configured to enable a presentation of virtual content, contextual data, usage data indicative of usage of the extended reality appliance, sensor data based on information captured using at least one sensor included in the extended reality appliance, software instructions configured to cause a processing device to present the virtual content, software instructions configured to cause a processing device to collect and analyze the contextual data, software instructions configured to cause a processing device to collect and analyze the usage data, and software instructions configured to cause a processing device to collect and analyze the sensor data. In additional embodiments, the extended reality appliance may include a processing device configured to perform at least one of rendering of virtual content, collecting and analyzing contextual data, collecting and analyzing usage data, and collecting and analyzing sensor data. In additional embodiments, the extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining where a human is looking or gazing.

In some embodiments, the systems and methods may use an input device to interact with the extended reality appliance. The term input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, gestures based input data, direction data, or any other data for supply for computation. Some examples of the input device may include a button, a key, a keyboard, a computer mouse, a touchpad, a touchscreen, a joystick, or another mechanism from which input may be received. Another example of an input device may include an integrated computational interface device that includes at least one physical component for receiving input from a user. The integrated computational interface device may include at least a memory, a processing device, and the at least one physical component for receiving input from a user. In one example, the integrated computational interface device may further include a digital network interface that enables digital communication with other computing devices. In one example, the integrated computational interface device may further include a physical component for outputting information to the user. In some examples, all components of the integrated computational interface device may be included in a single housing, while in other examples the components may be distributed among two or more housings. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs.

In some embodiments, image data may be captured using one or more image sensors. In some examples, the image sensors may be included in the extended reality appliance, in a wearable device, in the wearable extended reality device, in the input device, in an environment of a user, and so forth. In some examples, the image data may be read from memory, may be received from an external device, may be generated (for example, using a generative model), and so forth. Some non-limiting examples of image data may include images, grayscale images, color images, 2D images, 3D images, videos, 2D videos, 3D videos, frames, footages, data derived from other image data, and so forth. In some examples, the image data may be encoded in any analog or digital format. Some non-limiting examples of such formats may include raw formats, compressed formats, uncompressed formats, lossy formats, lossless formats, JPEG, GIF, PNG, TIFF, BMP, NTSC, PAL, SECAM, MPEG, MPEG-4 Part 14, MOV, WMV, FLV, AVI, AVCHD, WebM, MKV, and so forth.

In some embodiments, the extended reality appliance may receive digital signals, for example, from the input device. The term digital signals refers to a series of digital values that are discrete in time. The digital signals may represent, for example, sensor data, textual data, voice data, video data, virtual data, or any other form of data that provides perceptible information. Consistent with the present disclosure, the digital signals may be configured to cause the extended reality appliance to present virtual content. In one embodiment, the virtual content may be presented in a selected orientation. In this embodiment, the digital signals may indicate a position and an angle of a viewpoint in an environment, such as an extended reality environment. Specifically, the digital signals may include an encoding of the position and angle in six degree-of-freedom coordinates (e.g., forward/back, up/down, left/right, yaw, pitch, and roll). In another embodiment, the digital signals may include an encoding of the position as three-dimensional coordinates (e.g., x, y, and z), and an encoding of the angle as a vector originating from the encoded position. Specifically, the digital signals may indicate the orientation and an angle of the presented virtual content in an absolute coordinates of the environment, for example, by encoding yaw, pitch and roll of the virtual content with respect to a standard default angle. In another embodiment, the digital signals may indicate the orientation and the angle of the presented virtual content with respect to a viewpoint of another object (e.g., a virtual object, a physical object, etc.), for example, by encoding yaw, pitch, and roll of the virtual content with respect a direction corresponding to the viewpoint or to a direction corresponding to the other object. In another embodiment, such digital signals may include one or more projections of the virtual content, for example, in a format ready for presentation (e.g., image, video, etc.). For example, each such projection may correspond to a particular orientation or a particular angle. In another embodiment, the digital signals may include a representation of virtual content, for example, by encoding objects in a three-dimensional array of voxels, in a polygon mesh, or in any other format in which virtual content may be presented.

In some embodiments, the digital signals may be configured to cause the extended reality appliance to present virtual content. The term virtual content may include any type of data representation that may be displayed by the extended reality appliance to the user. The virtual content may include a virtual object, inanimate virtual content, animate virtual content configured to change over time or in response to triggers, virtual two-dimensional content, virtual three-dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation.). The rendered visual presentation may change to reflect changes to a status object or changes in the viewing angle of the object, for example, in a way that mimics changes in the appearance of physical objects. In another embodiment, the virtual content may include a virtual display (also referred to as a "virtual display screen" or a "virtual screen" herein), such as a virtual computer screen, a virtual tablet screen or a virtual smartphone screen, configured to display information generated by an operating system, in which the operating system may be configured to receive textual data from a physical keyboard and/or a virtual keyboard and to cause a display of the textual content in the virtual display screen. In one example, illustrated in FIG. 1, the virtual content may include a virtual environment that includes a virtual computer screen and a plurality of virtual objects. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), using an extended reality appliance. In one example, a virtual display may present content produced by a regular operating system that may be equally presented on a physical display screen. In one example, a textual content entered using a keyboard (for example, using a physical keyboard, using a virtual keyboard, etc.) may be presented on a virtual display in real time as the textual content is typed. In one example, a virtual cursor may be presented on a virtual display, and the virtual cursor may be controlled by a pointing device (such as a physical pointing device, a virtual pointing device, a computer mouse, a joystick, a touchpad, a physical touch controller, and so forth). In one example, one or more windows of a graphical user interface operating system may be presented on a virtual display. In another example, content presented on a virtual display may be interactive, that is, it may change in reaction to actions of users. In yet another example, a presentation of a virtual display may include a presentation of a screen frame, or may include no presentation of a screen frame.

Some disclosed embodiments may include and/or access a data structure or a database. The terms data structure and a database, consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, Entity-Relationship model, a graph, a hypergraph, a matrix, a tensor, and so forth. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure does not require information to be co-located. It may be distributed across multiple servers, for example, that may be owned or operated by the same or different entities. Thus, the term data structure in the singular is inclusive of plural data structures.

In some embodiments, the system may determine the confidence level in received input or in any determined value. The term confidence level refers to any indication, numeric or otherwise, of a level (e.g., within a predetermined range) indicative of an amount of confidence the system has at determined data. For example, the confidence level may have a value between 1 and 10. Alternatively, the confidence level may be expressed as a percentage or any other numerical or non-numerical indication. In some cases, the system may compare the confidence level to a threshold. The term threshold may denote a reference value, a level, a point, or a range of values. In operation, when the confidence level of determined data exceeds the threshold (or is below it, depending on a particular use case), the system may follow a first course of action and, when the confidence level is below it (or above it, depending on a particular use case), the system may follow a second course of action. The value of the threshold may be predetermined for each type of examined object or may be dynamically selected based on different considerations.

System Overview

Reference is now made to FIG. 1, which illustrates a user that uses an example extended reality system consistent with various embodiments of the present disclosure. FIG. 1 is an exemplary representation of just one embodiment, and it is to be understood that some illustrated elements might be omitted and others added within the scope of this disclosure.

As shown, a user 100 is sitting behind table 102, supporting a keyboard 104 and mouse 106. Keyboard 104 is connected by wire 108 to a wearable extended reality appliance 110 that displays virtual content to user 100. Alternatively or additionally to wire 108, keyboard 104 may connect to wearable extended reality appliance 110 wirelessly. For illustration purposes, the wearable extended reality appliance is depicted as a pair of smart glasses, but, as described above, wearable extended reality appliance 110 may be any type of head-mounted device used for presenting an extended reality to user 100. The virtual content displayed by wearable extended reality appliance 110 includes a virtual screen 112 (also referred to as a "virtual display screen" or a "virtual display" herein) and a plurality of virtual widgets 114. Virtual widgets 114A-114D are displayed next to virtual screen 112 and virtual widget 114E is displayed on table 102. User 100 may input text to a document 116 displayed in virtual screen 112 using keyboard 104; and may control virtual cursor 118 using mouse 106. In one example, virtual cursor 118 may move anywhere within virtual screen 112. In another example, virtual cursor 118 may move anywhere within virtual screen 112 and may also move to any one of virtual widgets 114A-114D but not to virtual widget 114E. In yet another example, virtual cursor 118 may move anywhere within virtual screen 112 and may also move to any one of virtual widgets 114A-114E. In an additional example, virtual cursor 118 may move anywhere in the extended reality environment including virtual screen 112 and virtual widgets 114A-114E. In yet another example, virtual cursor may move on all available surfaces (i.e., virtual surfaces or physical surfaces) or only on selected surfaces in the extended reality environment. Alternatively or additionally, user 100 may interact with any one of virtual widgets 114A-114E, or with selected virtual widgets, using hand gestures recognized by wearable extended reality appliance 110. For example, virtual widget 114E may be an interactive widget (e.g., a virtual slider controller) that may be operated with hand gestures.

Figure 2:
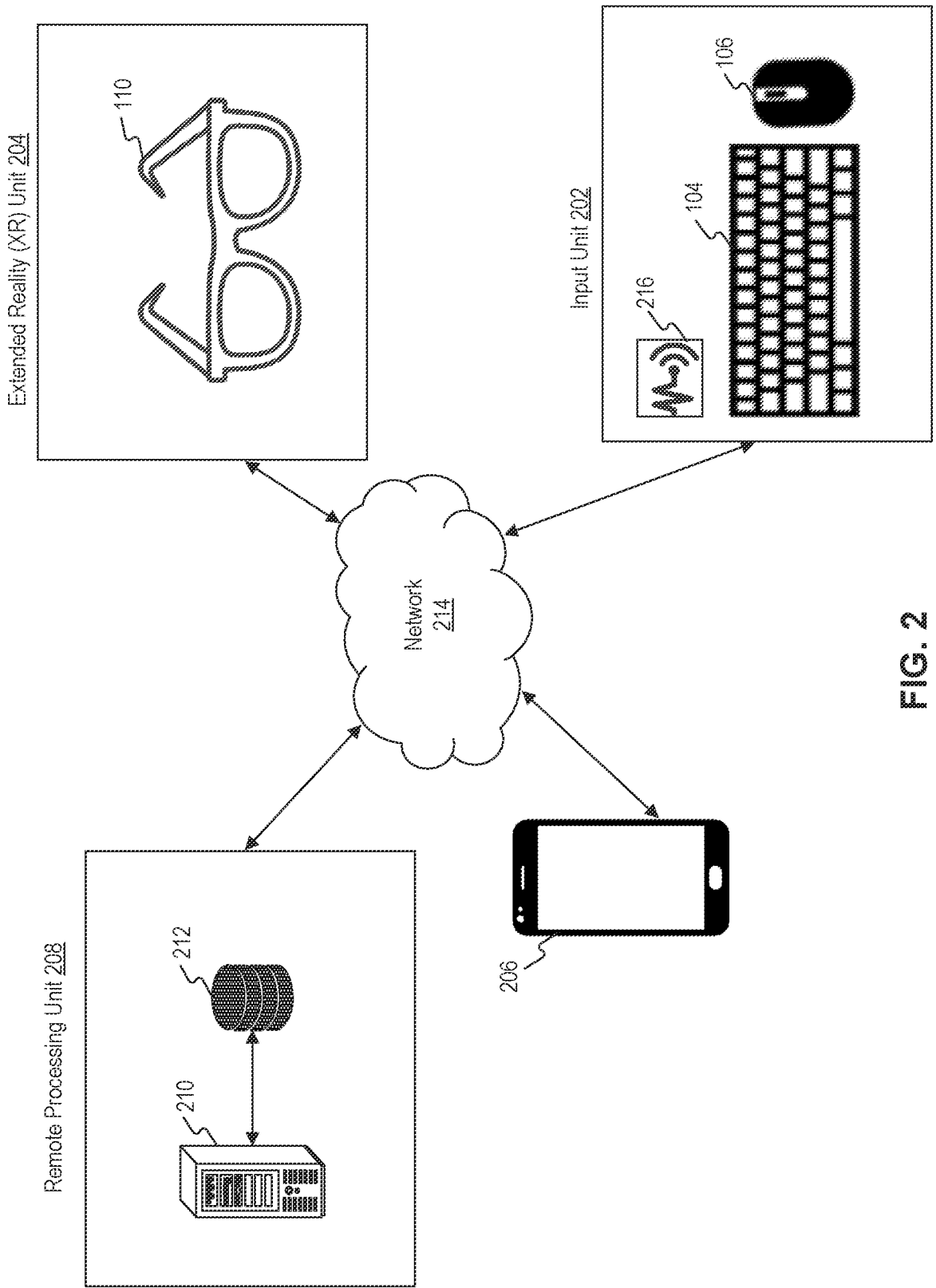
FIG. 2 is a schematic illustration of the main components of the example extended reality system of FIG. 1, consistent with the present disclosure.

FIG. 2 illustrates an example of a system 200 that provides extended reality (XR) experience to users, such as user 100. FIG. 2 is an exemplary representation of just one embodiment, and it is to be understood that some illustrated elements might be omitted and others added within the scope of this disclosure. System 200 may be computer-based and may include computer system components, wearable appliances, workstations, tablets, handheld computing devices, memory devices, and/or internal network(s) connecting the components. System 200 may include or be connected to various network computing resources (e.g., servers, routers, switches, network connections, storage devices, etc.) for supporting services provided by system 200. Consistent with the present disclosure, system 200 may include an input unit 202, an XR unit 204, a mobile communications device 206, and a remote processing unit 208. Remote processing unit 208 may include a server 210 coupled to one or more physical or virtual storage devices, such as a data structure 212. System 200 may also include or be connected to a communications network 214 that facilitates communications and data exchange between different system components and the different entities associated with system 200.

Consistent with the present disclosure, input unit 202 may include one or more devices that may receive input from user 100. In one embodiment, input unit 202 may include a textual input device, such as keyboard 104. The textual input device may include all possible types of devices and mechanisms for inputting textual information to system 200.

Examples of textual input devices may include mechanical keyboards, membrane keyboards, flexible keyboards, QWERTY keyboards, Dvorak keyboards, Colemak keyboards, chorded keyboards, wireless keyboards, keypads, key-based control panels, or other arrays of control keys, vision input devices, or any other mechanism for inputting text, whether the mechanism is provided in physical form or is presented virtually. In one embodiment, input unit 202 may also include a pointing input device, such as mouse 106. The pointing input device may include all possible types of devices and mechanisms for inputting two-dimensional or three-dimensional information to system 200. In one example, two-dimensional input from the pointing input device may be used for interacting with virtual content presented via the XR unit 204. Examples of pointing input devices may include a computer mouse, trackball, touchpad, trackpad, touchscreen, joystick, pointing stick, stylus, light pen, or any other physical or virtual input mechanism. In one embodiment, input unit 202 may also include a graphical input device, such as a touchscreen configured to detect contact, movement, or break of movement. The graphical input device may use any of a plurality of touch sensitivity technologies, including, but not limited to, capacitive, resistive, infrared, and surface acoustic wave technologies as well as other proximity sensor arrays or other elements for determining one or more points of contact. In one embodiment, input unit 202 may also include one or more voice input devices, such as a microphone. The voice input device may include all possible types of devices and mechanisms for inputting voice data to facilitate voice-enabled functions, such as voice recognition, voice replication, digital recording, and telephony functions. In one embodiment, input unit 202 may also include one or more image input devices, such as an image sensor, configured to capture image data. In one embodiment, input unit 202 may also include one or more haptic gloves configured to capture hands motion and pose data. In one embodiment, input unit 202 may also include one or more proximity sensors configured to detect presence and/or movement of objects in a selected region near the sensors.

In accordance with some embodiments, the system may include at least one sensor configured to detect and/or measure a property associated with the user, the user's action, or user's environment. One example of the at least one sensor, is sensor 216 included in input unit 202. Sensor 216 may be a motion sensor, a touch sensor, a light sensor, an infrared sensor, an audio sensor, an image sensor, a proximity sensor, a positioning sensor, a gyroscope, a temperature sensor, a biometric sensor, or any other sensing devices to facilitate related functionalities. Sensor 216 may be integrated with, or connected to, the input devices or it may be separated from the input devices. In one example, a thermometer may be included in mouse 106 to determine the body temperature of user 100. In another example, a positioning sensor may be integrated with keyboard 104 to determine movement of user 100 relative to keyboard 104. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, image based positioning technology, indoor positioning technology, outdoor positioning technology, or any other positioning technology.

In accordance with some embodiments, the system may include one or more sensors for identifying a position and/or a movement of a physical device (such as a physical input device, a physical computing device, keyboard 104, mouse 106, wearable extended reality appliance 110, and so forth). The one or more sensors may be included in the physical device or may be external to the physical device. In some examples, an image sensor external to the physical device (for example, an image sensor included in another physical device) may be used to capture image data of the physical device, and the image data may be analyzed to identify the position and/or the movement of the physical device. For example, the image data may be analyzed using a visual object tracking algorithm to identify the movement of the physical device, may be analyzed using a visual object detection algorithm to identify the position of the physical device (for example, relative to the image sensor, in a global coordinates system, etc.), and so forth. In some examples, an image sensor included in the physical device may be used to capture image data, and the image data may be analyzed to identify the position and/or the movement of the physical device. For example, the image data may be analyzed using visual odometry algorithms to identify the position of the physical device, may be analyzed using an ego-motion algorithm to identify movement of the physical device, and so forth. In some examples, a positioning sensor, such as an indoor positioning sensor or an outdoor positioning sensor, may be included in the physical device and may be used to determine the position of the physical device. In some examples, a motion sensor, such as an accelerometer or a gyroscope, may be included in the physical device and may be used to determine the motion of the physical device. In some examples, a physical device, such as a keyboard or a mouse, may be configured to be positioned on a physical surface. Such physical device may include an optical mouse sensor (also known as non-mechanical tracking engine) aimed towards the physical surface, and the output of the optical mouse sensor may be analyzed to determine movement of the physical device with respect to the physical surface.

Consistent with the present disclosure, XR unit 204 may include a wearable extended reality appliance configured to present virtual content to user 100. One example of the wearable extended reality appliance is wearable extended reality appliance 110. Additional examples of wearable extended reality appliance may include a Virtual Reality (VR) device, an Augmented Reality (AR) device, a Mixed Reality (MR) device, or any other device capable of generating extended reality content. Some non-limiting examples of such devices may include Nreal Light, Magic Leap One, Varjo, Quest 1/2, Vive, and others. In some embodiments, XR unit 204 may present virtual content to user 100. Generally, an extended reality appliance may include all real- and virtual combined environments and human-machine interactions generated by computer technology and wearables. As mentioned above, the term "extended reality" (XR) refers to a superset which includes the entire spectrum from "the complete real" to "the complete virtual." It includes representative forms such as augmented reality (AR), mixed reality (MR), virtual reality (VR), and the areas interpolated among them. Accordingly, it is noted that the terms "XR appliance," "AR appliance," "VR appliance,"

and "MR appliance" may be used interchangeably herein and may refer to any device of the variety of appliances listed above.

Consistent with the present disclosure, the system may exchange data with a variety of communication devices associated with users, for example, mobile communications device 206. The term "communication device" is intended to include all possible types of devices capable of exchanging data using digital communications network, analog communication network or any other communications network configured to convey data. In some examples, the communication device may include a smartphone, a tablet, a smartwatch, a personal digital assistant, a desktop computer, a laptop computer, an IoT device, a dedicated terminal, a wearable communication device, and any other device that enables data communications. In some cases, mobile communications device 206 may supplement or replace input unit 202. Specifically, mobile communications device 206 may be associated with a physical touch controller that may function as a pointing input device. Moreover, mobile communications device 206 may also, for example, be used to implement a virtual keyboard and replace the textual input device. For example, when user 100 steps away from table 102 and walks to the break room with his smart glasses, he may receive an email that requires a quick answer. In this case, the user may select to use his or her own smartwatch as the input device and to type the answer to the email while it is virtually presented by the smart glasses.

Consistent with the present disclosure, embodiments of the system may involve the usage of a cloud server. The term "cloud server" refers to a computer platform that provides services via a network, such as the Internet. In the example embodiment illustrated in FIG. 2, server 210 may use virtual machines that may not correspond to individual hardware. For example, computational and/or storage capabilities may be implemented by allocating appropriate portions of desirable computation/storage power from a scalable repository, such as a data center or a distributed computing environment. Specifically, in one embodiment, remote processing unit 208 may be used together with XR unit 204 to provide the virtual content to user 100. In one example configuration, server 210 may be a cloud server that functions as the operation system (OS) of the wearable extended reality appliance. In one example, server 210 may implement the methods described herein using customized hard-wired logic, one or more Application Specific Integrated Circuits (ASICs), Field Programmable Gate Arrays (FPGAs), firmware, and/or program logic which, in combination with the computer system, cause server 210 to be a special-purpose machine.

In some embodiments, server 210 may access data structure 212 to determine, for example, virtual content to display user 100. Data structure 212 may utilize a volatile or non-volatile, magnetic, semiconductor, tape, optical, removable, non-removable, other type of storage device or tangible or non-transitory computer-readable medium, or any medium or mechanism for storing information. Data structure 212 may be part of server 210 or separate from server 210, as shown. When data structure 212 is not part of server 210, server 210 may exchange data with data structure 212 via a communication link. Data structure 212 may include one or more memory devices that store data and instructions used to perform one or more features of the disclosed methods. In one embodiment, data structure 212 may include any of a plurality of suitable data structures, ranging from small data structures hosted on a workstation to large data structures distributed among data centers. Data structure 212 may also include any combination of one or more data structures controlled by memory controller devices (e.g., servers) or software.

Consistent with the present disclosure, communications network may be any type of network (including infrastructure) that supports communications, exchanges information, and/or facilitates the exchange of information between the components of a system. For example, communications network 214 in system 200 may include, for example, a telephone network, an extranet, an intranet, the Internet, satellite communications, off-line communications, wireless communications, transponder communications, a Local Area Network (LAN), wireless network (e.g., a Wi-Fi/302.11 network), a Wide Area Network (WAN), a Virtual Private Network (VPN), digital communication network, analog communication network, or any other mechanism or combinations of mechanism that enable data transmission.

The components and arrangements of system 200 shown in FIG. 2 are intended to be exemplary only and are not intended to limit any embodiment, as the system components used to implement the disclosed processes and features may vary.

Figure 3:
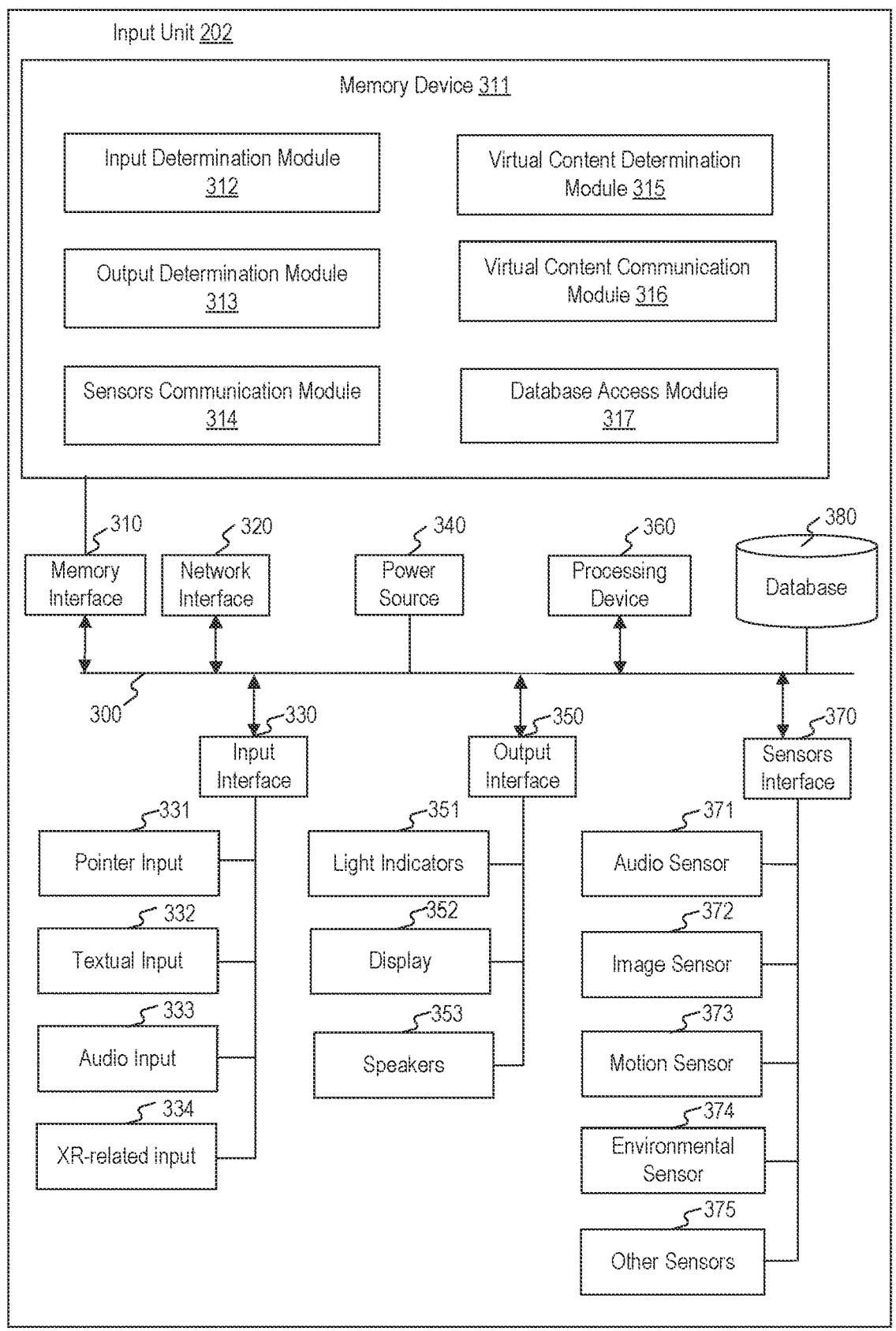
FIG. 3 is a block diagram illustrating some of the components of an input unit, consistent with the present disclosure.

FIG. 3 is a block diagram of an exemplary configuration of input unit 202. FIG. 3 is an exemplary representation of just one embodiment, and it is to be understood that some illustrated elements might be omitted and others added within the scope of this disclosure. In the embodiment of FIG. 3, input unit 202 may directly or indirectly access a bus 300 (or other communication mechanism) that interconnects subsystems and components for transferring information within input unit 202. For example, bus 300 may interconnect a memory interface 310, a network interface 320, an input interface 330, a power source 340, an output interface 350, a processing device 360, a sensors interface 370, and a database 380.

Memory interface 310, shown in FIG. 3, may be used to access a software product and/or data stored on a non-transitory computer-readable medium. Generally, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals. In the specific embodiment illustrated in FIG. 3, memory interface 310 may be used to access a software product and/or data stored on a memory device, such as memory device 311. Memory device 311 may include high-speed random-access memory and/or non-volatile memory, such as one or more magnetic disk storage devices, one or more optical storage devices, and/or flash memory (e.g., NAND, NOR). Consistent with the present disclosure, the components of memory device 311 may be distributed in more than units of system 200 and/or in more than one memory device.

Memory device 311, shown in FIG. 3, may contain software modules to execute processes consistent with the present disclosure. In particular, memory device 311 may include an input determination module 312, an output determination module 313, a sensors communication module 314, a virtual content determination module 315, a virtual content communication module 316, and a database access module 317. Modules 312-317 may contain software instructions for execution by at least one processor (e.g., processing device 360) associated with input unit 202. Input determination module 312, output determination module 313, sensors communication module 314, virtual content determination module 315, virtual content communication module 316, and database access module 317 may cooperate to perform various operations. For example, input determination module 312 may determine text using data received from, for example, keyboard 104. Thereafter, output determination module 313 may cause presentation of the recent inputted text, for example on a dedicated display 352 physically or wirelessly coupled to keyboard 104. This way, when user 100 types, he can see a preview of the typed text without constantly moving his head up and down to look at virtual screen 112. Sensors communication module 314 may receive data from different sensors to determine a status of user 100. Thereafter, virtual content determination module 315 may determine the virtual content to display, based on received input and the determined status of user 100. For example, the determined virtual content may be a virtual presentation of the recent inputted text on a virtual screen virtually located adjacent to keyboard 104. Virtual content communication module 316 may obtain virtual content that is not determined by virtual content determination module 315 (e.g., an avatar of another user). The retrieval of the virtual content may be from database 380, from remote processing unit 208, or any other source.

In some embodiments, input determination module 312 may regulate the operation of input interface 330 in order to receive pointer input 331, textual input 332, audio input 333, and XR-related input 334. Details on the pointer input, the textual input, and the audio input are described above. The term "XR-related input" may include any type of data that may cause a change in the virtual content displayed to user 100. In one embodiment, XR-related input 334 may include image data of user 100, a wearable extended reality appliance (e.g., detected hand gestures of user 100). In another embodiment, XR-related input 334 may include wireless communication indicating a presence of another user in proximity to user 100. Consistent with the present disclosure, input determination module 312 may concurrently receive different types of input data. Thereafter, input determination module 312 may further apply different rules based on the detected type of input. For example, a pointer input may have precedence over voice input.

In some embodiments, output determination module 313 may regulate the operation of output interface 350 in order to generate output using light indicators 351, display 352, and/or speakers 353. In general, the output generated by output determination module 313 does not include virtual content to be presented by a wearable extended reality appliance. Instead, the output generated by output determination module 313 include various outputs that relates to the operation of input unit 202 and/or the operation of XR unit 204. In one embodiment, light indicators 351 may include a light indicator that shows the status of a wearable extended reality appliance. For example, the light indicator may display green light when wearable extended reality appliance 110 are connected to keyboard 104, and blinks when wearable extended reality appliance 110 has low battery. In another embodiment, display 352 may be used to display operational information. For example, the display may present error messages when the wearable extended reality appliance is inoperable. In another embodiment, speakers 353 may be used to output audio, for example, when user 100 wishes to play some music for other users.

In some embodiments, sensors communication module 314 may regulate the operation of sensors interface 370 in order to receive sensor data from one or more sensors, integrated with, or connected to, an input device. The one or more sensors may include: audio sensor 371, image sensor 372, motion sensor 373, environmental sensor 374 (e.g., a temperature sensor, ambient light detectors, etc.), and other sensors 375. In one embodiment, the data received from sensors communication module 314 may be used to determine the physical orientation of the input device. The physical orientation of the input device may be indicative of a state of the user and may be determined based on combination of a tilt movement, a roll movement, and a lateral movement. Thereafter, the physical orientation of the input device may be used by virtual content determination module 315 to modify display parameters of the virtual content to match the state of the user (e.g., attention, sleepy, active, sitting, standing, leaning backwards, leaning forward, walking, moving, riding, etc.).

In some embodiments, virtual content determination module 315 may determine the virtual content to be displayed by the wearable extended reality appliance. The virtual content may be determined based on data from input determination module 312, sensors communication module 314, and other sources (e.g., database 380). In some embodiments, determining the virtual content may include determining the distance, the size, and the orientation of the virtual objects. The determination of the position of the virtual objects may be determined based on the type of the virtual objects. Specifically, with regards to the example illustrated in FIG. 1, the virtual content determination module 315 may determine to place four virtual widgets 114A-114D on the sides of virtual screen 112 and to place virtual widget 114E on table 102 because virtual widget 114E is a virtual controller (e.g., volume bar). The determination of the position of the virtual objects may further be determined based on user's preferences. For example, for left-handed users, virtual content determination module 315 may determine placing a virtual volume bar left of keyboard 104; and for right-handed users, virtual content determination module 315 may determine placing the virtual volume bar right of keyboard 104.

In some embodiments, virtual content communication module 316 may regulate the operation of network interface 320 in order to obtain data from one or more sources to be presented as virtual content to user 100. The one or more sources may include other XR units 204, the user's mobile communications device 206, remote processing unit 208, publicly available information, etc. In one embodiment, virtual content communication module 316 may communicate with mobile communications device 206 in order to provide a virtual representation of mobile communications device 206. For example, the virtual representation may enable user 100 to read messages and interact with applications installed on the mobile communications device 206. Virtual content communication module 316 may also regulate the operation of network interface 320 in order to share virtual content with other users. In one example, virtual content communication module 316 may use data from input determination module to identify a trigger (e.g., the trigger may include a gesture of the user) and to transfer content from the virtual display to a physical display (e.g., TV) or to a virtual display of a different user.

In some embodiments, database access module 317 may cooperate with database 380 to retrieve stored data. The retrieved data may include, for example, privacy levels associated with different virtual objects, the relationship between virtual objects and physical objects, the user's preferences, the user's past behavior, and more. As described above, virtual content determination module 315 may use the data stored in database 380 to determine the virtual content. Database 380 may include separate databases, including, for example, a vector database, raster database, tile database, viewport database, and/or a user input database. The data stored in database 380 may be received from modules 314-317 or other components of system 200. Moreover, the data stored in database 380 may be provided as input using data entry, data transfer, or data uploading.

Modules 312-317 may be implemented in software, hardware, firmware, a mix of any of those, or the like. In some embodiments, any one or more of modules 312-317 and data associated with database 380 may be stored in XR unit 204, mobile communications device 206, or remote processing unit 208. Processing devices of system 200 may be configured to execute the instructions of modules 312-317. In some embodiments, aspects of modules 312-317 may be implemented in hardware, in software (including in one or more signal processing and/or application specific integrated circuits), in firmware, or in any combination thereof, executable by one or more processors, alone, or in various combinations with each other. Specifically, modules 312-317 may be configured to interact with each other and/or other modules of system 200 to perform functions consistent with Some disclosed embodiments. For example, input unit 202 may execute instructions that include an image processing algorithm on data from XR unit 204 to determine head movement of user 100. Furthermore, each functionality described throughout the specification, with regards to input unit 202 or with regards to a component of input unit 202, may correspond to a set of instructions for performing said functionality. These instructions need not be implemented as separate software programs, procedures, or modules. Memory device 311 may include additional modules and instructions or fewer modules and instructions. For example, memory device 311 may store an operating system, such as ANDROID, iOS, UNIX, OSX, WINDOWS, DARWIN, RTXC, LINUX or an embedded operating system such as VXWorkS. The operating system can include instructions for handling basic system services and for performing hardware-dependent tasks.

Network interface 320, shown in FIG. 3, may provide two-way data communications to a network, such as communications network 214. In one embodiment, network interface 320 may include an Integrated Services Digital Network (ISDN) card, cellular modem, satellite modem, or a modem to provide a data communication connection over the Internet. As another example, network interface 320 may include a Wireless Local Area Network (WLAN) card. In another embodiment, network interface 320 may include an Ethernet port connected to radio frequency receivers and transmitters and/or optical (e.g., infrared) receivers and transmitters. The specific design and implementation of network interface 320 may depend on the communications network or networks over which input unit 202 is intended to operate. For example, in some embodiments, input unit 202 may include network interface 320 designed to operate over a GSM network, a GPRS network, an EDGE network, a Wi-Fi or WiMax network, and a Bluetooth network. In any such implementation, network interface 320 may be configured to send and receive electrical, electromagnetic, or optical signals that carry digital data streams or digital signals representing various types of information.

Input interface 330, shown in FIG. 3, may receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. In the depicted embodiment, input interface 330 may receive pointer input 331, textual input 332, audio input 333, and XR-related input 334. In additional embodiment, input interface 330 may be an integrated circuit that may act as bridge between processing device 360 and any of the input devices listed above.

Power source 340, shown in FIG. 3, may provide electrical energy to power input unit 202 and optionally also power XR unit 204. Generally, a power source included in the any device or system in the present disclosure may be any device that can repeatedly store, dispense, or convey electric power, including, but not limited to, one or more batteries (e.g., a lead-acid battery, a lithium-ion battery, a nickel-metal hydride battery, a nickel-cadmium battery), one or more capacitors, one or more connections to external power sources, one or more power convertors, or any combination of them. With reference to the example illustrated in FIG. 3, the power source may be mobile, which means that input unit 202 can be easily carried by a hand (e.g., the total weight of power source 340 may be less than a pound). The mobility of the power source enables user 100 to use input unit 202 in a variety of situations. In other embodiments, power source 340 may be associated with a connection to an external power source (such as an electrical power grid) that may be used to charge power source 340. In addition, power source 340 may be configured to charge one or more batteries included in XR unit 204; for example, a pair of extended reality glasses (e.g., wearable extended reality appliance 110) may be charged (e.g., wirelessly or not wirelessly) when they are placed on or in proximity to the input unit 202.

Output interface 350, shown in FIG. 3, may cause output from a variety of output devices, for example, using light indicators 351, display 352, and/or speakers 353. In one embodiment, output interface 350 may be an integrated circuit that may act as bridge between processing device 360 and at least one of the output devices listed above. Light indicators 351 may include one or more light sources, for example, a LED array associated with different colors. Display 352 may include a screen (e.g., LCD or dot-matrix screen) or a touch screen. Speakers 353 may include audio headphones, a hearing aid type device, a speaker, a bone conduction headphone, interfaces that provide tactile cues, vibrotactile stimulators, and more.

Processing device 360, shown in FIG. 3, may include at least one processor configured to execute computer programs, applications, methods, processes, or other software to perform embodiments described in the present disclosure. Generally, a processing device included in the any device or system in the present disclosure may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods such as a microprocessor manufactured by Intel™. The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

Sensors interface 370, shown in FIG. 3, may obtain sensor data from a variety of sensors, for example, audio sensor 371, image sensor 372, motion sensor 373, environmental sensor 374, and other sensors 375. In one embodiment, sensors interface 370 may be an integrated circuit that may act as bridge between processing device 360 and at least one of the sensors listed above.

Audio sensor 371 may include one or more audio sensors configured to capture audio by converting sounds to digital information. Some examples of audio sensors may include: microphones, unidirectional microphones, bidirectional microphones, cardioid microphones, omnidirectional microphones, onboard microphones, wired microphones, wireless microphones, or any combination of the above. Consistent with the present disclosure, processing device 360 may modify a presentation of virtual content based on data received from audio sensor 371 (e.g., voice commands).

Image sensor 372 may include one or more image sensors configured to capture visual information by converting light to image data. Consistent with the present disclosure, an image sensor may be included in the any device or system in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. The image data acquired by image sensor 372 may be transmitted by wired or wireless transmission to any processing device of system 200. For example, the image data may be processed in order to: detect objects, detect events, detect action, detect face, detect people, recognize a known person, or any other information that may be used by system 200. Consistent with the present disclosure, processing device 360 may modify a presentation of virtual content based on image data received from image sensor 372.

Motion sensor 373 may include one or more motion sensors configured to measure motion of input unit 202 or motion of objects in the environment of input unit 202. Specifically, the motion sensors may perform at least one of the following: detect motion of objects in the environment of input unit 202, measure the velocity of objects in the environment of input unit 202, measure the acceleration of objects in the environment of input unit 202, detect the motion of input unit 202, measure the velocity of input unit 202, measure the acceleration of input unit 202, etc. In some embodiments, motion sensor 373 may include one or more accelerometers configured to detect changes in proper acceleration and/or to measure proper acceleration of input unit 202. In other embodiments, motion sensor 373 may include one or more gyroscopes configured to detect changes in the orientation of input unit 202 and/or to measure information related to the orientation of input unit 202. In other embodiments, motion sensor 373 may include one or more using image sensors, LIDAR sensors, radar sensors, or proximity sensors. For example, by analyzing captured images the processing device may determine the motion of input unit 202, for example, using ego-motion algorithms. In addition, the processing device may determine the motion of objects in the environment of input unit 202, for example, using object tracking algorithms. Consistent with the present disclosure, processing device 360 may modify a presentation of virtual content based on the determined motion of input unit 202 or the determined motion of objects in the environment of input unit 202. For example, causing a virtual display to follow the movement of input unit 202.

Environmental sensor 374 may include one or more sensors from different types configured to capture data reflective of the environment of input unit 202. In some embodiments, environmental sensor 374 may include one or more chemical sensors configured to perform at least one of the following: measure chemical properties in the environment of input unit 202, measure changes in the chemical properties in the environment of input unit 202, detect the present of chemicals in the environment of input unit 202, measure the concentration of chemicals in the environment of input unit 202. Examples of such chemical properties may include: pH level, toxicity, and temperature. Examples of such chemicals may include: electrolytes, particular enzymes, particular hormones, particular proteins, smoke, carbon dioxide, carbon monoxide, oxygen, ozone, hydrogen, and hydrogen sulfide. In other embodiments, environmental sensor 374 may include one or more temperature sensors configured to detect changes in the temperature of the environment of input unit 202 and/or to measure the temperature of the environment of input unit 202. In other embodiments, environmental sensor 374 may include one or more barometers configured to detect changes in the atmospheric pressure in the environment of input unit 202 and/or to measure the atmospheric pressure in the environment of input unit 202. In other embodiments, environmental sensor 374 may include one or more light sensors configured to detect changes in the ambient light in the environment of input unit 202. Consistent with the present disclosure, processing device 360 may modify a presentation of virtual content based on input from environmental sensor 374. For example, automatically reducing the brightness of the virtual content when the environment of user 100 becomes darker.

Other sensors 375 may include a weight sensor, a light sensor, a resistive sensor, an ultrasonic sensor, a proximity sensor, a biometric sensor, or other sensing devices to facilitate related functionalities. In a specific embodiment, other sensors 375 may include one or more positioning sensors configured to obtain positioning information of input unit 202, to detect changes in the position of input unit 202, and/or to measure the position of input unit 202.

Alternatively, GPS software may permit input unit 202 to access an external GPS receiver (e.g., connecting via a serial port or Bluetooth). Consistent with the present disclosure, processing device 360 may modify a presentation of virtual content based on input from other sensors 375. For example, presenting private information only after identifying user 100 using data from a biometric sensor.

The components and arrangements shown in FIG. 3 are not intended to limit any embodiment. As will be appreciated by a person skilled in the art having the benefit of this disclosure, numerous variations and/or modifications may be made to the depicted configuration of input unit 202. For example, not all components may be essential for the operation of an input unit in all cases. Any component may be located in any appropriate part of an input unit, and the components may be rearranged into a variety of configurations while providing the functionality of various embodiments. For example, some input units may not include all of the elements as shown in input unit 202.

Figure 4:
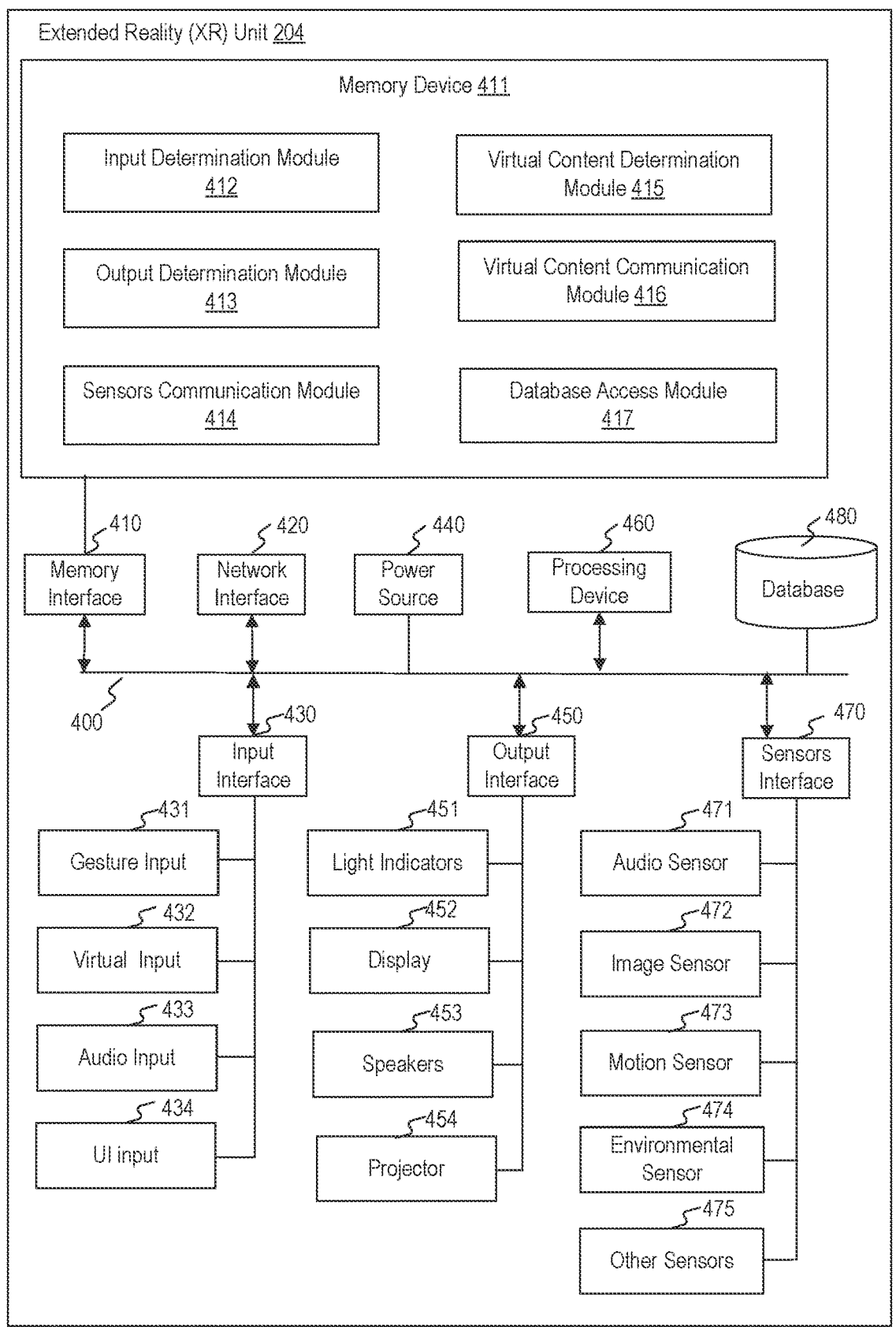
FIG. 4 is a block diagram illustrating some of the components of an extended reality unit, consistent with the present disclosure.

FIG. 4 is a block diagram of an exemplary configuration of XR unit 204. FIG. 4 is an exemplary representation of just one embodiment, and it is to be understood that some illustrated elements might be omitted and others added within the scope of this disclosure. In the embodiment of FIG. 4, XR unit 204 may directly or indirectly access a bus 400 (or other communication mechanism) that interconnects subsystems and components for transferring information within XR unit 204. For example, bus 400 may interconnect a memory interface 410, a network interface 420, an input interface 430, a power source 440, an output interface 450, a processing device 460, a sensors interface 470, and a database 480.

Memory interface 410, shown in FIG. 4, is assumed to have similar functionality as the functionality of memory interface 310 described above in detail. Memory interface 410 may be used to access a software product and/or data stored on a non-transitory computer-readable medium or on memory devices, such as memory device 411. Memory device 411 may contain software modules to execute processes consistent with the present disclosure. In particular, memory device 411 may include an input determination module 412, an output determination module 413, a sensors communication module 414, a virtual content determination module 415, a virtual content communication module 416, and a database access module 417. Modules 412-417 may contain software instructions for execution by at least one processor (e.g., processing device 460) associated with XR unit 204. Input determination module 412, output determination module 413, sensors communication module 414, virtual content determination module 415, virtual content communication module 416, and database access module 417 may cooperate to perform various operations. For example, input determination module 412 may determine User Interface (UI) input received from input unit 202. At the same time, sensors communication module 414 may receive data from different sensors to determine a status of user 100. Virtual content determination module 415 may determine the virtual content to display based on received input and the determined status of user 100. Virtual content communication module 416 may retrieve virtual content not determined by virtual content determination module 415. The retrieval of the virtual content may be from database 380, database 480, mobile communications device 206, or from remote processing unit 208. Based on the output of virtual content determination module 415, output determination module 413 may cause a change in a virtual content displayed to user 100 by projector 454.

In some embodiments, input determination module 412 may regulate the operation of input interface 430 in order to receive gesture input 431, virtual input 432, audio input 433, and UI input 434. Consistent with the present disclosure, input determination module 412 may concurrently receive different types of input data. In one embodiment, input determination module 412 may apply different rules based on the detected type of input. For example, gesture input may have precedence over virtual input. In some embodiments, output determination module 413 may regulate the operation of output interface 450 in order to generate output using light indicators 451, display 452, speakers 453, and projector 454. In one embodiment, light indicators 451 may include a light indicator that shows the status of the wearable extended reality appliance. For example, the light indicator may display green light when the wearable extended reality appliance 110 are connected to input unit 202, and blinks when wearable extended reality appliance 110 has low battery. In another embodiment, display 452 may be used to display operational information. In another embodiment, speakers 453 may include a bone conduction headphone used to output audio to user 100. In another embodiment, projector 454 may present virtual content to user 100.

The operations of a sensors communication module, a virtual content determination module, a virtual content communication module, and a database access module are described above with reference to FIG. 3, details of which are not repeated herein. Modules 412-417 may be implemented in software, hardware, firmware, a mix of any of those, or the like.

Network interface 420, shown in FIG. 4, is assumed to have similar functionality as the functionality of network interface 320, described above in detail. The specific design and implementation of network interface 420 may depend on the communications network(s) over which XR unit 204 is intended to operate. For example, in some embodiments, XR unit 204 is configured to be selectively connectable by wire to input unit 202. When connected by wire, network interface 420 may enable communications with input unit 202; and when not connected by wire, network interface 420 may enable communications with mobile communications device 206.

Input interface 430, shown in FIG. 4, is assumed to have similar functionality as the functionality of input interface 330 described above in detail. In this case, input interface 430 may communicate with an image sensor to obtain gesture input 431 (e.g., a finger of user 100 pointing to a virtual object), communicate with other XR units 204 to obtain virtual input 432 (e.g., a virtual object shared with XR unit 204 or a gesture of avatar detected in the virtual environment), communicate with a microphone to obtain audio input 433 (e.g., voice commands), and communicate with input unit 202 to obtain UI input 434 (e.g., virtual content determined by virtual content determination module 315).

Power source 440, shown in FIG. 4, is assumed to have similar functionality as the functionality of power source 340 described above, only it provides electrical energy to power XR unit 204. In some embodiments, power source 440 may be charged by power source 340. For example, power source 440 may be wirelessly changed when XR unit 204 is placed on or in proximity to input unit 202.

Output interface 450, shown in FIG. 4, is assumed to have similar functionality as the functionality of output interface 350 described above in detail. In this case, output interface 450 may cause output from light indicators 451, display 452, speakers 453, and projector 454. Projector 454 may be any device, apparatus, instrument, or the like capable of projecting (or directing) light in order to display virtual content onto a surface. The surface may be part of XR unit 204, part of an eye of user 100, or part of an object in proximity to user 100. In one embodiment, projector 454 may include a lighting unit that concentrates light within a limited solid angle by means of one or more mirrors and lenses, and provides a high value of luminous intensity in a defined direction.

Processing device 460, shown in FIG. 4, is assumed to have similar functionality as the functionality of processing device 360 described above in detail. When XR unit 204 is connected to input unit 202, processing device 460 may work together with processing device 360. Specifically, processing device 460 may implement virtual machine technologies or other technologies to provide the ability to execute, control, run, manipulate, store, etc., multiple software processes, applications, programs, etc. It is appreciated that other types of processor arrangements could be implemented to provide the capabilities disclosed herein.

Sensors interface 470, shown in FIG. 4, is assumed to have similar functionality as the functionality of sensors interface 370 described above in detail. Specifically sensors interface 470 may communicate with audio sensor 471, image sensor 472, motion sensor 473, environmental sensor 474, and other sensors 475. The operations of an audio sensor, an image sensor, a motion sensor, an environmental sensor, and other sensors are described above with reference to FIG. 3, details of which are not repeated herein. It is appreciated that other types and combination of sensors may be used to provide the capabilities disclosed herein.

The components and arrangements shown in FIG. 4 are not intended to limit any embodiment. As will be appreciated by a person skilled in the art having the benefit of this disclosure, numerous variations and/or modifications may be made to the depicted configuration of XR unit 204. For example, not all components may be essential for the operation of XR unit 204 in all cases. Any component may be located in any appropriate part of system 200, and the components may be rearranged into a variety of configurations while providing the functionality of various embodiments. For example, some XR units may not include all of the elements in XR unit 204 (e.g., wearable extended reality appliance 110 may not have light indicators 451).

Figure 5:
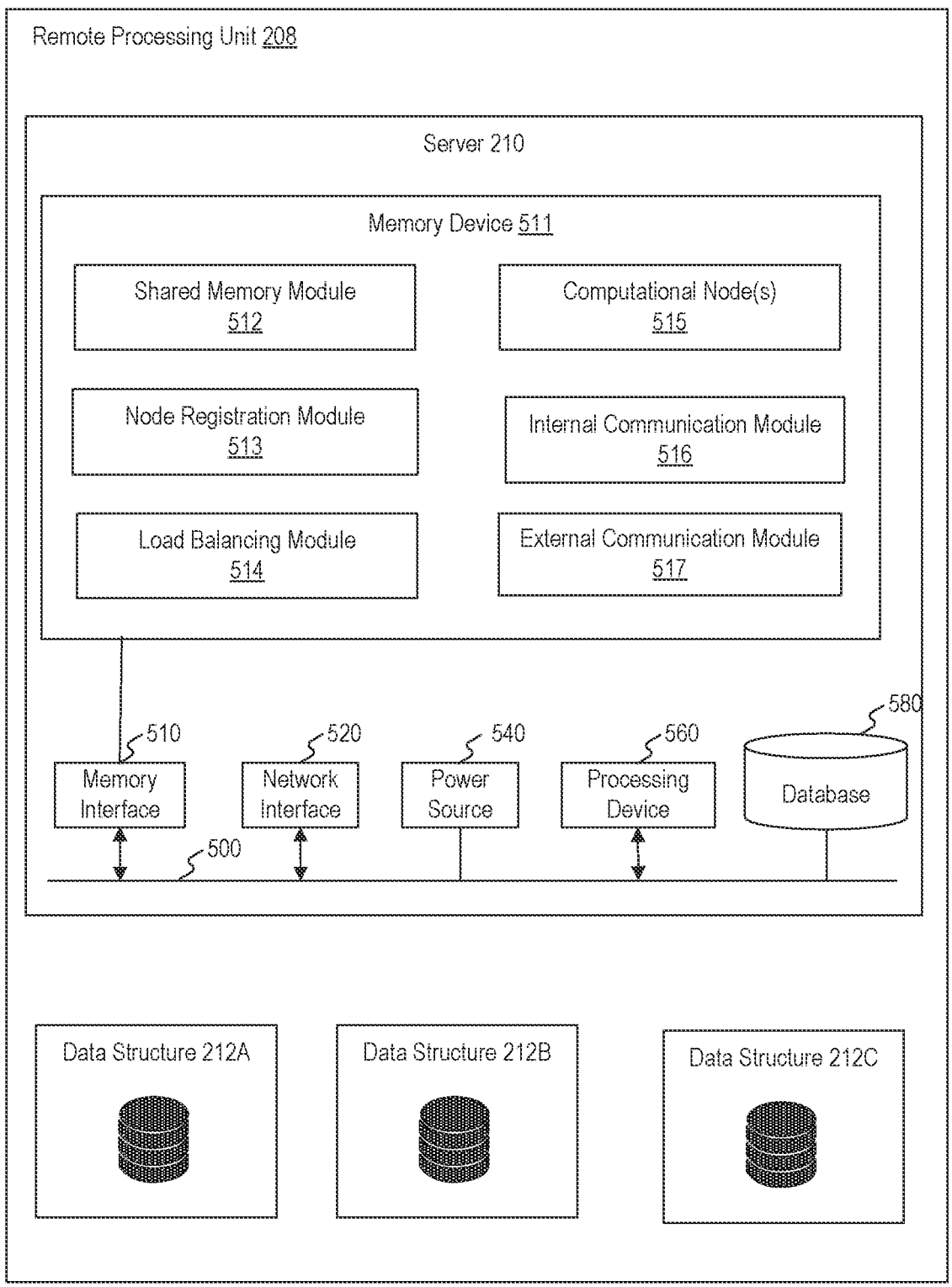
FIG. 5 is a block diagram illustrating some of the components of a remote processing unit, consistent with the present disclosure.

FIG. 5 is a block diagram of an exemplary configuration of remote processing unit 208. FIG. 5 is an exemplary representation of just one embodiment, and it is to be understood that some illustrated elements might be omitted and others added within the scope of this disclosure. In the embodiment of FIG. 5, remote processing unit 208 may include a server 210 that directly or indirectly accesses a bus 500 (or other communication mechanism) interconnecting subsystems and components for transferring information within server 210. For example, bus 500 may interconnect a memory interface 510, a network interface 520, a power source 540, a processing device 560, and a database 580. Remote processing unit 208 may also include a one or more data structures. For example, data structures 212A, 212B, and 212C.

Memory interface 510, shown in FIG. 5, is assumed to have similar functionality as the functionality of memory interface 310 described above in detail. Memory interface 510 may be used to access a software product and/or data stored on a non-transitory computer-readable medium or on other memory devices, such as memory devices 311, 411, 511, or data structures 212A, 212B, and 2120. Memory device 511 may contain software modules to execute processes consistent with the present disclosure. In particular, memory device 511 may include a shared memory module 512, a node registration module 513, a load balancing module 514, one or more computational nodes 515, an internal communication module 516, an external communication module 517, and a database access module (not shown). Modules 512-517 may contain software instructions for execution by at least one processor (e.g., processing device 560) associated with remote processing unit 208. Shared memory module 512, node registration module 513, load balancing module 514, computational module 515, and external communication module 517 may cooperate to perform various operations.

Shared memory module 512 may allow information sharing between remote processing unit 208 and other components of system 200. In some embodiments, shared memory module 512 may be configured to enable processing device 560 (and other processing devices in system 200) to access, retrieve, and store data. For example, using shared memory module 512, processing device 560 may perform at least one of: executing software programs stored on memory device 511, database 580, or data structures 212A-C; storing information in memory device 511, database 580, or data structures 212A-C; or retrieving information from memory device 511, database 580, or data structures 212A-C.

Node registration module 513 may be configured to track the availability of one or more computational nodes 515. In some examples, node registration module 513 may be implemented as: a software program, such as a software program executed by one or more computational nodes 515, a hardware solution, or a combined software and hardware solution. In some implementations, node registration module 513 may communicate with one or more computational nodes 515, for example, using internal communication module 516. In some examples, one or more computational nodes 515 may notify node registration module 513 of their status, for example, by sending messages: at startup, at shutdown, at constant intervals, at selected times, in response to queries received from node registration module 513, or at any other determined times. In some examples, node registration module 513 may query about the status of one or more computational nodes 515, for example, by sending messages: at startup, at constant intervals, at selected times, or at any other determined times.

Load balancing module 514 may be configured to divide the workload among one or more computational nodes 515. In some examples, load balancing module 514 may be implemented as: a software program, such as a software program executed by one or more of the computational nodes 515, a hardware solution, or a combined software and hardware solution. In some implementations, load balancing module 514 may interact with node registration module 513 in order to obtain information regarding the availability of one or more computational nodes 515. In some implementations, load balancing module 514 may communicate with one or more computational nodes 515, for example, using internal communication module 516. In some examples, one or more computational nodes 515 may notify load balancing module 514 of their status, for example, by sending messages: at startup, at shutdown, at constant intervals, at selected times, in response to queries received from load balancing module 514, or at any other determined times. In some examples, load balancing module 514 may query about the status of one or more computational nodes 515, for example, by sending messages: at startup, at constant intervals, at pre-selected times, or at any other determined times.

Internal communication module 516 may be configured to receive and/or to transmit information from one or more components of remote processing unit 208. For example, control signals and/or synchronization signals may be sent and/or received through internal communication module 516. In one embodiment, input information for computer programs, output information of computer programs, and/or intermediate information of computer programs may be sent and/or received through internal communication module 516. In another embodiment, information received though internal communication module 516 may be stored in memory device 511, in database 580, in data structures 212A-C, or other memory device in system 200. For example, information retrieved from data structure 212A may be transmitted using internal communication module 516. In another example, input data may be received using internal communication module 516 and stored in data structure 212B.

External communication module 517 may be configured to receive and/or to transmit information from one or more components of system 200. For example, control signals may be sent and/or received through external communication module 517. In one embodiment, information received though external communication module 517 may be stored in memory device 511, in database 580, in data structures 212A-C, and or any memory device in the system 200. In another embodiment, information retrieved from any of data structures 212A-C may be transmitted using external communication module 517 to XR unit 204. In another embodiment, input data may be transmitted and/or received using external communication module 517. Examples of such input data may include data received from input unit 202, information captured from the environment of user 100 using one or more sensors (e.g., audio sensor 471, image sensor 472, motion sensor 473, environmental sensor 474, other sensors 475), and more.

In some embodiments, aspects of modules 512-517 may be implemented in hardware, in software (including in one or more signal processing and/or application specific integrated circuits), in firmware, or in any combination thereof, executable by one or more processors, alone, or in various combinations with each other. Specifically, modules 512-517 may be configured to interact with each other and/or other modules of system 200 to perform functions consistent with embodiments of the present disclosure. Memory device 511 may include additional modules and instructions or fewer modules and instructions.

Network interface 520, power source 540, processing device 560, and database 580, shown in FIG. 5, are assumed to have similar functionality as the functionality of similar elements described above with reference to FIGS. 4 and 5. The specific design and implementation of the above-mentioned components may vary based on the implementation of system 200. In addition, remote processing unit 208 may include more or fewer components. For example, remote processing unit 208 may include an input interface configured to receive direct input from one or more input devices.

Consistent with the present disclosure, a processing device of system 200 (e.g., processor within mobile communications device 206, a processor within a server 210, a processor within a wearable extended reality appliance, such as, wearable extended reality appliance 110, and/or a processor within an input device associated with wearable extended reality appliance 110, such as keyboard 104) may use machine learning algorithms in order to implement any of the methods disclosed herein. In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and more. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by a process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, distance from an item depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

Consistent with the present disclosure, a processing device of system 200 may analyze image data captured by an image sensor (e.g., image sensor 372, image sensor 472, or any other image sensor) in order to implement any of the methods disclosed herein. In some embodiments, analyzing the image data may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

Consistent with another aspects of the disclosure, a processing device of system 200 may analyze image data in order to implement any of the methods disclosed herein. In some embodiments, analyzing the image may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result, and more. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two-dimensional array of pixel values. In one example, calculating a convolution of an image may include calculating a two-dimensional convolution on one or more components of the image. In another example, calculating a convolution of an image may include stacking arrays from different components to create a three-dimensional array, and calculating a three-dimensional convolution on the resulting three-dimensional array. In some examples, a video may comprise one or more components (such as color components, depth component, etc.), and each component may include a three-dimensional array of pixel values (with two spatial axes and one temporal axis). In one example, calculating a convolution of a video may include calculating a three-dimensional convolution on one or more components of the video. In another example, calculating a convolution of a video may include stacking arrays from different components to create a four-dimensional array, and calculating a four-dimensional convolution on the resulting four-dimensional array.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples, but is inclusive of general principles described herein and illustrated in the figures in addition to the general principles encompassed by the appended claims.

The present disclosure is directed to systems and methods for providing users an extended reality environment. The term "extended reality environment," which may also be referred to as "extended reality," "extended reality space," or "extended environment," refers to all types of real-and-virtual combined environments and human-machine interactions at least partially generated by computer technology. The extended reality environment may be a completely simulated virtual environment or a combined real- and-virtual environment that a user may perceive from different perspectives. In some examples, the user may interact with elements of the extended reality environment. One non-limiting example of an extended reality environment may be a virtual reality environment, also known as "virtual reality" or a "virtual environment." An immersive virtual reality environment may be a simulated non-physical environment which provides to the user the perception of being present in the virtual environment. Another non-limiting example of an extended reality environment may be an augmented reality environment, also known as "augmented reality" or "augmented environment." An augmented reality environment may involve live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both augmented reality environments and mixed reality environments may include a combination of real and virtual worlds, real-time interactions, and accurate 3D registration of virtual and real objects. In some examples, both augmented reality environment and mixed reality environments may include constructive overlaid sensory information that may be added to the physical environment. In other examples, both augmented reality environment and mixed reality environments may include destructive virtual content that may mask at least part of the physical environment.

In some embodiments, the systems and methods may provide the extended reality environment using an extended reality appliance. The term extended reality appliance may include any type of device or system that enables a user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets or any other device worn by a human for purposes of presenting an extended reality to the human. Other extended reality appliances may include holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality appliance may be a non-wearable extended reality appliance. Specifically, the non-wearable extended reality appliance may include multi-projected environment appliances. In some embodiments, an extended reality appliance may be configured to change the viewing perspective of the extended reality environment in response to movements of the user and in response to head movements of the user in particular. In one example, a wearable extended reality appliance may change the field-of-view of the extended reality environment in response to a change of the head pose of the user, such as by changing the spatial orientation without changing the spatial position of the user in the extended reality environment. In another example, a non-wearable extended reality appliance may change the spatial position of the user in the extended reality environment in response to a change in the position of the user in the real world, for example, by changing the spatial position of the user in the extended reality environment without changing the direction of the field-of-view with respect to the spatial position.

According to some embodiments, an extended reality appliance may include a digital communication device configured to at least one of: receiving virtual content data configured to enable a presentation of the virtual content, transmitting virtual content for sharing with at least one external device, receiving contextual data from at least one external device, transmitting contextual data to at least one external device, transmitting of usage data indicative of usage of the extended reality appliance, and transmitting of data based on information captured using at least one sensor included in the extended reality appliance. In additional embodiments, the extended reality appliance may include memory for storing at least one of virtual data configured to enable a presentation of virtual content, contextual data, usage data indicative of usage of the extended reality appliance, sensor data based on information captured using at least one sensor included in the wearable extended reality appliance, software instructions configured to cause a processing device to present the virtual content, software instructions configured to cause a processing device to collect and analyze the contextual data, software instructions configured to cause a processing device to collect and analyze the usage data, and software instructions configured to cause a processing device to collect and analyze the sensor data. In additional embodiments, the extended reality appliance may include a processing device configured to perform at least one of rendering of virtual content, collecting and analyzing contextual data, collecting and analyzing usage data, and collecting and analyzing sensor data. In additional embodiments, the extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining where a human is looking or gazing.

In some embodiments, the systems and methods may use an input device to interact with the extended reality appliance. The term input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, gestures based input data, direction data, or any other data for supply for computation. Some examples of the input device may include a button, a key, a keyboard, a computer mouse, a touchpad, a touchscreen, a joystick, or another mechanism from which input may be received. Another example of an input device may include an integrated computational interface device that includes at least one physical component for receiving input from a user. The integrated computational interface device may include at least a memory, a processing device, and the at least one physical component for receiving input from a user. In one example, the integrated computational interface device may further include a digital network interface that enables digital communication with other computing devices. In one example, the integrated computational interface device may further include a physical component for outputting information to the user. In some examples, all components of the integrated computational interface device may be included in a single housing, while in other examples the components may be distributed among two or more housings. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs.

In some embodiments, image data may be captured using one or more image sensors. In some examples, the image sensors may be included in the extended reality appliance, in a wearable device, in the wearable extended reality device, in the input device, in an environment of a user, and so forth. In some examples, the image data may be read from memory, may be received from an external device, may be generated (for example, using a generative model), and so forth. Some non-limiting examples of image data may include images, grayscale images, color images, 2D images, 3D images, videos, 2D videos, 3D videos, frames, footages, data derived from other image data, and so forth. In some examples, the image data may be encoded in any analog or digital format. Some non-limiting examples of such formats may include raw formats, compressed formats, uncompressed formats, lossy formats, lossless formats, JPEG, GIF, PNG, TIFF, BMP, NTSC, PAL, SECAM, MPEG, MPEG-4 Part 14, MOV, WMV, FLV, AVI, AVCHD, WebM, MKV, and so forth.

In some embodiments, the extended reality appliance may receive digital signals, for example, from the input device. The term digital signals may refer to a series of digital values that are discrete in time. The digital signals may represent, for example, sensor data, textual data, voice data, video data, virtual data, or any other form of data that provides perceptible information. Consistent with the present disclosure, the digital signals may be configured to cause the extended reality appliance to present virtual content. In one embodiment, the virtual content may be presented in a selected orientation. In this embodiment, the digital signals may indicate a position and an angle of a viewpoint in an environment, such as an extended reality environment. Specifically, the digital signals may include an encoding of the position and angle in six degree-of-freedom coordinates (e.g., forward/back, up/down, left/right, yaw, pitch, and roll). In another embodiment, the digital signals may include an encoding of the position as three-dimensional coordinates (e.g., x, y, and z), and an encoding of the angle as a vector originating from the encoded position. Specifically, the digital signals may indicate the orientation and an angle of the presented virtual content in an absolute coordinates of the environment, for example, by encoding yaw, pitch and roll of the virtual content with respect to a standard default angle. In another embodiment, the digital signals may indicate the orientation and the angle of the presented virtual content with respect to a viewpoint of another object (e.g., a virtual object, a physical object, etc.), for example, by encoding yaw, pitch, and roll of the virtual content with respect a direction corresponding to the viewpoint or to a direction corresponding to the other object. In another embodiment, such digital signals may include one or more projections of the virtual content, for example, in a format ready for presentation (e.g., image, video, etc.). For example, each such projection may correspond to a particular orientation or a particular angle. In another embodiment, the digital signals may include a representation of virtual content, for example, by encoding objects in a three-dimensional array of voxels, in a polygon mesh, or in any other format in which virtual content may be presented.

In some embodiments, the digital signals may be configured to cause the extended reality appliance to present virtual content. The term virtual content may include any type of data representation that may be displayed by the extended reality appliance to the user. The virtual content may include a virtual object, inanimate virtual content, animate virtual content configured to change over time or in response to triggers, virtual two-dimensional content, virtual three-dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation.). The rendered visual presentation may change to reflect changes to a status object or changes in the viewing angle of the object, for example, in a way that mimics changes in the appearance of physical objects. In another embodiment, the virtual content may include a virtual display (also referred to as a "virtual display screen" or a "virtual screen" herein), such as a virtual computer screen, a virtual tablet screen or a virtual smartphone screen, configured to display information generated by an operating system, in which the operating system may be configured to receive textual data from a physical keyboard and/or a virtual keyboard and to cause a display of the textual content in the virtual display screen. In one example, illustrated in FIG. 1, the virtual content may include a virtual environment that includes a virtual computer screen and a plurality of virtual objects. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), using an extended reality appliance. In one example, a virtual display may present content produced by a regular operating system that may be equally presented on a physical display screen. In one example, a textual content entered using a keyboard (for example, using a physical keyboard, using a virtual keyboard, etc.) may be presented on a virtual display in real time as the textual content is typed. In one example, a virtual cursor may be presented on a virtual display, and the virtual cursor may be controlled by a pointing device (such as a physical pointing device, a virtual pointing device, a computer mouse, a joystick, a touchpad, a physical touch controller, and so forth). In one example, one or more windows of a graphical user interface operating system may be presented on a virtual display. In another example, content presented on a virtual display may be interactive, that is, it may change in reaction to actions of users. In yet another example, a presentation of a virtual display may include a presentation of a screen frame, or may include no presentation of a screen frame.

Some disclosed embodiments may include and/or access a data structure or a database. The terms data structure and a database, consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, Entity-Relationship model, a graph, a hypergraph, a matrix, a tensor, and so forth. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, does not require information to be co-located. It may be distributed across multiple servers, for example, that may be owned or operated by the same or different entities. Thus, the term data structure in the singular is inclusive of plural data structures.

In some embodiments, the system may determine the confidence level in received input or in any determined value. The term confidence level refers to any indication, numeric or otherwise, of a level (e.g., within a predetermined range) indicative of an amount of confidence the system has at determined data. For example, the confidence level may have a value between 1 and 10. Alternatively, the confidence level may be expressed as a percentage or any other numerical or non-numerical indication. In some cases, the system may compare the confidence level to a threshold. The term threshold may denote a reference value, a level, a point, or a range of values. In operation, when the confidence level of determined data exceeds the threshold (or is below it, depending on a particular use case), the system may follow a first course of action and, when the confidence level is below it (or above it, depending on a particular use case), the system may follow a second course of action. The value of the threshold may be predetermined for each type of examined object or may be dynamically selected based on different considerations.

Reference is now made to FIG. 1, which illustrates a user that uses an example extended reality system consistent with embodiments of the present disclosure FIG. 1 is an exemplary representation of just one embodiment, and it is to be understood that some illustrated elements might be omitted and others added within the scope of this disclosure. As shown, a user 100 is sitting behind table 102, supporting a keyboard 104 and mouse 106. Keyboard 104 is connected by wire 108 to a wearable extended reality appliance 110 that displays virtual content to user 100. Alternatively or additionally to wire 108, keyboard 104 may connect to wearable extended reality appliance 110 wirelessly. For illustration purposes, the wearable extended reality appliance is depicted a pair of smart glasses, but, as described above, wearable extended reality appliance 110 may be any type of head-mounted device used for presenting an extended reality to user 100. The virtual content displayed by wearable extended reality appliance 110 includes a virtual screen 112 (also referred to as a "virtual display screen" or a "virtual display" herein) and a plurality of virtual widgets 114. Virtual widgets 114A-114D are displayed next to virtual screen 112 and virtual widget 114E is displayed on table 102. User 100 may input text to a document 116 displayed in virtual screen 112 using keyboard 104; and may control virtual cursor 118 using mouse 106. In one example, virtual cursor 118 may move anywhere within virtual screen 112. In another example, virtual cursor 118 may move anywhere within virtual screen 112 and may also move to any one of virtual widgets 114A-114D but not to virtual widget 114E. In yet another example, virtual cursor 118 may move anywhere within virtual screen 112 and may also move to any one of virtual widgets 114A-114E. In an additional example, virtual cursor 118 may move anywhere in the extended reality environment including virtual screen 112 and virtual widgets 114A-114E. In yet another example, virtual cursor may move on all available surfaces (i.e., virtual surfaces or physical surfaces) or only on selected surfaces in the extended reality environment. Alternatively or additionally, user 100 may interact with any one of virtual widgets 114A-114E, or with selected virtual widgets, using hand gestures recognized by wearable extended reality appliance 110. For example, virtual widget 114E may be an interactive widget (e.g., a virtual slider controller) that may be operated with hand gestures.

FIG. 2 illustrates an example of a system 200 that provides extended reality (XR) experience to users, such as user 100. FIG. 2 is an exemplary representation of just one embodiment, and it is to be understood that some illustrated elements might be omitted and others added within the scope of this disclosure. System 200 may be computer-based and may include computer system components, wearable appliances, workstations, tablets, handheld computing devices, memory devices, and/or internal network(s) connecting the components. System 200 may include or be connected to various network computing resources (e.g., servers, routers, switches, network connections, storage devices, etc.) for supporting services provided by system 200. Consistent with the present disclosure, system 200 may include an input unit 202, an XR unit 204, a mobile communications device 206, and a remote processing unit 208. Remote processing unit 208 may include a server 210 coupled to one or more physical or virtual storage devices, such as a data structure 212. System 200 may also include or be connected to a communications network 214 that facilitates communications and data exchange between different system components and the different entities associated with system 200.

Consistent with the present disclosure, input unit 202 may include one or more devices that may receive input from user 100. In one embodiment, input unit 202 may include a textual input device, such as keyboard 104. The textual input device may include all possible types of devices and mechanisms for inputting textual information to system 200. Examples of textual input devices may include mechanical keyboards, membrane keyboards, flexible keyboards, QWERTY keyboards, Dvorak keyboards, Colemak keyboards, chorded keyboards, wireless keyboards, keypads, key-based control panels, or other arrays of control keys, vision input devices, or any other mechanism for inputting text, whether the mechanism is provided in physical form or is presented virtually. In one embodiment, input unit 202 may also include a pointing input device, such as mouse 106. The pointing input device may include all possible types of devices and mechanisms for inputting two-dimensional or three-dimensional information to system 200. In one example, two-dimensional input from the pointing input device may be used for interacting with virtual content presented via the XR unit 204. Examples of pointing input devices may include a computer mouse, trackball, touchpad, trackpad, touchscreen, joystick, pointing stick, stylus, light pen, or any other physical or virtual input mechanism. In one embodiment, input unit 202 may also include a graphical input device, such as a touchscreen configured to detect contact, movement, or break of movement. The graphical input device may use any of a plurality of touch sensitivity technologies, including, but not limited to, capacitive, resistive, infrared, and surface acoustic wave technologies as well as other proximity sensor arrays or other elements for determining one or more points of contact. In one embodiment, input unit 202 may also include one or more voice input devices, such as a microphone. The voice input device may include all possible types of devices and mechanisms for inputting voice data to facilitate voice-enabled functions, such as voice recognition, voice replication, digital recording, and telephony functions. In one embodiment, input unit 202 may also include one or more image input devices, such as an image sensor, configured to capture image data. In one embodiment, input unit 202 may also include one or more haptic gloves configured to capture hands motion and pose data. In one embodiment, input unit 202 may also include one or more proximity sensors configured to detect presence and/or movement of objects in a selected region near the sensors.

In accordance with some embodiments, the system may include at least one sensor configured to detect and/or measure a property associated with the user, the user's action, or user's environment. One example of the at least one sensor, is sensor 216 included in input unit 202. Sensor 216 may be a motion sensor, a touch sensor, a light sensor, an infrared sensor, an audio sensor, an image sensor, a proximity sensor, a positioning sensor, a gyroscope, a temperature sensor, a biometric sensor, or any other sensing devices to facilitate related functionalities. Sensor 216 may be integrated with, or connected to, the input devices or it may be separated from the input devices. In one example, a thermometer may be included in mouse 106 to determine the body temperature of user 100. In another example, a positioning sensor may be integrated with keyboard 104 to determine movement of user 100 relative to keyboard 104. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, image based positioning technology, indoor positioning technology, outdoor positioning technology, or any other positioning technology.

In accordance with some embodiments, the system may include one or more sensors for identifying a position and/or a movement of a physical device (such as a physical input device, a physical computing device, keyboard 104, mouse 106, wearable extended reality appliance 110, and so forth). The one or more sensors may be included in the physical device or may be external to the physical device. In some examples, an image sensor external to the physical device (for example, an image sensor included in another physical device) may be used to capture image data of the physical device, and the image data may be analyzed to identify the position and/or the movement of the physical device. For example, the image data may be analyzed using a visual object tracking algorithm to identify the movement of the physical device, may be analyzed using a visual object detection algorithm to identify the position of the physical device (for example, relative to the image sensor, in a global coordinates system, etc.), and so forth. In some examples, an image sensor included in the physical device may be used to capture image data, and the image data may be analyzed to identify the position and/or the movement of the physical device. For example, the image data may be analyzed using visual odometry algorithms to identify the position of the physical device, may be analyzed using an ego-motion algorithm to identify movement of the physical device, and so forth. In some examples, a positioning sensor, such as an indoor positioning sensor or an outdoor positioning sensor, may be included in the physical device and may be used to determine the position of the physical device. In some examples, a motion sensor, such as an accelerometer or a gyroscope, may be included in the physical device and may be used to determine the motion of the physical device. In some examples, a physical device, such as a keyboard or a mouse, may be configured to be positioned on a physical surface. Such physical device may include an optical mouse sensor (also known as non-mechanical tracking engine) aimed towards the physical surface, and the output of the optical mouse sensor may be analyzed to determine movement of the physical device with respect to the physical surface.

Consistent with the present disclosure, XR unit 204 may include a wearable extended reality appliance configured to present virtual content to user 100. One example of the wearable extended reality appliance is wearable extended reality appliance 110. Additional examples of wearable extended reality appliance may include a Virtual Reality (VR) device, an Augmented Reality (AR) device, a Mixed Reality (MR) device, or any other device capable of generating extended reality content. Some non-limiting examples of such devices may include Nreal Light, Magic Leap One, Varjo, Quest 1/2, Vive, and others. In some embodiments, XR unit 204 may present virtual content to user 100. Generally, an extended reality appliance may include all real- and-virtual combined environments and human-machine interactions generated by computer technology and wearables. As mentioned above, the term "extended reality" (XR) refers to a superset which includes the entire spectrum from "the complete real" to "the complete virtual." It includes representative forms such as augmented reality (AR), mixed reality (MR), virtual reality (VR), and the areas interpolated among them. Accordingly, it is noted that the terms "XR appliance," "AR appliance," "VR appliance," and "MR appliance" may be used interchangeably herein and may refer to any device of the variety of appliances listed above.

Consistent with the present disclosure, the system may exchange data with a variety of communication devices associated with users, for example, mobile communications device 206. The term "communication device" is intended to include all possible types of devices capable of exchanging data using digital communications network, analog communication network or any other communications network configured to convey data. In some examples, the communication device may include a smartphone, a tablet, a smartwatch, a personal digital assistant, a desktop computer, a laptop computer, an IoT device, a dedicated terminal, a wearable communication device, and any other device that enables data communications. In some cases, mobile communications device 206 may supplement or replace input unit 202. Specifically, mobile communications device 206 may be associated with a physical touch controller that may function as a pointing input device. Moreover, mobile communications device 206 may also, for example, be used to implement a virtual keyboard and replace the textual input device. For example, when user 100 steps away from table 102 and walks to the break room with his smart glasses, he may receive an email that requires a quick answer. In this case, the user may select to use his or her own smartwatch as the input device and to type the answer to the email while it is virtually presented by the smart glasses.

Consistent with the present disclosure, embodiments of the system may involve the usage of a cloud server. The term "cloud server" refers to a computer platform that provides services via a network, such as the Internet. In the example embodiment illustrated in FIG. 2, server 210 may use virtual machines that may not correspond to individual hardware. For example, computational and/or storage capabilities may be implemented by allocating appropriate portions of desirable computation/storage power from a scalable repository, such as a data center or a distributed computing environment. Specifically, in one embodiment, remote processing unit 208 may be used together with XR unit 204 to provide the virtual content to user 100. In one example configuration, server 210 may be a cloud server that functions as the operation system (OS) of the wearable extended reality appliance. In one example, server 210 may implement the methods described herein using customized hard-wired logic, one or more Application Specific Integrated Circuits (ASICs), Field Programmable Gate Arrays (FPGAs), firmware, and/or program logic which, in combination with the computer system, cause server 210 to be a special-purpose machine.

In some embodiments, server 210 may access data structure 212 to determine, for example, virtual content to display user 100. Data structure 212 may utilize a volatile or non-volatile, magnetic, semiconductor, tape, optical, removable, non-removable, other type of storage device or tangible or non-transitory computer-readable medium, or any medium or mechanism for storing information. Data structure 212 may be part of server 210 or separate from server 210, as shown. When data structure 212 is not part of server 210, server 210 may exchange data with data structure 212 via a communication link. Data structure 212 may include one or more memory devices that store data and instructions used to perform one or more features of the disclosed methods. In one embodiment, data structure 212 may include any of a plurality of suitable data structures, ranging from small data structures hosted on a workstation to large data structures distributed among data centers. Data structure 212 may also include any combination of one or more data structures controlled by memory controller devices (e.g., servers) or software.

Consistent with the present disclosure, communications network may be any type of network (including infrastructure) that supports communications, exchanges information, and/or facilitates the exchange of information between the components of a system. For example, communications network 214 in system 200 may include, for example, a telephone network, an extranet, an intranet, the Internet, satellite communications, off-line communications, wireless communications, transponder communications, a Local Area Network (LAN), wireless network (e.g., a Wi-Fi/ 302.11 network), a Wide Area Network (WAN), a Virtual Private Network (VPN), digital communication network, analog communication network, or any other mechanism or combinations of mechanism that enable data transmission.

The components and arrangements of system 200 shown in FIG. 2 are intended to be exemplary only and are not intended to limit the disclosed embodiments, as the system components used to implement the disclosed processes and features may vary.

FIG. 3 is a block diagram of an exemplary configuration of input unit 202. FIG. 3 is an exemplary representation of just one embodiment, and it is to be understood that some illustrated elements might be omitted and others added within the scope of this disclosure. In the embodiment of FIG. 3, input unit 202 may directly or indirectly access a bus 300 (or other communication mechanism) that interconnects subsystems and components for transferring information within input unit 202. For example, bus 300 may interconnect a memory interface 310, a network interface 320, an input interface 330, a power source 340, an output interface 350, a processing device 360, a sensors interface 370, and a database 380.

Memory interface 310, shown in FIG. 3, may be used to access a software product and/or data stored on a non-transitory computer-readable medium. Generally, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals. In the specific embodiment illustrated in FIG. 3, memory interface 310 may be used to access a software product and/or data stored on a memory device, such as memory device 311. Memory device 311 may include high-speed random-access memory and/or non-volatile memory, such as one or more magnetic disk storage devices, one or more optical storage devices, and/or flash memory (e.g., NAND, NOR). Consistent with the present disclosure, the components of memory device 311 may be distributed in more than units of system 200 and/or in more than one memory device.

Memory device 311, shown in FIG. 3, may contain software modules to execute processes consistent with the present disclosure. In particular, memory device 311 may include an input determination module 312, an output determination module 313, a sensors communication module 314, a virtual content determination module 315, a virtual content communication module 316, and a database access module 317. Modules 312-317 may contain software instructions for execution by at least one processor (e.g., processing device 360) associated with input unit 202. Input determination module 312, output determination module 313, sensors communication module 314, virtual content determination module 315, virtual content communication module 316, and database access module 317 may cooperate to perform various operations. For example, input determination module 312 may determine text using data received from, for example, keyboard 104. Thereafter, output determination module 313 may cause presentation of the recent inputted text, for example on a dedicated display 352 physically or wirelessly coupled to keyboard 104. This way, when user 100 types, he can see a preview of the typed text without constantly moving his head up and down to look at virtual screen 112. Sensors communication module 314 may receive data from different sensors to determine a status of user 100. Thereafter, virtual content determination module 315 may determine the virtual content to display, based on received input and the determined status of user 100. For example, the determined virtual content may be a virtual presentation of the recent inputted text on a virtual screen virtually located adjacent to keyboard 104. Virtual content communication module 316 may obtain virtual content that is not determined by virtual content determination module 315 (e.g., an avatar of another user). The retrieval of the virtual content may be from database 380, from remote processing unit 208, or any other source.

In some embodiments, input determination module 312 may regulate the operation of input interface 330 in order to receive pointer input 331, textual input 332, audio input 333, and XR-related input 334. Details on the pointer input, the textual input, and the audio input are described above. The term "XR-related input" may include any type of data that may cause a change in the virtual content displayed to user 100. In one embodiment, XR-related input 334 may include image data of user 100, a wearable extended reality appliance (e.g., detected hand gestures of user 100). In another embodiment, XR-related input 334 may include wireless communication indicating a presence of another user in proximity to user 100. Consistent with the present disclosure, input determination module 312 may concurrently receive different types of input data. Thereafter, input determination module 312 may further apply different rules based on the detected type of input. For example, a pointer input may have precedence over voice input.

In some embodiments, output determination module 313 may regulate the operation of output interface 350 in order to generate output using light indicators 351, display 352, and/or speakers 353. In general, the output generated by output determination module 313 does not include virtual content to be presented by a wearable extended reality appliance. Instead, the output generated by output determination module 313 include various outputs that relates to the operation of input unit 202 and/or the operation of XR unit 204. In one embodiment, light indicators 351 may include a light indicator that shows the status of a wearable extended reality appliance. For example, the light indicator may display green light when wearable extended reality appliance 110 are connected to keyboard 104, and blinks when wearable extended reality appliance 110 has low battery. In another embodiment, display 352 may be used to display operational information. For example, the display may present error messages when the wearable extended reality appliance is inoperable. In another embodiment, speakers 353 may be used to output audio, for example, when user 100 wishes to play some music for other users.

In some embodiments, sensors communication module 314 may regulate the operation of sensors interface 370 in order to receive sensor data from one or more sensors, integrated with, or connected to, an input device. The one or more sensors may include: audio sensor 371, image sensor 372, motion sensor 373, environmental sensor 374 (e.g., a temperature sensor, ambient light detectors, etc.), and other sensors 375. In one embodiment, the data received from sensors communication module 314 may be used to determine the physical orientation of the input device. The physical orientation of the input device may be indicative of a state of the user and may be determined based on combination of a tilt movement, a roll movement, and a lateral movement. Thereafter, the physical orientation of the input device may be used by virtual content determination module 315 to modify display parameters of the virtual content to match the state of the user (e.g., attention, sleepy, active, sitting, standing, leaning backwards, leaning forward, walking, moving, riding, etc.).

In some embodiments, virtual content determination module 315 may determine the virtual content to be displayed by the wearable extended reality appliance. The virtual content may be determined based on data from input determination module 312, sensors communication module 314, and other sources (e.g., database 380). In some embodiments, determining the virtual content may include determining the distance, the size, and the orientation of the virtual objects. The determination of the position of the virtual objects may be determined based on the type of the virtual objects. Specifically, with regards to the example illustrated in FIG. 1, the virtual content determination module 315 may determine to place four virtual widgets 114A-114D on the sides of virtual screen 112 and to place virtual widget 114E on table 102 because virtual widget 114E is a virtual controller (e.g., volume bar). The determination of the position of the virtual objects may further be determined based on user's preferences. For example, for left-handed users, virtual content determination module 315 may determine placing a virtual volume bar left of keyboard 104; and for right-handed users, virtual content determination module 315 may determine placing the virtual volume bar right of keyboard 104.

In some embodiments, virtual content communication module 316 may regulate the operation of network interface 320 in order to obtain data from one or more sources to be presented as virtual content to user 100. The one or more sources may include other XR units 204, the user's mobile communications device 206, remote processing unit 208, publicly available information, etc. In one embodiment, virtual content communication module 316 may communicate with mobile communications device 206 in order to provide a virtual representation of mobile communications device 206. For example, the virtual representation may enable user 100 to read messages and interact with applications installed on the mobile communications device 206. Virtual content communication module 316 may also regulate the operation of network interface 320 in order to share virtual content with other users. In one example, virtual content communication module 316 may use data from input determination module to identify a trigger (e.g., the trigger may include a gesture of the user) and to transfer content from the virtual display to a physical display (e.g., TV) or to a virtual display of a different user.

In some embodiments, database access module 317 may cooperate with database 380 to retrieve stored data. The retrieved data may include, for example, privacy levels associated with different virtual objects, the relationship between virtual objects and physical objects, the user's preferences, the user's past behavior, and more. As described above, virtual content determination module 315 may use the data stored in database 380 to determine the virtual content. Database 380 may include separate databases, including, for example, a vector database, raster database, tile database, viewport database, and/or a user input database. The data stored in database 380 may be received from modules 314-317 or other components of system 200. Moreover, the data stored in database 380 may be provided as input using data entry, data transfer, or data uploading.

Modules 312-317 may be implemented in software, hardware, firmware, a mix of any of those, or the like. In some embodiments, any one or more of modules 312-317 and data associated with database 380 may be stored in XR unit 204, mobile communications device 206, or remote processing unit 208. Processing devices of system 200 may be configured to execute the instructions of modules 312-317. In some embodiments, aspects of modules 312-317 may be implemented in hardware, in software (including in one or more signal processing and/or application specific integrated circuits), in firmware, or in any combination thereof, executable by one or more processors, alone, or in various combinations with each other. Specifically, modules 312-317 may be configured to interact with each other and/or other modules of system 200 to perform functions consistent with disclosed embodiments. For example, input unit 202 may execute instructions that include an image processing algorithm on data from XR unit 204 to determine head movement of user 100. Furthermore, each functionality described throughout the specification, with regards to input unit 202 or with regards to a component of input unit 202, may correspond to a set of instructions for performing said functionality. These instructions need not be implemented as separate software programs, procedures, or modules. Memory device 311 may include additional modules and instructions or fewer modules and instructions. For example, memory device 311 may store an operating system, such as ANDROID, iOS, UNIX, OSX, WINDOWS, DARWIN, RTXC, LINUX or an embedded operating system such as VXWorkS. The operating system can include instructions for handling basic system services and for performing hardware-dependent tasks.

Network interface 320, shown in FIG. 3, may provide two-way data communications to a network, such as communications network 214. In one embodiment, network interface 320 may include an Integrated Services Digital Network (ISDN) card, cellular modem, satellite modem, or a modem to provide a data communication connection over the Internet. As another example, network interface 320 may include a Wireless Local Area Network (WLAN) card. In another embodiment, network interface 320 may include an Ethernet port connected to radio frequency receivers and transmitters and/or optical (e.g., infrared) receivers and transmitters. The specific design and implementation of network interface 320 may depend on the communications network or networks over which input unit 202 is intended to operate. For example, in some embodiments, input unit 202 may include network interface 320 designed to operate over a GSM network, a GPRS network, an EDGE network, a Wi-Fi or WiMax network, and a Bluetooth network. In any such implementation, network interface 320 may be configured to send and receive electrical, electromagnetic, or optical signals that carry digital data streams or digital signals representing various types of information.

Input interface 330, shown in FIG. 3, may receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. In the depicted embodiment, input interface 330 may receive pointer input 331, textual input 332, audio input 333, and XR-related input 334. In additional embodiment, input interface 330 may be an integrated circuit that may act as bridge between processing device 360 and any of the input devices listed above.

Power source 340, shown in FIG. 3, may provide electrical energy to power input unit 202 and optionally also power XR unit 204. Generally, a power source included in the any device or system in the present disclosure may be any device that can repeatedly store, dispense, or convey electric power, including, but not limited to, one or more batteries (e.g., a lead-acid battery, a lithium-ion battery, a nickel-metal hydride battery, a nickel-cadmium battery), one or more capacitors, one or more connections to external power sources, one or more power convertors, or any combination of them. With reference to the example illustrated in FIG. 3, the power source may be mobile, which means that input unit 202 can be easily carried by a hand (e.g., the total weight of power source 340 may be less than a pound). The mobility of the power source enables user 100 to use input unit 202 in a variety of situations. In other embodiments, power source 340 may be associated with a connection to an external power source (such as an electrical power grid) that may be used to charge power source 340. In addition, power source 340 may be configured to charge one or more batteries included in XR unit 204; for example, a pair of extended reality glasses (e.g., wearable extended reality appliance 110) may be charged (e.g., wirelessly or not wirelessly) when they are placed on or in proximity to the input unit 202.

Output interface 350, shown in FIG. 3, may cause output from a variety of output devices, for example, using light indicators 351, display 352, and/or speakers 353. In one embodiment, output interface 350 may be an integrated circuit that may act as bridge between processing device 360 and at least one of the output devices listed above. Light indicators 351 may include one or more light sources, for example, a LED array associated with different colors. Display 352 may include a screen (e.g., LCD or dot-matrix screen) or a touch screen. Speakers 353 may include audio headphones, a hearing aid type device, a speaker, a bone conduction headphone, interfaces that provide tactile cues, vibrotactile stimulators, and more.

Processing device 360, shown in FIG. 3, may include at least one processor configured to execute computer programs, applications, methods, processes, or other software to perform embodiments described in the present disclosure. Generally, a processing device included in the any device or system in the present disclosure may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods such as a microprocessor manufactured by Intel™. The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

Sensors interface 370, shown in FIG. 3, may obtain sensor data from a variety of sensors, for example, audio sensor 371, image sensor 372, motion sensor 373, environmental sensor 374, and other sensors 375. In one embodiment, sensors interface 370 may be an integrated circuit that may act as bridge between processing device 360 and at least one of the sensors listed above.

Audio sensor 371 may include one or more audio sensors configured to capture audio by converting sounds to digital information. Some examples of audio sensors may include: microphones, unidirectional microphones, bidirectional microphones, cardioid microphones, omnidirectional microphones, onboard microphones, wired microphones, wireless microphones, or any combination of the above. Consistent with the present disclosure, processing device 360 may modify a presentation of virtual content based on data received from audio sensor 371 (e.g., voice commands).

Image sensor 372 may include one or more image sensors configured to capture visual information by converting light to image data. Consistent with the present disclosure, an image sensor may be included in the any device or system in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. The image data acquired by image sensor 372 may be transmitted by wired or wireless transmission to any processing device of system 200. For example, the image data may be processed in order to: detect objects, detect events, detect action, detect face, detect people, recognize a known person, or any other information that may be used by system 200. Consistent with the present disclosure, processing device 360 may modify a presentation of virtual content based on image data received from image sensor 372.

Motion sensor 373 may include one or more motion sensors configured to measure motion of input unit 202 or motion of objects in the environment of input unit 202.

Specifically, the motion sensors may perform at least one of the following: detect motion of objects in the environment of input unit 202, measure the velocity of objects in the environment of input unit 202, measure the acceleration of objects in the environment of input unit 202, detect the motion of input unit 202, measure the velocity of input unit 202, measure the acceleration of input unit 202, etc. In some embodiments, motion sensor 373 may include one or more accelerometers configured to detect changes in proper acceleration and/or to measure proper acceleration of input unit 202. In other embodiments, motion sensor 373 may include one or more gyroscopes configured to detect changes in the orientation of input unit 202 and/or to measure information related to the orientation of input unit 202. In other embodiments, motion sensor 373 may include one or more using image sensors, LIDAR sensors, radar sensors, or proximity sensors. For example, by analyzing captured images the processing device may determine the motion of input unit 202, for example, using ego-motion algorithms. In addition, the processing device may determine the motion of objects in the environment of input unit 202, for example, using object tracking algorithms. Consistent with the present disclosure, processing device 360 may modify a presentation of virtual content based on the determined motion of input unit 202 or the determined motion of objects in the environment of input unit 202. For example, causing a virtual display to follow the movement of input unit 202.

Environmental sensor 374 may include one or more sensors from different types configured to capture data reflective of the environment of input unit 202. In some embodiments, environmental sensor 374 may include one or more chemical sensors configured to perform at least one of the following: measure chemical properties in the environment of input unit 202, measure changes in the chemical properties in the environment of input unit 202, detect the present of chemicals in the environment of input unit 202, measure the concentration of chemicals in the environment of input unit 202. Examples of such chemical properties may include: pH level, toxicity, and temperature. Examples of such chemicals may include: electrolytes, particular enzymes, particular hormones, particular proteins, smoke, carbon dioxide, carbon monoxide, oxygen, ozone, hydrogen, and hydrogen sulfide. In other embodiments, environmental sensor 374 may include one or more temperature sensors configured to detect changes in the temperature of the environment of input unit 202 and/or to measure the temperature of the environment of input unit 202. In other embodiments, environmental sensor 374 may include one or more barometers configured to detect changes in the atmospheric pressure in the environment of input unit 202 and/or to measure the atmospheric pressure in the environment of input unit 202. In other embodiments, environmental sensor 374 may include one or more light sensors configured to detect changes in the ambient light in the environment of input unit 202. Consistent with the present disclosure, processing device 360 may modify a presentation of virtual content based on input from environmental sensor 374. For example, automatically reducing the brightness of the virtual content when the environment of user 100 becomes darker.

Other sensors 375 may include a weight sensor, a light sensor, a resistive sensor, an ultrasonic sensor, a proximity sensor, a biometric sensor, or other sensing devices to facilitate related functionalities. In a specific embodiment, other sensors 375 may include one or more positioning sensors configured to obtain positioning information of input unit 202, to detect changes in the position of input unit 202, and/or to measure the position of input unit 202. Alternatively, GPS software may permit input unit 202 to access an external GPS receiver (e.g., connecting via a serial port or Bluetooth). Consistent with the present disclosure, processing device 360 may modify a presentation of virtual content based on input from other sensors 375. For example, presenting private information only after identifying user 100 using data from a biometric sensor.

The components and arrangements shown in FIG. 3 are not intended to limit the disclosed embodiments. As will be appreciated by a person skilled in the art having the benefit of this disclosure, numerous variations and/or modifications may be made to the depicted configuration of input unit 202. For example, not all components may be essential for the operation of an input unit in all cases. Any component may be located in any appropriate part of an input unit, and the components may be rearranged into a variety of configurations while providing the functionality of the disclosed embodiments. For example, some input units may not include all of the elements as shown in input unit 202.

FIG. 4 is a block diagram of an exemplary configuration of XR unit 204. FIG. 4 is an exemplary representation of just one embodiment, and it is to be understood that some illustrated elements might be omitted and others added within the scope of this disclosure. In the embodiment of FIG. 4, XR unit 204 may directly or indirectly access a bus 400 (or other communication mechanism) that interconnects subsystems and components for transferring information within XR unit 204. For example, bus 400 may interconnect a memory interface 410, a network interface 420, an input interface 430, a power source 440, an output interface 450, a processing device 460, a sensors interface 470, and a database 480.

Memory interface 410, shown in FIG. 4, is assumed to have similar functionality as the functionality of memory interface 310 described above in detail. Memory interface 410 may be used to access a software product and/or data stored on a non-transitory computer-readable medium or on memory devices, such as memory device 411. Memory device 411 may contain software modules to execute processes consistent with the present disclosure. In particular, memory device 411 may include an input determination module 412, an output determination module 413, a sensors communication module 414, a virtual content determination module 415, a virtual content communication module 416, and a database access module 417. Modules 412-417 may contain software instructions for execution by at least one processor (e.g., processing device 460) associated with XR unit 204. Input determination module 412, output determination module 413, sensors communication module 414, virtual content determination module 415, virtual content communication module 416, and database access module 417 may cooperate to perform various operations. For example, input determination module 412 may determine User Interface (UI) input received from input unit 202. At the same time, sensors communication module 414 may receive data from different sensors to determine a status of user 100. Virtual content determination module 415 may determine the virtual content to display based on received input and the determined status of user 100. Virtual content communication module 416 may retrieve virtual content not determined by virtual content determination module 415. The retrieval of the virtual content may be from database 380, database 480, mobile communications device 206, or from remote processing unit 208. Based on the output of virtual content determination module 415, output determination module 413 may cause a change in a virtual content displayed to user 100 by projector 454.

In some embodiments, input determination module 412 may regulate the operation of input interface 430 in order to receive gesture input 431, virtual input 432, audio input 433, and UI input 434. Consistent with the present disclosure, input determination module 412 may concurrently receive different types of input data. In one embodiment, input determination module 412 may apply different rules based on the detected type of input. For example, gesture input may have precedence over virtual input. In some embodiments, output determination module 413 may regulate the operation of output interface 450 in order to generate output using light indicators 451, display 452, speakers 453, and projector 454. In one embodiment, light indicators 451 may include a light indicator that shows the status of the wearable extended reality appliance. For example, the light indicator may display green light when the wearable extended reality appliance 110 are connected to input unit 202, and blinks when wearable extended reality appliance 110 has low battery. In another embodiment, display 452 may be used to display operational information. In another embodiment, speakers 453 may include a bone conduction headphone used to output audio to user 100. In another embodiment, projector 454 may present virtual content to user 100.

The operations of a sensors communication module, a virtual content determination module, a virtual content communication module, and a database access module are described above with reference to FIG. 3, details of which are not repeated herein. Modules 412-417 may be implemented in software, hardware, firmware, a mix of any of those, or the like.

Network interface 420, shown in FIG. 4, is assumed to have similar functionality as the functionality of network interface 320, described above in detail. The specific design and implementation of network interface 420 may depend on the communications network(s) over which XR unit 204 is intended to operate. For example, in some embodiments, XR unit 204 is configured to be selectively connectable by wire to input unit 202. When connected by wire, network interface 420 may enable communications with input unit 202; and when not connected by wire, network interface 420 may enable communications with mobile communications device 206.

Input interface 430, shown in FIG. 4, is assumed to have similar functionality as the functionality of input interface 330 described above in detail. In this case, input interface 430 may communicate with an image sensor to obtain gesture input 431 (e.g., a finger of user 100 pointing to a virtual object), communicate with other XR units 204 to obtain virtual input 432 (e.g., a virtual object shared with XR unit 204 or a gesture of avatar detected in the virtual environment), communicate with a microphone to obtain audio input 433 (e.g., voice commands), and communicate with input unit 202 to obtain UI input 434 (e.g., virtual content determined by virtual content determination module 315).

Power source 440, shown in FIG. 4, is assumed to have similar functionality as the functionality of power source 340 described above, only it provides electrical energy to power XR unit 204. In some embodiments, power source 440 may be charged by power source 340. For example, power source 440 may be wirelessly changed when XR unit 204 is placed on or in proximity to input unit 202.

Output interface 450, shown in FIG. 4, is assumed to have similar functionality as the functionality of output interface 350 described above in detail. In this case, output interface 450 may cause output from light indicators 451, display 452, speakers 453, and projector 454. Projector 454 may be any device, apparatus, instrument, or the like capable of projecting (or directing) light in order to display virtual content onto a surface. The surface may be part of XR unit 204, part of an eye of user 100, or part of an object in proximity to user 100. In one embodiment, projector 454 may include a lighting unit that concentrates light within a limited solid angle by means of one or more mirrors and lenses, and provides a high value of luminous intensity in a defined direction.

Processing device 460, shown in FIG. 4, is assumed to have similar functionality as the functionality of processing device 360 described above in detail. When XR unit 204 is connected to input unit 202, processing device 460 may work together with processing device 360. Specifically, processing device 460 may implement virtual machine technologies or other technologies to provide the ability to execute, control, run, manipulate, store, etc., multiple software processes, applications, programs, etc. It is appreciated that other types of processor arrangements could be implemented to provide the capabilities disclosed herein.

Sensors interface 470, shown in FIG. 4, is assumed to have similar functionality as the functionality of sensors interface 370 described above in detail. Specifically sensors interface 470 may communicate with audio sensor 471, image sensor 472, motion sensor 473, environmental sensor 474, and other sensors 475. The operations of an audio sensor, an image sensor, a motion sensor, an environmental sensor, and other sensors are described above with reference to FIG. 3, details of which are not repeated herein. It is appreciated that other types and combination of sensors may be used to provide the capabilities disclosed herein.

The components and arrangements shown in FIG. 4 are not intended to limit the disclosed embodiments. As will be appreciated by a person skilled in the art having the benefit of this disclosure, numerous variations and/or modifications may be made to the depicted configuration of XR unit 204. For example, not all components may be essential for the operation of XR unit 204 in all cases. Any component may be located in any appropriate part of system 200, and the components may be rearranged into a variety of configurations while providing the functionality of the disclosed embodiments. For example, some XR units may not include all of the elements in XR unit 204 (e.g., wearable extended reality appliance 110 may not have light indicators 451).

FIG. 5 is a block diagram of an exemplary configuration of remote processing unit 208. FIG. 5 is an exemplary representation of just one embodiment, and it is to be understood that some illustrated elements might be omitted and others added within the scope of this disclosure. In the embodiment of FIG. 5, remote processing unit 208 may include a server 210 that directly or indirectly accesses a bus 500 (or other communication mechanism) interconnecting subsystems and components for transferring information within server 210. For example, bus 500 may interconnect a memory interface 510, a network interface 520, a power source 540, a processing device 560, and a database 580. Remote processing unit 208 may also include a one or more data structures. For example, data structures 212A, 212B, and 212C.

Memory interface 510, shown in FIG. 5, is assumed to have similar functionality as the functionality of memory interface 310 described above in detail. Memory interface 510 may be used to access a software product and/or data stored on a non-transitory computer-readable medium or on other memory devices, such as memory devices 311, 411, 511, or data structures 212A, 212B, and 212C. Memory device 511 may contain software modules to execute processes consistent with the present disclosure. In particular, memory device 511 may include a shared memory module 512, a node registration module 513, a load balancing module 514, one or more computational nodes 515, an internal communication module 516, an external communication module 517, and a database access module (not shown). Modules 512-517 may contain software instructions for execution by at least one processor (e.g., processing device 560) associated with remote processing unit 208. Shared memory module 512, node registration module 513, load balancing module 514, computational module 515, and external communication module 517 may cooperate to perform various operations.

Shared memory module 512 may allow information sharing between remote processing unit 208 and other components of system 200. In some embodiments, shared memory module 512 may be configured to enable processing device 560 (and other processing devices in system 200) to access, retrieve, and store data. For example, using shared memory module 512, processing device 560 may perform at least one of: executing software programs stored on memory device 511, database 580, or data structures 212A-C; storing information in memory device 511, database 580, or data structures 212A-C; or retrieving information from memory device 511, database 580, or data structures 212A-C.

Node registration module 513 may be configured to track the availability of one or more computational nodes 515. In some examples, node registration module 513 may be implemented as: a software program, such as a software program executed by one or more computational nodes 515, a hardware solution, or a combined software and hardware solution. In some implementations, node registration module 513 may communicate with one or more computational nodes 515, for example, using internal communication module 516. In some examples, one or more computational nodes 515 may notify node registration module 513 of their status, for example, by sending messages: at startup, at shutdown, at constant intervals, at selected times, in response to queries received from node registration module 513, or at any other determined times. In some examples, node registration module 513 may query about the status of one or more computational nodes 515, for example, by sending messages: at startup, at constant intervals, at selected times, or at any other determined times.

Load balancing module 514 may be configured to divide the workload among one or more computational nodes 515. In some examples, load balancing module 514 may be implemented as: a software program, such as a software program executed by one or more of the computational nodes 515, a hardware solution, or a combined software and hardware solution. In some implementations, load balancing module 514 may interact with node registration module 513 in order to obtain information regarding the availability of one or more computational nodes 515. In some implementations, load balancing module 514 may communicate with one or more computational nodes 515, for example, using internal communication module 516. In some examples, one or more computational nodes 515 may notify load balancing module 514 of their status, for example, by sending messages: at startup, at shutdown, at constant intervals, at selected times, in response to queries received from load balancing module 514, or at any other determined times. In some examples, load balancing module 514 may query about the status of one or more computational nodes 515, for example, by sending messages: at startup, at constant intervals, at pre-selected times, or at any other determined times.

Internal communication module 516 may be configured to receive and/or to transmit information from one or more components of remote processing unit 208. For example, control signals and/or synchronization signals may be sent and/or received through internal communication module 516. In one embodiment, input information for computer programs, output information of computer programs, and/or intermediate information of computer programs may be sent and/or received through internal communication module 516. In another embodiment, information received though internal communication module 516 may be stored in memory device 511, in database 580, in data structures 212A-C, or other memory device in system 200. For example, information retrieved from data structure 212A may be transmitted using internal communication module 516. In another example, input data may be received using internal communication module 516 and stored in data structure 212B.

External communication module 517 may be configured to receive and/or to transmit information from one or more components of system 200. For example, control signals may be sent and/or received through external communication module 517. In one embodiment, information received though external communication module 517 may be stored in memory device 511, in database 580, in data structures 212A-C, and or any memory device in the system 200. In another embodiment, information retrieved from any of data structures 212A-C may be transmitted using external communication module 517 to XR unit 204. In another embodiment, input data may be transmitted and/or received using external communication module 517. Examples of such input data may include data received from input unit 202, information captured from the environment of user 100 using one or more sensors (e.g., audio sensor 471, image sensor 472, motion sensor 473, environmental sensor 474, other sensors 475), and more.

In some embodiments, aspects of modules 512-517 may be implemented in hardware, in software (including in one or more signal processing and/or application specific integrated circuits), in firmware, or in any combination thereof, executable by one or more processors, alone, or in various combinations with each other. Specifically, modules 512-517 may be configured to interact with each other and/or other modules of system 200 to perform functions consistent with disclosed embodiments. Memory device 511 may include additional modules and instructions or fewer modules and instructions.

Network interface 520, power source 540, processing device 560, and database 580, shown in FIG. 5, are assumed to have similar functionality as the functionality of similar elements described above with reference to FIGS. 4 and 5. The specific design and implementation of the above-mentioned components may vary based on the implementation of system 200. In addition, remote processing unit 208 may include more or fewer components. For example, remote processing unit 208 may include an input interface configured to receive direct input from one or more input devices.

Consistent with the present disclosure, a processing device of system 200 (e.g., processor within mobile communications device 206, a processor within a server 210, a processor within a wearable extended reality appliance, such as, wearable extended reality appliance 110, and/or a processor within an input device associated with wearable extended reality appliance 110, such as keyboard 104) may use machine learning algorithms in order to implement any of the methods disclosed herein. In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and more. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, distance from an item depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

Consistent with the present disclosure, a processing device of system 200 may analyze image data captured by an image sensor (e.g., image sensor 372, image sensor 472, or any other image sensor) in order to implement any of the methods disclosed herein. In some embodiments, analyzing the image data may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

Consistent with other aspects of the disclosure, a processing device of system 200 may analyze image data in order to implement any of the methods disclosed herein. In some embodiments, analyzing the image may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result, and more. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two-dimensional array of pixel values. In one example, calculating a convolution of an image may include calculating a two-dimensional convolution on one or more components of the image. In another example, calculating a convolution of an image may include stacking arrays from different components to create a three-dimensional array, and calculating a three-dimensional convolution on the resulting three-dimensional array. In some examples, a video may comprise one or more components (such as color components, depth component, etc.), and each component may include a three-dimensional array of pixel values (with two spatial axes and one temporal axis). In one example, calculating a convolution of a video may include calculating a three-dimensional convolution on one or more components of the video. In another example, calculating a convolution of a video may include stacking arrays from different components to create a four-dimensional array, and calculating a four-dimensional convolution on the resulting four-dimensional array.

Some disclosed embodiments may include systems, methods, and non-transitory computer readable media configured for enabling content sharing between users of wearable extended reality appliances. Content sharing may involve the presentation by one entity to another of text, images, programs, or any other information. The content may be shared between users of wearable extended reality appliances, so that one entity wearing an appliance may view or otherwise have access to content available via the wearable extended reality appliance of another. Content sharing may be enabled in many different ways. In some embodiments, enabling may occur through a link between two extended reality appliances. In one example, the link may include a direct and/or in-direct communication link between the two extended reality appliances. In another example, a system (such as a centralized system) may be in communication with each one of the two extended reality appliances, for example to provide each one of the two extended reality appliances content for presentation, to receive location and/or orientation information associated with the extended reality appliances, and/or any other information pertaining to presenting content. The link may include a linkage in a data-structure or a database of the system or maintained by the system. In one non-limiting example, a detected proximity of two entities may trigger an automatic or selectable sharing of content. In other embodiments, one entity may select content for sharing either with a group or an individual or may tie content to a physical or virtual location enabling anyone accessing that location to view the content. In some embodiments, content sharing may be enabled through permissions, where viewing of shared content is only enabled for entities with appropriate authority. In yet other embodiments, rules may define with whom content may be shared. In further exemplary embodiments, sharing may be enabled via a request sent from one appliance to another. Content sharing may be initiated in some embodiments as the result of signals from one or more sensors. For example, one or more image sensors might detect a gesture indicative of an intent to share content. Or a proximity sensor may trigger an ability to share when two wearable extended reality appliances are in proximity to each other. There are many different ways in which content sharing may be enabled consistent with this disclosure, and this disclosure is not limited to any particular one.

Some disclosed embodiments may include computer readable media containing instructions that when executed by at least one processor cause the at least one processor to establish a link between a first wearable extended reality appliance and a second wearable extended reality appliance.

In some embodiments, establishing a link may refer to any means of communicating between the first wearable extended reality appliance and the second extended wearable reality appliance. In some embodiments, there may be a formal protocol that governs how the first wearable extended reality appliance and the second wearable extended reality appliance transmit and receive data. Such protocols may include but are not limited to Transmission Control Protocol/Internet Protocols (TCP/IP), Bluetooth, Infrared, Near Field Communication, Ultra-Wide Band, WiFi, Zig-Bee, short-range communication protocol, and/or long-range communication protocol. Such means of communication between the first wearable extended reality appliance and the second wearable extended reality appliance may include, but are not limited to, Local Area Network (LAN), Wireless Local Area Network (WLAN), Virtual Private Network (VPN), an indirect communication link, and/or by a directed communication link. The processor may cause the first wearable extended reality appliance to initiate communication with a second wearable extended reality appliance via one or more of the above-identified protocols. In some examples, establishing a link may refer to linkage in a data-structure and/or a database, for example in system coordinating an extended reality environment, in a system that communicates with both the first and the second wearable extended reality appliances, and/or in a system that provides content for presentation for both the first and the second wearable extended reality appliance.

Some disclosed embodiments may involve establishing the link (for example, the communication link, the link in the data-structure and/or a database) and enabling information exchange when the first wearable extended reality appliance is detected in proximity to the second wearable extended reality appliance. Such instructions may be configured based on a threshold distance, and this threshold distance may vary between users of the extended reality appliance. For example, the first wearable extended reality appliance user may prefer to initiate a link with the second wearable extended reality appliance at a shorter threshold distance, for instance one or two meters, when a particular type of user is around, such as a family member. By contrast, the same first wearable extended reality appliance user may prefer to initiate a link with the second wearable extended reality appliance at a longer threshold distance in order to facilitate communication with a colleague or team member. The user may be free to update threshold distance settings depending on the user's preference.

In some examples, the communication link between the wearable extended reality appliances may be through intermediate devices. Intermediate devices may include any networking device positioned between a Remote Access Server (RAS) and a RAS client. Intermediate devices may aid in providing connectivity between two separate wearable extended reality appliances. An intermediate device may provide an extra layer of security before a communication link between two wearable extended reality appliances is established. For example, when security protocols are not satisfied, the intermediate device may prevent establishment of a connection between the two extended reality appliances.

Some disclosed embodiments may involve presenting through the first wearable extended reality appliance first virtual content. The virtual content may take on a variety of different forms and may include documents, photos, videos, virtual characters, and any other sharable media that can be transmitted wirelessly. In some examples, the virtual content may be presented as part of an extended reality environment. In other examples, virtual content may be displayed on a physical screen, such as a TV, tablet, laptop, or smartphone, or it may be displayed on a virtual screen, such as through one or more extended reality appliances.

Some disclosed embodiments may include obtaining a first command to display the first virtual content via the second wearable extended reality appliance. A first command may refer to a signal received from the at least one processor to display virtual content via the second wearable extended reality appliance. In another example, the first command may refer to a command obtained from a user, and/or in response to an action of the user. The non-transitory computer readable medium may be configured to share content and may contain instructions for the at least one processor to send a signal to the first wearable extended reality appliance to display virtual content.

In some disclosed embodiments, obtaining the first command to present virtual content may include a sharing intent in data captured by the first wearable extended reality appliance. A sharing intent may refer to a user's desire to present virtual content to another user or to exchange virtual content with another user. In one example, a machine learning model may be trained using training examples to identify sharing intent by analyzing captured data. An example of such a training example may include sample captured data, together with a label indicating whether the sample capture data corresponds to a sharing intent and/or a parameter of the sharing intent (for example, an intent to share a particular content, an intent to share content presented in a particular area, an intent to share content with a particular entity, and/or an intent to share content in a particular way). The trained machine learning model may be used to analyze the data captured by the first wearable extended reality appliance and identify the sharing intent and/or parameters of the sharing intent. For example, a user's sharing intent may be identified in captured image data. Some non-limiting examples of such captured image data may include image data (such as one or more images and/or one or more videos) captured using an image sensor included in the first wearable extended reality appliance, included in the second wearable extended reality appliance, included in a device in an environment of the first and the second wearable extended reality appliances (the device may differ from the first and the second wearable extended reality appliances, such as another wearable extended reality appliance, a stationary camera mounted in a room, and/or any other device that may capture image or video data). A user's sharing intent may be identified by analyzing the image data to detect movement or a change of position or orientation of an object in the captured image data. For example, a user's sharing intent may be identified by detecting a movement of the user's hand (e.g., user is waving their hand), by using a visual gesture recognition algorithm to analyze the image data. In another example, a user's sharing intent may be identified by detecting that a user has moved a piece of hardware in the one or more captured images, for example using a visual object tracking algorithm. Additionally, such a sharing intent may be captured if a user moves a finger, nods their head, touches their extended reality appliance, or otherwise gestures to another user that he or she wishes to share content. In some examples, a machine learning model may be trained using training examples to identify sharing intent by analyzing images and/or videos. An example of such training example may include a sample image and/or a sample video, together with a label indicating whether the sample image and/or sample video corresponds to a sharing intent and/or a parameter of the sharing intent (for example, an intent to share a particular content, an intent to share content presented in a particular area, an intent to share content with a particular entity, an intent to share content in a particular way, and/or intent to share content at a particular time). The trained machine learning model may be used to analyze the captured image data and identify the sharing intent and/or parameters of the sharing intent. In some examples, a convolution of at least part of the image data may be calculated to obtain a result value of the calculated convolution. In one example, in response to a first result value of the calculated convolution, a sharing intent of the first virtual content may be identified, and in response to a second result value of the calculated convolution, no sharing intent of the first virtual content may be identified. In another example, in response to a first result value of the calculated convolution, a sharing intent of one virtual content may be identified, and in response to a second result value of the calculated convolution, a sharing intent of another virtual content may be identified.

Figure 6:
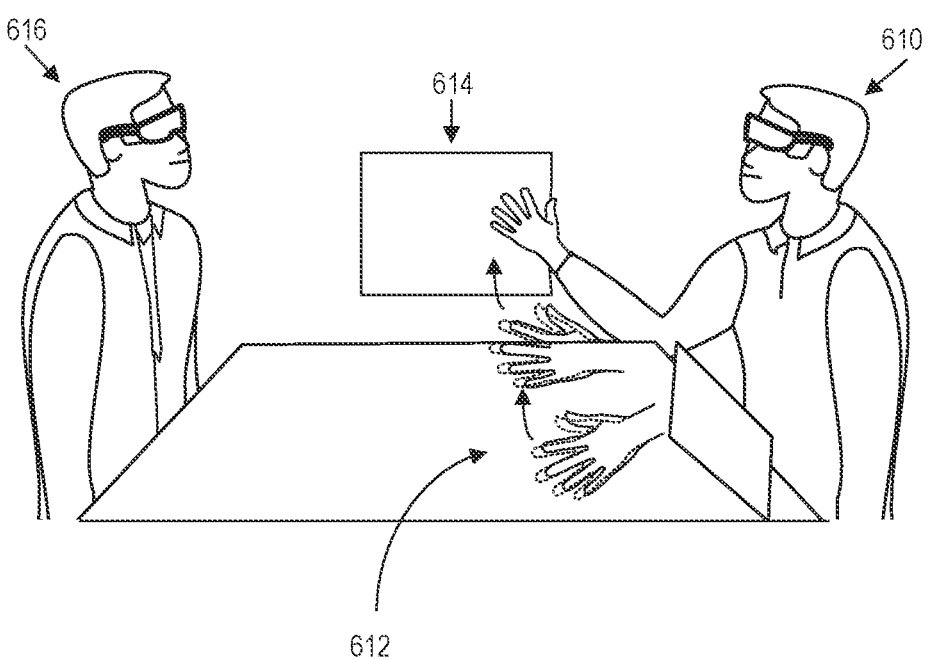
FIG. 6 is an exemplary pictorial illustration of sharing movements between first and second users of wearable extended reality appliances, consistent with some disclosed embodiments.

By way of example, FIG. 6 illustrates a sharing intent of first extended reality appliance user 610 via a sharing movement 612. For example, as illustrated in FIG. 6, hand waving by first user 610 reflects an intent to share virtual content 614 with second extended reality appliance user 616.

Hardware that may be used to capture a user's sharing intent may include a pointer, keyboard, mouse, joystick, or any other object designed to facilitate sharing data. Such a sharing intent may be captured when a user moves the hardware, such as a mouse or a joystick, towards another user. In some embodiments, a user's sharing intent may also be determined when the user waves a wand, presses a button on a keyboard, or otherwise gestures with respect to another user. In some embodiments, identification of sharing intent based on captured data from hardware may be configured based on a user's preference, and may not be limited to moving the hardware towards a second user.

A user's preference refers to how a particular wearable extended reality appliance user chooses to configure their appliance to share virtual content. For example, one user may prefer to share virtual content via a hand movement, whereas another user may prefer to share content via a pointer or joystick. Alternatively, users may be permitted to define gesture preferences for sharing content.

In some embodiments, the sharing intent may also be identified in captured voice data. For example, the captured voice data may include audio data captured using an audio sensor included in the first wearable extended reality appliance, using an audio sensor included in the second wearable extended reality appliance, and/or using an audio sensor included in another device. In one example, a user may verbally initiate sharing through a voice command. The command may include, but is not limited to, for example, "share content," "transmit content," "display content," "present content," or any other word combination that may be construed as a request to share content with another user. Additionally, the verbal command may name a second user specifically, and may take the form of, for example, "share content with User X." Verbal commands may also be configured based on a user's preference. In one example, the captured voice data may be analyzing using a speech recognition algorithm to identify voice commands corresponding to the sharing intent and/or parameters of the sharing intent.

Each unique wearable extended reality appliance user's preferences, as described above, may be stored in the non-transitory computer readable medium enabled for control of content sharing.

In some embodiments, the sharing intent may be identified in captured positioning data. Such positioning data may be captured based on the first wearable extended reality appliance user's position and/or orientation, based on position and/or orientation of the first wearable extended reality appliance, and/or based on position and/or orientation of a device associated the first wearable extended reality appliance (for example, of another device used by a user of the first wearable extended reality appliance, such as a keyboard, a glove, and/or a pointing device). For example, a sharing intent may be identified when a user positions their body and wearable extended reality appliance closer to another user's. By way of another example, the sharing intent may be identified when a user stands from a sitting position, leans over to another user, or otherwise positions their body or extended reality appliance in such a way as to indicate a sharing intent. Sharing intent based on positioning data may also be configured based on a user's preference. In one example, the position and/or orientation may be determined by analyzing data captured using a sensor included the first wearable extended reality appliance and/or in a different device, such as a positioning sensor (such as an accelerometer, a gyroscope, and/or a GPS sensor), and/or an image sensor (for example by analyzing the image data captured using the image sensor using ego-motion algorithms, and/or using visual object tracking algorithms).

In some embodiments, obtaining the first command may include identifying a sharing intent associated with an action performed in an extended reality environment (such as a virtual reality environment, an augmented reality environment, and/or a mixed reality environment). As described in the below paragraphs, an action performed in an extended reality environment may include sharing content via a sharing bubble or a sharing ring, or by automatically sharing content with another wearable extended reality appliance user upon establishing a link between the two or more wearable extended reality appliances.

In some embodiments, identifying the sharing intent may include determining that a first user of the first wearable extended reality appliance changed an orientation of a virtual screen presenting the first virtual content towards a second user of the second wearable extended reality appliance. In one example, determining that a first user of the first wearable extended reality appliance changed an orientation of the virtual screen towards a second user may include determining that the virtual screen is oriented towards the second user, and determining that the virtual screen became oriented towards the second user as a result of an action of the first user (and not, for example, as a result of a movement of the second user). In one example, determining whether the virtual screen became oriented towards the second user as a result of an action of the first user may be based on an analysis of movements of the second user and/or movements of the virtual screen and/or inputs leading to the movements of the virtual screen. For example, at least one of a system coordinating an extended reality environment, a system that communicates with both the first and the second wearable extended reality appliances, a system that provides content for presentation for both the first and the second wearable extended reality appliance, or the first wearable extended reality appliance may determine that an orientation of the virtual screen changed towards the second user. Based on the first wearable extended reality appliance user's preference, this may manifest a sharing intent with the second user. In some examples, a first angle may be an angle between a surface corresponding to the virtual screen and a direction associated with a user of the first wearable extended reality appliance, a second angle may be an angle between a surface corresponding to the virtual screen and a direction associated with a user of the second wearable extended reality appliance, and the determination that the orientation of the virtual screen presenting the first virtual content changed towards the second user of the second wearable extended reality may be based on the first angle and the second angle. Some non-limiting examples of such direction associated with a user may include a direction of a head of the user, a direction of a body of the user, a direction of a gaze and/or an eye of the user, a fixation line direction of the user, a line of sight direction of the user, a visual axis direction of the user, a pupillary axis direction of the user, an optical axis direction of the user, and/or a direction associated with an orientation of the wearable extended reality appliance of the user. In one example, a function of the first angle and the second angle may be calculated and compared with a threshold to determine whether the orientation of the virtual screen presenting the first virtual content changed towards the second user. In another example, a machine learning model may be trained using training examples to determine whether orientations of virtual screens are changed towards users based on angles and/or distances. An example of such training example may include sample angles of a sample virtual screen with respect to sample users and/or sample distances of the sample virtual screen from the sample users, together with a label indicating whether the sample virtual screen is oriented towards each one of the samples users. The trained machine learning model may be used to analyze the first angle, the second angle, and possibly the distances of the users from the virtual screen, to determine that the virtual screen is oriented towards the second user.

Furthermore, the user of the second wearable extended reality appliance may be located within proximity, whether a physical threshold distance or virtual proximity, of the virtual screen. In one example, the sharing intent may be determined if a user of the first wearable extended reality appliance leans or nods towards the user of the second wearable extended reality appliance, such that the change in orientation may be captured. The user of the second wearable extended reality appliance may also be a representation of the user, such as an avatar. Thus, a first user may share content based on a change in orientation even if the second user was not physically located next to the first user.

In some embodiments, identifying the sharing intent may include determining that a first user of the first wearable extended reality appliance moved the first virtual content towards a virtual sharing space surrounding a second user of the second wearable extended reality appliance. In one example, the virtual sharing space surrounding a second user may be referred to as a sharing bubble. For example, the at least one processor may be configured to detect an action that may take the form of a gesture, a dragging of the first virtual content, or other physical movements made by the first user. The at least one processor may be configured to determine movement of a first virtual content towards a virtual sharing space based on the detected gesture, dragging, or other physical movement. This sharing action may also be based on people's natural movement to lean towards other people with whom they wish to share content. Such movements may be detected by one or more sensors within at least one extended reality appliance, or via a sensor associated with another device.

The virtual sharing space in the above embodiment, known as a sharing bubble, may be determined automatically in a myriad of different ways. For example, the virtual sharing space may be determined based on a position and/or a movement of the second user and/or the second wearable extended reality appliance. For example, the virtual sharing space may include a space within a selected distance from the second user and/or the second wearable extended reality appliance. In this embodiment, when a first user is within a certain distance of a second user, virtual content may be automatically shared with the second user. In another example, the sharing bubble may be elongated in the direction of the movement. In yet another example, the sharing bubble may be larger in horizontal directions than in vertical directions.

The sharing bubble may be a space around a user. This space may be defined in a variety of different ways. In some embodiments, the size and/or orientation of a bubble surrounding one or more users may be determined by the number of users, the positions of the user, the positions of other people not belonging to the bubble, the orientations of the users, the orientations of other people not belonging to the bubble, the identities of the users, the identities of the users not belonging to the bubble, the positions of inanimate objects in the vicinity of the users, the types of the inanimate objects in the vicinity of the users, the status of the inanimate objects in the vicinity of the users, motion patterns of the users, motion patterns of other people not belonging to the bubble, preferences of the users, past behavior of the users, gestures of the users, and/or other factors regarding proximity of users to one another. In one example, a topological function of one of more of these parameters may define the space of the sharing bubble.

When the virtual sharing bubbles of two or more users collide, the two or more users may be automatically offered an opportunity to create a new shared bubble in which virtual content items may be shared among the extended realities of the two or more users. The at least one processor may be configured to determine that there is an overlap between virtual sharing bubbles, and in response the at least one processor may suggest to the users of the overlapping bubbles that virtual content may be shared between those users. A user's wearable extended reality appliance may also be configured to share content automatically upon overlapping with another user's bubble.

Figure 7A:
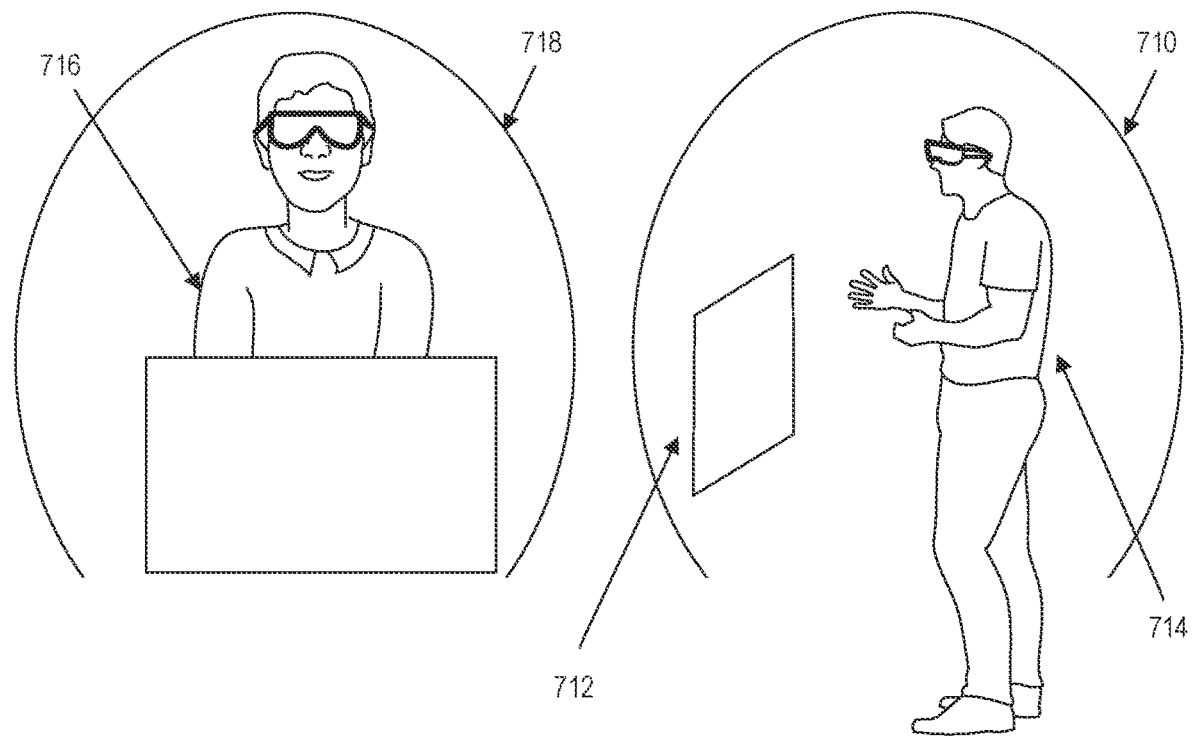
FIGS. 7A and 7B illustrate an exemplary embodiment of a sharing action via a sharing bubble between first and second users of wearable extended reality appliances.
Figure 7B:
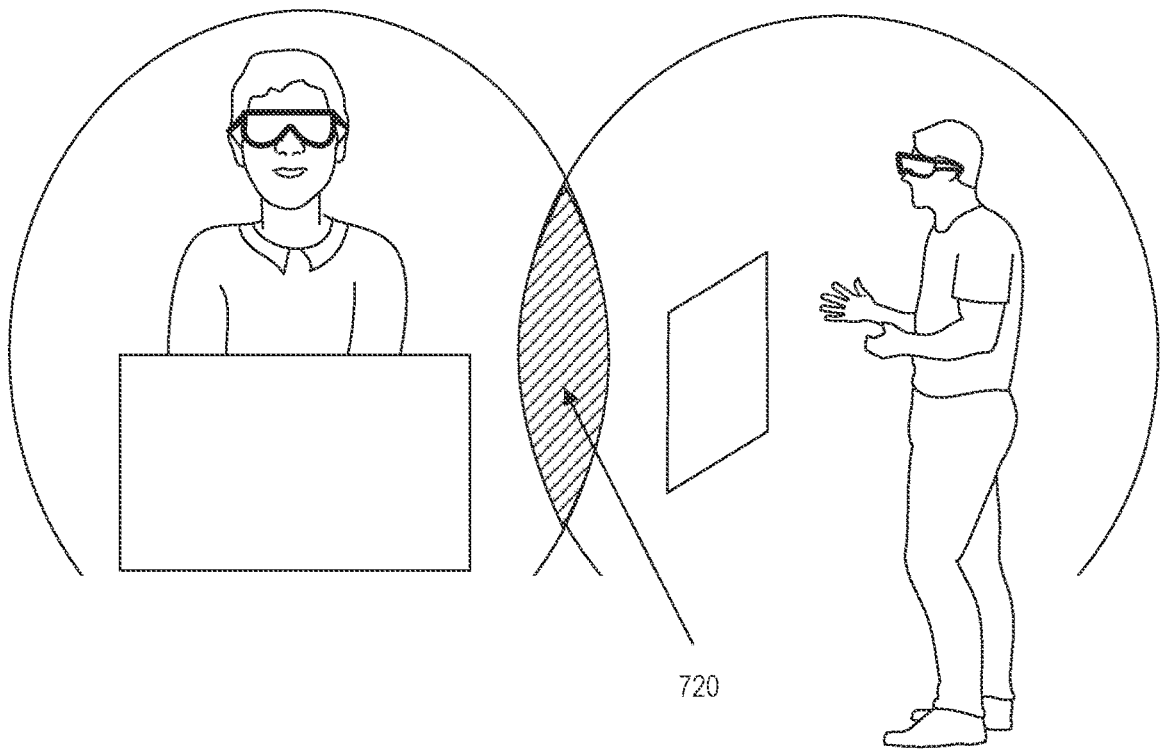

By way of example, FIG. 7A illustrates a pair of users 714 and 716. As illustrated in FIG. 7A, first wearable extended reality appliance user 714 may have an associated virtual sharing bubble 710 and second wearable extended reality appliance user 716 may have an associated virtual sharing bubble 718. Virtual sharing bubble 710 of first wearable extended reality appliance user 714 may come into contact with and overlap with virtual sharing bubble 718 of second wearable extended reality appliance user 716 when, for example, first wearable extended reality appliance user 714 moves towards a second user 716. FIG. 7B illustrates a condition in which virtual sharing bubble 710 overlaps with virtual sharing bubble 718 via overlapping region 720. Virtual content 712 may be automatically shared with second wearable extended reality appliance user 716 when the sharing bubbles 710 and 718 overlap in, for example, overlapping region 720, and/or when the volume of overlapping region 720 is above a selected volume threshold. In one example, the volume threshold may be selected by configuration, by a user, as a function of a volume of virtual sharing bubble 710 and/or of a volume of virtual sharing bubble 718, of the users 714, 716, and/or of the virtual content 712.

Figure 8A:
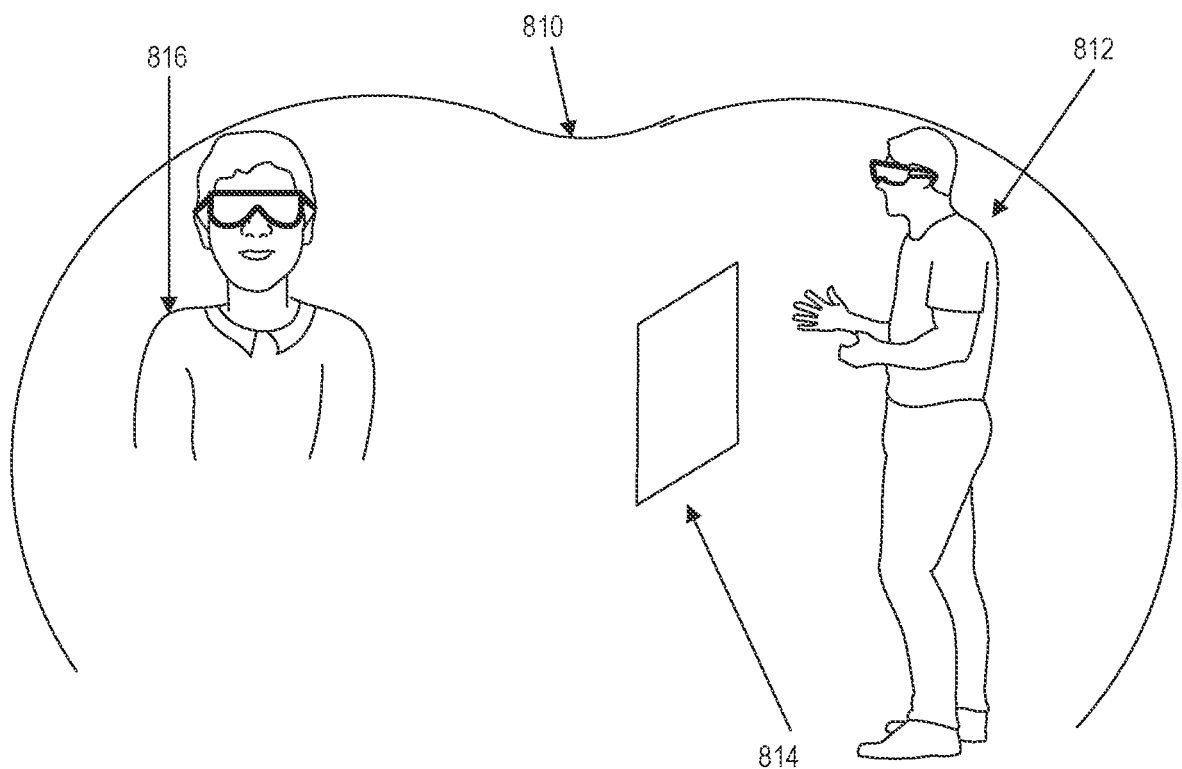
FIGS. 8A and 8B illustrates an exemplary embodiment of a sharing action wherein a first extended reality appliance user may lean towards a second user to share content.
Figure 8B:
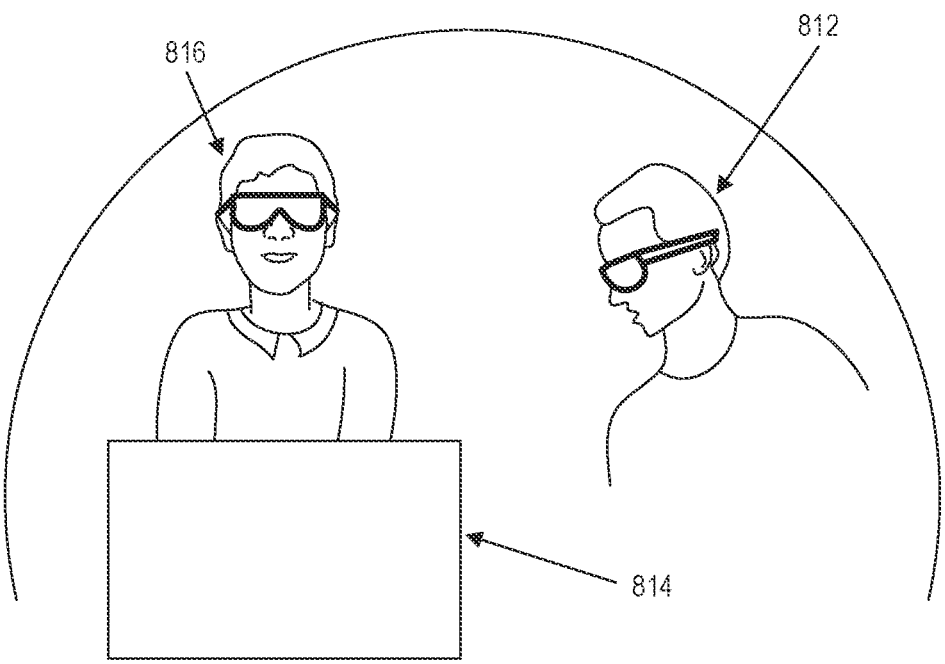

By way of example, FIGS. 8A and 8B illustrate a combined virtual sharing bubble 810 after the sharing bubbles from first extended reality appliance user 812 and second extended reality appliance user 816 overlap, as shown in FIG. 8A. While virtual content 814 may be automatically shared when these virtual sharing bubbles overlap, as shown in FIG. 8B, virtual content 814 may also be shared automatically when a first user 812 leans towards a second user 816 (for example, when first user 812 leans towards second user 816 when the virtual sharing bubbles overlap). The combined sharing bubble 810 may reduce in size the closer users get to one another.

The virtual sharing space may also be determined based on a usage mode of the second wearable extended reality appliance, the user, the second wearable extended reality appliance, and/or objects surrounding the second wearable extended reality appliance. For example, a user may configure the extended reality appliance to automatically share content when that user enters a room, passes a second user's desk, or walks within proximity of any other object in a room. Additionally, a usage mode may be configured to automatically share content with some users, and to not share the content with others.

A usage mode may refer to the different settings a user configures their extended reality system (for example, their wearable extended reality appliance) based on the different tasks they wish to accomplish. For example, one usage mode may apply only to activities performed in the workplace. In this example, certain types of content, including documents and emails, may be shared at a certain distance between two wearable extended reality appliance users. In another example, a usage mode may apply only to activities performed at home. A user may wish to share a video, for example, but not any documents or emails.

In some embodiments, identifying the sharing intent may also include determining that a first user of the first wearable extended reality appliance moved the first virtual content towards a defined, sharing space. For example, additionally or alternatively to automatically sharing content when two extended reality appliance users move towards each other, a user may create a sharing space based on predefined parameters, such as length, width, height, and/or location in a room. Instead of sharing content when two users' virtual sharing bubbles overlap, the sharing intent may be determined when users move content towards and/or into such a predefined space. In contrast with the sharing bubble that encompasses each user and has been described above, this sharing intent may be referred to as a sharing ring, as its characteristics are predefined by an extended reality appliance user. Sharing rings may be configured based on a user's preferences. In particular, the location and/or size of a sharing ring may be configured by each user of a wearable extended reality appliance.

Some non-limiting examples of such a virtual sharing space may include a ring, a rectangle, a cube, a sphere, a convex shape, a non-convex shape, a smooth shape, an irregular shape, or any other well-defined shape. In some examples, the virtual sharing space may be anchored to a physical location, may be anchored to a physical object, may be created by a user, or may be created based on any other predefined characteristic. A virtual sharing space (such as a sharing ring) may have any two-dimensional or three-dimensional shape, and are not limited to rings. In one example, a virtual sharing space (such as a sharing ring) may be anchored to an object and configured to move with the object. For example, a virtual sharing space may be anchored to a keyboard, an input device, an output device, a chair or a desk associated with a particular user, and moving virtual content into that virtual sharing space may cause the virtual content to be shared with the particular user. In an example of a desk, the virtual sharing space may correspond to at least part of an area of a top surface of the desk. In an example of a chair, the virtual sharing space may correspond to a three-dimensional shape encompassing at least part of the chair. In an example of a keyboard, the keyboard may be placed on a desk, and the virtual sharing space may correspond to at least part of an area of a top surface of the desk, for example a part of the area of the top surface of the desk in a vicinity of the keyboard. Sharing content may also be based on a predefined privacy setting, which may be configured by an extended reality appliance user. In some examples, content may be shared between two users, may be shared with the public, may be shared among a plurality of users, or may include any other combination of public and private sharing. The type and level of sharing and/or the identity of the users that may access the virtual content may be determined based on the virtual sharing space, the content, the user, or any other factors based on the where the user is located. In the sharing space, movement of the virtual content may be a result of an action of a user of the first wearable extended reality appliance. Such an action may take the form of, for example, a gesture, a dragging of the first virtual content, or any other physical movement or movement involving the first virtual content.

Figure 9:
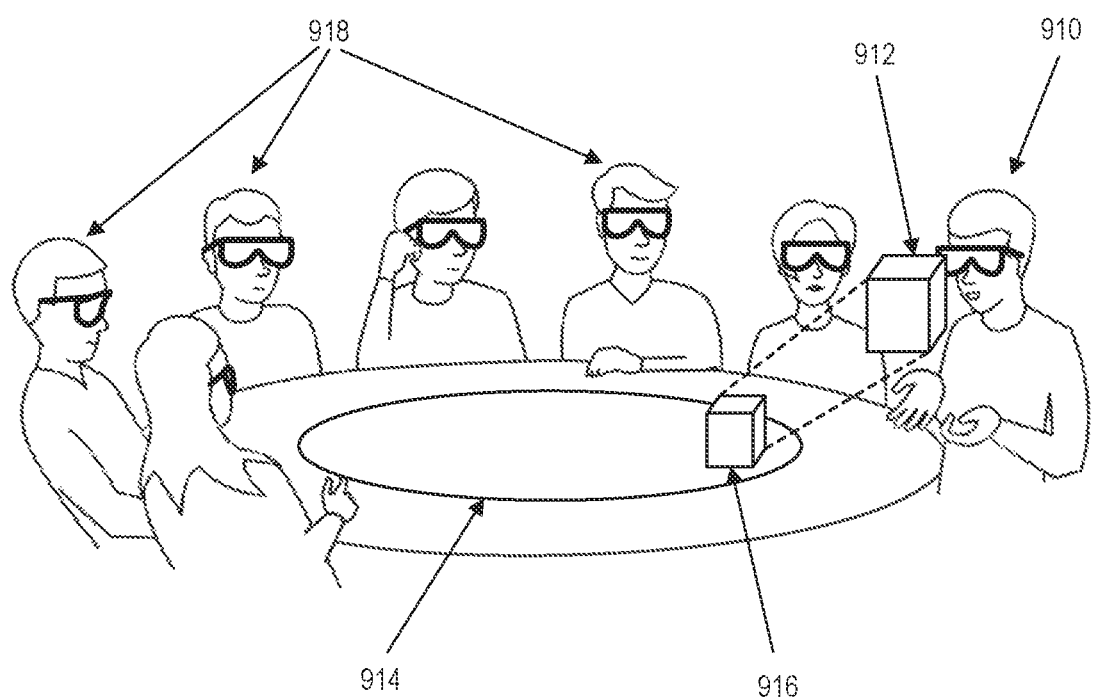
FIG. 9 illustrates an exemplary embodiment of a sharing action via a sharing ring.

By way of example, FIG. 9 illustrates a sharing ring 914, which may be a predefined virtual sharing space created by a first wearable extended reality appliance user 910, a virtual sharing space created by a user of another wearable extended reality appliance (such as one of users 918 or a user of a different wearable extended reality appliance), a virtual sharing space created by a user not using a wearable extended reality appliance, and/or an automatically generated virtual sharing space. First user 910 may place virtual content 912 in a predefined area 914 such that virtual content 912, previously only visible to the first wearable extended reality appliance user 910, becomes shared content 916 that may be visible to other extended reality appliance users 918.

In some examples, virtual content items may be shared based on people's natural movement and/or based on a user moving a virtual display screen and placing it in a location which is visible to other users or participants. For example, it may be recognized that there is a hand movement or a gesture, and in response a virtual content item (such as a virtual display screen) may be shared with the relevant users. In some embodiments, all participants may see the virtual display screen docked in the same location. In some embodiments, a virtual content item may be simultaneously viewed in a public region by a plurality of participants and in private mode as an additional/duplicate virtual display screen of a particular user, docked to where the users choose. For example, a user may prefer to see a virtual content item from a closer distance, especially if it includes text, may prefer to add private overlay to the virtual content item, or any other configurations. In one example, virtual content items with lower levels of privacy may be shared without need of user approval. In one example, public content items may be viewed in shared and private modes, and shared content may be viewed in private mode.

In some embodiments, for example, the sharing of virtual content may be triggered when a first user and a second user's sharing bubble overlap, or when a user shares content in a predefined area, i.e., a sharing ring, or by any other mean discussed herein. However, before virtual content between a first wearable extended reality appliance and a second wearable extended reality appliance may be shared, a non-transitory computer readable medium may establish a link between the two appliances. In some embodiments, virtual content may be automatically shared via a virtual sharing space when the link between the first wearable extended reality appliance and the second extended reality appliance is established. A processor may automatically generate the sharing of virtual content when the first and second wearable extended reality appliances are linked so as to communicate with each other. The shared virtual content may be selected based on the preference of the users of the first and/or second extended reality appliances. Whether a sharing is created immediately after establishing a link may be based on a user's preference, and the extended reality appliance may be configured for different uses.

For example, one user may configure their wearable extended reality appliance or system to automatically share content in the workplace. In this example, the appliance may be configured to share content at a longer distance, such as when a coworker is in view, and the content may be limited to documents and emails. In another example, a user may configure their wearable extended reality appliance or system to automatically share content at home. In this example, the appliance may be configured to only automatically share content at a shorter distance, such as when a family member is directly next to the user. Such virtual content may be limited to videos and music and may not include documents or emails.

In some embodiments, a visualization of the virtual sharing space may be presented by each of the first wearable extended reality appliance and the second wearable extended reality appliance. For example, on a typical computer screen, one can share a document by dragging and dropping files between different folders, such as a Dropbox folder. In contrast, in some embodiments of the disclosure, sharing virtual objects does not have to be limited to folders. Rather, virtual objects may be shared via a virtual box, a virtual window, or otherwise marked area. A virtual box may refer to a space on a virtual display presented by the first or second wearable extended reality appliance where multiple users may share virtual content. This sharing act may also take place in the three-dimensional space virtual space, and the act of sharing virtual objects between such a folder, a virtual box, or a window may be visible to users of both the first and second wearable extended reality appliances. In some examples, the visualization of the virtual sharing space may include a visual indication of a border of the virtual sharing space, a visual indication of a volume of the virtual sharing space, and/or a visual indication of a center of the virtual sharing space. Some non-limiting examples of such visual indicators may include virtual colorization of a surface or a volume, virtually highlighting a surface or a volume, and/or one or more virtual visual symbols at selected locations. When a user virtually moves virtual content towards and/or into the visualized virtual sharing space, a sharing of the moved virtual content may be triggered. For example, the user may move the virtual content using gestures, using a computer pointing device, using textual inputs, and/or using voice commands.

In some embodiments, a location of the virtual sharing space may be determined based on a location of a physical object in an environment of the first wearable extended reality appliance. For example, certain physical objects such as whiteboards or other display surfaces may be linked to a virtual sharing space such that anyone with permissions and in the vicinity of that object may have access to shared content. In some embodiments, an extended reality appliance user may select an object for defining a virtual sharing space. For example, a piece of artwork on a wall or a physical object on a table may be selected as a basis for a virtual sharing space, and upon detection of the selected object, a virtual display screen may appear in a region adjacent the selected object.

Figure 10A:
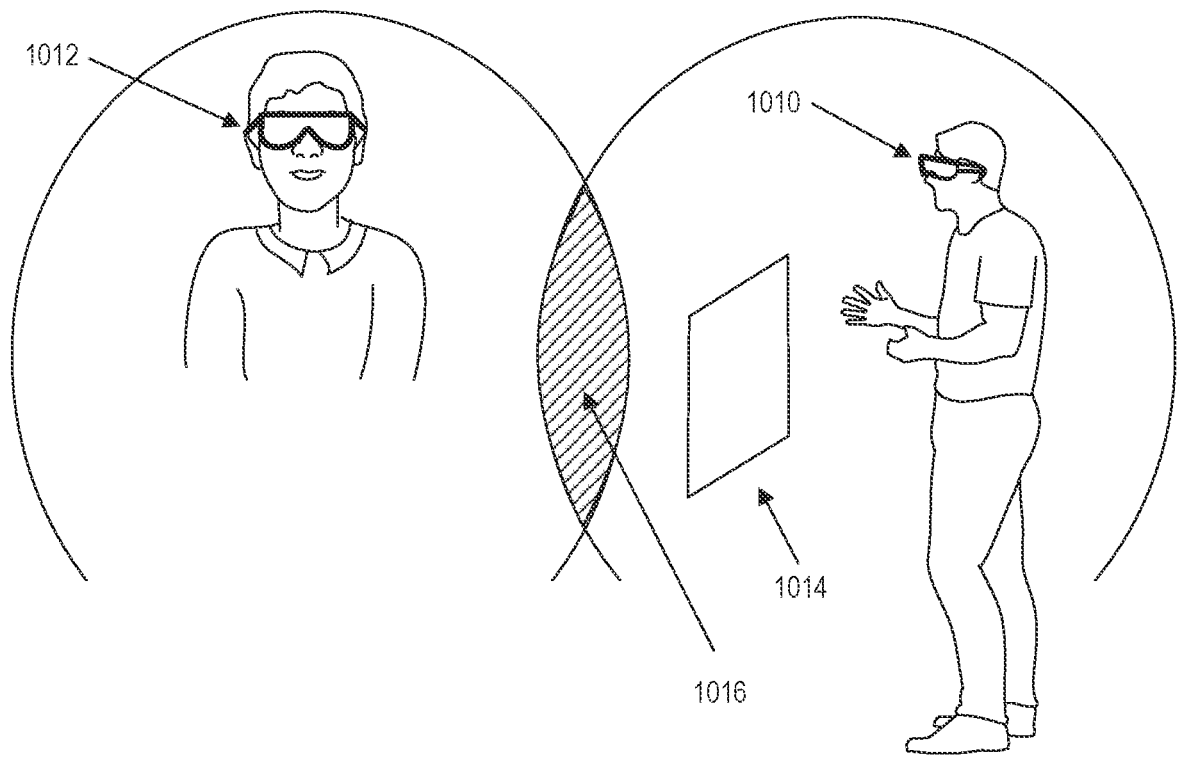
FIGS. 10A and 10B illustrate an exemplary embodiment of sharing content subsequently presented via a first wearable extended reality appliance.

By way of example. FIG. 10A illustrates a sharing bubble, wherein the second wearable extended reality appliance 1012 receives first virtual content 1014 from the second wearable extended reality appliance 1010 via sharing region 1016. Such virtual content may also be shared via a sharing ring as shown in FIG. 9.

Figure 10B:
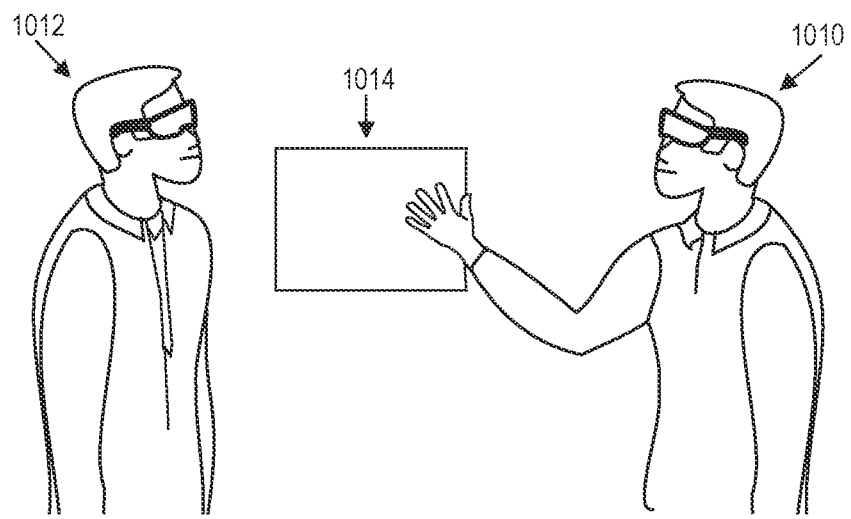

In another example, FIG. 10B illustrates presenting received virtual content. Here, the second wearable extended reality appliance 1012 presents first virtual content 1014 received from the first wearable extended reality appliance 1010. The virtual content may be presented via the wearable extended reality appliance on a screen such as a tablet or TV, via the appliance itself, or any other physical object, as represented by the square in FIG. 10B.

Some embodiments may provide an indicator via the first wearable extended reality appliance upon the first virtual content being presented via the second wearable extended reality appliance. An indicator may refer to any sort of mark, annotation, or signal that informs a user that his or her content is being displayed on another's extended reality appliance. Additionally, the indicator may be demonstrative of whether the content is privately shared, publicly shared, shared with a particular individual (and/or the identity of the particular individual), shared with a particular group (and/or the identity of the particular group), and other public or private sharing options. As another example, the indicator may inform whether a user of the second wearable extended reality appliance has included annotations or other comments on the first virtual content, or has edited or transformed the first virtual content. In one example, the indicator provided via the first wearable extended reality appliance may be an audible indicator. In another example, the indicator provided via the first wearable extended reality appliance may be a visual indicator. For example, the visual indicator may be present on or in conjunction with the first virtual content. In another example, the visual indicator may include a visual modification to a presentation of the first virtual content.

There are many ways in which virtual content may be shared between wearable extended reality appliance users. Content may be shared via a sharing bubble or a sharing ring. A first wearable extended reality appliance user may share content, via a sharing bubble or sharing ring, with a second wearable extended reality appliance user. In the above embodiments, the second wearable extended reality appliance user may display content received from the first user. This content may be displayed in a myriad of ways, whether it be through the second user's extended reality appliance, via a screen such as a tablet or TV, a flat surface such as a wall, window, or chalkboard, and/or any other physical object that a user may designate to present virtual content. For example, the second wearable extended reality appliance, after receiving virtual content from the first user, may display the content via the second appliance, and/or via a TV or whiteboard.

In some embodiments, the first virtual content may be associated with at least one private virtual object and at least one public virtual object, and causing the virtual content to be transmitted for display by the second wearable extended reality appliance may include transmitting the at least one public virtual object and avoiding transmission of the at least one private virtual object. As described herein, a virtual object may refer to a virtual display screen, to virtual content items, to virtual two-dimensional objects, to virtual three-dimensional objects, documents, media items, photos, videos, virtual characters, user-generated content, and/or components of the listed objects (e.g., a volume or brightness adjustment bar). Furthermore, a public virtual object may include virtual object that may be shared for viewing by other wearable extended reality appliance users and that may not be subject to any restrictions on sharing with other users. By contrast, a private virtual object may include virtual content that a wearable extended reality appliance user does not wish and/or is not allowed to share with any other user or with any other user that is not part of a predefined group. In some examples, a user may configure which virtual objects are public and which virtual objects are private, or may configure different privacy levels to different virtual objects. In other example, it may be determined automatically whether a virtual object is private or public, for example based on an analysis of visual and/or non-visual characteristics of the virtual object.

In the above embodiments, a user may specify that some or all portions of a virtual content may not be shared with another user. For example, if when the virtual content is visualized as a screen, the screen may have both a public and a private window. The public and private window each may contain virtual object. Thus, in some disclosed embodiments, virtual content may be displayed with only the public virtual object being visible to the second wearable extended reality appliance user, with the private virtual content remaining hidden. Virtual content, meant to be shared between wearable extended reality appliance users, may consist of various virtual objects, some private and some public.

By way of example, virtual content may include a table or graph illustrating financial information associated with a user and the user may not wish to share the financial information with other users. The user may designate the financial information in the virtual content as a private virtual object thus preventing other users from being able to see that virtual content. In another example, virtual content may include a document with confidential exhibits. The user may designate the exhibits as a private virtual object, thus preventing other users from being able to see that virtual object.

In some embodiments, virtual content items may be shared between same levels of privacy without need for user's approval. Levels of privacy may refer to which virtual content items may be or is shared with which specific wearable extended reality appliance users. Levels of privacy may be established by dividing the virtual content itself of other users one or more groups with each group being allowed to visualize some or all of the virtual content. The number of levels of privacy may be configured based on the user's preferences. For example, some of the virtual content may be designated as content that may be shared with all other users. This may qualify as a low level of privacy. In another example, a portion of the virtual content may be designated as content that may be shared with users who may be related to a user sharing the virtual content. The relationship may be based on family relationships or professional relationships. For example, a user may designate a portion of or all of a virtual content as content that may be shared only with immediate family members (e.g., spouse, children, or parents) or with users in a particular professional group (e.g., an office team or department). This may qualify as a medium level of privacy. As another example, a user may designate some or all of a virtual content as content that may be viewed only by the user and by no one else. This may qualify as a high level of privacy. Although only three levels of privacy (e.g., low, medium, high) have been discussed in this specification, the present disclosure is not so limiting, and it is contemplated that any number of levels of privacy may be established consistent with embodiments of the present disclosure.

In some embodiments, virtual content items may require user's approval before being shared at a lower level of privacy than the current level of privacy of the visual content item. In some examples, the decision of whether a virtual display screen needs to be shared may be based on the virtual size of the virtual display screen, the orientation of the virtual display screen, the location of the virtual display screen, and factors related to the virtual screen configuration.

In some embodiments, different sharing levels may be applied. Some non-limiting examples of such sharing levels may include private (available only to the user), Shared (available to people the user chooses to share with), public (available to anyone in a particular physical space), or any other combination of public, private, or shared. In one example, a particular physical space may have owners, and only an owner of the particular physical space may share public content in that particular physical space content. For example, a company may share public content within their office, or users may share public content within their house.

In some examples, private content items, including, but not limited to, virtual display screens and widgets, may be shared with other users in a way that do not enable identification of some type of items. For example, items such as text, images, fine details, or any other media that a user may not want to share may not be identified or visible to the other users. By way of example, some or all of the virtual content may appear blurred to some users but may be clearly visible to other users based on how the first wearable extended reality appliance user configures their appliance or level of privacy. Other methods of obscuring the virtual content may be employed. In one example, when a first user comes close to a second user, the first user may see private content of the second user as if being viewed through a milky glass, but without seeing content details. Thus, the second user's contents may be protected from a first user who may not have authority to view private documents.

In some embodiments, it may be communicated to the user that a particular content is going to be shared with others, and the user may be provided time to cancel sharing before the particular content is shared. Additionally, a user may obtain information related to the user's objects being shared with other users, information related to objects of others that are shared with the user, information related to these other users, and/or information related to a level of sharing of different users.

In some embodiments, a user may select a virtual content item, such as a virtual display screen, a document, or other media, to be shared and send it to a physical screen, using a gesture. Such physical screens may include, for example, but are not limited to, TV, tablet, laptop, smartphone, smartboard, board, physical screen designated for content sharing, or any other physical screen. Gestures used by a user to share virtual content may include, for example, a drag, a pinch, a swipe, or any other hand movement. As a result, the virtual content item may be shared, may be presented over the physical screen, or manipulated in any other way as desired by the user. In some examples, the physical screen may serve and/or induce a virtual sharing space, for example with screen borders as area of sharing, and the virtual content item may be presented as a virtual layer and viewed by extended reality appliances.

Figures 11A, 11B:
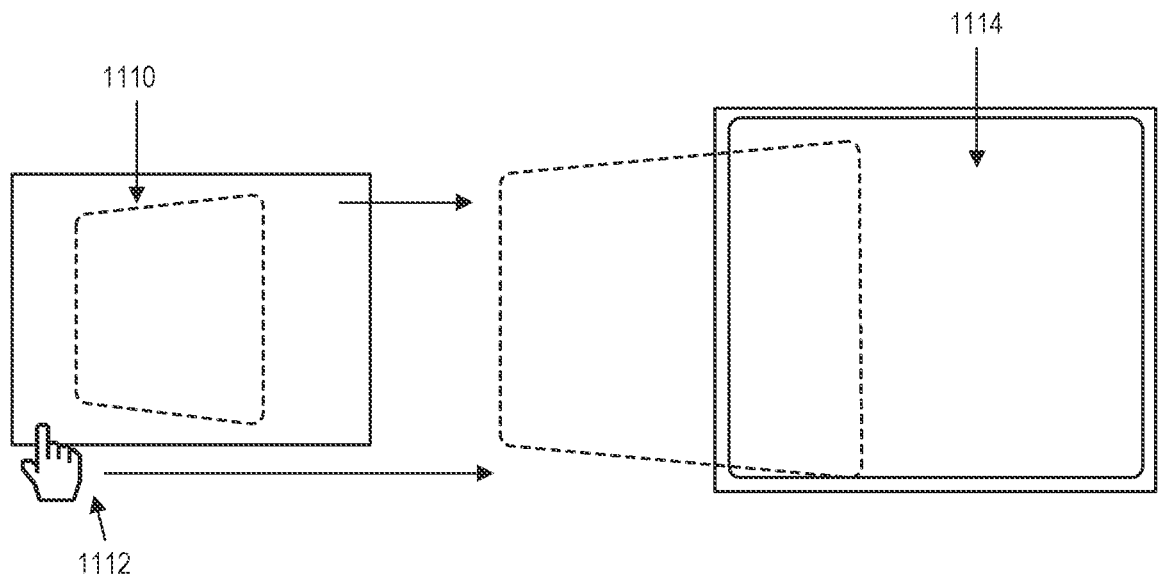
FIGS. 11A and 11B illustrate an exemplary embodiment of a sharing action, illustrating use of a gesture to send content to a physical screen.

By way of example, FIGS. 11A and 11B illustrate sharing public virtual content 1110. This content may be shared to a physical screen 1114, here, a TV, as shown in FIG. 11B, for example by using a gesture 1112, as shown in FIG. 11A. Such a gesture may be a hand wave, finger point, or any bodily movement. In this embodiment, the virtual content shared to a physical screen may be a public virtual content—everyone may see the content, including those who are not wearing extended reality appliances.

In some examples, a user may move her/his own virtual content item, such as a virtual display screen or document, to any of her/his personal physical screens. Such personal screens may include personal physical display screen, a smartphone screen, or tablet screen. The user may move his/her own content item by using a gesture. In response, the virtual content item may move to the physical display screen (i.e., may be presented using the physical display screen) or may be presented virtually over the physical display screen, for example without additional approvals, and with the virtual content item staying in same level of privacy.

When sharing some content, however, additional approval may be required. For example, a user may desire to share private virtual content that has a higher level of privacy, i.e., is confidential, with another user. Such virtual content may be password protected, be accessible to only certain users, or otherwise be made private. In this scenario, the sharing user may be prompted to enter a password, contact a system administrator, or otherwise request permission to share the virtual content.

Figures 12A, 12B:
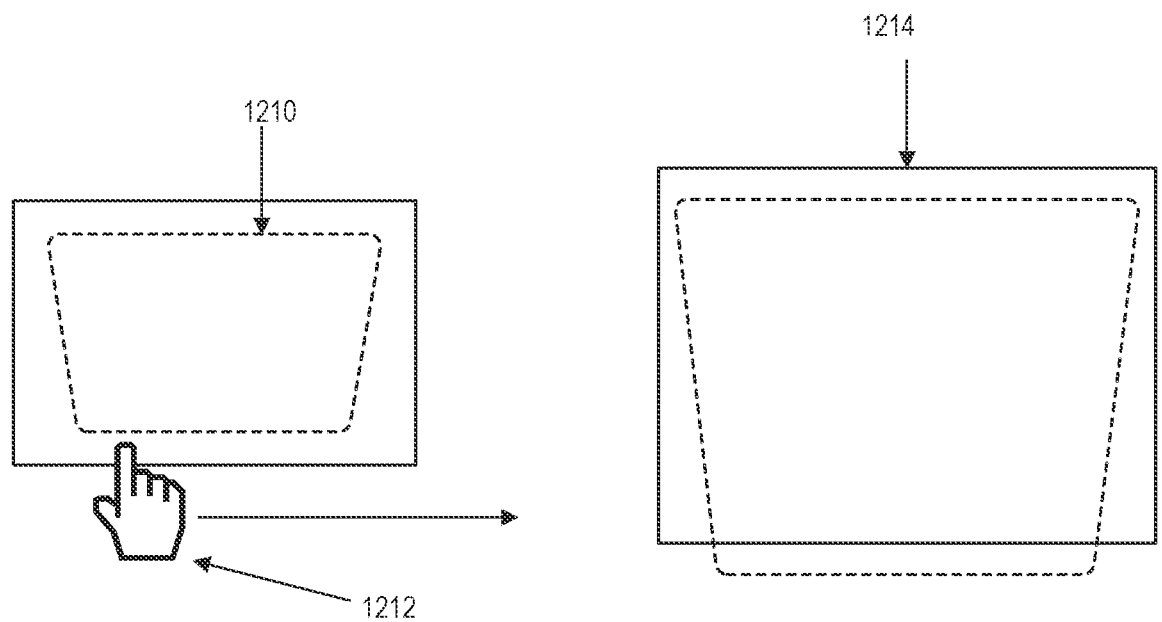
FIGS. 12A and 12B illustrate an exemplary embodiment of a sharing action, illustrating use of a gesture to share virtual content with one or more physical screens.

By way of example, FIGS. 12A and 12B illustrate sharing private virtual content 1210. Here, an extended reality appliance user may share their own virtual content 1210 with their own physical screen 1212 by using a gesture 1214, as shown in FIG. 12B. This content stays in the same level of privacy, i.e., no additional approvals are needed to share the private virtual content. In some examples, a user may initiate sharing of a virtual content with a physical screen. An identification of one or more users exposed to the physical screen may be made (for example, based on location information associated with the users, and/or based on an analysis of an image of a room that includes the physical screen). Based on the identified one or more users, it may be determined whether the virtual content may be shared with the physical screen without additional approval, whether the virtual content may be shared with the physical screen upon additional approval, and/or whether the virtual content may not be shared with the physical screen. In one example, after the virtual content is shared with the physical screen, a (potential or actual) exposer of the physical screen to an additional user may be identified (for example, based on location information associated with the additional user, and/or based on an analysis of an image of a room that includes the physical screen), and in response to the identified exposer of the physical screen to the additional user, the sharing of the virtual content with the physical screen may be stopped, or a prompt may be provided to the user sharing the virtual content. Such prompt may include an indicator of the exposer and/or of the additional user, and/or may be configured to enable the user sharing the virtual content to continue or stop the sharing of the virtual content.

In some embodiments, the privacy settings described above may be configured as part of a user's default settings. In some embodiments, causing the first virtual content to be displayed by the second wearable extended reality appliance may include modifying the first virtual content according to default settings associated with the second wearable extended reality appliance. The default settings may be configured according to the second wearable extended reality appliance user's preference and/or hardware available in the second wearable extended reality appliance and/or environmental conditions associated with the second wearable extended reality appliance. For example, the second wearable extended reality appliance may operate in lower or higher resolution than the first wearable extended reality appliance, and the rendering resolution of the first virtual content may be modified accordingly. In another example, the second wearable extended reality appliance may operate at different ambient light conditions than the first wearable extended reality appliance, and intensity and/or opacity of the rendering of the first virtual content may be modified to compensate for the different ambient light conditions. In yet another example, the second wearable extended reality appliance may enable a different angular field-of-view than the first wearable extended reality appliance, and a size of the first virtual content may be modified to adjust to the different angular field-of-view. In some examples, default settings may refer to how a wearable extended reality appliance is configured for use or how the wearable extended reality appliance is used. In some embodiments, default settings may be configured to hide personal information such as passwords or credit card numbers, or the default settings may involve a user's preferred display parameters, i.e., where content is displayed or how large the content appears. Default settings may be customizable by a user of the wearable extended reality appliance and may include, for example, privacy settings, proximity settings, gesture settings, or any other settings that may determine how the wearable extended reality appliance presents and/or shares virtual content.

In the above embodiments, privacy settings may determine an initial level of privacy associated with any virtual content that may be shared with another user. For example, a default privacy setting may allow virtual content to be shared with all users. As another example, a default privacy setting may prohibit virtual content from being shared with any other user. As another example, a default privacy setting may allow virtual content to be shared with a predefined group of users (e.g., immediate family members of a user, or colleagues in a particular team or department associated with the user).

In the above embodiments, sharing settings may determine how far one user needs to be from another before a sharing bubble is created, how large a predefined sharing ring is and where it is presented, or a default physical object via which virtual content is to be presented. In the above embodiments, gesture settings may determine what default user movement manifests a sharing intent. For example, a wearable extended reality appliance user may configure the gesture settings to automatically share content when the user waves their hand, but not share content when the user nods their head. Such privacy sharing and gesture settings may be adjusted at any time depending on the preference of the user and what the desired use of the wearable extended reality appliance is.

Some disclosed embodiments may involve receiving from the second wearable extended reality appliance second virtual content for display via the first wearable extended reality appliance. Receiving may involve any form of transmission of content. For example, the content may be received through a network-based communication of content, or through a direct communication of content, such as through a Bluetooth, Wi-Fi, NFC, or other direct communication protocol between multiple extended reality appliances or modems associated therewith. In some embodiments, a processor may instruct the first wearable extended reality appliance to receive virtual content from the second wearable extended reality appliance, and to display that virtual content. In some other examples, a processor may receive the virtual content from the second wearable extended reality appliance, and may provide the virtual content to the first wearable extended reality appliance, for example for display of the virtual content. There are many ways in which the first wearable extended reality appliance may receive virtual content from the second wearable extended reality appliance as discussed elsewhere in this specification. For example, the second wearable extended reality appliance may share virtual content with the first wearable extended reality appliance via a sharing bubble or a sharing ring. As another example, the second wearable extended reality appliance may share virtual content with the first wearable extended reality appliance as soon as a link between the two appliances is established.

Some disclosed embodiments may include displaying multiple versions of virtual content. In some embodiments, the first virtual content may include a two-dimensional virtual object, and the second virtual content may include an alternate version of the two-dimensional object. An alternate version of a two-dimensional object may include, for example, a scaled down version of the two-dimensional object, a magnified version of the two-dimensional object, a two-dimensional object having a different location or orientation, a two-dimensional object having a different color, texture, or shading, or a two-dimensional object with some or all of its characteristics or functions having been altered in some manner. An alternate version of a two-dimensional object may be generated based on a viewing user's preference.

For example, a two-dimensional object may be a virtual document and the alternate version of the two-dimensional virtual object may be an annotated or highlighted version of the virtual document. As another example, a two-dimensional object may be a presentation, and an alternate version of the two-dimensional object may have modified colors, graphics, and/or shapes in the presentation. By way of another example, multiple versions of virtual content may be comprised of both public and private virtual objects. For example, a first user of a first wearable extended reality appliance may send a document to a second user, who may share the document with a larger group. However, some of the comments and annotations on the virtual object may remain hidden based on the first or second user's privacy and/or document sharing settings.

In some embodiments, the first virtual content may include a three-dimensional virtual object, and the second virtual content may include a two-dimensional virtual object associated with the three-dimensional object. When one wearable extended reality appliance user shares content with another user, such content may include multiple virtual objects. As described in the above embodiments, these virtual objects may include both two-dimensional objects and three-dimensional objects and may be subject to various privacy settings. A three-dimensional virtual object may be a design model or project mock-up and the two-dimensional virtual object associated with the three-dimensional object may be a list of comments on the model. As with the two-dimensional models, subsequent versions of a three-dimensional virtual object may be configured to have different privacy settings.

For example, a project mock-up, such as a bridge, building, or other scale or architectural model, may be shared as a three-dimensional virtual object with another user. Associated with the project-mock up may be a list of comments, i.e., a two-dimensional virtual object, regarding the size, length, width, a myriad of any other parameters relevant to the project mock-up. In addition to the two-dimensional objects associated with the three-dimensional objects, a user may include three-dimensional virtual objects in the modified version as well. In the project mock-up example for instance, a wearable extended reality appliance user may share a first version of the mock-up and may also share a modified version of the model that may have more components, may be a different size, or have different texture than the first one.

In response to receiving the virtual content from the second wearable extended reality appliance, some disclosed embodiments may include presenting via the first extended reality appliance the second virtual content received from the second wearable extended reality appliance. There are many ways in which virtual content may be shared between wearable extended reality appliance users. Content may be shared via a sharing bubble or a sharing ring. A second wearable extended reality appliance user may share content, via a sharing bubble or sharing ring, with a first wearable extended reality appliance user. In the above embodiments, the first wearable extended reality appliance user may present content received from the second user. This content may be presented in a myriad of ways, for example, through the second user's extended reality appliance, via a screen such as a tablet or TV, or via a physical object such as a whiteboard or chalkboard. In one embodiment, the first user, after receiving virtual content from the second user, may present the content via the first appliance, or via a TV or whiteboard. The first wearable extended reality appliance user may also present content received from a second user to other users who are nearby the first user.

Figure 13A:
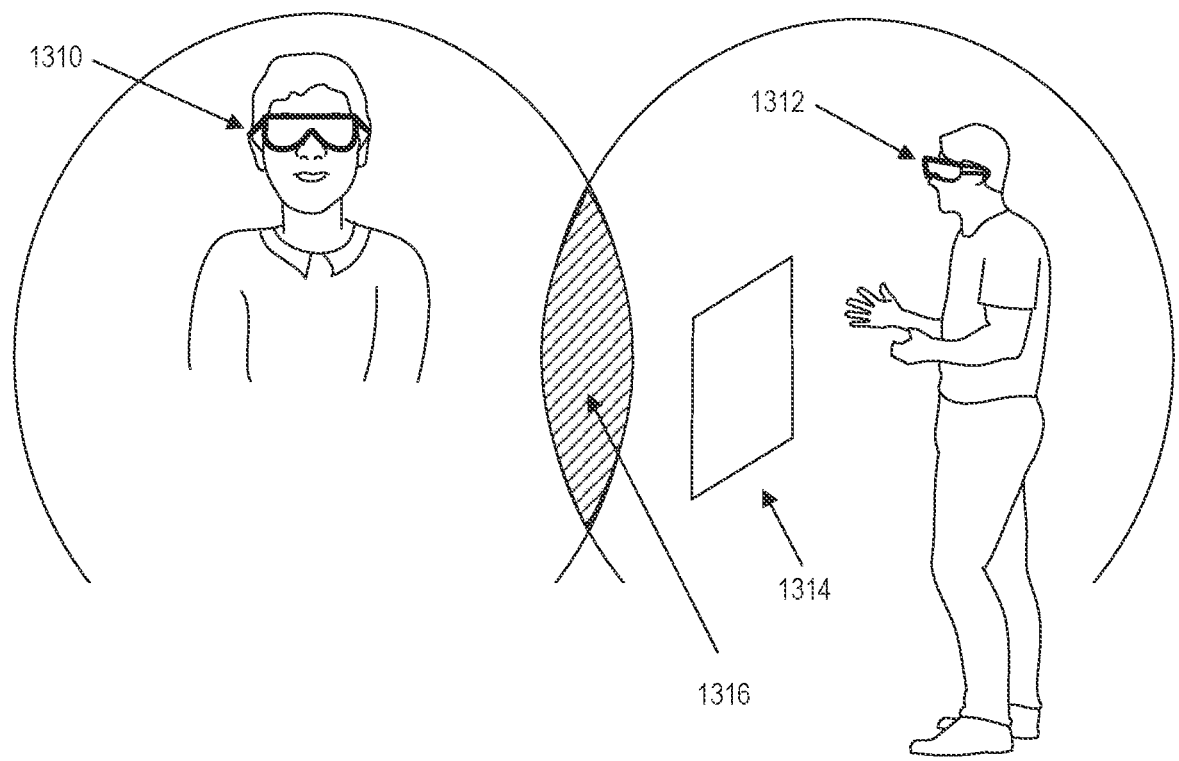
FIGS. 13A and 13B illustrate an exemplary embodiment of sharing content and presenting it via a second wearable extended reality appliance.
Figure 13B:
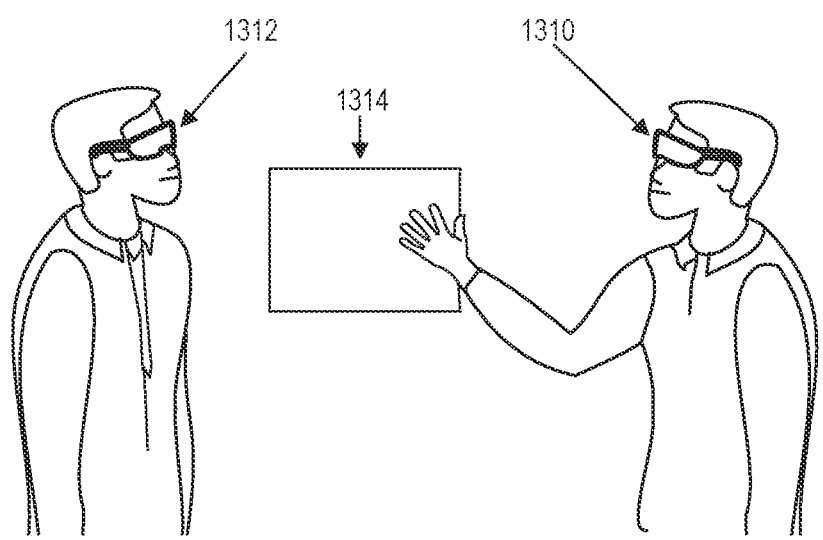

By way of example, FIGS. 13A and 13B illustrate a sharing bubble, wherein the first wearable extended reality appliance 1310 receives second virtual content 1314 from the second wearable extended reality appliance 1312 via sharing region 1316. Such virtual content may also be shared via a sharing ring. FIG. 13B illustrates an example of presenting received content 1314. Here, first wearable extended reality appliance 1310 may present second virtual content 1314 received from the second wearable extended reality appliance 1312. The virtual content may be presented via the wearable extended reality appliance, a screen such as a tablet or TV, or any other physical object.

Figure 14:
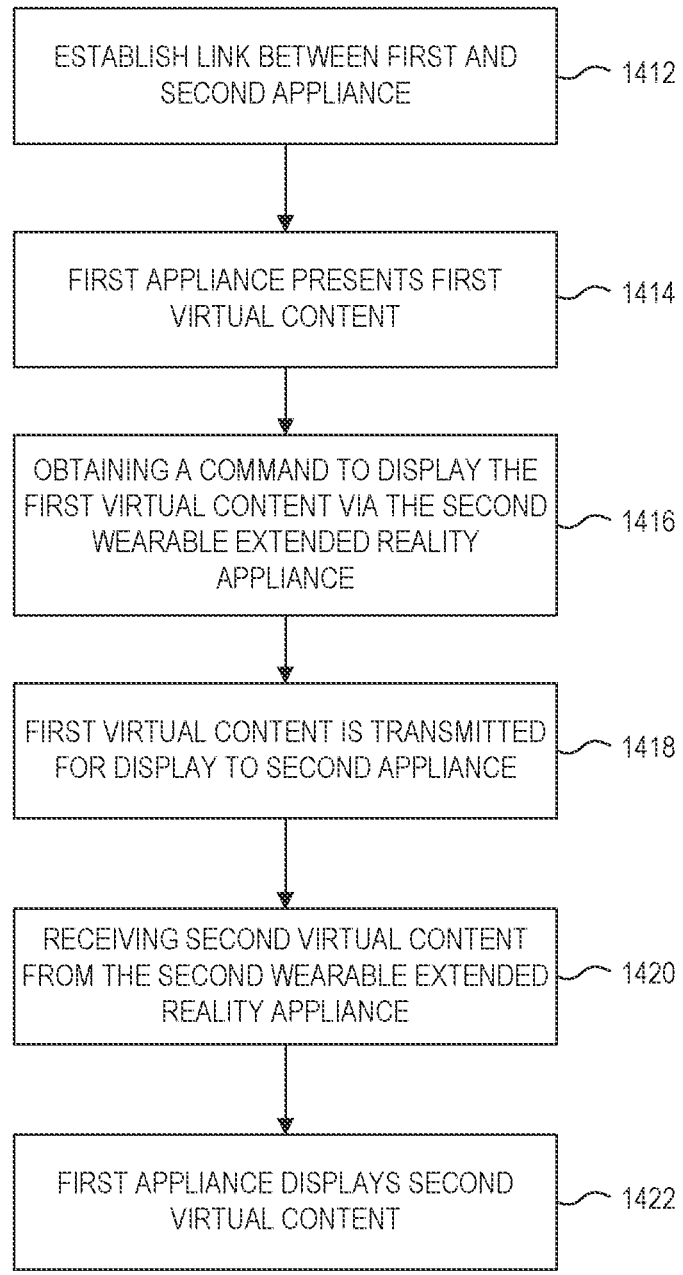
FIG. 14 is a flowchart illustrating an exemplary method of coordinating between the first and second wearable extended reality appliances to display virtual content, consistent with disclosed embodiments.

In another example, FIG. 14 shows a flowchart illustrating an exemplary method 1410 of coordinating between the first and second wearable extended reality appliances to display various virtual content. Method 1410 may contain step 1412, wherein the at least one processor may establish a link between the first and second wearable extended reality appliances, for example for communication between the two appliances or for control of the two appliances. Method 1410 may also contain step 1414, wherein first virtual content may be presented on the first wearable extended reality appliance before, after, or simultaneously with establishing a link with a second wearable extended reality appliance. Method 1410 may also contain step 1416, involving obtaining a command to display the first virtual content via the second wearable extended reality appliance. Method 1410 may also contain step 1418, wherein the first virtual content in some embodiments may be caused to be transmitted for display to the second wearable extended reality appliance. Method 1410 may also contain step 1420, wherein a second virtual content may be received from the second wearable extended reality appliance. Method 1410 may contain step 1422, wherein the first wearable extended reality appliance may display the second virtual content.

Some disclosed embodiments may involve operations for providing situational awareness to users of wearable extended reality appliances. Situational awareness may include one or more of a perception of elements in an environment, a comprehension of a current situation, a projection of future status, or any ability to identify, process, or understand elements of information regarding what is occurring in an environment. For example, situational awareness may include an understanding of one or more of a location, area, point, geography, region, scene, setting, site, surroundings, topography, section, angle, inclination, dimension, amount, breadth, capacity, content, diameter, height, intensity, length, magnitude, proportion, range, volume, width, amplitude, age, date, presence, time, moment, occasion, or any other condition associated with any portion of an environment. In some examples, situational awareness may include an understanding of a state of another person in an environment of a user. For example, the situational awareness may include an understanding of whether the other person is engaged with virtual content (such as virtual displays, virtual avatars, etc.) or not.

Some embodiments may cause virtual content to be displayed through a first wearable extended reality appliance. The term virtual content may include any type of data representation that may be displayed to the user, such as through an extended reality appliance or other presentation device. The virtual content may include a virtual object, inanimate virtual content, animate virtual content configured to change over time or in response to triggers, virtual two-dimensional content, virtual three-dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation). The rendered visual presentation may change to reflect changes to a status object or changes in the viewing angle of the object, for example, in a way that mimics changes in the appearance of physical objects.

Some embodiments may involve detecting a second wearable extended reality appliance in proximity to the first wearable extended reality appliance. Proximity may refer to a closeness, adjacency, concurrence, contiguity, propinquity, close vicinity, or any other state or condition of being near. Proximity may be measured by any of a capacitive effect, inductive effect, magnetic effect, or optical effect. Proximity may also be detected using one or more of, for example, radar, sonar, ultrasonic, fiber optic, or Hall Effect technology, reflection of ionizing radiation, or any other technology that can detect the presence of nearby objects. Proximity may include distance, direction, or a combination of distance and direction. In other examples, locations of the first and second wearable extended reality appliance may be based on positioning data corresponding to the two. In one example, the locations may be determined using indoor or outdoor positioning sensors included in each one of the two wearable extended reality appliances, from localization of the two wearable extended reality appliances in an image (for example, an image captured using an image sensor in the environment of the two wearable extended reality appliances and analyzed using an object detection algorithm to localize the wearable extended reality appliances), and so forth. In other examples, an image captured using an image sensor included in the first wearable extended reality appliance may be analyzed using an object detection algorithm to detect the second wearable extended reality appliance, and a distance between the two wearable extended reality appliances may be determined, for example based on a size of the second wearable extended reality appliance in the captured image, thereby determining whether the second wearable extended reality appliance is in proximity to the first wearable extended reality appliance. In other examples, an image captured using an image sensor included in the second wearable extended reality appliance may be analyzed using an object detection algorithm to detect the first wearable extended reality appliance, and the second wearable extended reality appliance may be considered in proximity to the first wearable extended reality appliance when the first wearable extended reality appliance is detected in the captured image (and therefore is in a line of sight of the second wearable extended reality appliance).

In some embodiments, detecting a second wearable extended reality appliance in proximity to the first wearable extended reality appliance may be continuous. In some embodiments, detecting a second wearable extended reality appliance in proximity to the first wearable extended reality appliance may occur at regular or irregular time intervals. In some embodiments, detecting a second wearable extended reality appliance in proximity to the first wearable extended reality appliance may be triggered by an input. The input may be received from a user, a system, or any other source of information that may trigger a detection of proximity.

In certain embodiments, detecting a second wearable extended reality appliance in proximity to the first wearable extended reality appliance may include detecting that the second wearable extended reality appliance is within a certain distance, width, height, radius, or other measure of separation from the first wearable extended reality appliance. For example, detecting a second wearable extended reality appliance in proximity to the first wearable extended reality appliance may include detecting that the second wearable extended reality appliance is within one foot, two feet, five feet of, or any distance from the first extended reality appliance. The measure of separation used to detect the proximity may be inputted by a user, a system, or may be determined from any other source of information. For example, a user may input a value of five feet to trigger a detection of proximity. In another embodiment, a system may include default settings to trigger a detection of proximity when a distance of five feet is detected between the first wearable extended reality appliance and the second wearable extended reality appliance. In one example, the measure of separation used to detect the proximity may be different for different directions (for example, one measure of separation for horizontal distances, and a smaller measure of separation for vertical distances, or in another example, one measure of separation for an upward distance, and a smaller measure of separation for a downward distance). In some examples, the second wearable extended reality appliance may be considered in proximity to the first wearable extended reality appliance when the two wearable extended reality appliance are in a same defined space (such as a same room, a same apartment, a same office, a same building, and so forth). In some examples, the second wearable extended reality appliance may be considered in proximity to the first wearable extended reality appliance when the first wearable extended reality appliance is in a line of sight of the second wearable extended reality appliance.

In some embodiments, a detection of proximity may be based on any reference point of each of the first wearable extended reality appliance and the second wearable extended reality appliance. For example, proximity may be detected based on a distance from any physical position of a wearable extended reality appliance. Alternatively, proximity may be detected based on a distance from a virtual position of a virtual object presented through a wearable extended reality appliance. In another example, proximity may be detected based on a distance from a reference point within a certain range of a wearable extended reality appliance.

Some embodiments may involve establishing a link between the first wearable extended reality appliance and the second wearable extended reality appliance. A link may include one or more of a physical or non-physical attachment, or any other mode of connection. In some embodiments, a link may be established using physical attachment including, for example, a wire, cable, or any other type of attachment means that requires a tangible connection between the first wearable extended reality appliance and the second wearable extended reality appliance. In some embodiments, a link may be established using non-physical means, and may include wireless communication such as Bluetooth, ZigBee, Wi-Fi, or any other technology that implements the transfer of information between two or more points without the use of an electric conductor as a medium by which to perform the transfer.

Furthermore, the link may be a direct or indirect link between the first wearable extended reality appliance and the second extended reality appliance. A direct link between the first wearable extended reality appliance and the second wearable extended reality appliance may be an unobstructed connection between the first wearable extended reality appliance and the second wearable extended reality appliance. Alternatively, an indirect link between the first wearable extended reality appliance and the second wearable extended reality appliance may be an obstructed connection between the first wearable extended reality appliance and the second wearable extended reality appliance. This type of link may include a connection that connects systems that are connected to one or both of the first wearable extended reality appliance and the second wearable extended reality appliance. Such systems may include, for example, a laptop, smartphone, or any other type of non-wearable device that may be connected to a wearable extended reality appliance. In one example, the link between the first wearable extended reality appliance and the second wearable extended reality appliance may include a direct and/or in-direct communication link between the two extended reality appliances. In another example, a system (such as a centralized system) may be in communication with each one of the first and the second wearable extended reality appliances, for example to provide each one of the two wearable extended reality appliances content for presentation, to receive location and/or orientation information associated with the wearable extended reality appliances, and so forth. The link between the first wearable extended reality appliance and the second wearable extended reality appliance may include a linkage in a data-structure or a database of the system or maintained by the system. In some examples, establishing a link between the first wearable extended reality appliance and the second wearable extended reality appliance may refer to linkage in a data-structure and/or a database, for example in system coordinating an extended reality environment, in a system that communicates with both the first and the second wearable extended reality appliances, in a system that provides content for presentation for both the first and the second wearable extended reality appliance, and so forth.

Some embodiments may involve transmitting data representing at least a portion of the virtual content in an obscured form to the second wearable extended reality appliance, wherein the obscured form provides an indication of a position of the at least a portion of the virtual content in a three-dimensional space without revealing substance of the virtual content in obscured form. In one example, the data may be transmitted from the first wearable extended reality appliance to the second, for example through a direct or an indirect communication link. In this example, the first wearable extended reality appliance may process at least part of the virtual content to generate the obscured form, for example as described below. In another example, the data may be transmitted from a computerized system (for example, a system coordinating an extended reality environment, a system that communicates with both the first and the second wearable extended reality appliances, a system that provides content for presentation for both the first and the second wearable extended reality appliance, and so forth) to the second wearable extended reality appliance. In this example, the computerized system may process at least part of the virtual content to generate the obscured form, for example as described below. An obscured form may include a presentation of any portion of the virtual content in a manner that obfuscates that portion of the virtual content. In certain embodiments, an obscured form that provides an indication of a position of the at least a portion of the virtual content in a three-dimensional space without revealing substance of the virtual content may include a presentation of the at least a portion of the virtual content through masking, redaction, omission, pixilation, blurring, or any other means that at least partially conceals any portion of the virtual content. In some examples, an obscured form may provide a visual indication of a position of the at least a portion of the virtual content in a three-dimensional space and/or a visual indication of a type of the at least a portion of the virtual content without revealing at least one detail of the at least a portion of the virtual content. For example, the obscured form may provide a visual indication that the at least a portion of the virtual content includes a textual content, without revealing the exact words and/or the exact letters of the textual content. In another example, the obscured form may provide a visual indication that the at least a portion of the virtual content includes a graphical content, without revealing the exact images and/or the exact graphics of the graphical content.

Figure 15:
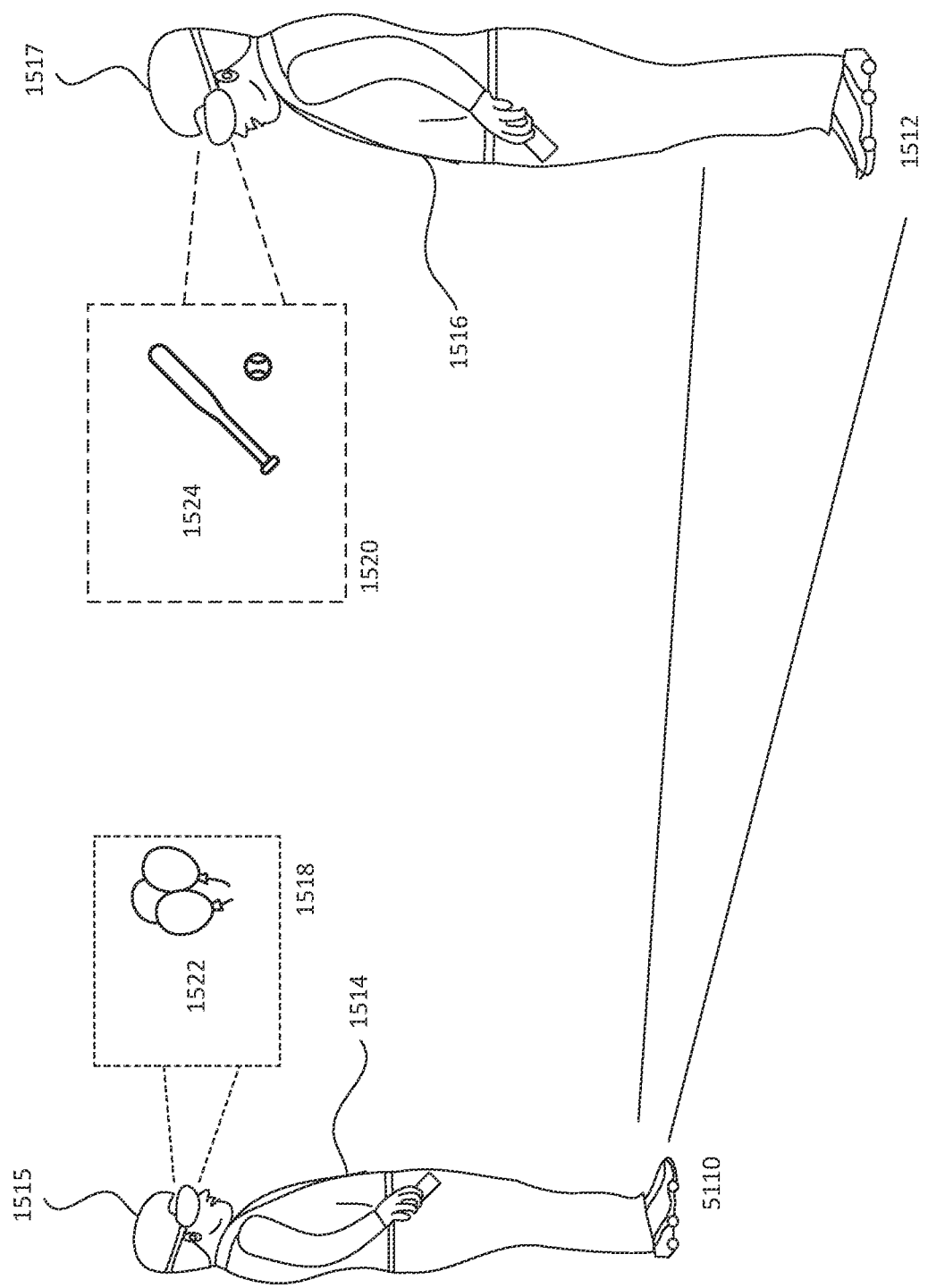
FIG. 15 is an illustration of an exemplary environment including a plurality of users, using a plurality of wearable extended reality appliances, consistent with some embodiments of the present disclosure.
Figure 16:
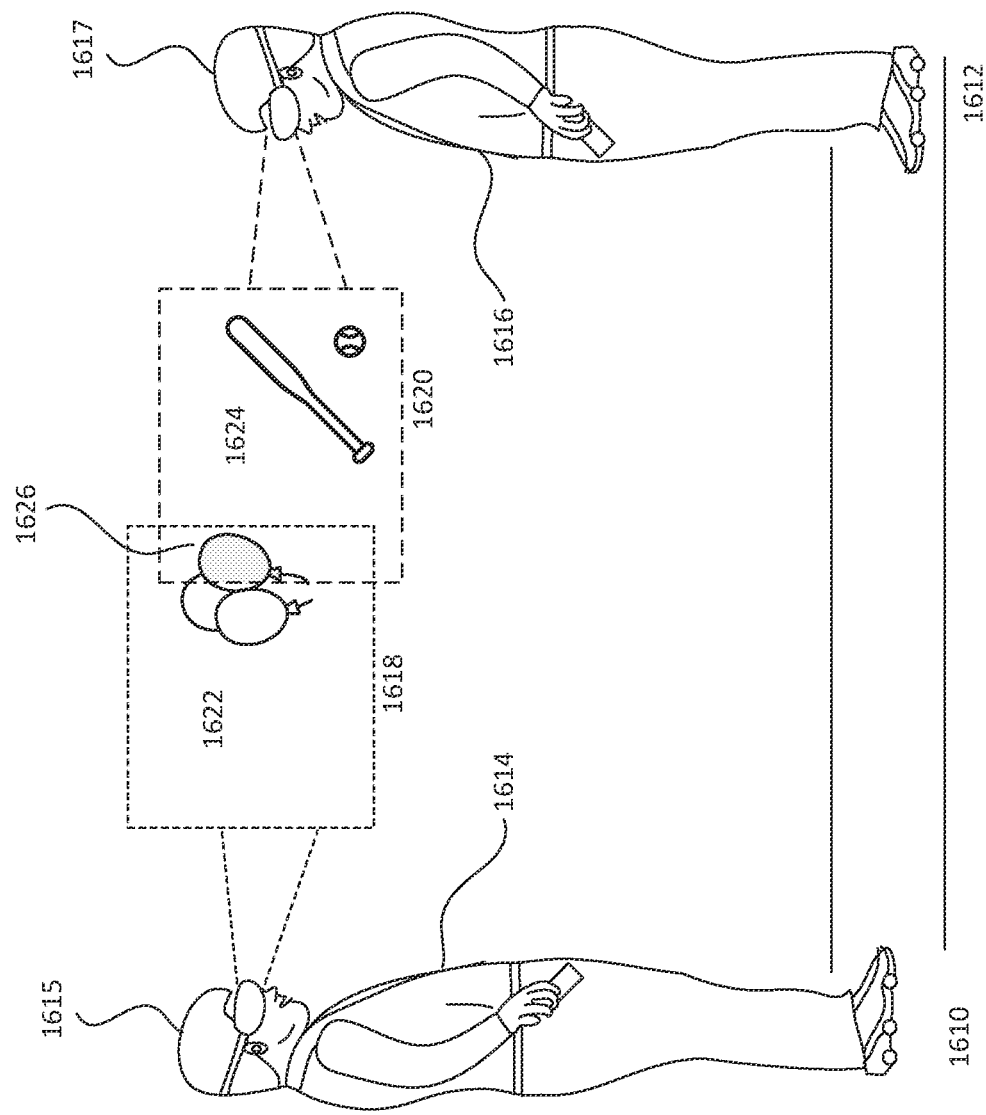
FIG. 16 is an illustration of exemplary virtual displays including a portion of the virtual displays provided in an obscured form, consistent with some embodiments of the present disclosure.

The functioning of the at least one processor as prescribed by the instructions is exemplified in FIGS. 15 and 16. For example, FIG. 15 is an illustration of an exemplary environment including a plurality of users, using a plurality of wearable extended reality appliances, consistent with some embodiments of the present disclosure. As illustrated in FIG. 15, a first user 1514 of a first wearable extended reality appliance 1515 may be located at a first position 1510. Second user 1516 of a second wearable extended reality appliance 1517 may be located at a second position 1512 that is not in proximity of first position 1510 of first user 1514 (for example, in a distance longer than a selected threshold, not in the same defined space, not in the same room, not in the line of sight, and so forth). The first user 1514 may be presented with first content 1522 in a first virtual display 1518, while the second user 1516 may be presented with second content 1524 in a second virtual display 1520. Since the first wearable extended reality appliance 1515 is not in proximity to the second wearable extended reality appliance 1517, none of the first virtual content 1522 may be transmitted to the second user 1516.

FIG. 16 is an illustration of exemplary virtual displays including a portion of the virtual displays provided in an obscured form, consistent with some embodiments of the present disclosure. As illustrated in FIG. 16, a first user 1614 of a first wearable extended reality appliance 1615 may be located at a first position 1610. Second user 1616 of a second wearable extended reality appliance 1617 may be located at a second position 1612 that is in proximity of a first position 1610 of first user 1614 (for example, in a distance shorter than a selected threshold, in a same defined space, in a same room, in a line of sight of wearable extended reality appliance 1615, and so forth). In this example, the first user 1614 may be presented with first content 1622 in a first virtual display 1618, while the second user 1616 may be presented with second content 1624 in a second virtual display 1620. Here, because the second wearable extended reality appliance 1617 is in proximity to the first wearable extended reality appliance 1615, a portion 1626 of the first virtual content 1622 may be transmitted to the second wearable extended reality appliance 1617. Moreover, the portion 1626 of the first virtual content 1622 may be shown in an obscured form to the second wearable extended reality appliance 1617 by being blurred, so that the blurred image provides an indication of a position of portion 1626 of the first virtual content 1622 in a three-dimensional space without revealing a substance of the virtual content 1622.

In some embodiments, the virtual content displayed through the first wearable extended reality appliance may include content of differing types, and the operations further include presenting via the second wearable extended reality appliance, a type associated with the obscured information, without revealing substance of the content. Content of differing types may include content that varies with regard to format, presentation, shape, size, color, or any other aspect. In some embodiments, differing types of content may include, for example, word processing content, gaming content, spreadsheet content, database content, graphics content, or web browser content. As one example of a presentation consistent with such embodiments, the virtual content displayed through the first wearable extended reality appliance may include content of a web browser type. Accordingly, when data representing at least a portion of the virtual content is transmitted in an obscured form to the second wearable extended reality device, a web browser type that is associated with the obscured form is presented via the second display.

Figure 17:
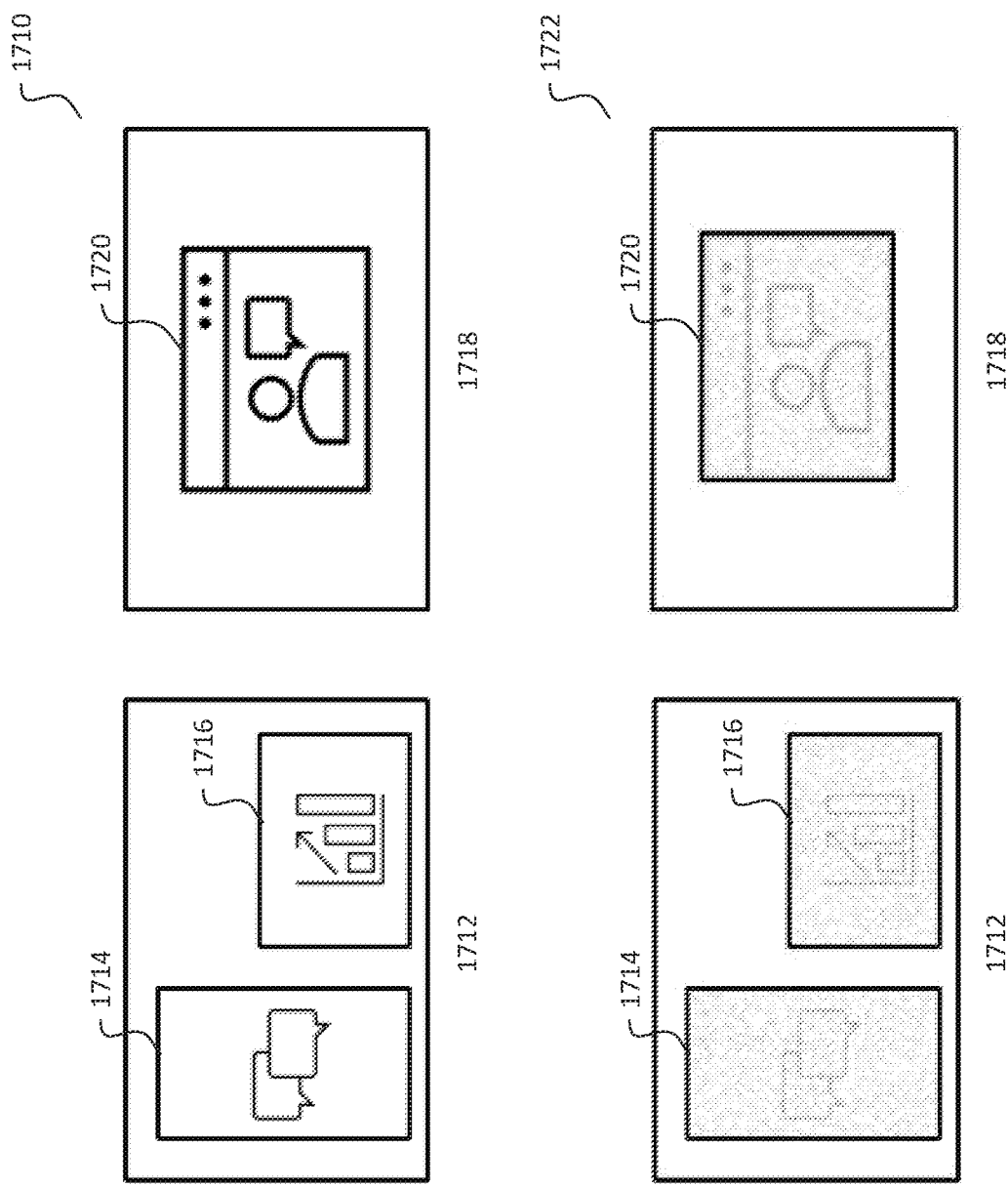
FIG. 17 is another exemplary illustration of a virtual display provided in an obscured form, consistent with some embodiments of the present disclosure.

In some embodiments, the virtual content displayed through the first wearable extended reality appliance may include a plurality of virtual screens, and the virtual content presented in obscured form via the second wearable extended reality appliance may further provide an indication of sizes and orientations of the plurality of virtual screens without revealing substance of content associated with the plurality of virtual screens. A virtual screen (also referred to as virtual display herein) may include any bounded shape or presentation area including virtual content, such as a rectangular window containing a plurality of virtual objects. A plurality of virtual screens may include two or more bounded shapes or presentation areas, with each including virtual content. The plurality of virtual screens may have different sizes, orientations, display settings, and other visual features. One or more of these visual features may be obfuscated when the plurality of virtual screens is presented to the second wearable extended reality appliance. For example, the virtual content displayed through the first wearable extended reality appliance may include one virtual screen that is square in shape and another virtual screen that is rectangular in shape. In such an embodiment, when the obscured form is presented via the second wearable extended reality appliance, the square shape and the rectangular shape of the corresponding virtual screens may be displayed to the user of the second wearable extended reality appliance, but the content of the square and rectangular shapes may be obscured. FIG. 17 is an example illustration of a virtual display provided in an obscured form, consistent with some embodiments of the present disclosure. For example, as illustrated in FIG. 17, the virtual content displayed through the first wearable extended reality appliance 1710 may include one virtual screen 1712 comprising two smaller windows 1714 and 1716 and another virtual screen 1718 comprising one large window 1720. When the virtual content is displayed through the second wearable extended reality appliance 1722, only the size of the two smaller windows 1714 and 1716 in the first virtual screen 1712 and the larger window 1720 in the second virtual screen 1718 may be displayed to the user of the second wearable extended reality appliance. In this exemplary embodiment, the indication of the size without revealing substance of content associated with the plurality of virtual screens may be achieved through blurring, but blacking out, pixilation, or any other method of concealing the content is contemplated for use with other embodiments.

In some embodiments, the virtual content displayed through the first wearable extended reality appliance may include a user interface presenting a conversation with one or more participants, and the obscured form may further include a representation of the conversation without revealing identities of the one or more participants. The user interface may include a graphical or textual display of communication exchanged by two or more users. The display may be generated by one or more applications that allow users to exchange textual or graphic communications. Such applications may include iMessage, Google Chat, SMS, Facebook Chat, Messenger, Slack, Teams, WhatsApp, Telegram, Signal, Zoom, or any other application used for composing and sending electronic messages, typically consisting of alphabetic and numeric characters, between two or more users of mobile devices, desktops, laptops, or another type of compatible computer. The user interface may be presented to another user if a second wearable extended reality appliance is in proximity to a first wearable extended reality appliance. For example, the user interface may include a chatting window comprising a plurality of participants. In such an embodiment, the obscured form may present an indication of a chatting window, such as through chatting bubbles, but conceal the names of the participants. Other indications of a participant's identity may also be concealed, such as a photograph, picture, avatar, association, organization, location, position, role in an organization, or any other information that may be tied to an individual's identity. An individual's identity may include their name, phone number, email, user ID, address, location, face, picture, video, or any other identifying information.

In some embodiments, the virtual content displayed through the first wearable extended reality appliance may include a virtual three-dimensional object, and the obscured form may further provide an indication of a shape of the virtual three-dimensional object without revealing other details of the three-dimensional object. A virtual three-dimensional object may include a virtual three-dimensional representation of a physical person, or an animate or inanimate object. A shape of a three-dimensional object may include the architecture, body, configuration, contour, format, frame, outline, silhouette, dimensions, color, texture, identifying features such as projections and recesses, or any other characteristic of the object that describes its form. For example, the virtual content displayed through the first wearable extended reality appliance may include a three-dimensional rendering of a person. In such an embodiment, the obscured form may provide a silhouette of the person without revealing other details of the person, such as their face, what they are wearing, and any other attributes of the person that extend beyond merely their shape.

In some embodiments, the operations may further include receiving a request from the second wearable extended reality appliance to share the virtual content, and upon receiving confirmation from the first wearable extended reality appliance, transmitting second data representing the at least a portion of the virtual content in an unobscured form to the second wearable extended reality appliance. A request from the second wearable extended reality appliance may be generated either automatically or through user input. An automatic request from the second wearable extended reality appliance may include a request that is triggered to be sent based on a distance between the first wearable extended reality appliance and the second wearable extended reality appliance, a location of the first wearable extended reality appliance or the second wearable extended reality appliance, an identity of a user of the first wearable extended reality appliance or the second wearable extended reality appliance, a specified time, or any other parameter that may be used to trigger a request from the second wearable extended reality appliance. A request from the second wearable extended reality appliance may also be sent through a user input. A user input request may be generated when a user of the second wearable extended reality appliance interacts with the second wearable extended reality device or any other device connected to the second wearable extended reality device. In some examples, a user input request may be generated when a user of the second wearable extended reality appliance interacts with any portion of the virtual display of the second wearable extended reality appliance. Such an interaction may be achieved through a trigger, a touch-screen interface, a mouse, or any other type of interactive element. In some embodiments, the automatic request from the second wearable extended reality appliance may be generated through a combination of an automatic input and a user-generated input. For example, a request from the second wearable extended reality appliance to share the virtual content may be generated when the first wearable extended reality appliance is within five feet of the second wearable extended reality appliance and a user of the second wearable extended reality appliance presses a button to generate the request. Confirmation from the first wearable extended reality appliance may be generated through an input from a user of the first wearable extended reality appliance. The user may generate the input through interaction with an object connected to the first wearable extended reality appliance, such as a trigger, a touch-screen interface, a mouse, or any other type of interactive element.

In another example, the first wearable extended reality appliance or a processing unit associated with the first wearable extended reality appliance may access a datastructure including access permissions to determine whether a confirmation should be provided, and may automatically provide the confirmation in response to a determination that a confirmation should be provided.

In some embodiments, the operations may further include providing to the first wearable extended reality appliance an indication that the at least a portion of the virtual content is displayed in an obscured form via the second wearable extended reality appliance. This indication may be presented to a user of the first wearable extended reality appliance through an output that is either audio, visual, or haptic in nature. Further, any combination of an audible, visual, or haptic output may also be used to present the indication to the first wearable extended reality appliance. The indication presented to the user may include an indication of at least one of the second wearable extended reality appliance, a user of the second wearable extended reality appliance, the portion of the virtual content, the obscuring technique, the obscured form, or a time period of the presentation of the obscured form. An audio indication that the at least a portion of the virtual content is displayed in an obscured form via the second extended reality appliance may include a beep, tone, alarm, voice indication, or any other type of sound. A visual indication that the at least a portion of the virtual content is displayed in an obscured form via the second extended reality appliance may include a picture, image, cartoon, description, sentence, drawing, figure, icon, photograph, or any other viewable output. A haptic indication that the at least a portion of the virtual content is displayed in an obscured form via the second extended reality appliance may include a buzz, vibration, or any other sign to a user of the first extended reality appliance that relates to the sense of touch. In other examples, the indication that the at least a portion of the virtual content is displayed in the obscured form via the second wearable extended reality may be provided to the first wearable extended reality appliance in a digital signal, for example in a digital signal transmitted to the first wearable extended reality appliance. The digital signal may include an indication of at least one of the second wearable extended reality appliance, a user of the second wearable extended reality appliance, the portion of the virtual content, the obscuring technique, the obscured form, or a time period of the presentation of the obscured form.

Some embodiments, may involve determining an intent of a first user of the first wearable extended reality appliance to share the at least a portion of the virtual content with a second user of the second wearable extended reality appliance, and transmitting second data representing the at least a portion of the virtual content in an unobscured form to the second wearable extended reality appliance. An intent of a first user of the first wearable extended reality appliance to share the at least a portion of the virtual content with a second user of the second wearable extended reality appliance may be determined based on any input by the first user. Such an input may include interaction with objects such as a trigger, a touch-screen interface, a mouse, or any other type of interactive element. For example, when a first user of the first wearable extended reality appliance presses a button on the first wearable extended reality appliance, an intent of the first user of the first wearable extended reality appliance to share the at least a portion of the virtual content with a second user of the second wearable extended reality appliance is determined. In another example, such input may include a gesture of the first user. An unobscured form of the at least a portion of the virtual content may include a presentation of the at least a portion in a manner that is not concealed. For example, an obscured form of the at least one portion may include an image with a blur filter applied such that the shape of the image is readily identifiable, while its substance is not. In such an embodiment, an unobscured form of the image may include an image with the blur filter removed, such that the substance of the image also becomes identifiable.

In some embodiments, the intent to share the at least a portion of the virtual content with the second user of the second wearable extended reality appliance is determined from image data captured by the first wearable extended reality appliance. Image data may include pixel data, time, date, location, identity of a subject, role of a subject, or any other information that may be associated with a given image. For example, the first wearable extended reality appliance may capture image data indicative of a person A. The at least one processor may be configured to determine an intent to share the at least a portion of the virtual content with the second user of the second wearable extended reality appliance based on the information included in the image data. For example, the at least one processor may determine the intent to share the at least a portion of the virtual content with the second user of the second wearable extended reality appliance when the image data indicates person A, or based on a time, date, or location associated with the image. In other examples, the image data may be analyzed using a gesture recognition algorithm to identify a gesture indicative of the intent of the first user to share the at least a portion of the virtual content with the second user.

In some embodiments, the intent to share the at least a portion of the virtual content with the second user of the second wearable extended reality appliance may be determined from not receiving an indication from the user of the first wearable extended reality appliance to keep the at least a portion of the virtual content in an obscured form. In some embodiments, the at least one processor may not receive any input from a user of the first wearable extended reality appliance regarding obscuring a portion of the virtual content. The at least one processor may be configured to determine the intent to share based on a lack of input from the user. In some embodiments, the at least one processor may not receive any input from a user of the first wearable extended reality appliance regarding obscuring a portion of the virtual content within a given period of time. The at least one processor may be configured to determine the intent to share based on a lack of input from the user during a given period of time. For example, the given period of time set by the first wearable extended reality system may be five minutes from any triggering event. The at least one processor my determine the intent to share the at least a portion of the virtual content with the second user of the second wearable extended reality appliance when it does not receive an indication from the user of the first wearable extended reality appliance to keep the at least a portion of the virtual content in an obscured form within five minutes. A triggering event may be one or more of a user input or a determination made by the first wearable extended reality appliance.

In some embodiments, the virtual content displayed through the first wearable extended reality appliance may include a first portion classified as private and a second portion classified as public, and the operations may further exclude the first portion from transmission to the second wearable extended reality appliance and transmit the second portion in an obscured form to the second wearable extended reality appliance. The classification of private or public content may be based on user input or other criteria, such as the content itself. For example, content may be marked by a user as confidential or private, or content may be automatically designated as private if it includes any identifying information. Information classified as private may include a name, identity, email address, location, or any other information intended for or restricted to the use of a particular person, group, or class. Information classified as public may include a message, picture, news article, or any other information intended to be exposed to general view. For example, the virtual content displayed through the first wearable extended reality appliance may include a chat window consisting of a first portion comprising an identity of a participant, which may be classified as private. A second portion of the chat window may include a chat bubble, which may be classified as public. The at least one processor may be configured to prohibit transmission of the first portion comprising the identity of the participant to the second wearable extended reality appliance. The processor may, however, transmit the second portion of the chat window comprising the chat bubble in an obscured form to the second wearable extended reality appliance. As another example, the virtual content displayed through the first wearable extended reality appliance may include a shopping application window consisting of a first portion comprising the user's credit card details, which may be classified as private. A second portion of the shopping application window may include a list of items available for purchase, which may be classified as public. The at least one processor may be configured to prohibit transmission of the first portion comprising the user's credit card details to the second wearable extended reality appliance. The processor may, however, transmit the second portion comprising the list of items available for purchase in an obscured form to the second wearable extended reality appliance.

In some embodiments, the virtual content displayed through the first wearable extended reality appliance may include a first portion classified as private and a second portion classified as public, and the operations may further include transmitting the first portion in an obscured form and transmitting the second portion in a non-obscured form. As discussed above, some portions of a virtual content may be designated as being confidential or private while other portions may be designated as being public. Information classified as public may include a message, picture, news article, or any other information intended to be exposed to general view. The portions classified as private may be transmitted in an obscured form, while the portions classified as public may be transmitted in an unobscured form. For example, the virtual content displayed through the first wearable extended reality appliance may include a chat window consisting of a first portion comprising an identity of a participant classified as private and a second portion comprising a chat bubble classified as public. In such an embodiment, the first portion comprising the identity of the participant is transmitted to the second wearable extended reality appliance in an obscured form, while the second portion comprising the chat bubble is transmitted in a non-obscured form to the second wearable extended reality appliance. In such an embodiment, the first portion comprising the identity of the participant may be presented as a blurred image, while the second portion comprising the chat bubble may be presented without any blur. As another example, the virtual content displayed through the first wearable extended reality appliance may include a shopping application window consisting of a first portion comprising the user's credit card details, which may be classified as private. A second portion of the shopping application window may include a list of items available for purchase, which may be classified as public. In such an embodiment, the first portion comprising the user's credit card details is transmitted to the second wearable extended reality appliance in an obscured form, while the second portion comprising the list of items available for purchase is transmitted in a non-obscured form to the second wearable extended reality appliance. In such an embodiment, the first portion comprising the user's credit card details may be presented as a blurred image, while the second portion comprising the list of items available for purchase may be presented without any blur.

In some embodiments, the operations may further include receiving indication via the first wearable extended reality appliance that the first portion is classified as private. An indication that the first portion is classified as private may be received via the first wearable extended reality appliance through a user interaction with any portion of the first wearable extended reality appliance or with any device connected to the first wearable extended reality appliance, such as a trigger, a touch-screen interface, a mouse, or any other type of interactive element. Thus, for example, a user may provide one or more inputs indicating a portion of virtual content and identifying that portion as being private, using the first wearable extended reality appliance or any device connected to the first wearable extended reality appliance. For example, a user may select portions of a document by highlighting them with a cursor to mark those portions as private. As another example, a user may select portions of an image by highlighting them with a cursor to mark those portions as private.

In some embodiments, the operations may further include automatically determining that the first portion is classified as private. An automatic determination that the first portion is classified as private may be based on a determination by the first wearable extended reality appliance that is independent of any user input, or may be determined by another computing device. In such embodiments, the automatic determination may be based on one or more characteristics of the virtual content, including, for example, an identity of the user, a role of the user, a location of the first wearable extended reality appliance, a present time or date, or any other information associated with a virtual content. In some embodiments, the at least one processor may employ one or more rules that determines whether some or all portions of virtual content should be designated as private based on the one or more characteristics of the virtual content independent of an active user input. In such embodiments, the rules may be stored in a database or may be created by a user. Alternatively, or in addition, a machine learning model (such as a classification model, a visual classification model, etc.) may be trained using training examples to determine whether contents are public or private. An example of such training example may include a sample content, together with a label indicating whether the sample content is public or private. The trained machine learning model may be used to determine which portions are confidential and which portions are public. In another example, the first wearable extended reality appliance may be configured to determine the location of the appliance. In such an embodiment, the at least one processor may be configured to classify the first portion of a virtual content as private whenever the first wearable extended reality appliance is in a given location or within a predetermined distance of the given location.

Some embodiments, the operations may further include identifying at least a first individual with permission to view the first portion and at least a second individual without permission to view the first portion, and the operations may additionally include enabling display of the first portion to the at least a first individual while preventing display of the first portion to the at least a second individual. A first individual with permission to view the first portion may be identified either based on user input or automatically. In some embodiments, a user of the first wearable extended reality appliance may interact with the first wearable extended reality appliance or any connected devices in order to identify that an individual has permission to view the first portion. The user may interact with the first wearable extended reality appliance or any connected devices using a trigger, a touch-screen interface, a mouse, or any other type of interactive element in order to identify an individual as having permission to view the first portion. In some embodiments, the first wearable extended reality appliance or a different computing device may automatically identify that an individual has permission to view the first portion, based on one or more of the identity of the individual, the role of the individual, the location of the first wearable extended reality appliance, the location of the second wearable extended reality appliance, the present time or date, or any other information that may be used to classify a permission status of an individual independent of an active user input. In some embodiments, the at least one processor may employ one or more rules to identify that an individual has permission to view the first portion based on the information that may be used to classify a permission status independent of an active user input. In such embodiments, the rules may be stored in a database or could be created by a user. Alternatively, or in addition, a machine learning model (such as a classification model, a visual classification model, etc.) could be trained using training examples to determine whether particular individuals have permissions to view different contents. An example of such training example may include a sample content and data associated with a sample individual, together with a label indicating whether or not the sample individual has permission to view the sample content. The trained machine learning model may be used to determine which individuals have permission to view the first portion. A second individual without permission to view the first portion may similarly be identified either based on user input or automatically. In some embodiments, a user of the first wearable extended reality appliance may interact with the first wearable extended reality appliance or any connected devices in order to identify that an individual does not have permission to view the first portion. The user may interact with the first wearable extended reality appliance or any connected devices using a trigger, a touch-screen interface, a mouse, or any other type of interactive element in order to identify an individual as not having permission to view the first portion. In some embodiments, the first wearable extended reality appliance or a different computing device may automatically identify that an individual does not have permission to view the first portion, based on one or more of the identity of the individual, the role of the individual, the location of the first wearable extended reality appliance, the location of the second wearable extended reality appliance, the present time or date, or any other information that can be used to classify a permission status of an individual independent of an active user input. Additionally, enabling display may include enabling a fully obscured display, a fully unobscured display, a partially obscured display, or a partially unobscured display. For example, a first individual may be identified to have permission to view the first portion of a document, while a second individual may be identified to not have permission to view the first portion. Some disclosed embodiments may allow the first individual to see the portion of the document clearly, while blacking out, blurring, or in some other way while preventing display of the portion of the document to the second individual.

Some embodiments may involve detecting that a third wearable extended reality appliance is in proximity to the first wearable extended reality appliance; establishing an additional link between the first wearable extended reality appliance and the third wearable extended reality appliance; and transmitting data representing a specific portion of the virtual content in an unobscured form to the third wearable extended reality appliance, while the specific portion of the virtual content is displayed in an obscured form to the second wearable extended reality appliance. Detecting a proximity between the first wearable extended reality appliance and the third wearable extended reality appliance may be achieved via systems, devices, and methods similar to those discussed above for detecting the proximity between the first wearable extended reality appliance and the second wearable extended reality appliance. Establishing an additional link between the first wearable extended reality appliance and the third wearable extended reality appliance may be achieved via systems, devices, and methods similar to those discussed above for establishing a link between the first wearable extended reality appliance and the second extended reality appliance. For example, a link may be established between the first wearable extended reality appliance and the third wearable extended reality appliance through Bluetooth, and a link may be established between the first wearable extended reality appliance and the second wearable extended reality appliance also through Bluetooth. In another example, the link between the first wearable extended reality appliance and the second wearable extended reality appliance may include a linkage in a data-structure or a database, for example in a system coordinating an extended reality environment, in a system that communicates with both the first and the second wearable extended reality appliances, in a system that provides content for presentation for both the first and the second wearable extended reality appliance, and so forth. By way of another example, a link may be established between the first wearable extended reality appliance and the third wearable extended reality appliance in a different way than a link established between the first wearable extended reality appliance and the second wearable extended reality appliance. For example, a link may be established between the first wearable extended reality appliance and the third wearable extended reality appliance through Bluetooth, while a link may be established between the first wearable extended reality appliance and the second wearable extended reality appliance through Wi-Fi or in a data-structure.

In some embodiments, the operations may further include accessing second user permission data associated with a second user of the second wearable extended reality appliance and third user permission data associated with the third wearable extended reality appliance; and based on the second user permission data and the third user permission data, selectively sharing content with the second wearable extended reality appliance and with the third wearable extended reality appliance, wherein the content shared with the second wearable extended reality appliance differs from content shared with the third wearable extended reality appliance. The second user permission data associated with the second user of the second wearable extended reality appliance may be generated either through user input or automatically, similar to the systems, devices, and methods discussed above. The user input may be generated by either a user of the first wearable extended reality appliance, a user of the second wearable extended reality appliance, or any other user. In one embodiment, a user of the first wearable extended reality appliance, a user of the second wearable extended reality appliance, or any other user may interact with the first wearable extended reality appliance, the second wearable extended reality appliance, or any connected devices in order to generate the second user permission data associated with the second user of the second wearable extended reality appliance. Such a user may interact with the first wearable extended reality appliance, the second wearable extended reality appliance, or any connected devices using a trigger, a touch-screen interface, a mouse, or any other type of interactive element in order to generate the second user permission data associated with the second user of the second wearable extended reality appliance. In some embodiments, the first wearable extended reality appliance, the second wearable extended reality appliance, or any connected devices may automatically generate the second user permission data associated with the second user of the second wearable extended reality appliance, based on one or more of the identity of the second user, the role of the second user, the location of the first wearable extended reality appliance, the location of the second wearable extended reality appliance, the present time or date, or any other information that can be used to establish rules for data privacy independent of an active user input.

Similarly, the third user permission data associated with the third user of the second wearable extended reality appliance may be generated either through user input or automatically. The user input may be generated by either a user of the first wearable extended reality appliance, a user of the third wearable extended reality appliance, or any other user. In one embodiment, a user of the first wearable extended reality appliance, a user of the third wearable extended reality appliance, or any other user may interact with the first wearable extended reality appliance, the third wearable extended reality appliance, or any connected devices in order to generate the third user permission data associated with the third user of the third wearable extended reality appliance. Such a user may interact with the first wearable extended reality appliance, the third wearable extended reality appliance, or any connected devices using a trigger, a touch-screen interface, a mouse, or any other type of interactive element in order to generate the third user permission data associated with the third user of the third wearable extended reality appliance. In another embodiment, the first wearable extended reality appliance, the third wearable extended reality appliance, or any connected devices may automatically generate the third user permission data associated with the third user of the third wearable extended reality appliance, based on one or more of the identity of the third user, the role of the third user, the location of the first wearable extended reality appliance, the location of the third wearable extended reality appliance, the present time or date, or any other information that can be used to establish rules for data privacy independent of an active user input.

Furthermore, selectively sharing content may include sharing content in any way that differentiates the information being presented to the second user of the second wearable extended reality appliance from the information being presented to the third user of the third wearable extended reality appliance. For example, the content shared with the second user of the second wearable extended reality appliance may comprise fully obscured content, while the content shared with the third user of the third wearable extended reality appliance may comprise only partially obscured content. In one example, the content shared with the second user of the second wearable extended reality appliance may comprise a blacked-out image, while the content shared with the third user of the third wearable extended reality appliance may comprise only a blurred-out image. In another example, the content shared with the second user of the second wearable extended reality appliance may comprise a completely redacted document, while the content shared with the third user of the third wearable extended reality appliance may comprise only a partially redacted document.

In some embodiments, the second user permission data and the third user permission data may be obtained during the establishment of the link and the additional link respectively. In such embodiments, the second user permission data and the third user permission data may be obtained following a request to a user for the permission data or automatically.

In some embodiments, the data representing at least a portion of the virtual content in an obscured form may be generated by processing at least part of the virtual content. For example, the first wearable extended reality appliance may process the at least part of the virtual content to generate the data representing the at least a portion of the virtual content in the obscured form. In another example, a computerized system (for example, a system coordinating an extended reality environment, a system that communicates with both the first and the second wearable extended reality appliances, a system that provides content for presentation for both the first and the second wearable extended reality appliance, and so forth) may process the at least part of the virtual content to generate the data representing the at least a portion of the virtual content in the obscured form. In some examples, the processing of the at least part of the virtual content to generate the data may include applying the at least part of the virtual content to a transformation function, such as blurring, modification, visual filter, and so forth. In one example, a machine learning model (such as a generative model, a generative adversarial network, a transformer based generative model, etc.) may be trained using training examples to generated obscure forms of virtual contents. An example of such training example may include a sample virtual content and sample obscuring parameters, together with a desired obscured form of the sample virtual content corresponding to the sample obscuring parameters. Some non-limiting examples of such obscuring parameters may include an obscuring level (such as 'High', 'Low', etc.), an obscuring method (such as reduction, blurring, etc.), and so forth. The trained machine learning model may analyze the at least part of the virtual content to generate the data representing the at least a portion of the virtual content in the obscured form. In one example, a manual configuration may be used to select obscuring parameters for the usage of the trained machine learning model. In some examples, the obscure form of the at least a portion of the virtual content may be selected based on characteristics of the second wearable extended reality appliance (such as hardware characteristics, display resolution, operating system, and so forth) and/or based on a condition of the second wearable extended reality appliance (such as ambient illumination conditions in an environment of the second wearable extended reality appliance, usage mode of the second wearable extended reality appliance, and so forth). For example, the characteristics and/or condition of the second wearable extended reality appliance may be used to select obscuring parameters for the usage of the trained machine learning model. In some examples, in response to first ambient illumination conditions in the environment of the second wearable extended reality appliance, a first obscure form of the at least a portion of the virtual content may be selected, and in response to second illumination conditions in the environment of the second wearable extended reality appliance, a second obscure form of the at least a portion of the virtual content may be selected, the second obscure form may differ from the first obscure form. In one example, the first ambient illumination conditions may correspond to brighter illumination than the second ambient illumination conditions, and the first obscure form may be more opaque and/or sharper than the second obscure form. In some examples, in response to a first usage mode of the second wearable extended reality appliance, a first obscure form of the at least a portion of the virtual content may be selected, and in response to a second usage mode of the second wearable extended reality appliance, a second obscure form of the at least a portion of the virtual content may be selected, the second obscure form may differ from the first obscure form. For example, the first usage mode may include an active engagement of the user of the second wearable extended reality appliance with virtual objects, the second usage mode may include a passive viewing of virtual objects by the user of the second wearable extended reality appliance, and the first obscure form may be smaller than the second obscure form. In another example, the first usage mode may include usage while being mobile (for example, walking, running, etc.), the second usage mode may include usage while being stationary (for example, sitting, standing, etc.), and the first obscure form may be less opaque than the second obscure form.

Figure 18:
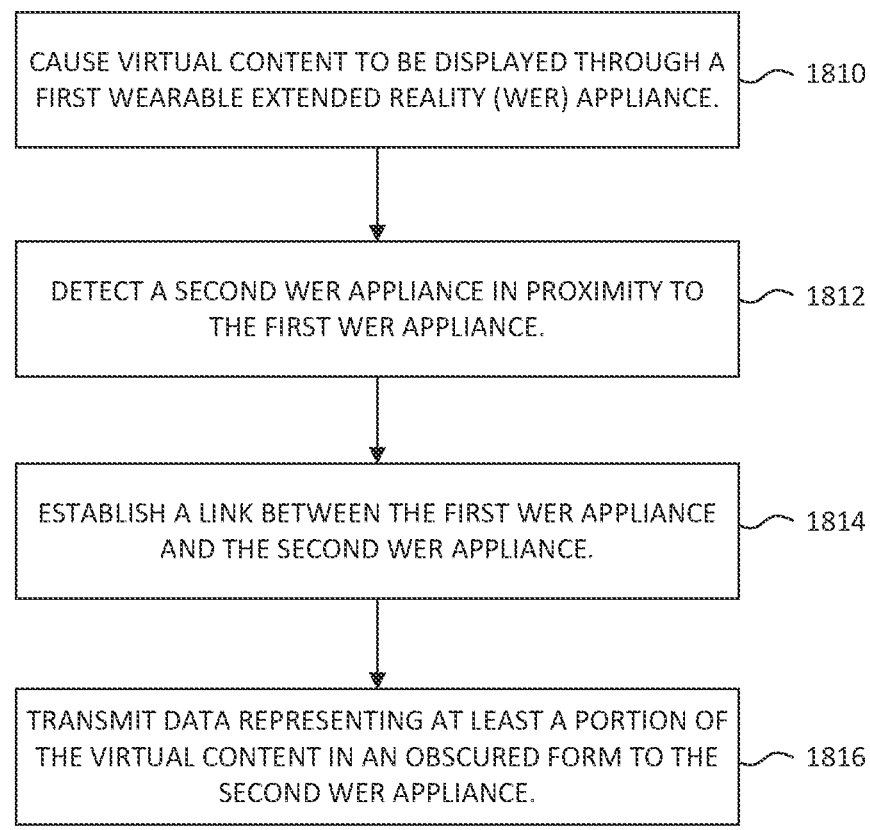
FIG. 18 is a flowchart of an exemplary method of providing situational awareness to users of wearable extended reality appliances, consistent with some embodiments of the present disclosure.

In some embodiments, a method for providing situational awareness to users of wearable extended reality appliances may be disclosed. FIG. 18 is a flowchart of an exemplary method 1805 of providing situational awareness to users of wearable extended reality appliances, consistent connection with some embodiments of the present disclosure. Method 1805 may include a step 1810 in which the at least one processor causes virtual content to be displayed through a first wearable extended reality appliance. Method 1805 may include a step 1812 in which the at least one processor detects a second wearable extended reality appliance in proximity to the first wearable extended reality appliance. Method 1805 may include a step 1814 in which the at least one processor establishes a link between the first wearable extended reality appliance and the second wearable extended reality appliance. Method 1805 may include a step 1816 in which the at least one processor transmits data representing at least a portion of the virtual content in an obscured form to the second wearable extended reality appliance, wherein the obscured form provides an indication of a position of the at least a portion of the virtual content in a three-dimensional space without revealing substance of the virtual content in obscured form.

Some embodiments may involve providing situational awareness to users of wearable extended reality appliances. For example, a system may include at least one processor configured to: cause virtual content to be displayed through a first wearable extended reality appliance; detect a second wearable extended reality appliance in proximity to the first wearable extended reality appliance; establish a link between the first wearable extended reality appliance and the second wearable extended reality appliance; and transmit data representing at least a portion of the virtual content in an obscured form to the second wearable extended reality appliance, wherein the obscured form provides an indication of a position of the at least a portion of the virtual content in a three-dimensional space without revealing substance of the virtual content in obscured form.

Some disclosed embodiments may relate to tying a virtual whiteboard to a physical space, including methods, systems, apparatuses, and non-transitory computer-readable media. For example, a non-transitory computer-readable medium is described below, with the understanding that aspects of the non-transitory computer-readable medium may apply equally to methods, systems, and apparatuses. For example, one or more processes embodied in the non-transitory computer-readable medium may be performed as a method, in a system, or in an apparatus. Some aspects of such processes may occur electronically over a network that may be wired, wireless, or both. Other aspects of such processes may occur using non-electronic means. In a broadest sense, the processes are not limited to particular physical and/or electronic instrumentalities, but rather may be accomplished using many differing instrumentalities. For example, some disclosed embodiments may include a system, method or apparatus for tying virtual whiteboards to physical spaces, the system comprising at least one processor configured to perform various processes as described herein.

The non-transitory computer-readable medium may contain instructions that when executed by at least one processor cause the at least one processor to perform various processes as described herein. A non-transitory computer-readable medium may include any type of physical memory on which information or data readable by at least one processor may be stored. A non-transitory computer-readable medium may include, for example, random access memory (RAM), read-only memory (ROM), volatile memory, non-volatile memory, hard drives, compact disc read-only memory (CD-ROM), digital versatile discs (DVDs), flash drives, disks, any optical data storage medium, any physical medium with patterns of holes, programmable read-only memory (PROM), erasable programmable read-only memory (EPROM), FLASH-EPROM or any other flash memory, non-volatile random-access memory (NVRAM), caches, registers, any other memory chip or cartridge, or networked versions of the same. A non-transitory computer-readable medium may refer to multiple structures, such as a plurality of non-transitory computer-readable media, located at a local location or at a remote location. Additionally, one or more non-transitory computer-readable media may be utilized in implementing a computer-implemented method. Accordingly, a non-transitory computer-readable medium may include tangible items and may exclude carrier waves or transient signals.

The instructions contained in the non-transitory computer-readable medium may include, for example, software instructions, computer programs, computer code, executable instructions, source code, machine instructions, machine language programs, or any other type of directions for a computing device. The instructions contained in the non-transitory computer-readable medium may be based on one or more of various types of desired programming languages, and may include (e.g., embody) various processes for tying a virtual whiteboard to a physical space as described herein.

At least one processor may execute the instructions contained in the non-transitory computer-readable medium to cause various processes to be performed for tying a virtual whiteboard to a physical space as described herein. The processor may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor may include a single-core or multiple-core processor. In some examples, the processor may be a single-core processor configured with virtualization technologies. The processor may, for example, implement virtualization technologies or other functionalities to provide the ability to execute, control, run, manipulate, or store multiple software processes, applications, or programs. In another example, the processor may include a multiple-core processor (e.g., dual-core, quad-core, or with any desired number of cores) configured to provide parallel processing functionalities to allow a device associated with the processor to execute multiple processes simultaneously. Other types of processor arrangements may be implemented to provide the capabilities described herein.

Some disclosed embodiments may relate to tying a virtual whiteboard to a physical space. A virtual whiteboard may refer to a virtual location where content may be displayed. For example, a virtual surface may be an area in a display space configured for the presentation of digital content. The digital content may include images, widgets, text, links, markings, scribbles or any other preexisting information or information generated on the fly, such as handwritten or typed text or images. The virtual content being displayed by an extended reality appliance to a user. Although referred to in a colloquial sense as a "white" board, the surface need not be of any particular color. That is, the display area may be white, black, blue, green, or yellow, or may have any other desired color. The surface may be displayed as glossy, smooth, or coarse, or may have any other desired texture. Any shape may be employed as a whiteboard. For example, in some embodiments, the whiteboard may have a traditional rectangular shape of a chalkboard or a flip chart, and in other embodiments, the whiteboard may be presented in the shape of a circle, square, triangle, hexagon, parallelogram, trapezoid, freeform shape, or any other desired contour. Similarly, use of the term "board" is not meant to imply that the display need be flat. In some embodiments, the virtual whiteboard may be present with varying contours. For example, a whiteboard may be presented as a rotatable cube or other three-dimensional shape (or combinations of shapes.) In some embodiments, initial characteristics (e.g., shape, size, color) of a whiteboard may change over time. For example, as a user interacts with differing portions of the whiteboard, the whiteboard's characteristics may change (e.g., a full board may expand; interacting with certain regions of the board may cause changes in display characteristics). A whiteboard surface is not limited to any particular size. It might be of any size, depending on the particular use case (e.g., if rectangular, 0.5 square meters, 0.75 square meters, 1 square meter, 2 square meters, or any other desired amount of area). In some examples, the surface of the virtual whiteboard may be bounded by an enclosure (e.g., frames) along the borders of the shape of the surface, the enclosure being displayed as virtual content together with the displayed surface. The virtual whiteboard may be displayed as being affixed onto a physical wall or a virtual wall being displayed as virtual content, may be displayed as being supported by an assembly standing on the floor, may be displayed as being placed (e.g., floating) in a space without being connected to other objects (either physical or virtual) in the space, or may be displayed in any other desired manner.

The virtual whiteboard may be configured for making markings. For example, virtual content may be added onto, or removed from, a surface of the virtual whiteboard. Such virtual content may include texts, drawings, colors, shapes, icons, logos, pictures, graphics, annotations, videos, animations, documents, files, links, programs, scripts, or any other desired representation of data. Such virtual content may be displayed to be on the surface of the virtual whiteboard, and to be facing a direction same as or substantially similar to a direction that the virtual whiteboard may be facing. The virtual content on the virtual whiteboard may be within the borders of the virtual whiteboard. The virtual content on the virtual whiteboard may be modified in any desired manner. Using the virtual whiteboard (e.g., adding, removing, or modifying virtual content) may be carried out via user commands. As further described herein, the virtual whiteboard may be used in various manners and to implement various functions.

In some examples, the virtual whiteboard may resemble a physical whiteboard. Just as physical whiteboards may be located in physical spaces, virtual whiteboards may be tied to physical spaces. For example, a virtual whiteboard may be tied to a physical space such as a conference room, a classroom, a discussion room, a work room, an office, a living room, a bedroom, a kitchen, a hall, a concourse, an indoor space, a playground, an outdoor space, or any other desired environment. Tying the virtual whiteboard to a physical space may, for example, enable a user of an extended reality appliance in the physical space to post content on the virtual whiteboard, for later viewing by another user even when the posting user is no longer physically located in the physical space of the virtual whiteboard. In some examples, a virtual whiteboard tied to a physical space may be configured to have a particular orientation and a particular position relative to the settings of the physical space. This may enable the virtual whiteboard, when displayed in the physical space, to have a consistent (e.g., fixed) orientation and position relative to the settings of the physical space. For example, a virtual whiteboard tied to a particular conference room in a building may, when invoked, be displayed consistently as being placed on a particular part of a specific wall of the conference room. In some examples, a virtual whiteboard may be a surface that enables different users in a vicinity of the virtual whiteboard to add virtual content for presentation on the virtual whiteboard by interacting with the virtual whiteboard, and/or erase visual content presented on the virtual whiteboard (for example, by interacting with the virtual whiteboard) and/or view visual content presented on the whiteboard. Some non-limiting examples of such virtual content are described above. Some non-limiting examples of such interactions are describes below. In some examples, a virtual whiteboard may be a virtual object mimicking and/or extending the functionality of a physical whiteboard.

Some disclosed embodiments may involve receiving via a wireless network, an indication of a location of a first wearable extended reality appliance (WER-Appliance). A wireless network may include, for example, a Wi-Fi network, a WiMAX network, a cellular network (e.g., 2G, 3G, 4G, or 5G), a mobile network, a satellite communication network, a terrestrial microwave network, a wireless personal area network, a wireless local area network, a wireless ad hoc network, a wireless metropolitan area network, a wireless wide area network, a wireless global area network, a space network, or any other type of computer network that may use wireless data connections between network nodes.

The location of the first wearable extended reality appliance may be determined, and the information may be sent to at least one processor via the non-transitory computer-readable medium (e.g., a processor of the server 210). The determination of the location of the first wearable extended reality appliance may be based on one or more positioning systems included in the first wearable extended reality appliance, such as Global Positioning System (GPS) sensors, indoor positioning systems, Wi-Fi-based positioning systems, presence reporting systems for tagged objects, radio-frequency identification (RFID) systems, positioning systems based on received signal strength indications of wireless networks, or other types of desired mechanisms configured to identify device locations. The location of the first wearable extended reality appliance may be determined periodically, such as continuously, every 0.1 seconds, every 0.5 seconds, every 1 second, every 2 seconds, every 3 seconds, or at any other desired interval. In other examples, the location of the first wearable extended reality appliance may be determined when needed, at random points in time, and so forth. Such location information as monitored and updated may be sent to, and received by, the at least one processor of the non-transitory computer-readable medium. The location of the first wearable extended reality appliance may comprise, for example, a set of GPS coordinates, a building identifier, a room identifier, a space identifier, an office identifier, or any other type of positioning data.

FIG. 19 is a flowchart illustrating an exemplary process 1900 for tying a virtual whiteboard to a physical space consistent with some embodiments of the present disclosure. With reference to FIG. 19, in step 1910, instructions contained in a non-transitory computer-readable medium when executed by a processor may cause the processor to receive via a wireless network, an indication of a location of a first wearable extended reality appliance.

Some disclosed embodiments may involve performing a lookup in a repository of virtual whiteboards and locations thereof to determine that the location of the first wearable extended reality appliance corresponds to a location of a particular virtual whiteboard. The repository of virtual whiteboards and locations thereof may refer to a data storage containing, for example, a table of virtual whiteboards (e.g., data for presentation on virtual whiteboards) and corresponding locations of the virtual whiteboards. For example, each virtual whiteboard of the virtual whiteboards indicated in the table may have a corresponding location stored in the table. The repository may be implemented based on or in a similar manner as data structure 212. In some examples, the repository of virtual whiteboards and locations may be any data-structure searchable by location and enabling retrieval of whiteboards by physical location. In some examples, the location of the first wearable extended reality appliance may be a particular room (such as a particular meeting room, a particular office room, etc.), the lookup in the repository may be based on the particular room to identify one or more virtual whiteboards positioned in the particular room, and it may be determined that the location of the first wearable extended reality appliance corresponds to the one or more virtual whiteboards positioned in the particular room. In one example, the particular room may be a particular physical room, and the first wearable extended reality appliance may be located in the particular physical room. In some examples, the location of the first wearable extended reality appliance may be and/or indicate a particular wall (or a particular surface of a different type) visible to a user of the first wearable extended reality appliance, the lookup in the repository may be based on the location of the first wearable extended reality appliance and/or the particular wall to identify one or more virtual whiteboards placed on the particular wall, and it may be determined that the location of the first wearable extended reality appliance corresponds to the one or more virtual whiteboards placed on the particular wall. In one example, the particular wall may be identified by the position and direction of the first wearable extended reality appliance. In another example, the particular wall may be identified by analyzing image data captured by an image sensor included in the first wearable extended reality appliance to detect the particular wall in the image data. In some examples, the lookup in the repository may identify one or more virtual whiteboards positioned in a distance smaller than a selected threshold from the location of the first wearable extended reality appliance, and it may be determined that the location of the first wearable extended reality appliance corresponds to the identified one or more virtual whiteboards. In some non-limiting examples, the threshold may be selected based on a user of the first wearable extended reality appliance, based on the location of the first wearable extended reality appliance, based on a direction of the first wearable extended reality appliance, based on the whiteboard, based on a dimension of the whiteboard, based on a type of the whiteboard, and so forth.

In some examples, when a particular virtual whiteboard is initially generated for a physical space, a registration process may be triggered, where identification of the virtual whiteboard and the location of the virtual whiteboard may be determined and sent to the repository. The generated virtual whiteboard may be tied to the physical space. The location of the virtual whiteboard may include, for example, a set of GPS coordinates, a building identifier, a room identifier, a space identifier, an office identifier, or any other type of positioning data. The information pair of the virtual whiteboard identification and the virtual whiteboard location may be received by the repository, and may be stored by the repository (e.g., in a data table). In some examples, an orientation of a particular virtual whiteboard and a position of the virtual whiteboard relative to the settings of a physical space may be recorded in the repository. By doing so, when the virtual whiteboard is displayed in the physical space, the virtual whiteboard may be configured, using the orientation and position information recorded in the repository, to have a consistent (e.g., fixed) orientation and position relative to the settings of the physical space. For example, using the orientation and position information recorded in the repository, when the virtual whiteboard is displayed in the physical space, the virtual whiteboard may be displayed consistently as being placed on a particular part of a wall of the physical space (e.g., a conference room).

Information stored in the repository may be queried or retrieved, for example, for determining whether an extended reality appliance is present in a location of any of the virtual whiteboards identified in the repository. To perform the lookup in the repository, at least one processor may use the location of the first wearable extended reality appliance as a key to search in the repository. The at least one processor may determine whether a location indication matching the location of first wearable extended reality appliance is found in the repository. If a matching location indication is found in the repository, the at least one processor may identify a virtual whiteboard corresponding to the matching location. Based on a lookup as described above, the at least one processor may determine that the location of the first wearable extended reality appliance corresponds to a location of a particular virtual whiteboard. If a location indication matching the location of the first wearable extended reality appliance is not found in the repository, the at least one processor may determine that the location of the first wearable extended reality appliance does not correspond to a location of any virtual whiteboard. A lookup in the repository may be triggered when location information of an extended reality appliance (e.g., as periodically monitored) is received by the at least one processor, and the lookup may be performed based on the received location information.

With reference to FIG. 19, in step 1912, instructions contained in a non-transitory computer-readable medium when executed by a processor may cause the processor to perform a lookup in a repository of virtual whiteboards and locations thereof to determine that the location of the first wearable extended reality appliance corresponds to a location of a particular virtual whiteboard.

Some disclosed embodiments may involve transmitting to the first wearable extended reality appliance, data corresponding to content of the particular virtual whiteboard to thereby enable a first user of the first wearable extended reality appliance to virtually view the content of the particular virtual whiteboard and to add virtual content to the particular virtual whiteboard. Based on determining that the location of the first wearable extended reality appliance corresponds to the location of the particular virtual whiteboard, at least one processor may transmit, to the first wearable extended reality appliance, data corresponding to content of the particular virtual whiteboard. The transmitted data may include, for example, text, drawings, colors, shapes, icons, logos, pictures, graphics, annotations, videos, animations, documents, files, links, programs, scripts, or any other information that conveys content for representation on the virtual whiteboard. In some examples, the content of the particular virtual whiteboard may include multiple documents contributed by differing users. The multiple documents may include, for example, text documents, image documents, audio documents, video documents, program documents, scribbles, handwritten text, or any other types of organizations of data. The differing users may comprise different persons using extended reality appliances (or other kind of computerized systems), such as students, teachers, presenters, participants, workers, individuals, or other members of the population. Each of the differing users may post his or her document(s) onto the virtual whiteboard, to share the document(s) with other users.

The content of the particular virtual whiteboard may be stored in the repository that may also store identifications and locations for virtual whiteboards, or in a different repository. The at least one processor may retrieve the content of the particular virtual whiteboard from the repository, and may transmit the retrieved content to the first wearable extended reality appliance. In some examples, the at least one processor may retrieve the configuration of the virtual whiteboard (e.g., the size, shape, texture, or frame of the virtual whiteboard), which may be stored in the repository. The at least one processor may transmit the configuration of the virtual whiteboard to the first wearable extended reality appliance.

The first wearable extended reality appliance may receive the transmitted content of the particular virtual whiteboard. In some examples, the first wearable extended reality appliance may receive the transmitted configuration of the particular virtual whiteboard. The first wearable extended reality appliance may, based on the received data, render the virtual whiteboard and the content of the virtual whiteboard, as a virtual representation to a first user of the first wearable extended reality appliance. The first user may include a person using the first wearable extended reality appliance, such as a student, a teacher, a presenter, a participant, a worker, an individual, or any other member of the population. Using the first wearable extended reality appliance, the first user may virtually view the rendered virtual whiteboard and the rendered content of the virtual whiteboard.

The first user may add virtual content to the particular virtual whiteboard. The added virtual content may include, for example, text, drawings, colors, shapes, icons, logos, pictures, graphics, annotations, videos, animations, documents, files, links, programs, scripts, scribbles, handwritten texts, or any other desired representation of data. In some examples, the added content may include animated content, such as videos, sequentially displayed images, moving pictures, motion pictures, or any other type of content with moving elements. In some examples, the added content may include a drawing made by the first user through interaction with the particular virtual whiteboard. For example, a physical drawing tool or a digital representation of a drawing tool may be provided to the first user. The drawing tool when activated may follow a travel path of an input device associated with the first wearable extended reality appliance. Using the drawing tool, the travel path of the input device may be projected onto the virtual whiteboard, thereby allowing the first user to draw on the virtual whiteboard. Additionally or alternatively, when the drawing tool is intersecting with and/or is touching and/or in proximity of a region of the particular virtual whiteboard, a marking may be added to the region of the particular virtual whiteboard. The characteristics of the marking added (such as color, size, texture, etc.) may be selected based on the drawing tool, based on a parameter of the intersection, based on a parameter of the touch, based on the proximity, based on an analysis of the movement of the drawing tool, based on the virtual whiteboard, and so forth. In another example, a part of a body of the first user (such as a digit, a hand, etc.) may be used by the first user to add content through interaction with the particular virtual whiteboard. For example, when the part of the body is intersecting with and/or is touching and/or in proximity of a region of the particular virtual whiteboard, a marking may be added to the region of the particular virtual whiteboard. The characteristics of the marking added (such as color, size, texture, etc.) may be selected based on the gesture, based on a parameter of the intersection, based on a parameter of the touch, based on the proximity, based on the virtual whiteboard, and so forth.

To add virtual content to the virtual whiteboard, the first user may input user commands to the first wearable extended reality appliance using an input device associated with the first wearable extended reality appliance. The virtual whiteboard may have one or more functions that may allow the first user to add virtual content to the virtual whiteboard. For example, a function to add text may allow the first user to type text onto the virtual whiteboard. As another example, a function to add drawings may allow the first user to draw on the virtual whiteboard. By way of another example, a function to add files may allow the first user to upload a file onto the virtual whiteboard. As another example, a function to add pictures may allow the first user to upload a picture onto the virtual whiteboard. Other functions to add virtual content to the virtual whiteboard may be provided as desired. The first user may use an input device of the first wearable extended reality appliance to invoke one or more of the functions, and to add virtual content to the virtual whiteboard. In addition, the virtual whiteboard may have functions to modify or remove virtual content of the virtual whiteboard. Using the functions, the first user may select virtual content of the virtual whiteboard for modification or removal.

With reference to FIG. 19, in step 1914, instructions contained in a non-transitory computer-readable medium when executed by a processor may cause the processor to transmit to the first wearable extended reality appliance, data corresponding to content of the particular virtual whiteboard to thereby enable a first user of the first wearable extended reality appliance to virtually view the content of the particular virtual whiteboard and to add virtual content to the particular virtual whiteboard.

Figure 20:
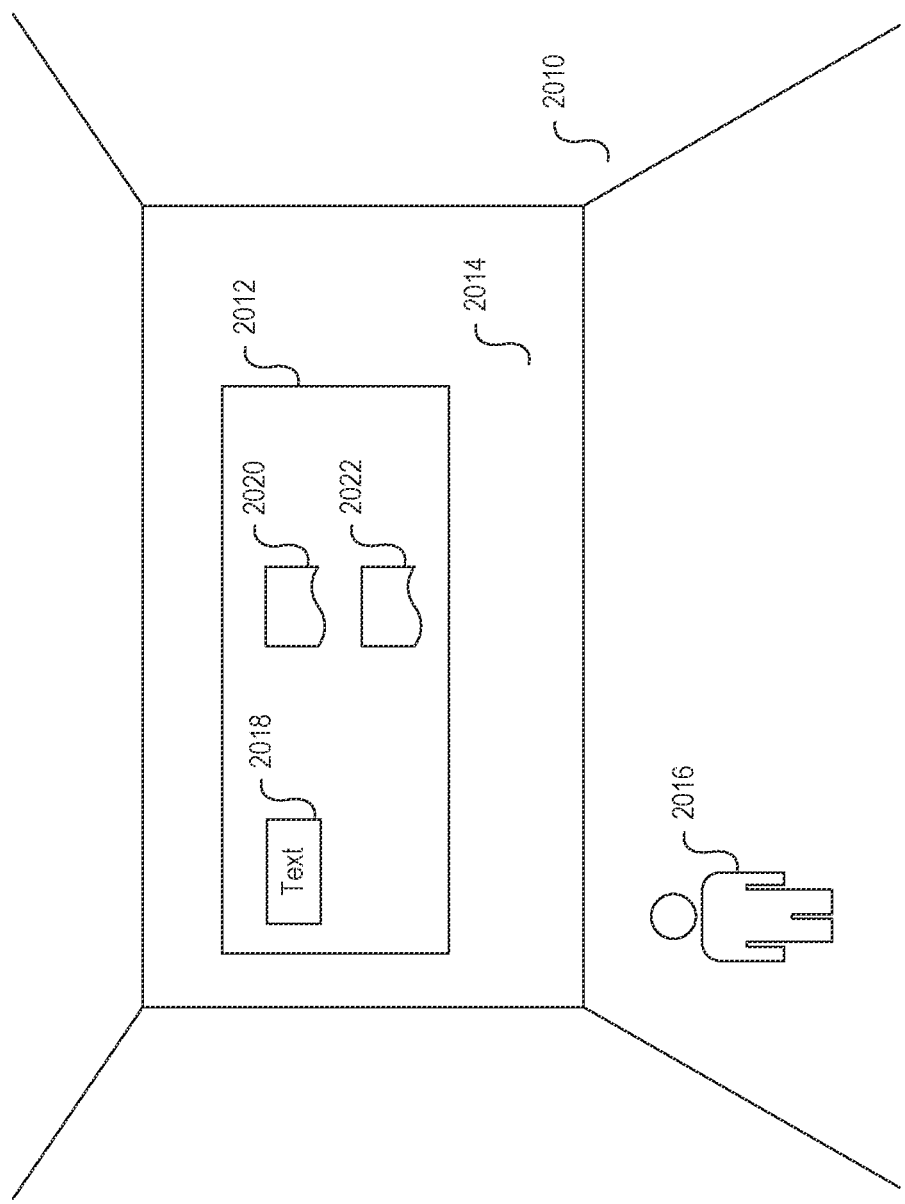
FIG. 20 and FIG. 21 are schematic diagrams illustrating examples of tying a virtual whiteboard to a physical space, consistent with some embodiments of the present disclosure.
Figure 21:
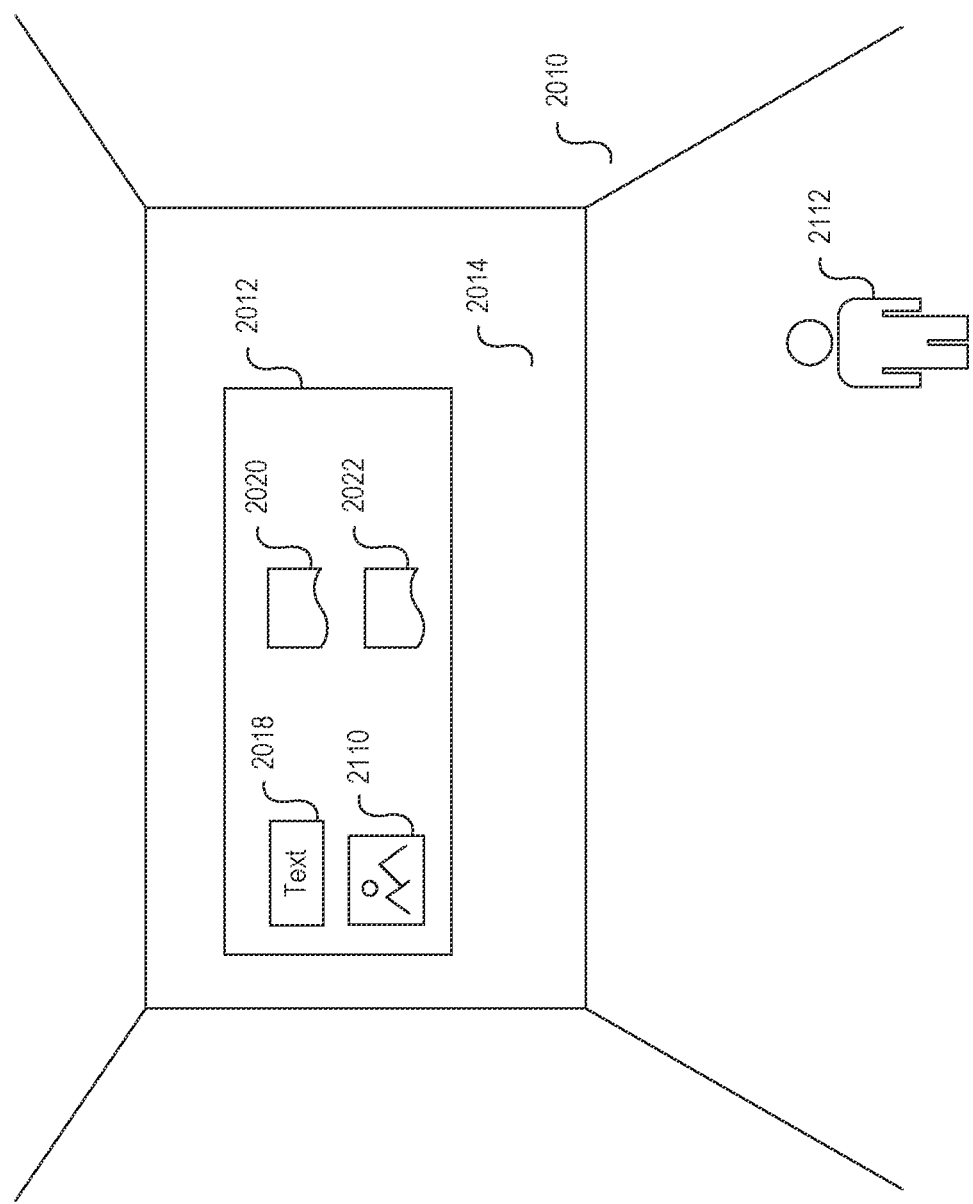

FIG. 20 and FIG. 21 are schematic diagrams illustrating examples of tying a virtual whiteboard to a physical space consistent with some embodiments of the present disclosure. With reference to FIG. 20, a physical space 2010 may include a conference room, a classroom, a discussion room, a work room, a meeting room, an office, a living room, a bedroom, a kitchen, a hall, a concourse, an indoor space, a playground, an outdoor space, or any other desired environment. A first user 2016 may be present in the physical space 2010, and may wear a first wearable extended reality appliance. A virtual whiteboard 2012 may be displayed via the first wearable extended reality appliance to the first user 2016. The virtual whiteboard 2012 may be displayed as being placed on a wall 2014. The virtual whiteboard 2012 may be tied to the physical space 2010. Based on the first wearable extended reality appliance being in the physical space 2010, the first wearable extended reality appliance may receive and display the virtual whiteboard 2012 and content of the virtual whiteboard 2012. The content of the virtual whiteboard 2012 may include, for example, text 2018 and multiple documents 2020, 2022. The first user 2016 may add virtual content to the virtual whiteboard 2012 (for example, using the first wearable extended reality appliance, using an input device, using a physical marking tool, using a virtual marking tool, using gestures, using voice commands, by interacting with virtual whiteboard 2012, etc.).

Some disclosed embodiments may involve receiving, during a first time period, the virtual content added by the first user. For example, receiving may include obtaining by at least one processor, signals reflecting virtual content. Based on the adding of the virtual content to the particular virtual whiteboard by the first user, the first wearable extended reality appliance may send signals reflecting the added virtual content to the at least one processor. The at least one processor may receive, during a first time period, the virtual content added by the first user. The virtual content added by the first user may be received from the first wearable extended reality appliance, from a device associated with the first wearable extended reality appliance, from a fixed camera placed in a vicinity of the particular virtual whiteboard, or from any other suitable entities having information associated with the added virtual content. In some examples, the first time period may be a time period before the first wearable extended reality appliance leaves the location of the particular virtual whiteboard. For example, the first time period may include the time of the addition of the virtual content to the particular virtual by the first user. In some examples, the first time period may be a time period after the first wearable extended reality appliance is no longer in the location of the particular virtual whiteboard. In some examples, the first time period may be a time period during which the first wearable extended reality appliance leaves the location of the particular virtual whiteboard. For example, the first time period may be a time period after the time of the addition of the virtual content to the particular virtual by the first user. For example, the virtual content added to the particular virtual whiteboard by the first user may be received from an external device that stored the virtual content from the time of the addition. The external device may provide the virtual content (for example, by transmitting it) once the first wearable extended reality appliance leaves the location of the particular virtual whiteboard and/or after the first wearable extended reality appliance is no longer in the location of the particular virtual whiteboard (for example, to overcome communication problems at the location of the particular virtual whiteboard, to minimize communication costs, and so forth). With reference to FIG. 19, in step 1916, instructions contained in a non-transitory computer-readable medium when executed by a processor may cause the processor to receive, during a first time period, the virtual content added by the first user. The processor may be part of, for example, server 210.

In some examples, the instructions contained in the non-transitory computer-readable medium may further include storing the added content in the repository of virtual whiteboards. Based on receiving the virtual content added by the first user from the first wearable extended reality appliance, the at least one processor may store the added content in the repository of virtual whiteboards and locations thereof. The added content may be stored in the repository in association with the particular virtual whiteboard to which the added content is added.

Consistent with disclosed embodiments, instructions contained in a non-transitory computer-readable medium may include receiving via the wireless network at a second time period after the first wearable extended reality appliance is no longer in the location of the particular virtual whiteboard, an indication that a second wearable extended reality appliance is in the location of the particular virtual whiteboard. After the first user has added the virtual content to the particular virtual whiteboard using the first wearable extended reality appliance, the first wearable extended reality appliance may leave the location of the particular virtual whiteboard. For example, the first user may leave the location of the particular virtual whiteboard, and may take the first wearable extended reality appliance with him or her. At a second time period after the first wearable extended reality appliance is no longer in the location of the particular virtual whiteboard, a second wearable extended reality appliance (which may differ from or be the same as the first wearable extended reality appliance) may arrive at the location of the particular virtual whiteboard. For example, a second user in possession of the second wearable extended reality appliance, may arrive at a vicinity of the virtual whiteboard. By way of another example, a second user may enter a conference room, a classroom, a discussion room, a work room, an office, a meeting room, a living room, a bedroom, a kitchen, a hall, a concourse, an indoor space, a playground, an outdoor space, or any other desired environment associated with the location of the particular virtual whiteboard, and may take the second wearable extended reality appliance with him or her.

In a similar manner as the first wearable extended reality appliance, the second wearable extended reality appliance (or another process or computerized system) may periodically monitor the location of the second wearable extended reality appliance. In other examples, the location of the second wearable extended reality appliance may be determined when needed, at random points in time, and so forth. For example, the second wearable extended reality appliance may use positioning systems to determine its location. The second wearable extended reality appliance may send the location information (e.g., as periodically monitored) via the wireless network to at least one processor (e.g., a processor of the server 210). The at least one processor may receive the location information sent by the second wearable extended reality appliance. The received location information may indicate, to the at least one processor, whether the second wearable extended reality appliance is in the location of the particular virtual whiteboard (or in a location that corresponds to the location of the particular virtual whiteboard). For example, the at least one processor may compare the received location information of the second wearable extended reality appliance with locations of virtual whiteboards included in the repository. If the location information of the second wearable extended reality appliance matches the location of the particular virtual whiteboard, the at least one processor may determine that the second wearable extended reality appliance is in the location of the particular virtual whiteboard. In another example, it may be determined that the second wearable extended reality appliance is in a location that corresponds to the location of the particular virtual whiteboard in a similar manner to the determination that the location of the first wearable extended reality appliance corresponds to the location of the particular virtual whiteboard.

In some examples, the second time period and the first time period may have no overlap. For example, the first time period may end before the second time period starts. In some examples, the first time period may start after the second time period ends. In some examples, the second time period and the first time period may have overlap, but may differ from one another (e.g., may be of unequal durations). In some examples, the second time period and the first time period may be identical (e.g., may have a generally equal duration).

With reference to FIG. 19, in step 1918, instructions contained in a non-transitory computer-readable medium when executed by a processor may cause the processor to receive via the wireless network at a second time period after the first wearable extended reality appliance is no longer in the location of the particular virtual whiteboard, an indication that a second wearable extended reality appliance is in the location of the particular virtual whiteboard.

Some disclosed embodiments may also involve transmitting to the second wearable extended reality appliance, data corresponding to the content and the added content of the particular virtual whiteboard, to thereby enable a second user of the second wearable extended reality appliance to view the content and the added content while the first user is absent from the location of the particular virtual whiteboard. Based on receiving the indication that the second wearable extended reality appliance is in the location of the particular virtual whiteboard, at least one processor may transmit, to the second wearable extended reality appliance, data corresponding to the content of the particular virtual whiteboard (e.g., the content transmitted previously to the first wearable extended reality appliance) and corresponding to the virtual content added by the first user to the particular virtual whiteboard. Such data may be stored in memory with a marker associating the content with the virtual whiteboard. Therefore, although the first wearable extended reality device is not present, the data may be retrieved from memory and sent to the second wearable extended reality device. Such a process may occur as the result of at least one processor, such as processor of the server 210, accessing the data for transmission.

In some examples, the data transmitted to the second wearable extended reality appliance may include an indication that the first user contributed the added content. For example, when the first user adds the virtual content to the particular virtual whiteboard, an indication that the first user contributed the added content may be recorded by the first wearable extended reality appliance, and may be sent to, and stored by, the at least one processor of the non-transitory computer-readable medium. That is, the at least one processor may store the added content in memory for later retrieval. The indication that the first user contributed the added content may include, for example, initials of the first user, a code associated with the first user, a username of the first user, user identification of the first user (e.g., a user identification number), a location of the first user when the first user adds the virtual content to the particular virtual whiteboard, a time when the first user adds the virtual content to the particular virtual whiteboard, a place of the first user when the first user adds the virtual content to the particular virtual whiteboard, or any other desired information associated with the first user adding the virtual content to the particular virtual whiteboard. The indication associated with the added content may be stored in connection with the added content (e.g., in the repository). The at least one processor may be configured to transmit an indication associated with the added content to the second wearable extended reality appliance. In one example, the second wearable extended reality appliance may be configured to provide a visual indication that the first user contributed the added content (for example, to a user of the second wearable extended reality appliance), for example based on the indication that the first user contributed the added content in the data transmitted to the second wearable extended reality appliance.

In some examples, the data transmitted to the second wearable extended reality appliance may include an indication of when the added content was added to the particular virtual whiteboard. For example, when the first user adds the virtual content to the particular virtual whiteboard, a time stamp of when the adding of the virtual content occurs may be recorded by the first wearable extended reality appliance, and may be sent to, and stored by, the at least one processor. The time stamp may be recorded in connection with the added content (e.g., in the repository), and may be transmitted in connection with the added content (e.g., to the second wearable extended reality appliance). In one example, the second wearable extended reality appliance may be configured to provide a visual indication of when the added content was added to the particular virtual whiteboard (for example, to a user of the second wearable extended reality appliance), for example based on the indication of when the added content was added to the particular virtual whiteboard in the data transmitted to the second wearable extended reality appliance.

The transmission of the data to the second wearable extended reality appliance may enable a second user of the second wearable extended reality appliance to view the content of the particular virtual whiteboard (e.g., the content transmitted also to the first wearable extended reality appliance) and the content added by the first user to the particular virtual whiteboard, while the first user is absent from the location of the particular virtual whiteboard. The second user may include a person using the second wearable extended reality appliance, such as a student, a teacher, a presenter, a participant, a worker, an individual, or any other member of the population.

With reference to FIG. 19, in step 1920, instructions contained in a non-transitory computer-readable medium when executed by a processor may cause the processor to transmit to the second wearable extended reality appliance, data corresponding to the content and the added content of the particular virtual whiteboard, to thereby enable a second user of the second wearable extended reality appliance to view the content and the added content while the first user is absent from the location of the particular virtual whiteboard.

With reference to FIG. 21, a second user 2112 wearing a second wearable extended reality appliance may come to (or enter) the physical space 2010, for example, after the first user 2016 wearing the first wearable extended reality appliance leaves the physical space 2010. Based on the second wearable extended reality appliance being in the physical space 2010, the second wearable extended reality appliance may receive and display the virtual whiteboard 2012, the content of the virtual whiteboard 2012 (e.g., the text 2018 and the multiple documents 2020, 2022), and virtual content added by the first user 2016 to the virtual whiteboard 2012. The virtual content added by the first user 2016 to the virtual whiteboard 2012 may include, for example, an image 2110.

Some examples may involve causing the multiple documents to be displayed in a common layout arrangement during both the first time period and the second time period. The content of the particular virtual whiteboard that may be displayed during the first time period and the second time period may include multiple documents. The multiple documents may be displayed in a common layout arrangement. For example, each of the multiple documents may be displayed as a large icon. As another example, each of the multiple documents may be displayed as a small icon. By way of another example, the multiple documents may be displayed in the form of tiles. As another example, the multiple documents may be displayed in a list. As another example, each of the multiple documents may be displayed, showing contents of the document. The multiple documents may be displayed in any other desired common manner. It is contemplated that the layout used to display the documents during the first time period to a first user may be the same as the layout used to display the documents during the second time period to a second user. For example, with reference to FIG. 20 and FIG. 21, the multiple documents 2020, 2022 may be displayed in a common layout arrangement (e.g., one below the other on a right side of the display) using icons during both a time period when the first user 2016 is present in the physical space 2010 and a time period when the second user 2112 is present in the physical space 2010. Similarly, for example, text 2018 may be displayed above image 2110 on a left side of the display during both a time period when the first user 2016 is present in the physical space 2010 and a time period when the second user 2112 is present in the physical space 2010.

Some examples may involve automatically erasing at least some of the multiple documents from the particular virtual whiteboard upon expiration of a maintenance period. The maintenance period may be, for example, 15 days, 1 month, 2 months, 3 months, 6 months, 1 year, 2 years, or any other interval or time duration suitable for automatically removing documents from a virtual whiteboard. In some examples, the maintenance period may be specific to each of the multiple documents. In some examples, the maintenance period for a particular document may be set by a user who adds the particular document to the particular virtual whiteboard. In some examples, the maintenance period may be adjusted by other users or may be based on policies (e.g., policies of an organization or group). In some examples, the maintenance period may be different for different types of documents (e.g., 2 months for text documents and 1 month for video documents). At least one processor of the non-transitory computer-readable medium may be configured, for example, to set a timer corresponding to a maintenance period for a document of multiple documents displayed on a virtual whiteboard. Upon expiration of the timer, the at least one processor may be configured to automatically erase the document from that particular virtual whiteboard.

Further embodiments may involve accessing rules associating users of wearable extended reality appliances with permissions to add content to the particular virtual whiteboard, and using the accessed rules to determine that the first user can add content on the particular virtual whiteboard. The rules associating the users with the permissions to add content to the particular virtual whiteboard may include an indication of whether each of the users is permitted to add content to the particular virtual whiteboard. For example, the repository of virtual whiteboards may store, for each virtual whiteboard, a user permission table for adding content. The user permission table may list one or more users of the virtual whiteboard, and whether the one or more users have permission to add content to the virtual whiteboard. At least one processor may access the permission information for adding content for the particular virtual whiteboard. Based on the accessed permission information, the at least one processor may determine whether a first user is permitted to add content on the particular virtual whiteboard.

Figure 22:
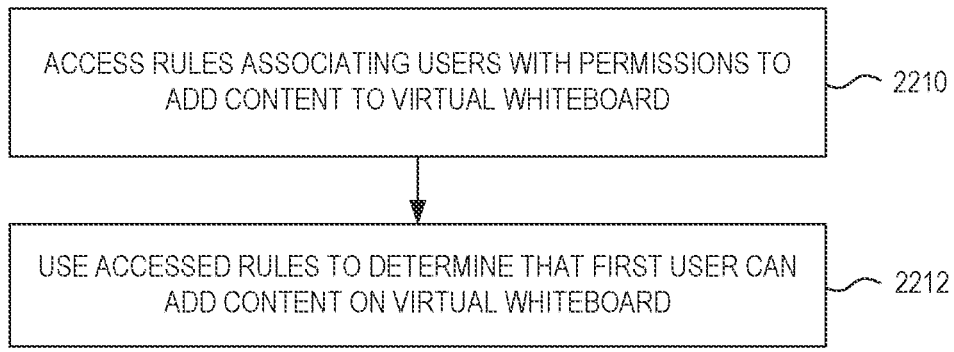
FIG. 22 is a flowchart illustrating an exemplary process for adding content to a virtual whiteboard, consistent with some embodiments of the present disclosure.

FIG. 22 is a flowchart illustrating an exemplary process 2200 for adding content to a virtual whiteboard consistent with some embodiments of the present disclosure. With reference to FIG. 22, in step 2210, instructions contained in a non-transitory computer-readable medium when executed by a processor may cause the processor to access rules associating users of wearable extended reality appliances with permissions to add content to the particular virtual whiteboard. In step 2212, instructions contained in a non-transitory computer-readable medium when executed by a processor may cause the processor to use the accessed rules to determine that the first user can add content on the particular virtual whiteboard. In some examples, the determination that the first user can add content on the particular virtual whiteboard may be based on the location of the particular virtual whiteboard. In one example, the rules associating users of wearable extended reality appliances with permissions to add content to the particular virtual whiteboard may include rules associating the users with permissions based on locations of virtual whiteboards. For example, the first user may have permission to add content to all virtual whiteboard in a first region (such as a particular building, a particular floor, a particular room, etc.). In another example, the first user may have no permission to add content to all virtual whiteboard in a second region (such as a particular building, a particular floor, a particular room, etc.).

In some examples, the determination that the first user can add content on the particular virtual whiteboard may be based on an access privilege of the first user to the particular virtual whiteboard, or may be based on a position within an organization associated with the first user. The access privilege of a first user to the particular virtual whiteboard may indicate, for example, to what extent the first user is permitted to access the particular virtual whiteboard, such as whether the first user is permitted to add content to the particular virtual whiteboard, whether the first user is permitted to delete content from the particular virtual whiteboard, whether the first user is permitted to modify content of the particular virtual whiteboard, or whether the first user is permitted to view content of the particular virtual whiteboard. The organization associated with a first user may include, for example, a company, a firm, a government agency, an education institution, a school, a university, or any other entity. The position within the organization may be based on, for example, a job function or work responsibilities of the first user. For example, the position within the organization may include a supervisor, an employee, an officer, a board member, a president, a manager, a director, or any other appropriate job description or title within an organization. Permissions to add content to the particular virtual whiteboard may be different for different positions within the organization. The at least one processor may determine whether the first user can add content on the particular virtual whiteboard based on the access privilege of the first user to the particular virtual whiteboard, or based on the position within the organization associated with the first user.

Some embodiments may further involve accessing rules associating users with permissions to delete content from the particular virtual whiteboard, and using the accessed rules to determine that the second user is permitted to delete the added content from the particular virtual whiteboard. The rules associating the users with the permissions to delete content from the particular virtual whiteboard may include indication of whether each of the users is permitted to delete content from the particular virtual whiteboard. For example, the repository of virtual whiteboards may store, for each virtual whiteboard, a user permission table for deleting content. The user permission table may list one or more users of the virtual whiteboard, and whether the one or more users have permission to delete content from the virtual whiteboard. At least one processor of the non-transitory computer-readable medium may access the permission information for deleting content for the particular virtual whiteboard. Based on the accessed permission information, the at least one processor may determine whether a second user is permitted to delete content (e.g., the content added by the first user to the particular virtual whiteboard) from the particular virtual whiteboard. In some examples, the determination that the second user is permitted to delete the added content from the particular virtual whiteboard may be based on the location of the particular virtual whiteboard. In one example, the rules associating users with permissions to delete content from the particular virtual whiteboard may include rules associating the users with permissions based on locations of virtual whiteboards. For example, the second user may be permitted to delete content from all virtual whiteboard in a first region (such as a particular building, a particular floor, a particular room, etc.). In another example, the second user may have no permission to delete content from all virtual whiteboard in a second region (such as a particular building, a particular floor, a particular room, etc.). In some examples, the determination that the second user is permitted to delete the added content from the particular virtual whiteboard may be based on the first user. In one example, the rules associating users with permissions to delete content from the particular virtual whiteboard may associate the users with permissions based on identities of content creators associated with the content to be deleted. For example, the second user may be permitted to delete content added to the particular virtual whiteboard by individuals of a first group of individuals. In another example, the second user may have no permission to delete content added to the particular virtual whiteboard by individuals of a second group of individuals. The determination that the second user is permitted to delete the added content from the particular virtual whiteboard may be based on whether the first user is included in the first group and/or based on whether the first user is included in the second group.

Figure 23:
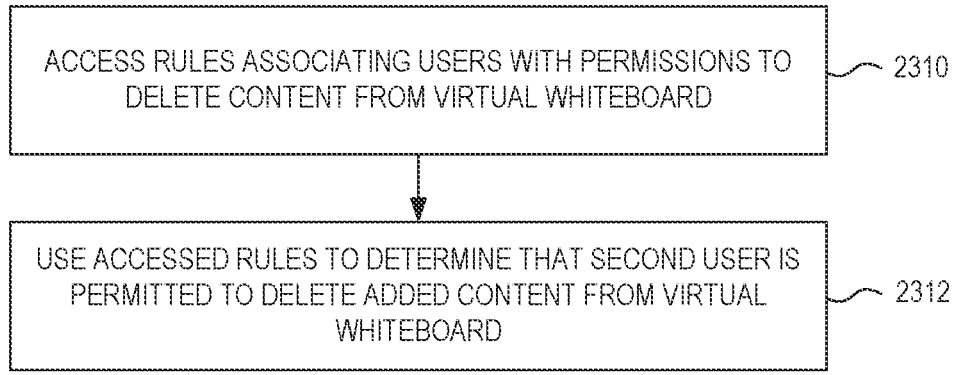
FIG. 23 is a flowchart illustrating an exemplary process for deleting content from a virtual whiteboard, consistent with some embodiments of the present disclosure.

FIG. 23 is a flowchart illustrating an exemplary process 2300 for deleting content from a virtual whiteboard consistent with some embodiments of the present disclosure. With reference to FIG. 23, in step 2310, instructions contained in a non-transitory computer-readable medium when executed by a processor may cause the processor to access rules associating users with permissions to delete content from the particular virtual whiteboard. In step 2312, instructions contained in a non-transitory computer-readable medium when executed by a processor may cause the processor to use the accessed rules to determine that the second user is permitted to delete the added content from the particular virtual whiteboard.

In some examples, the determination that the second user is permitted to delete content from the particular virtual whiteboard may be based on a position within an organization associated with the second user, or may be based on an access privilege of the second user to the particular virtual whiteboard. The access privilege of the second user to the particular virtual whiteboard may indicate, for example, to what extent the second user is permitted to access the particular virtual whiteboard, such as whether the second user is permitted to add content to the particular virtual whiteboard, whether the second user is permitted to delete content from the particular virtual whiteboard, whether the second user is permitted to modify content of the particular virtual whiteboard, or whether the second user is permitted to view content of the particular virtual whiteboard. The organization associated with the second user may include, for example, a company, a firm, a government agency, an education institution, a school, a university, or any other entity. The position within the organization may be based on, for example, a job function or work responsibilities of the second user. For example, the position within the organization may include a supervisor, an employee, an officer, a board member, a president, a manager, a director, or any other appropriate job description or title within an organization. Permissions to delete content from the particular virtual whiteboard may be different for different positions within the organization. The at least one processor may determine whether the second user is permitted to delete content from the particular virtual whiteboard based on the access privilege of the second user to the particular virtual whiteboard, or based on the position within the organization associated with the second user.

Additional embodiments may involve accessing rules associating types of content with permissions to upload content to the particular virtual whiteboard, and using the accessed rules to determine that the added content is permitted for posting on the particular virtual whiteboard. The rules associating the types of content with the permissions to upload content to the particular virtual whiteboard may include indication of whether one or more of the types of content is permitted to be uploaded to the particular virtual whiteboard. The types of content may include, for example, scientific content, research content, accounting content, financial content, administrative content, training content, professional content, personal content, or other categories of content. In another example, the types of content may be based on a category of the content, such as textual, visual, footage, animated, unanimated, handwritten, scribbled, and so forth. For example, the repository of virtual whiteboards may store, for each virtual whiteboard, a content-type permission table for uploading content. The content-type permission table may list the one or more types of content, and whether the one or more types of content are permitted to be uploaded to the virtual whiteboard. At least one processor may access the permission information for uploading content for the particular virtual whiteboard. Based on the accessed permission information, the at least one processor may determine whether content (e.g., the content added by the first user to the particular virtual whiteboard) is permitted to be uploaded to the particular virtual whiteboard for posting on the particular virtual whiteboard. For example, the first user may mark or tag the added content with a content type for determining whether the added content is permitted to be uploaded to the particular virtual whiteboard for posting on the particular virtual whiteboard.

Figure 24:
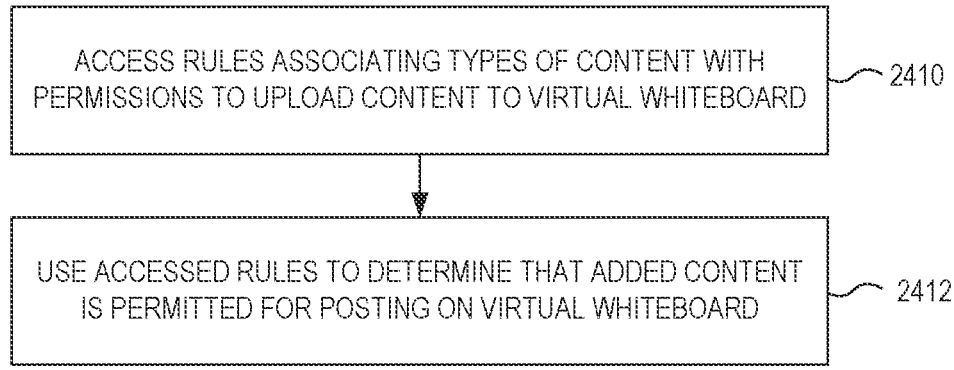
FIG. 24 is a flowchart illustrating an exemplary process for uploading content to a virtual whiteboard based on types of content, consistent with some embodiments of the present disclosure.

FIG. 24 is a flowchart illustrating an exemplary process 2400 for uploading content to a virtual whiteboard based on types of content consistent with some embodiments of the present disclosure. With reference to FIG. 24, in step 2410, instructions contained in a non-transitory computer-readable medium when executed by a processor may cause the processor to access rules associating types of content with permissions to upload content to the particular virtual whiteboard. In step 2412, instructions contained in a non-transitory computer-readable medium when executed by a processor may cause the processor to use the accessed rules to determine that the added content is permitted for posting on the particular virtual whiteboard.

In some examples, the determination that the added content is permitted for posting on the particular virtual whiteboard may be based on content analysis of the added content. For example, the added content may be permitted for posting on the particular virtual whiteboard based on images analysis of the added content to determine that there is no nudity in the added content. Additionally or alternatively, image analysis of the added content may be used to determine various characteristics of the added content, such as unclear or blurred images, images with insufficient lighting, images of restricted objects (e.g., restricted government facility), images of a confidential document or prototype, or other image features of interest. One or more criteria to permit content posting on the particular virtual whiteboard may be configured, for example, based on policies (e.g., policies of an organization or group). The one or more criteria may indicate, for example, whether images with particular characteristics are permitted for posting on the particular virtual whiteboard. Based on image analysis of the added content, when determined characteristics of the added content satisfy the one or more criteria, the added content may be permitted for posting on the particular virtual whiteboard. Based on image analysis of the added content, when determined characteristics of the added content do not satisfy the one or more criteria, the added content might not be permitted for posting on the particular virtual whiteboard. In some examples, the type of content may be determined by analyzing the added content, for example using a visual classification algorithm classifying each content to one of a plurality of classes, where each class correspond to a content type. In some examples, a binary visual classification algorithm may be used to classify the added content to one of two classes, where one class may be permitted for posting, and the other class may not be permitted for posting.

As another example, the added content may be permitted for posting on the particular virtual whiteboard based on text analysis of the added content to determine that there is no offensive language in the added content. Additionally or alternatively, text analysis of the added content may be used to determine various characteristics of the added content, such as text with spelling errors, text with grammatical errors, text of a confidential document or prototype, or other text features of interest. One or more criteria to permit content posting on the particular virtual whiteboard may be configured, for example, based on policies (e.g., policies of an organization or group). The one or more criteria may indicate, for example, whether text with particular characteristics is permitted for posting on the particular virtual whiteboard. Based on text analysis of the added content, when determined characteristics of the added content satisfy the one or more criteria, the added content may be permitted for posting on the particular virtual whiteboard. Based on text analysis of the added content, when determined characteristics of the added content do not satisfy the one or more criteria, the added content might not be permitted for posting on the particular virtual whiteboard. In some examples, the type of content may be determined by analyzing the added content, for example using a textual classification algorithm classifying each content to one of a plurality of classes, where each class correspond to a content type. In some examples, a binary textual classification algorithm may be used to classify the added content to one of two classes, where one class may be permitted for posting, and the other class may not be permitted for posting.

Additional embodiments may involve accessing rules associating users of wearable extended reality appliances with permissions to view content from the particular virtual whiteboard, and using the accessed rules to determine that the second user is permitted to view the added content on the particular virtual whiteboard. The rules associating the users with the permissions to view content from the particular virtual whiteboard may include indication of whether each of the users is permitted to view content from the particular virtual whiteboard. For example, the repository of virtual whiteboards may store, for each virtual whiteboard, a user permission table for viewing content. The user permission table may list one or more users of the virtual whiteboard, and whether the one or more users have permission to view content from the virtual whiteboard. At least one processor may access the permission information for viewing content for the particular virtual whiteboard. Based on the accessed permission information, the at least one processor may determine whether a second user is permitted to view content (e.g., the content added by the first user to the particular virtual whiteboard) on the particular virtual whiteboard. In some examples, the determination that the second user is permitted to view the added content from the particular virtual whiteboard may be based on the location of the particular virtual whiteboard. In one example, the rules associating users with permissions to view content from the particular virtual whiteboard may include rules associating the users with permissions based on locations of the particular virtual whiteboard. For example, the second user may be permitted to view content from all virtual whiteboard in a first region (such as a particular building, a particular floor, a particular room, etc.). In another example, the second user may have no permission to view content from all virtual whiteboard in a second region (such as a particular building, a particular floor, a particular room, etc.). In some examples, the determination that the second user is permitted to view the added content from the particular virtual whiteboard may be based on the first user. In one example, the rules associating users with permissions to view content from the particular virtual whiteboard may include rules associating the users with permissions based on identities of content creators associated with the content to be viewed. For example, the second user may be permitted to view content added to the particular virtual whiteboard by individuals of a first group of individuals. In another example, the second user may have no permission to view content added to the particular virtual whiteboard by individuals of a second group of individuals. The determination that the second user is permitted to view the added content from the particular virtual whiteboard may be based on whether the first user is included in the first group and/or based on whether the first user is included in the second group.

Figure 25:
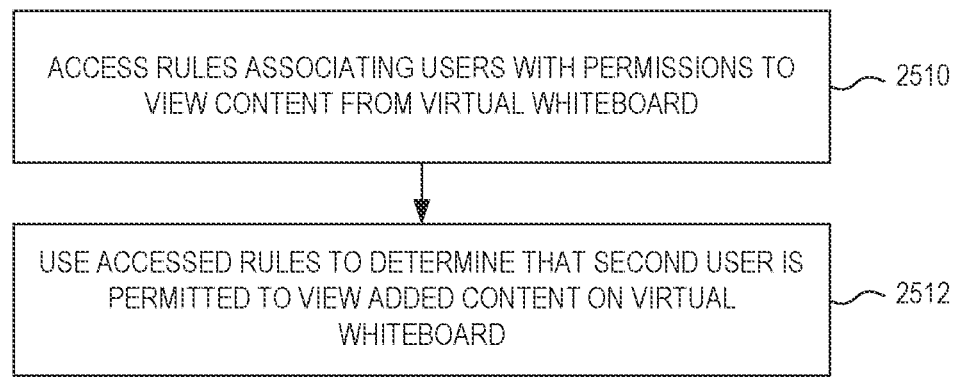
FIG. 25 is a flowchart illustrating an exemplary process for viewing content from a virtual whiteboard, consistent with some embodiments of the present disclosure.

FIG. 25 is a flowchart illustrating an exemplary process 2500 for viewing content from a virtual whiteboard consistent with some embodiments of the present disclosure. With reference to FIG. 25, in step 2510, instructions contained in a non-transitory computer-readable medium when executed by a processor may cause the processor to access rules associating users of wearable extended reality appliances with permissions to view content from the particular virtual whiteboard. In step 2512, instructions contained in a non-transitory computer-readable medium when executed by a processor may cause the processor to use the accessed rules to determine that the second user is permitted to view the added content on the particular virtual whiteboard.

In some examples, the determination that the second user is permitted to view the added content on the particular virtual whiteboard may be based on an age of the second user. Permissions to view content on a virtual whiteboard may be different for different ages of users. For example, a content item of a virtual whiteboard may be permitted to be viewed by users who are 18 years of age or older, and may not be permitted to be viewed by users who are under 18 years of age. The at least one processor may determine, based on the age of the second user, whether the second user is permitted to view content (e.g., the content added by the first user to the particular virtual whiteboard) on the particular virtual whiteboard. The age restriction for viewing a content item may be specified by the user who adds the content item to a virtual whiteboard, may be specified by other users, or may be configured based on policies (e.g., policies of an organization or group).

Further embodiments may involve receiving via the wireless network at a time before the second time period, an indication of at least one class of content of interest to the second user, determining that a first part of the added content is included in the at least one class of interest to the second user, and enabling the second user to view the first part of the added content. The at least one class of content of interest to the second user may be configured by the second user. For example, the second user may identify one or more classes of content, such as scientific content, research content, accounting content, financial content, administrative content, training content, professional content, personal content, or other categories of content. The at least one processor may receive an indication of one or more content classes, for example, at a time before the second time period at which the indication that the second wearable extended reality appliance is in the location of the particular virtual whiteboard is received.

The at least one processor may determine whether any part of the content added by the first user to the particular virtual whiteboard is included in at least one class of interest to the second user. In some examples, the at least one processor may perform content classification techniques on different parts of the added content to determine one or more classes for each of the different parts of the added content. In some examples, the first user may mark or tag each of the different parts of the added content with one or more suitable classes. The at least one processor may determine whether the class(es) for each of the different parts of the added content match one or more of the at least one class of interest to the second user. Based on determining that a first part of the added content is included in the at least one class of interest to the second user, the at least one processor may send the first part of the added content to the second wearable extended reality appliance, and enable the second user to view the first part of the added content via the second wearable extended reality appliance.

For example, with reference to FIG. 20 and FIG. 21, a first user 2016 may assign different content classes to the items that may be displayed on the virtual whiteboard 2012 (e.g., the text 2018, the image 2110, the document 2020, or the document 2022). A second user 2112 may identify an interest in one of the different content classes. An item, of the items, corresponding to the content class identified by the second user 2112 may be provided to the second user 2112 for viewing. One or more of the items not corresponding to the content class identified by the second user 2112 may not be provided to the second user 2112 for viewing.

In some examples, image data captured using an image sensor included in the first wearable extended reality appliance while the first user interacts with a first portion of the particular whiteboard may be received. For example, the image data may be received from the image sensor, from the first wearable extended reality appliance, from an intermediate device external to the first wearable extended reality appliance, from a memory unit, and so forth. The image data may be analyzed to detect a physical object moving in a trajectory, for example using an object tracking algorithm. In one example, the physical object and the first user may be on opposite sides of the particular whiteboard. In one example, a presentation of the particular whiteboard via the first wearable extended reality appliance may hide, at least partly, the physical object from the first user. For example, a ray casting algorithm may be used to determine that the particular whiteboard hides, at least partly, the physical object from the first user. In one example, the trajectory of the physical object may be analyzed, for example using an extrapolation algorithm, to determine a likelihood that the physical object is about to move through a second portion of the particular whiteboard. The second portion and the first portion of the particular whiteboard may be disjoint, may be identical, may have some but not all area in common, may have no area in common, and so forth. Further, a visual indication of the second portion may be provided to the first user, for example via the first wearable extended reality appliance. In some examples, the visual indication may further indicate at least one of the physical object, a type of the physical object, a velocity of the physical object, the trajectory, a distance of the physical object from the particular whiteboard, or a likely time of intersection of the physical object with the second portion of the particular whiteboard by the physical object. In some examples, the type of the physical object may be determined, for example by analyzing the image data using an object recognition algorithm. Further, in response to a first determined type of the physical object (such as a small physical object, a fly, etc.), providing the visual indication may be avoided, and in response to a second determined type of the physical object (such as a large physical object, a person, etc.), the visual indication may be provided. In another example, the physical object may be a person, in response to a determination that the person is using a wearable device that provides the person with an indication of the particular white board, providing the visual indication may be avoided, and in response to a determination that the person is not using a wearable device that provides the person with an indication of the particular white board, the visual indication may be provided. In one example, the visual indication of the second portion may include halting the presentation of the second portion of the particular whiteboard via the first wearable extended reality appliance. In another example, the visual indication of the second portion may include a presentation of a virtual object indicating the second portion of the particular whiteboard (such as an arrow, a halo, and so forth). In yet another example, the visual indication of the second portion may include a presentation of the second portion of the particular whiteboard with different presentation parameters.

Figure 26:
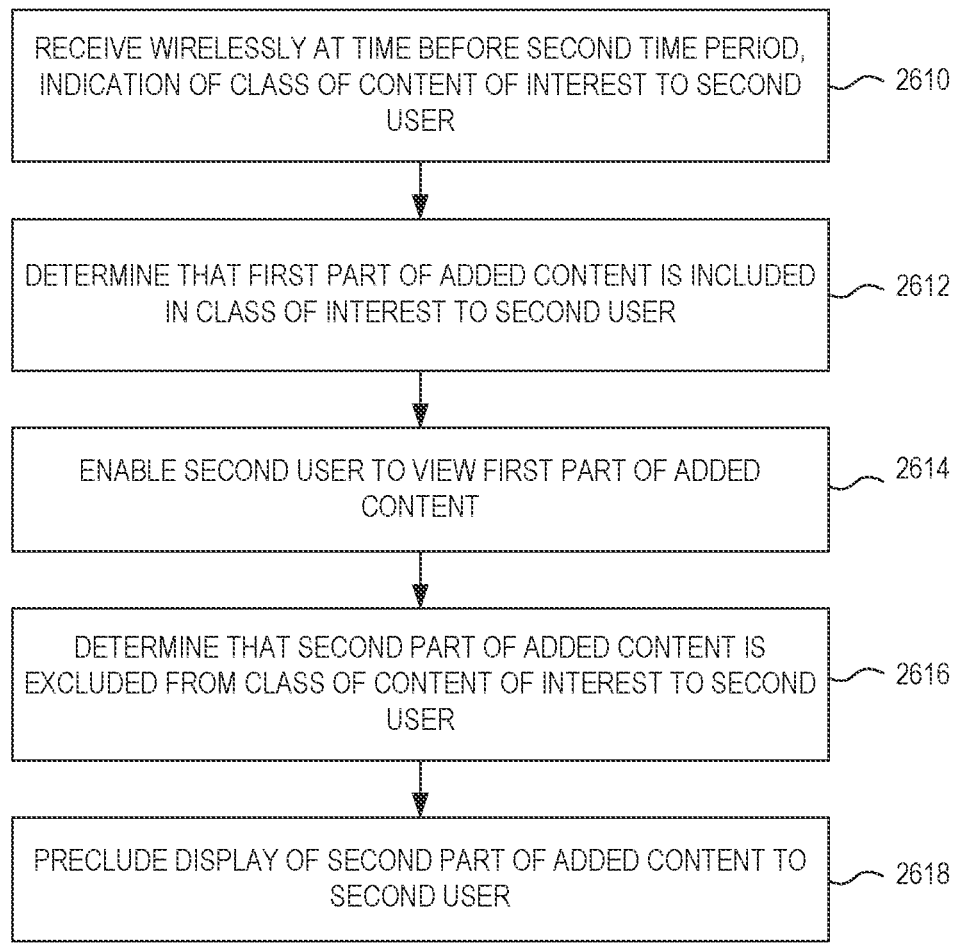
FIG. 26 is a flowchart illustrating an exemplary process for viewing virtual whiteboard content of interest to a user, consistent with some embodiments of the present disclosure.

FIG. 26 is a flowchart illustrating an exemplary process 2600 for viewing virtual whiteboard content of interest to a user consistent with some embodiments of the present disclosure. With reference to FIG. 26, in step 2610, instructions contained in a non-transitory computer-readable medium when executed by a processor may cause the processor to receive via the wireless network at a time before the second time period, an indication of at least one class of content of interest to the second user. In step 2612, instructions contained in a non-transitory computer-readable medium when executed by a processor may cause the processor to determine that a first part of the added content is included in the at least one class of interest to the second user. In step 2614, instructions contained in a non-transitory computer-readable medium when execute by a processor may cause the processor to enable the second user to view the first part of the added content.

Some embodiments may involve determining that a second part of the added content is excluded from the at least one class of content of interest to the second user, and precluding display of the second part of the added content to the second user. The at least one processor may determine whether any part of the content added by the first user to the particular virtual whiteboard is included in the at least one class of interest to the second user. In some examples, the at least one processor may perform content classification techniques on different parts of the added content to determine one or more classes for each of the different parts of the added content. In some examples, the first user may mark or tag each of the different parts of the added content with one or more suitable classes. The at least one processor may determine whether the class(es) for each of the different parts of the added content match one or more of the at least one class of interest to the second user. Based on determining that a second part of the added content is excluded from the at least one class of interest to the second user, the at least one processor may preclude display of the second part of the added content to the second user. In some examples, the second part of the added content includes advertising, such as commercials, television advertisements, newspaper advertisements, radio advertisements, online advertisements, or any other type of promotional announcement or publication.

For example, with reference to FIG. 20 and FIG. 21, a first user 2016 may assign different content classes to the items that may be displayed on the virtual whiteboard 2012 (e.g., the text 2018, the image 2110, the document 2020, or the document 2022). A second user 2112 may identify an interest in one of the different content classes. An item, of the items, corresponding to the content class identified by the second user 2112 may be provided to the second user 2112 for viewing. One or more of the items not corresponding to the content class identified by the second user 2112 may not be provided to the second user 2112 for viewing.

The one or more items not provided to the second user 2112 for viewing may, for example, include advertising.

In some examples, the second wearable extended reality appliance may be configured to receive via the wireless network at a time before the second time period, at least one indication of a class of content that the second user of the second wearable extended reality appliance is interested in viewing; receive the data corresponding to the content and the added content of the particular virtual whiteboard; determine that the added content is associated with the at least one class that the second user of the second wearable extended reality appliance is interested in viewing; and display to the second user of the second wearable extended reality appliance the added content. For example, the second wearable extended reality appliance may be further configured to: determine that a specific content associated with a different virtual whiteboard is associated with a class that the second user of the second wearable extended reality appliance is not interested in viewing; and avoid displaying to the second user of the second wearable extended reality appliance the specific content. In some examples, the specific content may include advertisements.

Viewing content in extended reality environment has significant advantages and disadvantages when compared to viewing content on a physical display. On one hand, the boundaries and size limit of the physical display vanishes, enabling viewing content of any size and in every place in the environment. Furthermore, the content may be three dimensional, and may interact with physical elements of the environment. Moreover, when it comes to privacy, content in extended reality may be viewed in private without the danger of someone catching a glimpse of the displayed content. On the other hand, display quality of extended reality appliances may be lesser than the one of physical displays, viewing the content may require usage of extended reality appliances which may be burdensome when used for long periods of time, and the content may not be easily shared with people that do not use extended reality appliances to share the extended reality environment. To enable users to enjoy the benefits of both mediums, it is desired to enable the user to easily move content from extended reality to physical displays and vise versa.

Some disclosed embodiments may include a non-transitory computer readable medium containing instructions that when executed by at least one processor cause the at least one processor to perform operations for transferring virtual content to a physical display device. Virtual content may include a virtual object, inanimate virtual content, animate virtual content configured to change over time or in response to triggers, virtual two-dimensional content, virtual three-dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. In one example, the virtual object may be or include a virtual display screen (also referred to as a "virtual display" or a "virtual screen" herein), as described above. An example of such virtual display screen may include virtual screen 112. Consistent with the present disclosure, the virtual content may include any visual presentation rendered by a computer or a processing device, for example presented in an extended reality environment by an extended reality appliance (for example, presented in an extended reality environment to a user via a wearable extended reality appliance). In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation.). The rendered visual presentation may change to reflect changes to a status object or changes in the viewing angle of the object, for example, in a way that mimics changes in the appearance of physical objects.

Figure 27:
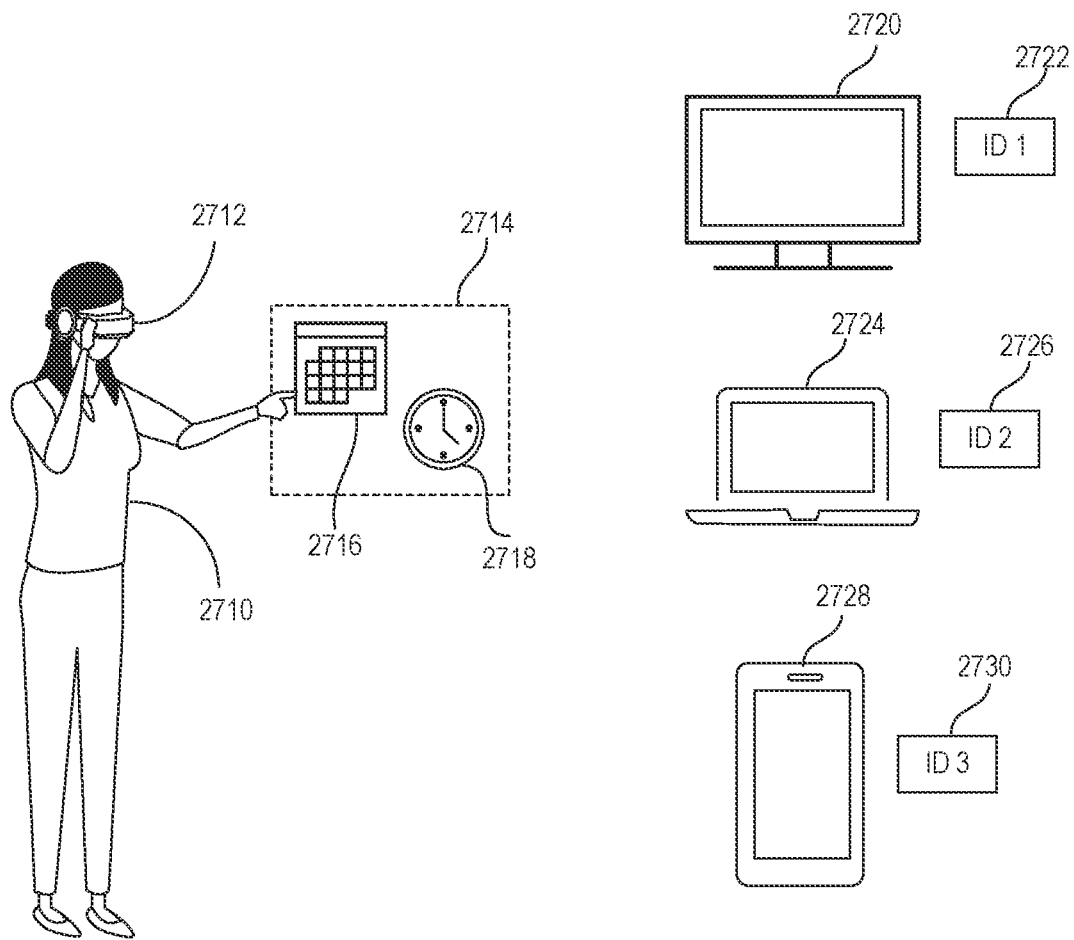
FIG. 27 illustrates examples of various physical display devices, consistent with some embodiments of the present disclosure.
Figure 28:
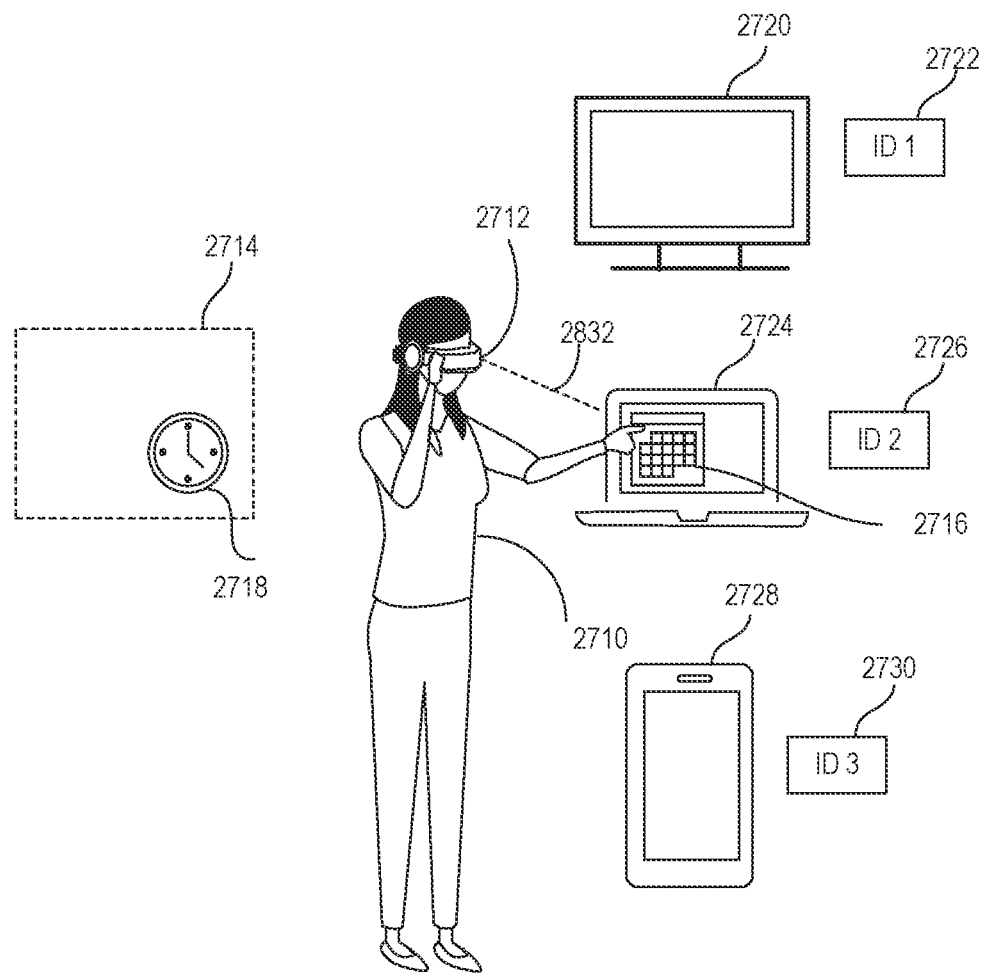
FIG. 28 illustrates an example of transferring virtual content to a physical display device, consistent with some embodiments of the present disclosure.

A physical display device (also referred to as a 'physical display', a 'physical display screen' or a 'physical screen' herein) may include a television, a monitor, a computer screen, a laptop screen, a phone screen, a tablet, a smartwatch screen or any other tangible output device for the presentation of information in a visual form. FIG. 27 illustrates examples of various physical display devices, consistent with some embodiments of the present disclosure. For example, the physical display device may be included in a computer 2720, in a laptop 2724, or in a phone 2728. Transferring virtual content to a physical display device may include relocating, transmitting, displacing, shifting, translating, or in any other way moving virtual content to the physical display device. It may be desirable to transfer virtual content to a physical device in order to view information presented in a virtual format in a different size or perspective, or to separate a presentation of virtual content that is too cluttered for proper viewing. For example, the virtual content may include several documents presented on top of one another or overlapping one another in some way. In this example, it may be desirable to transmit at least a portion of that virtual content, such as one of the documents, to a particular physical display device so that a user may view the information in that document more clearly. In another example, it may be desirable to transmit at least a portion of a virtual content to a particular physical display device so that other people, including people not using extended reality appliances or people not sharing the extended reality environment of the user, may view the virtual content. FIG. 28 illustrates an example of transferring virtual content to a physical display device, consistent connection with some embodiments of the present disclosure. For example, the virtual content 2716 may be a calendar that is transferred to a physical display device included in laptop 2724.

Some disclosed embodiments may include presenting an extended reality environment in a room via a wearable extended reality appliance, the wearable extended reality appliance being configured to be paired with multiple display devices located in the room, wherein each display device is associated with a unique network identifier. Multiple display devices located in the room may include two or more of the physical display devices described above. The multiple devices may include a variety of different types of physical display devices or a plurality of the same type of physical display device. For example, the multiple display devices may include three phones in the room. In another example, the multiple display devices may include one phone, one television, and one laptop in the room. It may be desirable to provide multiple display devices in the room so that the user may have a choice of ways in which to display the transferred virtual content, based on size, compatibility, or other features that may make a particular display device more appropriate for a given type of virtual content. For example, providing multiple display devices in the room including a phone, television, and laptop may allow a user to transfer virtual content better suited to each type of display device. The user may transfer messaging content to the phone, documents to the laptop, and videos to the television.

A unique network identifier may include a MAC address, IP address, address, domain name, code, serial number, name, mark, sign, character, emblem, token, or any other sequence of words, numbers, letters, or symbols that indicate the identity of a display device. The unique network identifier may belong to or may be connected with one particular display device. It may be desirable to use a unique network identifier so that communication is established with trusted devices with associated recognized unique network identifiers, and to avoid communicating sensitive information with devices that the user may not recognize. For example, a user of the wearable extended reality appliance may be in a room with many different types of display devices, and some of these display devices may not belong to the user or may belong to other individuals. By using unique network identifiers, the transfer of virtual content to a display device in that room may be more secure since the user may only transfer virtual content to a display device with a recognized unique network identifier. FIG. 27 illustrates examples of various physical display devices, consistent with some embodiments of the present disclosure. For example, the computer 2720 may be associated with unique network identifier "ID 1" 2722, the laptop 2724 may be associated with unique network identifier "ID 2" 2726, and the phone 2728 may be associated with unique network identifier "ID 3" 2730.

Some disclosed embodiments may include receiving input associated with the wearable extended reality appliance to cause presentation of a specific virtual object in the extended reality environment on a target display device. Receiving input may include obtaining an indication from a user, sensor information, from a device external to the wearable extended reality appliance (for example, from an input device, such as a keyboard, paired with the wearable extended reality appliance, from a computing device paired with the wearable extended reality appliance, and so forth), from a memory unit, from a database or a data-structure, or any other data or control signals by the at least one processor. Receiving input by obtaining an indication from the user may include any user interaction with any physical device configured to receive input from a user (such as a keyboard, a touch sensor, a computer mouse, a haptic glove, etc.) or from an environment of the user (for example through an image sensor, an audio sensor, a volumetric sensor, and so forth), and to provide the data to a computational device. In one example, receiving input by obtaining an indication from the user may include recognizing a gesture of the user (for example by analyzing image data using a visual gesture recognition algorithm), recognizing voice commands provided by the user (for example by analyzing audio data using a speech recognition algorithm), and so forth. The data provided to the computational device may be in a digital format and/or in an analog format. In one embodiment, the input device may store the input received from the user in a memory device accessible by a processing device (e.g., the at least one processor), and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, direction data, image data, or any other data. Some examples of the input device may include a button, a key, a keyboard, a computer mouse, a touchpad, a touchscreen, a joystick, a microphone, or another mechanism from which input may be received. Receiving input by obtaining sensor information may include acquiring data from a sound sensor, vibration sensor, acoustic sensor, chemical sensor, magnetic sensor, position sensor, optical sensor, image sensor, pressure sensor, force sensor, thermal sensor, proximity sensor, or any other device that detects events or changes in its environment and sends the detected information to other electronics.

In some embodiments, the input may be received from a pointing device associated with the wearable extended reality appliance. A pointing device may include a mouse, a touch screen, a joystick, a remote, or any other human interface device that allows a user to input spatial data to a computer. For example, the pointing device may be a mouse that is connected by either a wired or wireless connection to the wearable extended reality appliance.

Figure 30:
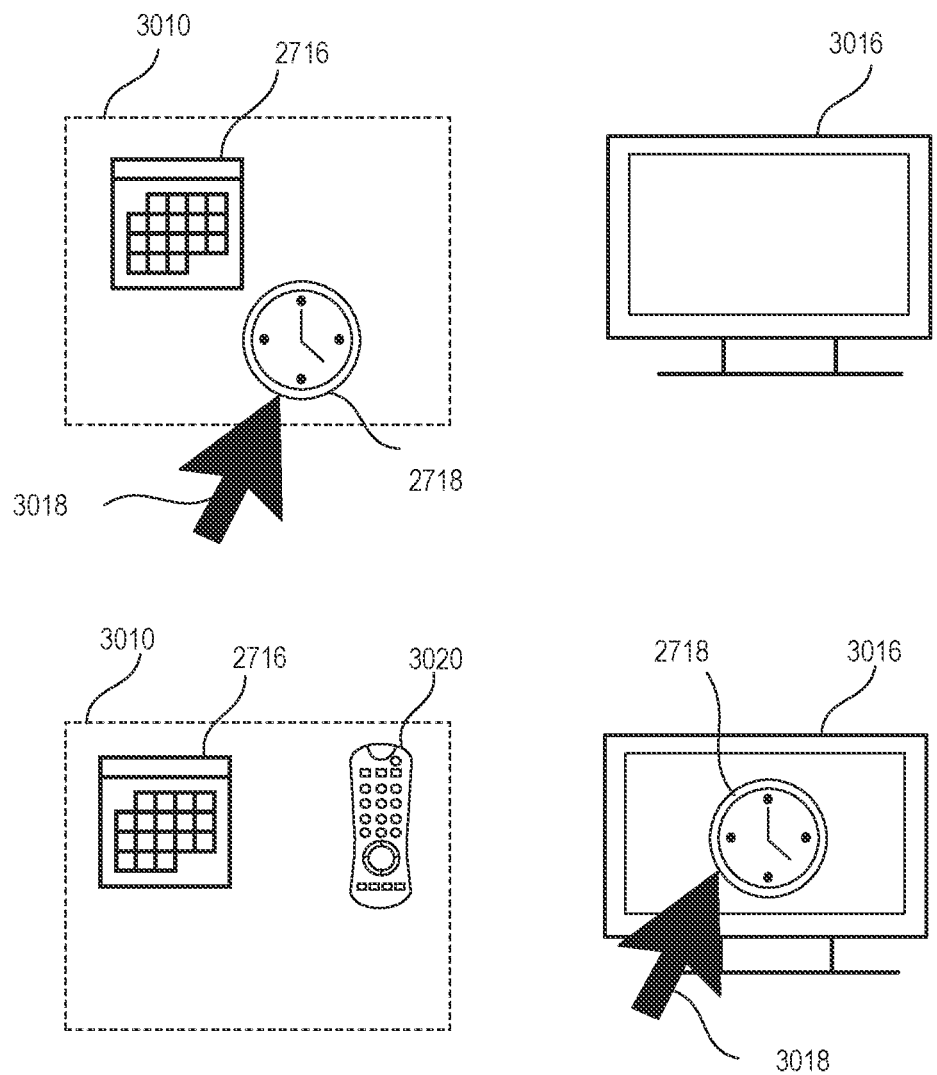
FIG. 30 illustrates an example of a pointing device input for transferring virtual content to a physical display device, consistent with some embodiments of the present disclosure.

Some disclosed embodiments may further include analyzing the input from the pointing device to determine a cursor drag-and-drop movement of the specific virtual object on the target display device. A cursor may include a pointer, arrow, text, or any other indicator used to show the current position of user interaction on a display in response to input from the pointing device. A cursor drag-and-drop movement may include any movement associated with a pointing device in which the user selects a virtual object and drags it to a different location. The virtual object may be selected by clicking, highlighting, or hovering over the virtual object using the pointing device. In FIG. 30, the virtual content 3010 includes virtual calendar 2716 and virtual clock 2718. In this example, a drag-and-drop movement of cursor 3018 is used to transfer the virtual clock 2718 to a target display device, for example, a computer 3016.

A target display device may include one of the multiple display devices located in the room that is selected to be the physical device to which the virtual content is to be transferred. It may be desirable to associate the input with the target display device so that the virtual content is only transferred to a physical display device that is intended or chosen by the user, rather than another of the multiple display devices that may not be appropriate for the type of virtual content being transferred. FIG. 27 illustrates examples of various physical display devices, consistent with some embodiments of the present disclosure. In FIG. 27, a user 2710 of a wearable extended reality appliance 2712 is standing in a room with multiple display devices including computer 2720 with associated unique network identifier "ID 1" 2722, laptop 2724 with associated unique network identifier "ID 2" 2726, and phone 2728 with associated unique network identifier "ID 3" 2730. The virtual content 2714 presented to user 2710 includes virtual calendar 2716 and virtual clock 2718.

FIG. 28 illustrates an example of transferring virtual content to a physical display device, consistent with some embodiments of the present disclosure. In FIG. 28, the virtual calendar 2716 of the virtual content 2714 including virtual calendar 2716 and virtual clock 2718 is transferred to the target display device, as caused by receiving input from the user 2710, for example in the form of a pointing gesture.

Some disclosed embodiments may include receiving image data from an image sensor associated with the wearable extended reality appliance, the image data depicting the target display device. Receiving image data from the image sensor may include receiving the image data continuously, or at regular or irregular intervals. Continuously receiving the image data may be desirable when the user intends to transfer a plurality of virtual content items to one or more physical display devices. For example, when the virtual content includes a clock, a calendar, and a document, continuously receiving the image data may be appropriate so that the user may transfer one, some, or all of the virtual content to one or more physical display devices. Receiving the image data at intervals may be desirable when the user may only want to transfer virtual content during a specific period of time. For example, the user may only want to transfer virtual content while at work. In such cases, receiving the image data only during working hours of the day may be appropriate so that the user may transfer virtual content at a time of their choosing without placing the burden of continuous receipt of image data on an associated processing system (e.g., the at least one processor). In other examples, the image data may be received in response to a trigger. Some non-limiting examples of such triggers may include receiving the input to cause presentation of a specific virtual object in the virtual environment on a target display device, receiving an input from a user, entering a specific space (such as a room), and so forth.

Some disclosed embodiments may include analyzing the image data to identify the target display device. Analyzing the image data may include object recognition, image segmentation, motion detection, video tracking, optical flow detection, or any other manner of extracting information from images acquired by the image sensor. For example, the processor may analyze the image data by performing object recognition on the image data to determine when a target display device is detected. Such object recognition may be accomplished through edge matching, divide-and-conquer search, greyscale matching, gradient matching, histograms of receptive field response, or any other technique for identifying objects in images or videos. In some examples, a machine learning model may be trained using training examples to identify display devices from images and/or videos. An example of such training example may include a sample image and/or a sample video of a sample display device, together with a label indicating the identity of the target display device. The trained machine learning model may be used to analyze the image data and identify the target display device. In some examples, a convolution of at least part of the image data may be calculated to obtain a result value of the calculated convolution. In response to a first result value of the calculated convolution, a first identity of the target display device may be determined, and in response to a second result value of the calculated convolution, a second identity of the target display device may be determined, the second identity may differ from the first identity.

In some embodiments, analyzing the image data to identify the target display device may include determining product visual characteristics based on the image data and comparing the product visual characteristics with stored reference data to thereby determine an identity of the target display device. Product visual characteristics may include a label, logo, emblem, symbol, tag, brand name, design, stamp, sticker, insignia, mark, size, aspect ratio, frame color, or any other visible feature associated with a specific product. Stored reference data may include any information used to classify or categorize the product visual characteristics or an identity of a display device. For example, the stored reference data may include data associating various logos with specific display devices. In another example, the stored reference data may include data associating various brand names with specific display devices. The reference data may be provided by a user or generated by the processor. Using product visual characteristics and stored reference data to determine the identity of the target display device may be desirable to automate the identification of the target display device, so that the processor may perform the identification using image processing instead of a manual identification by the user for every display device in the room. For example, a target display device may have product visual characteristics in the form of a logo on the surface of the target display device. In this example, the image data may be analyzed to detect logos, for example using visual logo recognition algorithm, the processed logo data may be associated with a database of logos associated with various display devices, and the identity of the target display device may be identified based on a match in the database with the detected logo data. In another example, a target display device may have product visual characteristics in the form of a display size and/or a display aspect ratio. In this example, the image data may be analyzed to determine the display size and/or the display aspect ratio, for example based on the measurements of the target display device in the image data. The determined display size and/or display aspect ratio may be compared with a database of display sizes and/or display aspect ratios associated with various display devices, and the identity of the target display device may be identified based on a match in the database with the determined display size and/or display aspect ratio.

Some disclosed embodiments may further include analyzing the image data to recognize content displayed by the target display device and to thereby determine an identity of the target display device. Content displayed by the target display device may include one or more of a symbol, image, sentence, word, letter, shape, sign, or any other visual information that may be displayed by the target display device. Using content displayed by the target display device may be desirable to automate the identification of the target display device, so that the processor may perform the identification using image processing instead of a manual identification by the user for every display device in the room. For example, the target display device may be configured to display a message that states, "meeting room TV." In this example, the processor may analyze the image data to recognize the message "meeting room TV" to determine that the target display device is a television located in or associated with the meeting room.

In some embodiments, analyzing the image data to identify the target display device may include determining a position based on the image data and comparing the position with stored position data to thereby determine an identity of the target display device. A position may include a location, area, environment, point, room, geography, locale, region, setting, site, space, surroundings, angle, direction, or any other indication of a way in which someone or something is arranged. The position may include a position of a user of the wearable user interface, another individual, a target display device, another display device, or any other object. Using a position may be desirable to automate the identification of the target display device, so that the processor may perform the identification using image processing instead of a manual identification by the user for every display device in the room. For example, the image data may be analyzed to identify that the target display device is in a meeting room. In this example, the meeting room information may be compared with stored position data that associates rooms with display devices to determine that the display device is a meeting room display device, such as a television or computer, as opposed to a personal display device, such as a phone.

Some disclosed embodiments may further include detecting in the image data a visual code associated with the target display device and processing the visual code to determine the identity of the target display device. A visual code may include a OR code, barcode, textual code, numerical code, specific visual pattern, or any other visible indication of association with the target display device utilizing any combination of letters, words, number, symbols, or images. Using a visual code to determine the identity of the target display device may be desirable to automate the identification of the target display device, so that the processor may perform the identification using image processing instead of a manual identification by the user for every display device in the room. For example, a target display device may have a visual code in the form of a QR code presented on the screen of the target display device. In this example, the image data may be processed to detect information in the OR code that associates the QR code with a specific display device and this information may be used to determine the identity of the target display device.

In some embodiments, the input may be received from the image sensor associated with the wearable extended reality appliance. This type of input may be desirable in order to reduce the number of devices used to transfer the virtual content to the physical display device. Additionally, since the user would be wearing the wearable extended reality appliance during the transfer, using the image sensor associated with the wearable extended reality appliance may ensure that the user can direct the input depending on the direction in which the user is facing.

Figure 29:
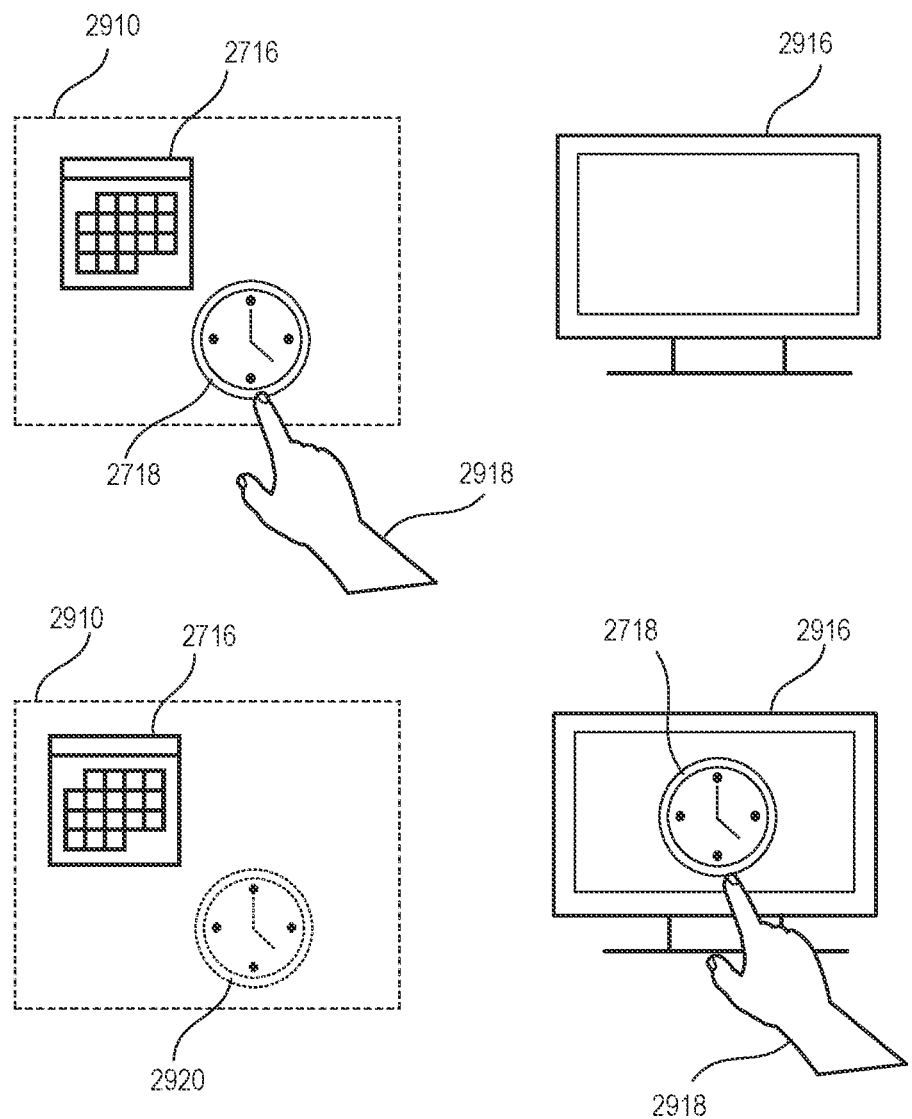
FIG. 29 illustrates an example of a user gesture for transferring virtual content to a physical display device, consistent with some embodiments of the present disclosure.

Some disclosed embodiments may further include analyzing the image data to identify a gesture initiated by a user of the wearable extended reality appliance that triggers a virtual collision between the specific virtual object and the target display device. A gesture may include any form of nonverbal communication in which bodily actions may be used to communicate. A gesture may include movement of the hand, fingers, leg, head, face, or other parts of the body. For example, a hand gesture may include pointing, dragging, clenching, opening, pinching, sliding, twisting, or rotating using the palm, one or more of the fingers, or the hand. In one example, the gesture may include a dragging of the virtual object to the target display device, a push the virtual object towards the target display device, and so forth. A virtual collision may include a contact, association, or any other encounter between the specific virtual object and the target display device. In some instances, the gesture may trigger a full transfer of the virtual object to the target display device. In other instances, the gesture may trigger a transfer of the virtual object to only a portion of the target display device. FIG. 29 illustrates an example of a user gesture for transferring virtual content to a physical display device, consistent connection with some embodiments of the present disclosure. In FIG. 29, the virtual content 2910 includes virtual calendar 2716 and virtual clock 2718. In this example, a user gesture 2918 of dragging the virtual clock 2718 to a target display device (i.e., computer 2916) triggers a virtual collision between the virtual clock 2718 and the target display device by causing the virtual clock 2718 and the target display device to at least partly be in a same common region of the extended reality environment.

Some disclosed embodiments may include upon identifying the target display device, determining a network identifier of the target display device. Determining a network identifier of the target display device may include using the identity of the target display device to access a data-structure or a database associating display devices with network identifiers, and thereby obtaining the network identifier of the target display device. In other examples, the network identifier of the target display device may be an encoding or another simple transformation of the identifier of the target display device. In other examples, determining a network identifier of the target display device may include scanning, examining, inspecting, or in any other way receiving information regarding a unique network identifier associated with a physical display device. The network identifier may be determined using an image sensor, a barcode reader, a magnetic stripe reader, or any other device that is capable of detecting an identifier. For example, a network identifier associated with a physical display device may be encoded on a barcode or another visual code, and the barcode number may be determined by using an image sensor to measure the intensity of light reflected back by the white spaces within the unique pattern of parallel bars in the barcode. The network identifier may also be obtained by requesting the target display device to transmit the identifier to the processor or the wearable extended reality appliance.

Some disclosed embodiments may include using the determined network identifier of the target display device to establish a communications link with the target display device. Establishing a communications link may include creating a communications channel that connects the target display device to at least one other device. The communications channel may be either a wired communication channel or a wireless communication channel. A wired communication channel may utilize coaxial cables, Ethernet, or any other channel that transmits information over a wired connection. A wireless communication channel may utilize Wi-Fi, Bluetooth™, or any other channel that transmits information without a wired connection. It may be desirable to establish a communications link with the target display device in order to ensure that information is only being communicated on a recognized communications channel, which may improve user privacy. For example, establishing a communications link with the target display device may include creating a Bluetooth™ or other wireless communication links between the target display device and another device so that the target display device and the other device may communicate wirelessly, allowing a wireless transfer of the virtual content to the target display device. Some non-limiting examples of such established communication link may include at least one of a communications link between the wearable extended reality appliance and the target display device, a communications link between a computing device associated with the wearable extended reality appliance and the target display device, a communications link between a computing device coordinating the extended reality environment and the target display device, a communications link between a computing device generating the virtual object and the target display device, a communications link between a computing device providing content for presentation to the wearable extended reality appliance and the target display device, and so forth. In FIG. 28, a determined network identifier "ID 2" 2726 of laptop 2724 is used to establish a communications link 2832 with the target display device (i.e., laptop 2724).

In some embodiments, the communications link may be established between the wearable extended reality appliance and the target display device. It may be desirable to establish the communications link between the wearable extended reality appliance and the target display device in order to enable a direct connection between the two devices. This may improve the speed of transfer between virtual content presented on the wearable extended reality appliance to the target display device. For example, in FIG. 28, a wireless communications link 2832 may be established between the wearable extended reality appliance 2712 and the target display device in the form of laptop 2724.

In some embodiments, the communications link may be established between a computing device associated with the wearable extended reality appliance and the target display device. A computing device may include a smartphone, keyboard, computer, or any other device that may be used to accept inputs, process the inputs, and output information. It may be desirable to establish the communications link between a computing device associated with the wearable extended reality appliance and the target display device in order to reduce a burden on an existing communications link between the wearable extended reality appliance and the target display device, or in the case that the computing device is better located or equipped to form a communications link with the target display device. For example, in a large room, a wearable extended reality appliance may be connected to a smartphone and may be located at a distance beyond the Wi-Fi range of the target display device. In this example, the smartphone may be located at a distance within the Wi-Fi range of the target display device. In such an instance, a Wi-Fi communications link may be established between the smartphone connected to the wearable extended reality appliance and the target display device because the smartphone may be better positioned to establish that Wi-Fi link.

Some disclosed embodiments may include transmitting data representing the specific virtual object to the target display device, wherein the transmitted data enables the target display device to present the specific virtual object. Transmitting the data may include communicating the data to the target display device using the established communications link. It may be desirable to use the established communications link in order to improve privacy by ensuring that a recognized communications channel is used to transfer the virtual content. Alternatively, transmitting the data may include communicating the data to the target display device using another communications link. It may be desirable to use another communications link to improve system efficiency and speed by reducing the burden on a single communications link for several types of communication. In FIG. 28, data representing the virtual calendar 2716 is transmitted to the target display device 2724 through the communications link 2832, and the transmitted data enables the target display device 2724 to present the virtual calendar 2716.

In some embodiments, the specific virtual object may be a virtual screen playing media content, and the transmission of the data may cause the media content to be presented through the target display device. In one example, virtual screen (also referred to as a "virtual display" or a "virtual display screen" herein) may include any bounded shape or presentation area, such as a rectangular window containing one or more virtual objects. Other examples are described above. Media content may include one or more of an image, data, text, sound, video, or any other information or experience directed at an end-user or audience in publishing, art, or communication. For example, the specific virtual object may be a virtual screen playing a movie, and the transmission of the data may cause the movie to be presented through the target display device. In some embodiments, the specific virtual object may be a virtual screen (also referred to as a "virtual display" or a "virtual display screen" herein) displaying content generated by a graphical operating system, and the transmission of the data may cause the content generated by the graphical operating system to be presented through the target display device. In one example, the graphical operating system may be paired with a physical keyboard, and text entered using the physical keyboard may be presented in a word processing application running over the operating system and (at least previously) displayed on the virtual screen. In this example, the transmission of the data may cause the word processing application running over the operating system to be displayed on the target display device, and therefore may cause text entered using the physical keyboard to appear on the target display device.

Some disclosed embodiments may further include determining that the specific virtual object is classified as private, requesting a permission for displaying the specific virtual object through the target display device, and transmitting the data representing the specific virtual object to the target display device only after receiving the permission. Some disclosed embodiments may also include in response to receiving a denial of the permission, avoiding transmitting the information. A private virtual object may include a virtual object that is confidential, exclusive, secret, discreet, non-public, or in any other way belonging to or for the use of one particular person or group of people only. Transmitting the data only after receiving the permission for a private virtual object may be desirable when a user does not wish to share the private virtual object (e.g., personal information) with the general public and may want to authorize each request for the private virtual object to ensure that the user is comfortable with sharing the information with a specific individual or group of individuals. For example, the specific virtual object may be a banking application of the user of the wearable extended reality appliance. In this example, the user's financial advisor may request a permission for displaying the banking appliance through a television in a meeting room consisting of the user and the financial advisor. The user may grant the permission since the financial advisor may be a trusted individual whom the user may trust with sensitive and confidential financial information presented on the banking application. Thus, the data representing the banking application may be transmitted to the television. In another example, the user may be waiting in the same meeting room for his financial advisor to arrive. In the meantime, if another individual that the user does not know requests permission for displaying the banking application through the television, the user may deny the permission. In this example, the transmission of the information would be avoided in order to preserve the confidentiality of the user's financial information.

Some disclosed embodiments may further include determining that the specific virtual object is classified as private, determining that the target display device is authorized for presenting the private information, and in response to the determination that the target display device is authorized for presenting the private information, transmitting the data representing the specific virtual object to the target display device. A private virtual object may include a virtual object similar to those described above. Transmitting the data in response to determining that the target display device is authorized for presenting the private information may be desirable to ensure that sensitive or confidential information is only presented on devices that are capable of and appropriate for displaying such information. For example, the specific virtual object may be a banking application of the user of the wearable extended reality appliance. In this example, the target display device may be a television in a meeting room of a bank associated with the banking application. In such an instance, the television may be determined to be authorized for presenting the banking application, and in response to this determination, the data representing the banking application may be transmitted to the television, so that financial information may be presented in a display device that is appropriate for the sensitive nature of the information. In another example using the same banking application, the target display device may be a computer in a living room of a friend whom the user is visiting. In this example, the computer may be determined to not be authorized for presenting the private information, and transmission of the data representing the banking application to the computer would be avoided in order to preserve the confidentiality of the user's financial information, which the user may not want the friend to view.

Some disclosed embodiments may further include determining that the specific virtual object is classified as private, analyzing the image data to determine presence of individuals other than a user of the wearable extended reality appliance exposed to the target display device, in response to a determination of no individuals other than the user exposed to the target display device, transmitting the data representing the specific virtual object to the target display device, and in response to a determination of more than one individual is exposed to the target display device, avoiding transmission of the data representing the specific virtual object to the target display device. A private virtual object may include a virtual object similar to those described above. Individuals exposed to the target display device may include individuals within a specific geographical range of the target display device, or individuals that may be able to view information displayed on the target display device. Transmitting information to the target display device based on the absence of individuals other than the user of the wearable extended reality appliance may be desirable to ensure that the confidentiality of the user's sensitive information is preserved by not presenting that information to individuals other than the user. For example, the specific virtual object may be a document containing secret information that the user may not wish to share with others, and the user may be standing in an office room, where the target display device is a computer. In this example, the image data may be analyzed to determine whether other individuals are in the office room, and in response to a determination that no other individuals are present in the office room, the data representing the document may be transmitted to the computer. Alternatively, the image data may be analyzed to determine that someone else is in the office room, and in response to a determination of that other individual's presence in the room, transmission of the data representing the document to the computer may be avoided, in order to preserve the confidentiality of the information in the document. In some examples, a machine learning model may be trained using training examples to determine presence of individuals exposed to display devices. An example of such training example may include a sample image and/or a sample video of a sample room including a sample display device, together with a label indicating whether individuals in the sample room are exposed to the sample display device. The trained machine learning model may be used to analyze the image data and determine the presence of individuals other than a user of the wearable extended reality appliance that are exposed to the target display device. In some examples, the image data may be analyzed to detect persons in the room and to determine pose of the detected persons, for example using a visual person detection algorithm and a visual pose estimation algorithm. Further, the pose and location of a person may be used to determine whether the person is exposed to the target display device, for example using ray casting algorithm involving the location of the eyes of the person (based on the determined pose).

Some disclosed embodiments may further include, after transmitting the data representing the specific virtual object to the target display device: determining that an individual other than the user is likely to be exposed to the target display device; and in response to the determination that the individual other than the user is likely to be exposed to the target display device, causing the target display device to cease presentation of the specific virtual object. An individual that is likely to be exposed to the target display device may include an individual within a specific geographical range or proximity of the target display device, an individual that may be able to view information displayed on the target display device, or an individual that is in a location where they may soon be within the specific geographical range of the target display device or be able to view information displayed on the target display device. Causing the target display device to cease presentation of the specific virtual object may include turning off the entire display of the target display device, removing the specific virtual object from the display of the target display device, or pixilating or blurring the virtual object to make it illegible. Ceasing presentation of the specific virtual object on the target display device in response to the determination that the individual other than the user is likely to be exposed to the target display device may be desirable to continuously preserve the confidentiality of sensitive information, even after an initial determination of an absence of other individuals is made. Continuing from the previous example where the data representing the document was transmitted to the computer, the processor may determine after this transmission that an individual other than the user is about to enter the office room, making the individual likely to be exposed to the computer. In this example, the computer may be turned off, or the document may be removed from the display presented on the computer, in order to preserve the confidentiality of the information in the document in view of the individual that may soon enter the office room.

Some disclosed embodiments may further include causing the specific virtual object to disappear from the extended reality environment once the specific virtual object is presented through the target display device. Causing the specific virtual object to disappear from the extended reality environment after its presentation through the target display device may be desirable to reduce the processing burden on the system and the redundancy of displaying the same information on two different modalities (e.g., physical display devices and one or more virtual screens) at the same time. Causing the specific virtual object to disappear from the extended reality environment may also reduce a user's visual confusion upon being presented with the same information on two different displays, thereby allowing the user to better focus on the information presented. For example, the specific virtual object may be a movie, and presenting the movie through both the wearable extended reality appliance and a target display device may cause confusion to the user, and may not allow the user to understand the movie. In this example, the processor may cause the movie to disappear from the extended reality environment once the movie is presented through the target display device, in order to avoid user confusion.

Some disclosed embodiments may further include displaying via the wearable extended reality appliance a virtual indicator indicating that the specific virtual object is presented through the target display device. A virtual indicator may include a color, pattern, shape, text, message, picture, symbol, or any other sign that that shows the condition or existence of the specific virtual object being presented through the target display device. It may be desirable to display the virtual indicator via the extended reality appliance so that a user of the wearable extended reality appliance may be put on notice of the specific virtual object being presented through the target display device. This may be relevant in cases where the specific virtual object was accidentally transmitted to the target display device. For example, in FIG. 29, the virtual clock 2718 is the specific virtual object that is presented through the target display device in the form of computer 2916. In this example, the virtual indicator may be a greyed-out virtual clock 2920 displayed via the wearable extended reality appliance to signal to the user of the wearable extended reality appliance that the virtual clock 2718 is being presented through computer 2916.

Some disclosed embodiments may further include generating a virtual controller associated with the target display device, the virtual controller enabling modification of display parameters of the target display device. A virtual controller may include a clicker, remote, joystick, wheel, pad, button, or any other mechanism for controlling any audio or visual aspect of an extended reality display. Generating a virtual controller associated with the target display device may be desirable to adjust a size, volume, angle, perspective, or any other audio or visual aspect of the target display device. For example, in FIG. 30, a virtual controller in the form of a remote 3020 is generated, wherein the remote 3020 is associated with the target display device in the form of computer 3016. In this example, the remote 3020 may be used to enlarge or reduce the size of the virtual clock 2718 presented on computer 3016 to enable a user to view the virtual clock 2718 better. In another example, the target display device may be a television presenting a video with sound. In this example, a virtual remote may be generated to control the volume of the television so that a user may better hear the sounds associated with the video presented on the television.

After the target display device begins presenting the specific virtual object, some disclosed embodiments may further include receiving additional input, and modifying the specific virtual object on the target display device based on the additional input. The additional input may be received from the user or the processor. The additional input may be received from the user through interaction with a user input device, such as a button, a key, a keyboard, a computer mouse, a touchpad, a touchscreen, a joystick, or another mechanism from which input may be received. The additional input may additionally, or alternatively, be received from the processor based on an automated assessment of further modifications that may be appropriate for the specific virtual object on the target display device. Modifying the specific virtual object may include adjusting or changing one or more of a size, angle, color, position, orientation, perspective, text, object, sound, or any other audio or visual aspect of the virtual object. It may be desirable to modify the specific virtual object on the target display device based on the additional input in order to allow a user to adjust a size of the virtual object to see it better, add text to a virtual document in order to complete work tasks, or in any other way change the virtual object to better fit the needs or desires of the user. For example, the specific virtual object may be a movie window, and the processor may determine that the size of the movie window is too large to fit entirely within a target television display. In this example, the processor may provide additional input to reduce the size of the movie window to fit within the screen of the television. In another example, the specific virtual object may be a document, and a user may provide additional input by typing into a keyboard text to be added to the document. In this example, the processor may receive the additional input to add the typed text to the document.

After the target display device begins presenting the specific virtual object, some disclosed embodiments may further include receiving an additional input indicating a desire of a user of the wearable extended reality appliance to stop presenting the specific virtual object through the target display device; and in response to receiving the additional input, causing the target display device to cease presentation of the specific virtual object by the target display device. An additional input indicating a desire of the user of the wearable extended reality appliance to stop presenting the specific virtual object through the target display device may be received through interaction with a user input device, such as those described above. Causing the target display device to cease presentation of the specific virtual object by the target display device may include transmitting information configured to cause the target display device to stop displaying the content to the system controlling the physical display, halting transmission of data to a system controlling the target display device, or in any other way stopping the presentation of the specific virtual object on the target display device. Ceasing presentation of the specific virtual object by the target display device in response to receiving additional input indicating such a desire of the user may be desirable so that the user may prevent others from viewing sensitive information, or if the user no longer wants to view information on the target display device. For example, the specific virtual object may be a document and after a target computer presents the document, the user may finish reading the document. In this example, the user may click a button to provide additional input indicating that the user no longer wishes to present the document on the computer, and in response to receiving this additional input, data may be transmitted to a system controlling the computer to cease presentation of the document on the computer, since the user has finished reading the document.

In some embodiments, the additional input indicating the desire of the user of the wearable extended reality appliance to stop presenting the specific virtual object through the target display device may include an indication that the wearable extended reality appliance left the room. An indication that the wearable extended reality appliance left the room may be provided through user input or sensor input. A user input may be received through interaction with a user input device, such as those described above. A sensor input may be received via data from a position sensor, image sensor, proximity sensor, or any other device that may generate information indicative of the presence or absence of the wearable extended reality appliance in the room. It may be desirable to stop presenting the specific virtual object through the target display device based on an indication that the wearable extended reality appliance left the room so that the processor is not burdened with presenting information that the user is not able to view, and so that others may not view the information after the user has left the room. For example, the room may be a living room, and a position sensor may provide information indicating that the wearable extended reality appliance has moved to a dining room. In this example, the indication that the wearable extended reality appliance has moved to a dining room may indicate the desire of the user of the wearable extended reality appliance to stop presenting the specific virtual object through the target display device in the living room, since the user is no longer in the living room to view the presented information.

Some disclosed embodiments may further include, after ceasing the presentation of the specific virtual object, receiving an indication that the wearable extended reality appliance reentered the room, and causing a renewal of the presentation of the specific virtual object by the target display device in response to the reentrance. An indication that the wearable extended reality appliance reentered the room may be provided through user input or sensor input. A user input may be received through interaction with a user input device, such as those described above. A sensor input may be received via data from a sensor, such as those described above. It may be desirable to renew the presentation of the specific virtual object through the target display device in response to the reentrance in order to improve processing speed by avoiding repeating the steps of receiving input associated with the wearable extended reality appliance, receiving image data from the image sensor, analyzing the image data to identify the target display device, upon identifying the target display device, determining a network identifier of the target display device, using the determined network identifier of the target display device to establish a communications link with the target display device, and transmitting data representing the specific virtual object to the target display device. Continuing from the example of the living room above, after ceasing presentation of the specific virtual object, the position sensor may provide information indicating that the wearable extended reality appliance has reentered the living room. In this example, a renewal of the presentation of the specific virtual object by the target display device may be caused in response to the reentrance, so that a user may once again view the specific virtual object without having to repeat the initial steps.

Some disclosed embodiments may further include receiving additional input to cause presentation of content from a second display device through the wearable extended reality appliance; receiving second image data from the image sensor, the second image data depicting the second display device; analyzing the second image data to identify the second display device; upon identifying the second display device, determining a network identifier of the second display device; using the determined network identifier of the second display device to establish a communications link with the second display device; receiving data representing the content from the second display device; and displaying through the wearable extended reality appliance the content from the second display device. The second display device may include a physical display device, such as one of those described above. It may be desirable to display through the wearable extended reality appliance the content from the second display device so that a user may view content in a virtual space which is not limited by the constraints of a physical display device, such as size or perspective. For example, the user may press a button to cause presentation of a movie from a second display device, such as a phone, through the wearable extended reality appliance. In this example, the processing steps described above may be performed so that the movie from the phone is displayed through the wearable extended reality appliance, so that the user may enlarge the size of the movie for better viewability.

Figure 31:
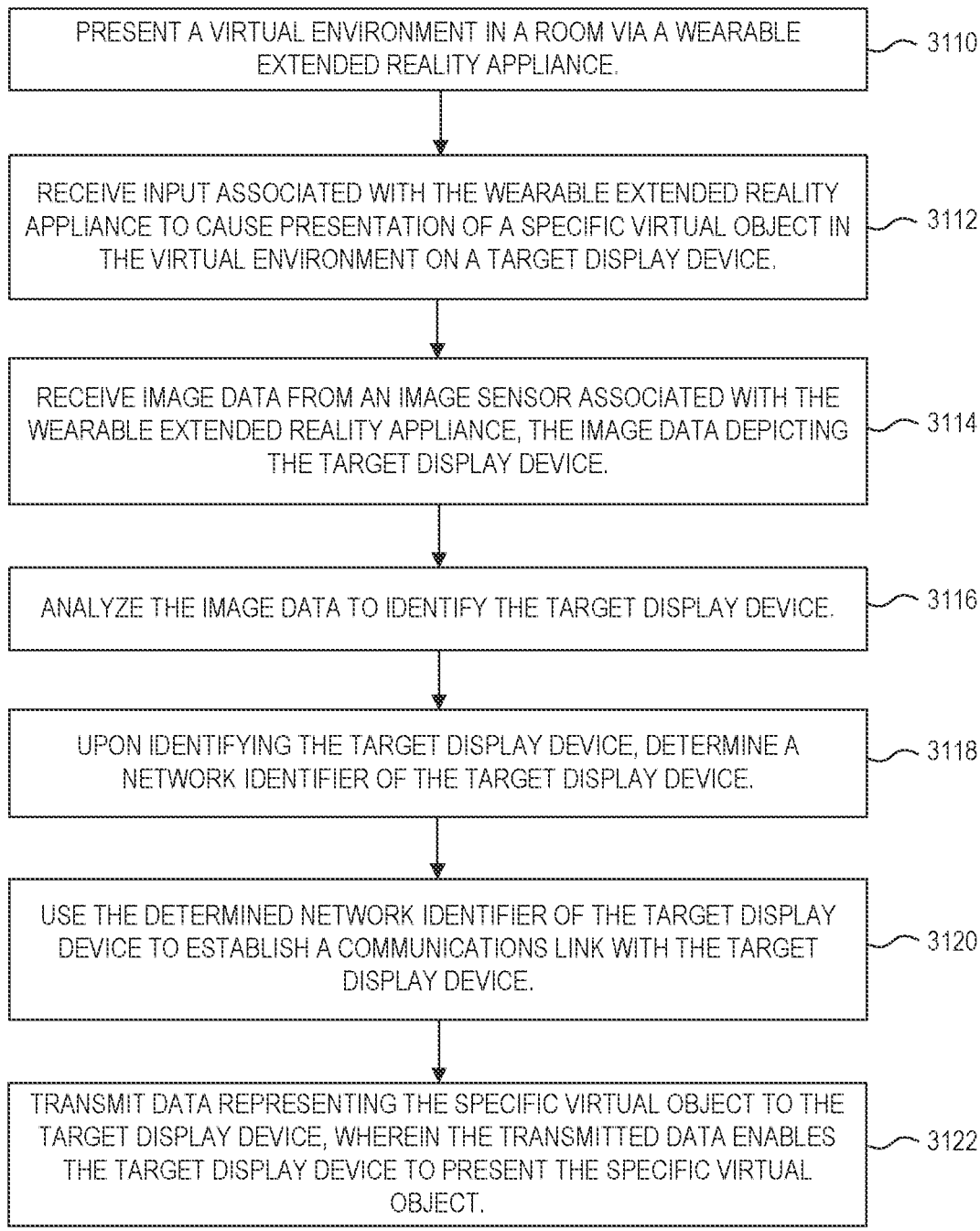
FIG. 31 is a flowchart of an exemplary method 3100 of transferring virtual content to a physical display device, consistent with some embodiments of the present disclosure.

Some embodiments may include a method for transferring virtual content to a physical display device. FIG. 31 is a flowchart of an exemplary method 3100 of coordinating virtual content display with mobility status, consistent connection with some embodiments of the present disclosure. Method 3100 may include a step 3110 of presenting an extended reality environment in a room via a wearable extended reality appliance, the wearable extended reality appliance being configured to be paired with multiple display devices located in the room, wherein each display device is associated with a unique network identifier. Method 3100 may include a step 3112 of receiving input associated with the wearable extended reality appliance to cause presentation of a specific virtual object in the extended reality environment on a target display device. Method 3100 may include a step 3114 receiving image data from an image sensor associated with the wearable extended reality appliance, the image data depicting the target display device. Method 3100 may include a step 3116 of analyzing the image data to identify the target display device. Method 3100 may include a step 3118 of upon identifying the target display device, determining a network identifier of the target display device. Method 3100 may include a step 3120 of using the determined network identifier of the target display device to establish a communications link with the target display device. Method 3100 may include a step 3122 of transmitting data representing the specific virtual object to the target display device, wherein the transmitted data enables the target display device to present the specific virtual object.

Some embodiments may include a system for transferring virtual content to a physical display device, the system comprising, at least one processor configured to: present an extended reality environment in a room via a wearable extended reality appliance, the wearable extended reality appliance being configured to be paired with multiple display devices located in the room, wherein each display device is associated with a unique network identifier; receive input associated with the wearable extended reality appliance to cause presentation of a specific virtual object in the extended reality environment on a target display device; receive image data from an image sensor associated with the wearable extended reality appliance, the image data depicting the target display device; analyze the image data to identify the target display device; upon identifying the target display device, determine a network identifier of the target display device; use the determined network identifier of the target display device to establish a communications link with the target display device; and transmit data representing the specific virtual object to the target display device, wherein the transmitted data enables the target display device to present the specific virtual object.

When discussing physically presented visual content, it is useful to visually indicate portions of the physically presented visual content, for example with hand gestures. When sharing virtually presented visual content among computers, for example in a video call, it is useful to visually indicate portions of the virtually presented visual content, for example using a mouse cursor controlled by one user and visible to the other user. However, when sharing content among extended reality appliances, the usage of a cursor to indicate portions of the content may be counterproductive, as it breaks the natural experience that the usage of extended reality appliances calls for. That is, it fails to mimic the experience of discussing physically presented visual content. It is therefore desire to allow visual indication of a portion of the content produced by a first user through natural hand gestures to be visually available to a second user viewing the content using an extended reality appliance at a remote location. When the extended reality is a mixed reality or an augmented reality, the position from which the first user use the hand gesture to indicate the portion of the content may not be available for the second user, for example due to different layouts of the physical spaces of the two users (for example, the first user may stand at a location in relation to the content that corresponds to a wall in the physical space of the second user). Therefore, in some cases it is desired to adjust the visual indications to the physical environments of the users.

Disclosed embodiments, including methods, systems, apparatuses, and non-transitory computer-readable media, may relate to simulating user interactions with shared content. Shared content may include any information communicated between two or more entities (e.g., users or devices). For example, the shared content may include visual content, textual content, audio content, graphical content, virtual white board, virtual display screen, two-dimensional content, three-dimensional content, animated content, inanimate content, live content, real-time content, Internet content, cinema content, television content, radio content, smartphone content, live events, physical objects, virtual objects, or any other type of information. In some examples, the shared content may be communicated between two or more wearable extended realty appliances. For example, content (physical or virtual) viewed by a user of a wearable extended reality appliance may be transmitted to another wearable extended reality appliance for display to another user.

A user interaction may include any action associated with a user or an entity. For example, the user interaction may include a finger gesture, a hand gesture, an eye gesture, a mouth gesture, a face gesture, or an action of one or more other parts of a person's body. As an example, the user interaction may include any finger or hand motion, such as a drag, a pinch, a spread, a swipe, a tap, a pointing, a scroll, a rotate, a flick, a touch, a zoom-in, a zoom-out, a thumb-up, a thumb-down, a touch-and-hold, or any other action of a finger or hand. As another example, the user interaction may include a location or movement of the attention (e.g., gaze) of a user. As another example, the user interaction may include a sound (e.g., voice) of a user. Additionally or alternatively, the user interaction may include an action via an object (physical or virtual), such as a pen, an eraser, a pointer stick, a laser pointer, a cursor, or any other item.

Simulating user interactions may include, for example, generating an indication of a user interaction of a user to another user. In some examples, a user may cause a user interaction (e.g., with particular content), and an indication of the user interaction may be transmitted for display to another user. A simulated user interaction may be based on a user interaction initiated by a user, and may be same as or similar to the initiated user interaction. In some examples, the simulated user interaction may be different from the initiated user interaction. As one example, the initiated user interaction may include a hand gesture, and the simulated user interaction may include a visual representation of the hand gesture. As another example, the initiated user interaction may include a hand gesture, and the simulated user interaction may include a visual indication of a pointer. The simulated user interaction may have one or more features same as or similar to the initiated user interaction, such as a location of a user interaction relative to content interacted with, an orientation of a user interaction relative content interacted with, a motion of a user interaction, a texture of a user interaction, or any other characteristic of a user interaction.

Some disclosed embodiments may relate to simulating user interactions with shared content, as described in greater detail herein. Users of wearable extended reality appliances may automatically share user interactions with shared content. For example, when a first user stands in front of a whiteboard (physical or virtual) and points to a specific part of the whiteboard, a second user's wearable extended reality appliance may display a virtual representation of the whiteboard with a virtual indicator identifying the specific part of the whiteboard to which the first user points, as described herein.

Some disclosed embodiments may include establishing a communication channel for sharing content and user interactions between a first wearable extended reality appliance (WER-Appliance) and at least one second wearable extended reality appliance. A communication channel may include any type of medium for transmitting data. A communication channel may include, for example, an IP (Internet Protocol) connection, a Wi-Fi connection, a WiMAX connection, a cellular connection (e.g., 2G, 3G, 4G, or 5G), a Bluetooth connection, a near-field communication (NFC) connection, a low-power wide-area networking (LPWAN) connection, an Ethernet connection, a power-line communication (PLC) connection, a satellite communication connection, a mobile network connection, a terrestrial microwave network connection, a wireless ad hoc network connection, or any other type of connection via a network. The communication channel may be wired or wireless. In some examples, the communication channel may be via a personal area network, a local area network, a metropolitan area network, a wide area network, a global area network, a space network, a peer-to-peer network, or any other type of computer network that may use data connections between network nodes.

In some examples, the communication channel may be established between the first wearable extended reality appliance and the at least one second wearable extended reality appliance. For example, the at least one processor may cause networking resources to be allocated for the first wearable extended reality appliance and the at least one second wearable extended reality appliance, such as network addresses, port numbers, or other types of networking configurations. In some examples, the at least one processor may execute processes that may be specified in network protocols (e.g., the transmission control protocol (TCP), the user datagram protocol (UDP), or any other protocol). In some examples, the communication channel may be established between a centralize system and each one of the first wearable extended reality appliance and the at least one second wearable extended reality appliance. That is, in some examples there may be no communication between wearable extended reality appliances that does not pass through the centralize system. Such centralized system may include one or more servers, a cloud platform, a distributed computing system, and so forth. Some non-limiting examples of such centralize system may include a system that controls the extended reality environment, a system that provides virtual content for presentation to the wearable extended reality appliances, and so forth. In one example, establishing the communication channel may include adding an association of the first wearable extended reality appliance and the at least one second wearable extended reality appliance in a data-structure maintained by the centralize system. When data is received from the first wearable extended reality appliance for sharing with other wearable extended reality appliances, the centralized system may access the data-structure to determine that the received data, or information based on the received data, needs to be shared with the at least one second wearable extended reality appliance, and vice versa.

Content may be shared via the communication channel. The shared content may include any information communicated between two or more entities (e.g., users or devices). For example, the shared content may include visual content, textual content, audio content, graphical content, two-dimensional content, three-dimensional content, animated content, inanimate content, live content, real-time content, Internet content, cinema content, television content, radio content, smartphone content, live events, physical objects, virtual objects, or any other type of information. User interactions may be shared via the communication channel.

Figure 32:
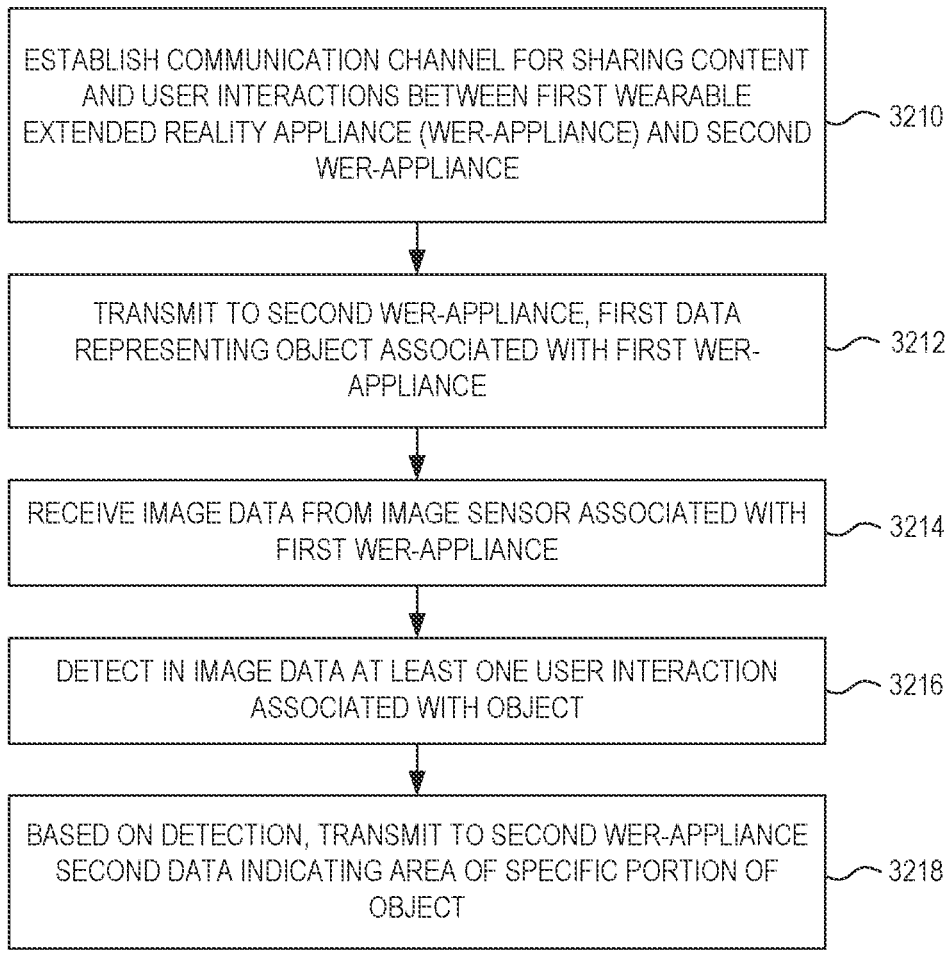
FIG. 32 is a flowchart illustrating an exemplary process for simulating user interactions with shared content, consistent with some embodiments of the present disclosure.

FIG. 32 is a flowchart illustrating an exemplary process 3200 for simulating user interactions with shared content consistent with some embodiments of the present disclosure. With reference to FIG. 32, in step 3210, instructions contained in a non-transitory computer-readable medium when executed by a processor may cause the processor to establish a communication channel for sharing content and user interactions between a first wearable extended reality appliance and at least one second wearable extended reality appliance.

Figure 34:
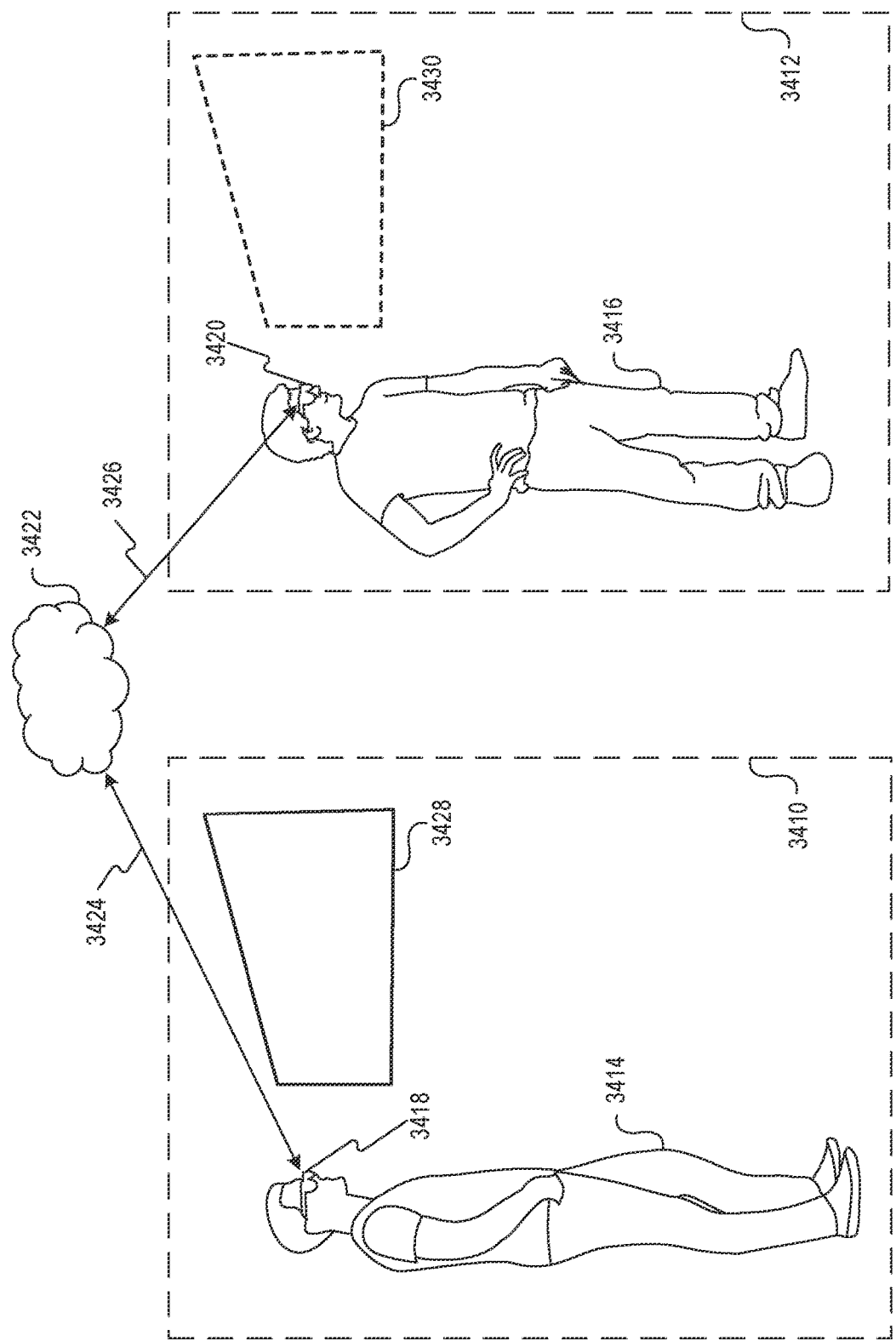
FIG. 34, FIG. 35, and FIG. 36 are schematic diagrams illustrating various use snapshots of an example system for simulating user interactions with shared content, consistent with some embodiments of the present disclosure.
Figure 35:
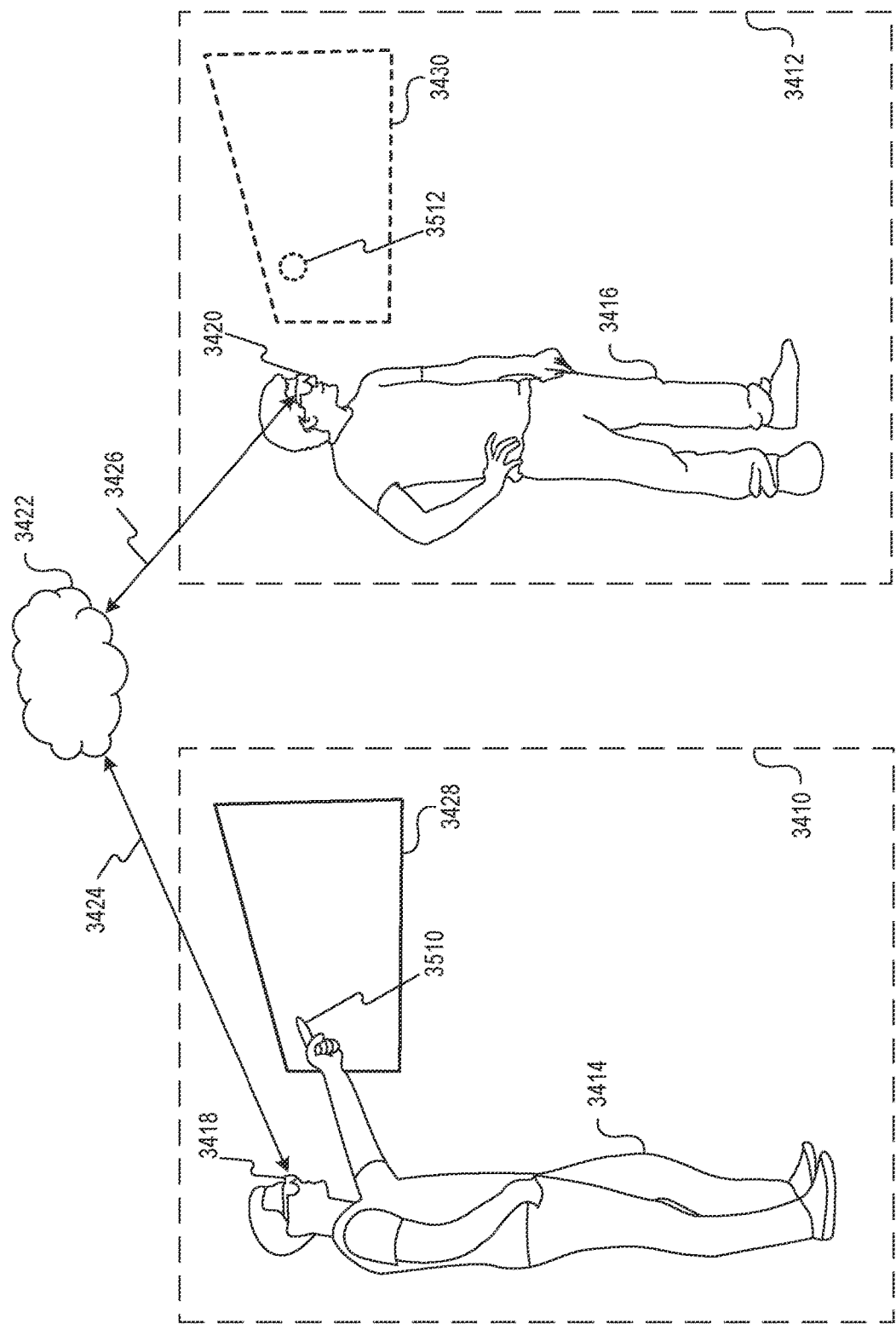
Figure 36:
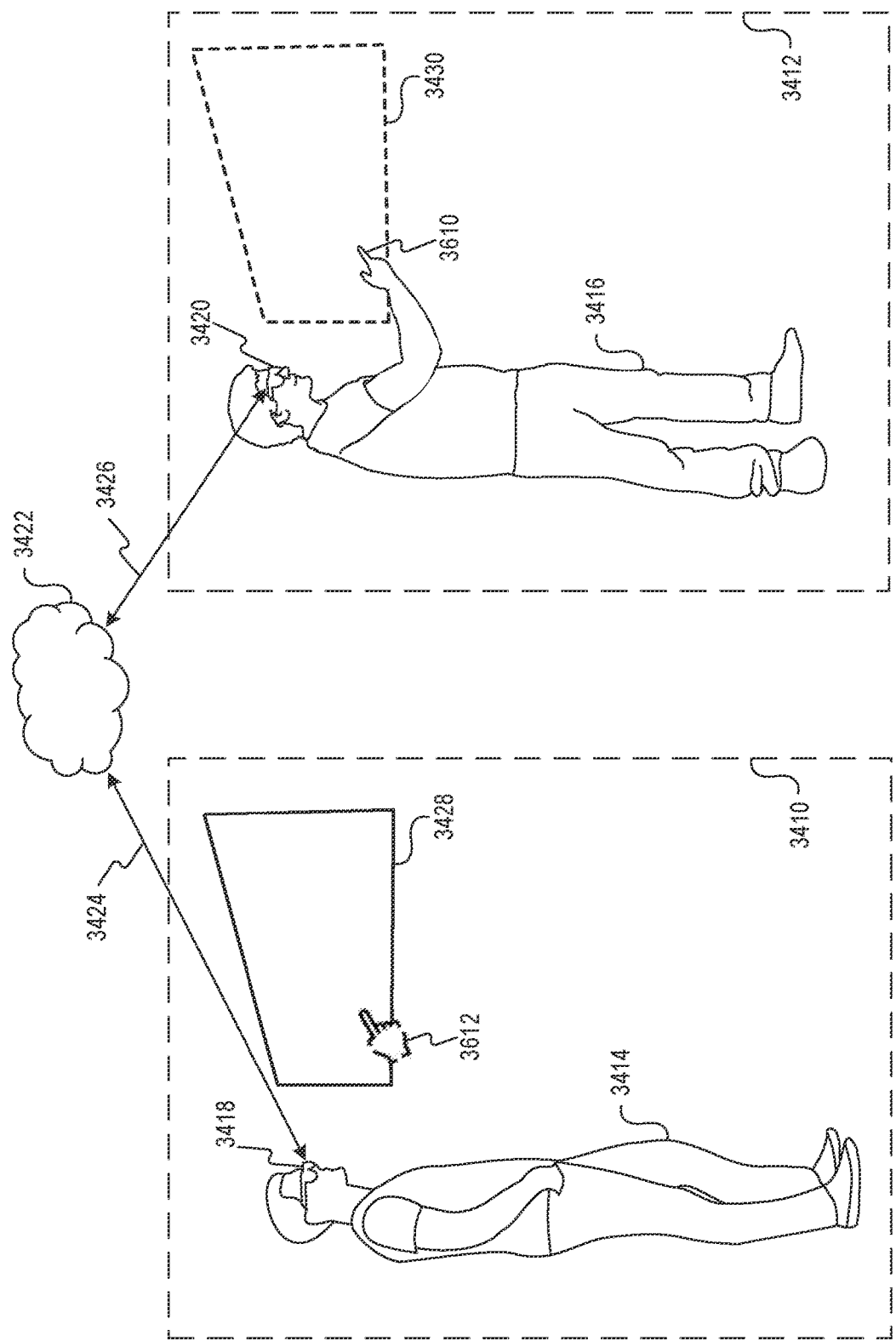

FIG. 34, FIG. 35, and FIG. 36 are schematic diagrams illustrating various use snapshots of an example system for simulating user interactions with shared content consistent with some embodiments of the present disclosure. With reference to FIG. 34, a first user 3414 using a first wearable extended reality appliance 3418 may be present in a first location 3410, and a second user 3416 using a second wearable extended reality appliance 3420 may be present in a second location 3412. A communication channel (e.g., based on a link 3424, a network 3422, and a link 3426) may be established between first wearable extended reality appliance 3418 and second wearable extended reality appliance 3420.

Some disclosed embodiments may include transmitting to the at least one second wearable extended reality appliance, first data representing an object associated with the first wearable extended reality appliance. The first data may enable a virtual representation of the object to be displayed through the at least one second wearable extended reality appliance. The object associated with the first wearable extended reality appliance may include any item with which a user may interact. In some examples, the object associated with the first wearable extended reality appliance may be a physical object, such as a whiteboard, a screen, a lamp, a desk, a table, a vase, a container, a printer, a shelf, a keyboard, a mouse, a touchpad, a cup, a telephone, a mobile device, a machine, a vehicle, a door, a window, a chair, a button, a surface, or any other type of physical item. In some examples, the object associated with the first wearable extended reality appliance may be a virtual object, such as a virtual widget, a virtual screen, a virtual whiteboard, a virtual keyboard, a virtual touchpad, a virtual button, a virtual surface, virtual furniture, a virtual desk, a virtual chair, a virtual window, a virtual decorative object, a virtual vase, an inanimate virtual object, an animate virtual object, or any other type of visual representation rendered by a computing device (e.g., a wearable extended reality appliance) and configured to represent an item. In one example, the first data may be transmitted from the first wearable extended reality appliance to the at least one second wearable extended reality appliance. In another example, the first data may be transmitted from a centralized system to the at least one second wearable extended reality appliance, for example in response to information received at the centralized system from the first wearable extended reality. The first data may be identical or different from the information received at the centralized system from the first wearable extended reality. Some examples of such centralized system are described above.

The first data representing the object associated with the first wearable extended reality appliance may include any information describing the object, such as textual data, imagery data (e.g., two-dimensional), modeling data (e.g., three-dimensional), feature data, or any other type of desired information. The first data may enable display of a visual representation of the object (e.g., by a wearable extended reality appliance). As one example, the first data may include data of a three-dimensional model of the object and may enable a wearable extended reality appliance to display a three-dimensional visual representation of the object. As another example, the first data may include data of a two-dimensional image of the object and may enable a wearable extended reality appliance to display a two-dimensional visual representation of the object. In some examples, the first data may indicate one or more features for the visual representation of the object, such as a size, a color scheme, a texture, a location, an orientation, or any other characteristic. The one or more features for the visual representation may be same as or similar to the one or more features of the object, so that the visual representation of the object may be same as or similar to the object in terms of a size, a color scheme, a texture, a location, an orientation, or any other feature.

At least one processor may determine (e.g., identify) the object associated with the first wearable extended reality appliance. In some examples, the at least one processor may receive image data that may be captured by image sensor(s) of the first wearable extended reality appliance. The image sensor(s) may be part of or separate from the first wearable extended reality appliance. The at least one processor may use the image data to identify the object (e.g., a physical object). The image sensor(s) may capture the image data of the scenes in front of (e.g., in the field of view of) the image sensor(s). When the object is located in front of (e.g., in the field of view of) the image sensor(s), the captured image data may indicate the object. The at least one processor may use image analysis algorithms to identify the object, and/or to determine the features (e.g., a size, a color scheme, a texture, a location, an orientation, or any other characteristic) of the object. Based on the image data, the at least one processor may generate the first data representing the object. For example, the at least one processor may use one or more captured images to construct a three-dimensional model of the object. In some examples, the construction of the three-dimensional model may include classifying the object into a category based on captured images, and adding, to a template three-dimensional model (e.g., predefined) for the determined category, extracted features of the object (e.g., a size, a color scheme, a texture, a location, an orientation, or any other characteristic). Additionally or alternatively, the construction of the three-dimensional model may be based on three-dimensional scanning devices (e.g., light detection and ranging (Lidar)), depth sensors, or range imaging sensors of the first wearable extended reality appliance. As another example, the at least one processor may use one or more captured images to determine a two-dimensional representation of the object. For example, the at least one processor may extract an imagery representation of the object (e.g., based on an image captured from a particular perspective).

In some examples, the at least one processor may receive data of the object associated with the first wearable extended reality appliance (e.g., a virtual object). The object may be displayed by the first wearable extended reality appliance. For example, the object may be displayed in a field of view of a display system of the first wearable extended reality appliance. The at least one processor may determine the first data based on the received data of the object (e.g., being displayed by the first wearable extended reality appliance). In some examples, the first data may be same as or similar to the received data, so that the object may be displayed in a same or similar manner by the first wearable extended reality appliance and the at least one second wearable extended reality appliance to which the first data may be transmitted. In some examples, the first data may be a changed (e.g., simplified or compressed) version of the received data. In some examples, the object may be a three-dimensional virtual object virtually displayed by the first wearable extended reality appliance and the first data may be configured to cause a display, via the at least one second wearable extended reality appliance, of the three-dimensional virtual object. In some examples, the first data may be configured to cause a display of the three-dimensional virtual object via the at least one second extended reality appliance in a size corresponding to a size of the three-dimensional virtual object displayed via the first extended reality appliance. A size may include, for example, a height, a width, a depth, or any other measurement. In some examples, the first data may be configured to cause a display of the three-dimensional virtual object via the at least one second extended reality appliance with a feature (e.g., a color scheme, a texture, a location, an orientation, or any other characteristic) corresponding to a feature of the three-dimensional virtual object displayed via the first extended reality appliance.

In some examples, the object may be a two-dimensional virtual object virtually displayed by the first wearable extended reality appliance and the first data may be configured to cause a display, via the at least one second wearable extended reality appliance, of the two-dimensional virtual object. In some examples, the first data may be configured to cause a display of the two-dimensional virtual object via the at least one second extended reality appliance in a color scheme corresponding to a color scheme of the two-dimensional virtual object displayed via the first extended reality appliance. A color scheme may include, for example, a choice of colors used in a design for creating style and/or appeal, or any other choice of colors. In some examples, the first data may be configured to cause a display of the two-dimensional virtual object via the at least one second extended reality appliance with a feature (e.g., a size, a texture, a location, an orientation, or any other characteristic) corresponding to a feature of the two-dimensional virtual object displayed via the first extended reality appliance.

The at least one processor may transmit to the at least one second wearable extended reality appliance (e.g., via the established communication channel), the first data representing the object associated with the first wearable extended reality appliance. The first data may enable a virtual representation of the object to be displayed through the at least one second wearable extended reality appliance. The virtual representation of the object may include, for example, any visual display rendered by a computing device (e.g., a wearable extended reality appliance) and configured to represent the object.

With reference to FIG. 32, in step 3212, instructions contained in a non-transitory computer-readable medium when executed by a processor may cause the processor to transmit to the at least one second wearable extended reality appliance, first data representing an object associated with the first wearable extended reality appliance, the first data enabling a virtual representation of the object to be displayed through the at least one second wearable extended reality appliance.

With reference to FIG. 34, an object 3428 associated with first wearable extended reality appliance 3418 may be present or presented in first location 3410. Object 3428 may include a physical object or a virtual object. As one example, object 3428 may include a physical whiteboard, or a virtual whiteboard displayed by first wearable extended reality appliance 3418. At least one processor (e.g., associated with first wearable extended reality appliance 3418 or with a centralized system as described above) may determine first data representing object 3428, and may transmit the first data to second wearable extended reality appliance 3420. The transmission of the first data may be via the established communication channel (e.g., based on link 3424, network 3422, and link 3426). Second wearable extended reality appliance 3420 may receive the first data and may, based on the received first data, cause display of a virtual representation 3430 of object 3428. For example, second user 3416 may view virtual representation 3430 via second wearable extended reality appliance 3420.

In some examples, the object may be an inanimate object physically located in proximity to the first wearable extended reality appliance, and the first data may include a representation of the inanimate object. The inanimate object may include any physical item that may lack motion (e.g., may be motionless). The inanimate object may include, for example, a whiteboard, a desk, a table, a vase, a container, a shelf, a cup, a chair, a surface, or any other physical item that may lack motion. The object associated with the first wearable extended reality appliance may be the inanimate object physically located in proximity (e.g., 0.1 meters, 0.5 meters, 1 meter, 2 meters, 3 meters, 5 meters, 10 meters, or any other desired distance) to the first wearable extended reality appliance. The representation of the inanimate object may include any information describing the inanimate object, such as textual data, imagery data (e.g., two-dimensional), modeling data (e.g., three-dimensional), feature data, or any other type of desired information.

In some examples, the first data may enable display of a virtual representation of the inanimate object in a size corresponding to an actual size of the inanimate object. At least one processor may measure the actual size (e.g., height, width, depth, or any other measurement) of the inanimate object, for example, based on image data captured by an image sensor associated with the first wearable extended reality appliance. In some examples, additional or alternative sensor(s) may be used to capture data (e.g., distance data, depth data, position data, orientation data, perspective data, or any other information) for measuring the actual size of the inanimate object. In some examples, based on data captured by the sensor(s), the at least one processor may construct a model (e.g., three-dimensional) of the inanimate object to have a size corresponding to the actual size of the inanimate object. The first data may include information of a determined size of the inanimate object, and may enable display of a virtual representation of the inanimate object in a size corresponding to an actual size of the inanimate object. The virtual representation of the inanimate object may include, for example, any visual display rendered by a computing device (e.g., a wearable extended reality appliance) and configured to represent the inanimate object.

Some disclosed embodiments may include detecting changes associated with the inanimate object, and transmitting third data representing the changes to the at least one second wearable extended reality appliance. The third data may enable a virtual representation of the changes to be displayed through the at least one second wearable extended reality appliance. For example, at least one processor may, periodically or continuously, monitor the inanimate object to detect changes associated with the inanimate object. The monitoring may be based on, for example, image data captured by an image sensor and/or data captured by other sensor(s). For example, the at least one processor may compare a current captured image of the inanimate object with a previous captured image of the inanimate object, and may detect changes associated with the inanimate object if a difference between the current and previous captured images of the inanimate object satisfies (e.g., meets or exceeds) a threshold. In some examples, the changes may include markings. For example, if the inanimate object is a whiteboard, the changes may include writing on the whiteboard.

The at least one processor may transmit third data representing the changes to the at least one second wearable extended reality appliance. The third data may include any information for describing the changes. The third data may enable a virtual representation of the changes to be displayed through the at least one second wearable extended reality appliance. The virtual representation of the changes may include, for example, any visual display rendered by a computing device (e.g., a wearable extended reality appliance) and configured to represent the changes. In some examples, the third data may indicate the changes, which may be applied to a previous virtual representation of the inanimate object. In some examples, the third data may indicate a representation of the inanimate object with the changes, which representation may be displayed to replace a previous virtual representation of the inanimate object.

Some disclosed embodiments may include receiving image data from an image sensor associated with the first wearable extended reality appliance. The image sensor may be part of or separate from the first wearable extended reality appliance. The image sensor may be configured to capture image data of the scenes in front of (e.g., in the field of view of) the image sensor. The image sensor may, periodically or continuously, capture images and transmit captured images to at least one processor. The at least one processor may receive the image data from the image sensor.

With reference to FIG. 32, in step 3214, instructions contained in a non-transitory computer-readable medium when executed by a processor may cause the processor to receive image data from an image sensor associated with the first wearable extended reality appliance.

Some disclosed embodiments may include detecting in the image data at least one user interaction associated with the object. The at least one user interaction may include a human hand pointing to a specific portion of the object. The at least one user interaction associated with the object may include any action associated with a user or the object (physical or virtual). The at least one user interaction may be directed to the object. In some examples, the at least one user interaction may include a human hand pointing to a specific portion of the object. The specific portion of the object may include any location, point, area, or space of the object. In some examples, the at least one user interaction may include a finger gesture, a hand gesture, an eye gesture, a mouth gesture, a face gesture, or an action of other part(s) of a person's body, directed to the object. As an example, the at least one user interaction may include any finger or hand motion associated with the object, such as a drag, a pinch, a spread, a swipe, a tap, a pointing, a scroll, a rotate, a flick, a touch, a zoom-in, a zoom-out, a thumb-up, a thumb-down, a touch-and-hold, or any other action of a finger or hand. As another example, the at least one user interaction may include a location or movement of the attention (e.g., gaze) of a user on the object. As another example, the at least one user interaction may include a sound (e.g., voice) of a user associated with the object. Additionally or alternatively, the at least one user interaction may include an action with the object via another object (physical or virtual), such as a pen, an eraser, a pointer stick, a laser pointer, a cursor, or any other item.

At least one processor may detect the at least one user interaction in the image data received from the image sensor associated with the first wearable extended reality appliance. For example, the at least one processor may perform image analysis algorithms (e.g., gesture recognition algorithms) based on the image data to detect the at least one user interaction. The at least one processor may detect the at least one user interaction, for example, based on a structure, a shape, a pose, a position, a location, an orientation, or any other feature of a human hand (or other body part(s)) or a portion thereof. In some examples, the detection of the at least one user interaction may be based on additional or alternative sensor(s) associated with (e.g., part of or separate from) the first wearable extended reality appliance, such as a depth sensor, a range imaging sensor, a haptic glove, a wired glove, a data glove, a computer mouse, a touchpad, or any other device configured to capture information for detecting the at least one user interaction. The detection of the at least one user interaction may be based on one or more of various types of gesture recognition algorithms, such as algorithms based on three-dimensional models, skeletal-based algorithms, appearance-based models, or other types of algorithms for recognizing gestures.

In some examples, the at least one user interaction may include a human hand pointing to a specific portion of the object associated with the first wearable extended reality appliance. The specific portion of the object may include any location, point, area, or space of the object. The at least one processor may determine the specific portion of the object to which the human hand may be pointing. For example, if a pointing end of the human hand (e.g., a tip of a pointing finger) touches on the object, the at least one processor may determine the specific portion of the object to be the location where the pointing end of the human hand touches on the object. As another example, if a pointing end of the human hand (e.g., a tip of a pointing finger) does not touch on the object, the at least one processor may determine the specific portion of the object to be a location where a pointing direction of the human hand as extended towards the object reaches the object, to be a location where a pointing end of the human hand is mapped onto the object (e.g., the mapping of the pointing end may be perpendicular, approximately perpendicular, or in any other desired angle to a nearby surface of the object), or to be any other desired location determined based on the pointing human hand. Additionally or alternatively, the specific portion of the object may be determined based on, for example, eye tracking of the eye(s) of a user initiating the at least one user interaction. For example, the attention (e.g., gaze) of the user determined based on the eye tracking may be used to confirm or adjust a location of the specific portion of the object.

With reference to FIG. 32, in step 3216, instructions contained in a non-transitory computer-readable medium when executed by a processor may cause the processor to detect in the image data at least one user interaction associated with the object, the at least one user interaction including a human hand pointing to a specific portion of the object.

With reference to FIG. 35, first user 3414 may initiate a user interaction 3510 associated with object 3428. User interaction 3510 may include a human hand (e.g., of first user 3414) pointing to a specific portion of object 3428. At least one processor (e.g., associated with first wearable extended reality appliance 3418 or with a centralized system as described above) may detect user interaction 3510, for example, based on image data from an image sensor associated with first wearable extended reality appliance 3418.

Some disclosed embodiments may include, based on the detection of the at least one user interaction in the image data, transmitting to the at least one second wearable extended reality appliance second data indicating an area of the specific portion of the object. The area of the specific portion of the object may include, for example, an area within, surrounding, overlapping with, coextensive with, extending beyond, or otherwise associated with the specific portion of the object. In some examples, the area of the specific portion of the object may include an area centered around a location to which a human hand may point. The area of the specific portion of the object may have any desired size, color, shape, contour, visual effect, animation, or other features. The second data may include any information for describing the area of the specific portion of the object. At least one processor may determine the area of the specific portion of the object, for example, based on the determined specific portion of the object. In one example, the second data may be transmitted from the first wearable extended reality appliance to the at least one second wearable extended reality appliance. In another example, the second data may be transmitted from a centralized system to the at least one second wearable extended reality appliance, for example in response to information received at the centralized system from the first wearable extended reality. The second data may be identical or different from the information received at the centralized system from the first wearable extended reality. Some examples of such centralized system are described above.

Based on the detection of the at least one user interaction in the image data, the at least one processor may transmit to the at least one second wearable extended reality appliance the second data indicating the area of the specific portion of the object. The at least one second wearable extended reality appliance may receive the second data and may, based on the second data, cause display of an indication of the area of the specific portion of the object. The indication of the area may be displayed in connection with the virtual representation of the object displayed via the at least one second wearable extended reality appliance. A location of the indicated area relative to the virtual representation of the object may be same as or similar to the location of the specific portion relative to the object. The indication of the area on the virtual representation of the object may simulate the at least one user interaction with the object, and may show to a user associated with the at least one second wearable extended reality appliance the at least one user interaction with the object. The indication of the area on the virtual representation of the object may be in any desired form, such as highlighting the area with any desired color, displaying a virtual hand pointing to the area, displaying a particular shape (e.g., a circle, a square, a triangle, or any other desired shape) covering the area, moving a cursor to the area, or in any other manner for displaying the indication of the area.

Some disclosed embodiments may include transmitting the second data to a plurality of second wearable extended reality appliances. In some examples, the transmissions of the second data may be configured to cause a displaying of differing virtual indicators by the plurality of second wearable extended reality appliances. The differing virtual indicators may be in various desired forms, such as a cursor, a virtual hand, highlighting, a particular shape, or in any other form that serves to indicate. At least one processor may transmit the second data to the plurality of second wearable extended reality appliances. The plurality of second wearable extended reality appliances may, in response to receiving the second data, cause display of the differing virtual indicators. The differing virtual indicators may be pointing to or be directed to the area of the specific portion of the object (e.g., as virtually displayed via the plurality of second wearable extended reality appliances).

With reference to FIG. 32, in step 3218, instructions contained in a non-transitory computer-readable medium when executed by a processor may cause the processor to, based on the detection of the at least one user interaction in the image data, transmit to the at least one second wearable extended reality appliance second data indicating an area of the specific portion of the object.

With reference to FIG. 35, at least one processor (e.g., associated with first wearable extended reality appliance 3418 or with a centralized system as described above) may, based on detecting user interaction 3510, transmit to second wearable extended reality appliance 3420 second data indicating an area of the specific portion of object 3428 which the human hand of user interaction 3510 may point to. The transmission of the second data may be, for example, via the established communication channel (e.g., based on link 3424, network 3422, and link 3426). Second wearable extended reality appliance 3420 may receive the second data and may, based on the second data, cause display of an indication 3512 of the area of the specific portion. Indication 3512 may be displayed in connection with virtual representation 3430 of object 3428, to simulate user interaction 3510 with object 3428. Indication 3512 may be in a form of a circle covering the area of the specific portion. In some examples, indication 3512 may be in a form of a virtual hand pointing to the area of the specific portion, or in any other desired form.

In one implementation, the detected at least one user interaction may include a movement of the human hand. Some disclosed embodiments may include identifying multiple parts of the object pointed to by the human hand at a particular order in time, and causing a display of visual indications of the multiple parts via the at least one second extended reality appliance at the particular order in time. The movement of the human hand may include any motion or action of the human hand. For example, the movement of the human hand may include moving the human hand in a particular gesture (e.g., a pointing finger) along a surface of the object, changing the human hand from being in one gesture (e.g., a pointing finger) to being in another gesture (e.g., a thumb-up), or any other motion or action of the human hand. As one example, the human hand may be in the gesture of a pointing finger, and may move along a surface of the object to point to multiple parts of the object. At least one processor may identify multiple parts of the object pointed to by the human hand at a particular order in time (e.g., sequentially), for example, based on image data captured by an image sensor and/or data captured by other sensor(s). The identified multiple parts of the object may have any desired interval between each other in terms of space or time. For example, the identified multiple parts may sequentially be spaced apart by any desired distance (e.g., 0.1 cm, 0.2 cm, 0.3 cm, 0.4 cm, 0.5 cm, 0.8 cm, 1 cm, 2 cm, 3 cm, 5 cm, 10 cm, or any other desired distance). As another example, the identified multiple parts may be captured at times that may sequentially be apart by any desired time period (e.g., 0.1 seconds, 0.2 seconds, 0.3 seconds, 0.4 seconds, 0.5 seconds, 0.8 seconds, 1 second, 2 seconds, 3 seconds, or any other desired time interval).

The at least one processor may cause a display of visual indications of the multiple parts via the at least one second extended reality appliance at the particular order in time. For example, the at least one processor may transmit, to the at least one second extended reality appliance, a data stream indicating the identified multiple parts of the object. For example, as the at least one processor identifies a particular part of the multiple parts of the object, the at least one processor may transmit, to the at least one second extended reality appliance, a data segment, of the data stream, indicating the identified particular part of the object. As each one of the multiple parts of the object may be sequentially identified and indicated in a data segment of the data stream transmitted to the at least one second extended reality appliance, the at least one second extended reality appliance may cause display of visual indications of the multiple parts at the particular order in time (e.g., in connection with the displayed virtual representation of the object). The visual indications (e.g., relative to the displayed virtual representation of the object) may simulate the movement of the human hand (e.g., relative to the object). In some examples, the simulation of the movement of the human hand may be updated in real-time based on the movement of the human hand.

Some disclosed embodiments may include initially determining that the human hand pointing to the specific portion of the object belongs to a user of the first wearable extended reality appliance and causing a first virtual indicator to identify the specific portion of the object; and subsequently determining that an additional human hand pointing to the specific portion of the object belongs to an individual other than the user of the first wearable extended reality appliance, and causing a second virtual indicator, different from the first virtual indicator, to identify the specific portion of the object. Hand source recognition may occur in any one of a number of ways, or a combination of ways. For example, based on a relative position of the hand, the system may determine whether the hand is that of a user of the first wearable extended reality appliance. This may occur because hands of wearers may have an orientation in the field of view that may be a telltale sign that the hand is that of the wearer. Such telltale signs might include detected finger orientation relative to an image sensor, or detection of arms extending toward a general direction of the image sensor. Similarly, hands of individuals other than the wearer may have differing finger orientations or may be detected as being associated with arms extending in a direction inconsistent with a direction associated with a wearer. Such signs may be determined by performing image analysis on the current hand image and comparing it with stored images or image data associated with orientations of hands of wearers. Similarly, hands of persons other than the wearer may have differing orientations and in a similar manner to determining that a hand is one of a wearer of the first wearable extended reality appliance, the system may determine that a detected hand is of a person other than the wearer.

By way of another example, hands of differing individuals may differ. The system may recognize hands as being those of an extended reality device wearer (or even a particular individual), by examining unique characteristics of skin or structure. Over time as a wearer uses the system, features of the wearer's hands may be stored in a data structure and image analysis may be performed to confirm that a current hand in an image is that of the wearer. In a similar way, hands of individuals other than the wearer may be recognized, enabling the system to distinguish between a plurality of individuals based on characteristics of their hands. This feature may enable unique user interaction simulation. For example, if multiple individuals interact with the same object, virtual indicators simulating the user interactions may vary based on the person interacting with the object.

At least one processor may determine whether a human hand interacting with the object belongs to the user of the first wearable extended reality appliance or another individual, for example, based on image data captured by an image sensor associated with the first wearable extended reality appliance. The at least one processor may analyze the image data for hand identification, for example, by determining hand features based on the image data and comparing the determined hand features with stored features of a hand of the user of the first wearable extended reality appliance. In some examples, the at least one processor may perform hand identification based on particular objects associated with a hand (e.g., a particular ring for identifying a hand of the user). In some examples, the hand identification may be based on data captured by other sensor(s). The at least one processor may initially determine that the human hand pointing to the specific portion of the object belongs to a user of the first wearable extended reality appliance and cause a first virtual indicator to identify the specific portion of the object; and subsequently determine that an additional human hand pointing to the specific portion of the object belongs to an individual other than the user of the first wearable extended reality appliance and cause a second virtual indicator, different from the first virtual indicator, to identify the specific portion of the object. The first virtual indicator and/or the second virtual indicator may be displayed, for example, by the at least one second wearable extended reality appliance in connection with the displayed virtual representation of the object. The first virtual indicator and the second virtual indicator may be different in terms of one or more of various aspects, such as colors, shapes, textures, visual effects, animations, or other features.

In some examples, the object associated with the first wearable extended reality appliance may be a three-dimensional virtual object virtually displayed by the first wearable extended reality appliance and the first data may be configured to cause a display, via the at least one second wearable extended reality appliance, of the three-dimensional virtual object. Some disclosed embodiments may include detecting in the image data (e.g., received from the image sensor associated with the first wearable extended reality appliance) an additional user interaction changing an orientation of the three-dimensional virtual object for viewing from a particular perspective, and causing the at least one second wearable extended reality appliance to display the three-dimensional object from the particular perspective. The detecting of the additional user interaction may be performed in a similar manner as the detecting of the at least one user interaction as described above. The additional user interaction may include any action that may change the orientation of the three-dimensional virtual object, such as a rotate gesture, a drag gesture, a tap gesture (e.g., to activate a function to change an orientation), a spread gesture, a click (e.g., via a computer mouse or a touchpad), or any other action for changing an orientation. The particular perspective may include any desired angle from which the three-dimensional virtual object may be viewed. The orientation of the three-dimensional virtual object may be measured using any desired method to represent orientations, such as the Euler angles, the system based on yaw, pitch, and roll, or any other way for measuring orientation. At least one processor may measure degree(s) of change of the orientation of the three-dimensional virtual object. Based on the detecting of the additional user interaction, at least one processor may transmit, to the at least one second wearable extended reality appliance, data indicating the change of the orientation of the three-dimensional virtual object. The data may include, for example, information of the measured degree(s) of change of the orientation of the three-dimensional virtual object. The at least one second wearable extended reality appliance may receive the data and may, based on the measured degree(s) of orientation change (e.g., included in the data), adjust the orientation of the three-dimensional virtual object displayed via the at least one second wearable extended reality appliance, so that the three-dimensional virtual object may be displayed via the at least one second wearable extended reality appliance from the particular perspective.

Some disclosed embodiments may include receiving from the at least one second wearable extended reality appliance third data in response to a detection of a second user interaction with the virtual representation of the object. The second user interaction may include a second human hand pointing to a particular portion of the virtual representation of the object. For example, at least one processor (e.g., associated with the at least one second wearable extended reality appliance) may detect the second user interaction with the virtual representation of the object (e.g., in a similar manner as the detection of the at least one user interaction associated with the object as described above) and may in response transmit the third data to the first wearable extended reality appliance or to the centralized system as described above. The third data may indicate, for example, the detected second user interaction and/or an area of the particular portion, of the virtual representation of the object, which the second human hand may be pointing to. At least one processor (e.g., associated with first wearable extended reality appliance or with a centralized system as described above) may receive the third data from the at least one second wearable extended reality appliance.

Some disclosed embodiments may include causing the first wearable extended reality appliance to display a visual indicator of a particular area of the object corresponding to the particular portion of the virtual representation of the object. For example, based on the received third data, at least one processor (e.g., associated with first wearable extended reality appliance or with a centralized system as described above) may cause display of a visual indicator of a particular area of the object corresponding to the particular portion of the virtual representation of the object. The particular area of the object may be in a location, relative to the object, that may be same as or similar to a location, of the particular portion of the virtual representation of the object, relative to the virtual representation of the object. The visual indicator may be in any desired form, such as highlighting the particular area of the object with any desired color, displaying a virtual hand pointing to the particular area of the object, displaying a particular shape (e.g., a circle, a square, a triangle, or any other desired shape) covering the particular area of the object, moving a cursor to the particular area of the object, or in any other desired manner.

In some examples, the visual indicator of the particular area of the object may include a virtual hand pointing to the particular area of the object. The virtual hand may include, for example, any visual display rendered by a computing device (e.g., a wearable extended reality appliance) and configured to represent a hand. In some examples, at least one visual characteristic of the virtual hand may be selected based on the third data. The at least one virtual characteristic may include a size of at least part of the virtual hand (such as a digit), a color of at least part of the virtual hand, a ratio between sizes of two digits of the virtual hand, a pose of the virtual hand, or any other feature of the virtual hand. In some examples, the third data may be indicative of a pose of the second human hand. The at least one visual characteristic may be based on the pose of the second human hand. In some examples, the at least one visual characteristic of the virtual hand may be based on one or more features of the second human hand in the second user interaction with the virtual representation of the object. In some examples, the virtual hand may visually resemble an appearance of the second human hand in the second user interaction with the virtual representation of the object.

Some disclosed embodiments may include causing the first wearable extended reality appliance to display a virtual shadow corresponding to the virtual hand pointing to the particular area of the object. A virtual shadow may take the form of an outline, a shape or a contour, and may simulate an appearance of an actual shadow. In some examples, the virtual shadow may include an area or shape that may be shaded or dark. The virtual shadow may be placed in a location, for example, based on the lighting condition in the environment surrounding the first wearable extended reality appliance to simulate how a shadow might actually appear if an actual hand were pointing. For example, the virtual shadow may be placed in a location where a natural shadow may appear based on the lighting condition if the virtual hand were a physical hand. In some examples, the virtual shadow may have a shape, a color, or any other characteristic that may be same as or similar to such a natural shadow.

In some examples, the visual indicator of the particular area of the object may include a change to a visual appearance of the particular area of the object. For example, the change to the visual appearance of the particular area of the object may include a change to a color scheme, a change to a brightness, a change to a texture, a change to a shape, or a change to any other feature, of the particular area of the object.

With reference to FIG. 36, second user 3416 may initiate a second user interaction 3610 with virtual representation 3430 of object 3428. Second user interaction 3610 may include a second human hand (e.g., a hand of second user 3416) pointing to a particular portion of virtual representation 3430 of object 3428. Second wearable extended reality appliance 3420 may detect second user interaction 3610 (e.g., based on image data captured by an image sensor and/or data captured by other sensor(s)) and may transmit third data to first wearable extended reality appliance 3418. The transmission of the third data may be, for example, via the established communication channel (e.g., based on link 3424, network 3422, and link 3426). In another example, a centralized system may transmit the third data to first wearable extended reality appliance 3418, for example based on information received at the centralized system from second wearable extended reality appliance 3420, for example as described above. The third data may indicate second user interaction 3610 and/or an area of the particular portion, of virtual representation 3430, which the second human hand may be pointing to. First wearable extended reality appliance 3418 may receive the third data and may in response cause display of a visual indicator 3612 of a particular area of object 3428 corresponding to the particular portion of virtual representation 3430. Visual indicator 3612 may include a virtual hand, and may be displayed to first user 3414 via first wearable extended reality appliance 3418.

Figure 33:
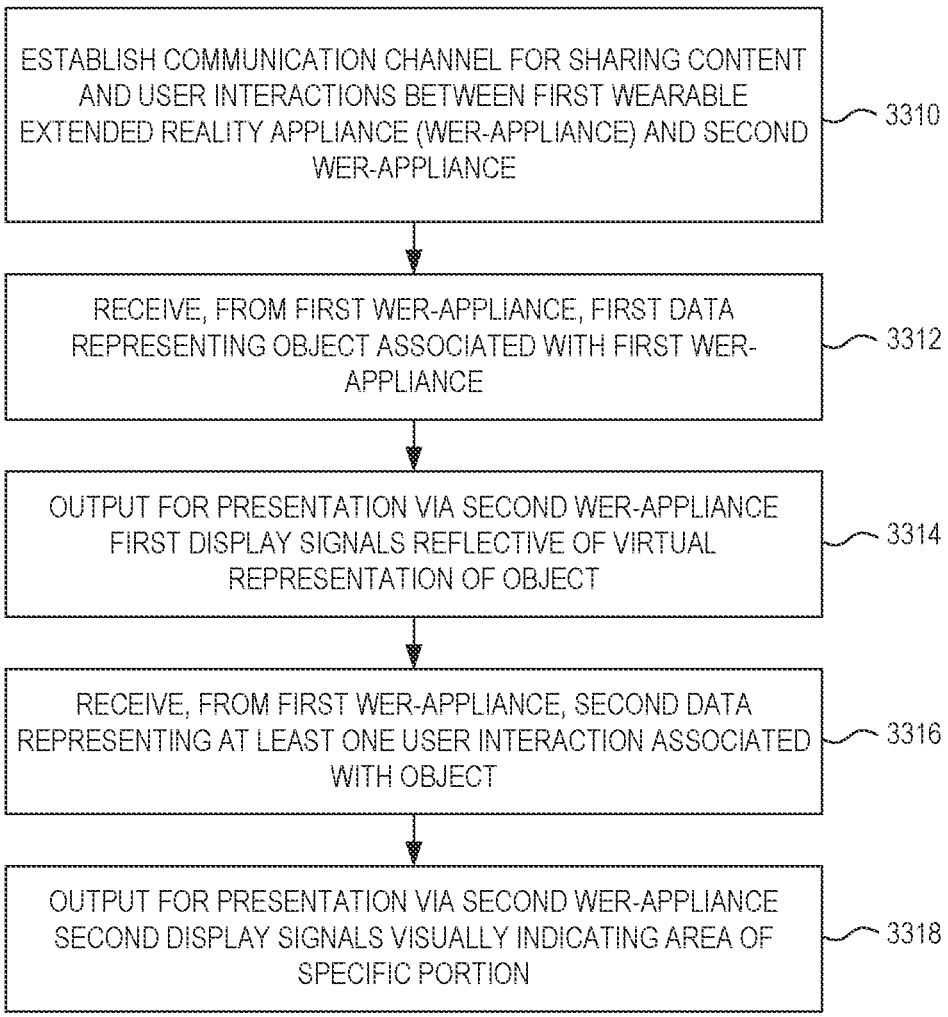
FIG. 33 is a flowchart illustrating an exemplary process for simulating user interactions with shared content, consistent with some embodiments of the present disclosure.

Some disclosed embodiments may relate to simulating user interactions with shared content, including methods, systems, apparatuses, and non-transitory computer-readable media. Some disclosed embodiments may include establishing a communication channel for sharing content and user interactions between a first wearable extended reality appliance and a second wearable extended reality appliance. For example, at least one processor may cause establishing of a communication channel for sharing content and user interactions between a first wearable extended reality appliance and a second wearable extended reality appliance, as described herein. FIG. 33 is a flowchart illustrating an exemplary process 3300 for simulating user interactions with shared content consistent with some embodiments of the present disclosure. With reference to FIG. 33, in step 3310, instructions contained in a non-transitory computer-readable medium when executed by a processor may cause the processor to establish a communication channel for sharing content and user interactions between a first wearable extended reality appliance and a second wearable extended reality appliance.

Some disclosed embodiments may include receiving, from the first wearable extended reality appliance, first data representing an object associated with the first wearable extended reality appliance. The first data may enable a virtual representation of the object to be displayed through the second wearable extended reality appliance. For example, at least one processor (e.g., associated with the second wearable extended reality appliance or with the centralized system as described above) may receive, from the first wearable extended reality appliance, first data representing an object associated with the first wearable extended reality appliance, as described herein. With reference to FIG. 33, in step 3312, instructions contained in a non-transitory computer-readable medium when executed by a processor may cause the processor to receive, from the first wearable extended reality appliance, first data representing an object associated with the first wearable extended reality appliance, the first data enabling a virtual representation of the object to be displayed through the second wearable extended reality appliance.

Some disclosed embodiments may include outputting for presentation via the second wearable extended reality appliance first display signals reflective of the virtual representation of the object. For example, at least one processor (e.g., associated with the second wearable extended reality appliance or with the centralized system as described above) may cause output, for presentation via the second wearable extended reality appliance, of first display signals reflective of the virtual representation of the object, as described herein. The first display signals may include any visible radiation that may be output by a display system associated with a wearable extended reality appliance, such as an optical head-mounted display, a monocular head-mounted display, a binocular head-mounted display, a see-through head-mounted display, a helmet-mounted display, or any other type of device configured to show images to a user. In some examples, the display system may reflect the first display signals (e.g., projected images) and to allow a user to see through the display system. In some examples, the first display signals may be based on waveguide techniques, diffraction optics, holographic optics, polarized optics, reflective optics, or other types of techniques for combining images projected by a computing device and optical signals emanated from physical objects. At least one processor (e.g., associated with the second wearable extended reality appliance or with the centralized system as described above) may output for presentation via the second wearable extended reality appliance the first display signals reflective of the virtual representation of the object. The output of the first display signals may cause display of the virtual representation of the object to a user.

With reference to FIG. 33, in step 3314, instructions contained in a non-transitory computer-readable medium when executed by a processor may cause the processor to output for presentation via the second wearable extended reality appliance first display signals reflective of the virtual representation of the object.

Some disclosed embodiments may include receiving, from the first wearable extended reality appliance, second data representing at least one user interaction associated with the object. The at least one user interaction may include a human hand pointing to a specific portion of the object. For example, at least one processor (e.g., associated with the second wearable extended reality appliance or with the centralized system as described above) may receive, from the first wearable extended reality appliance, second data representing at least one user interaction associated with the object, as described herein. With reference to FIG. 33, in step 3316, instructions contained in a non-transitory computer-readable medium when executed by a processor may cause the processor to receive, from the first wearable extended reality appliance, second data representing at least one user interaction associated with the object, the at least one user interaction including a human hand pointing to a specific portion of the object.

Some disclosed embodiments may include outputting for presentation via the second wearable extended reality appliance second display signals visually indicating an area of the specific portion. For example, at least one processor (e.g., associated with the second wearable extended reality appliance or with the centralized system as described above) may cause output, for presentation via the second wearable extended reality appliance, of second display signals visually indicating an area of the specific portion, as described herein. The visual indicator of the area of the specific portion may be in any desired form, as described herein. The visual indicator may be displayed in connection with the displayed virtual representation of the object. With reference to FIG. 33, in step 3318, instructions contained in a non-transitory computer-readable medium when executed by a processor may cause the processor to output for presentation via the second wearable extended reality appliance second display signals visually indicating an area of the specific portion.

Some disclosed embodiments may include, following receipt of the second data, continuously receiving information from the first wearable extended reality appliance and continuously updating the second data to thereby cause a visual representation of the area of the specific portion to cease when the at least one user interaction including the human hand pointing to the specific portion of the object is no longer detected. For example, the first wearable extended reality appliance may periodically or continuously monitor the at least one user interaction and may transmit, to the second wearable extended reality appliance, a data stream of updated state(s) of the at least one user interaction as monitored. The second wearable extended reality appliance may receive the data stream and may, based on the data stream, update the visual indicator simulating the at least one user interaction (e.g., in terms of a location, an orientation, a shape, a color, or any other feature). When the at least one user interaction is no longer detected, the first wearable extended reality appliance may transmit, to the second wearable extended reality appliance, an indication that the at least one user interaction is no longer detected. Based on receiving the indication, the second wearable extended reality appliance may cause a visual representation of the area of the specific portion to cease (e.g., the visual representation of the area of the specific portion may be removed from the displayed virtual representation of the object).

In some examples, the second data may be reflective of multiple human hands pointing to multiple parts of the object during a time period, and the second display signals may be configured to visually indicating a plurality of areas corresponding to the multiple parts of the object. The multiple human hands may belong to one person, or multiple persons. In some examples, the multiple human hands may include two hands of a user of the first wearable extended reality appliance. In some examples, the multiple human hands may include hand(s) of the user of the first wearable extended reality appliance, and/or hand(s) of person(s) other than the user of the first wearable extended reality appliance. The time period may include any length of time, such as 0.5 seconds, 1 second, 2 seconds, 3 seconds, 5 seconds, 10 seconds, 30 seconds, 60 seconds, 120 seconds, other any other time interval. The visual indicators of the plurality of areas may be displayed in connection with the displayed virtual representation of the object, and may be configured to simulate the interactions of the multiple human hands with the multiple parts of the object. In some embodiments, the second display signals may be configured to cause differentiated indicators of the plurality of areas to be displayed via the second wearable extended reality appliance. The differentiated indicators may differ in terms of one or more of various aspects, such as colors, shapes, textures, visual effects, animations, or other features.

In some embodiments, the first data may include information on an environment of the object from a perspective of the first wearable extended reality appliance. Some disclosed embodiments may include configuring the first display signals to cause via the second wearable extended reality appliance, a presentation of the object located in proximity to the first wearable extended reality appliance corresponding to the perspective of the first wearable extended reality appliance. For example, the first wearable extended reality appliance may measure a position and/or orientation of the object relative to the first wearable extended reality appliance. The measuring may be based on data captured by one or more of an image sensor, a distance sensor, a depth sensor, a range imaging sensor, or any other sensor configured to capture information for measuring a position and/or orientation of the object. The measured position and/or orientation may be included in the first data, and may be transmitted to the second wearable extended reality appliance. The second wearable extended reality appliance may, based on the measured position and/or orientation of the object relative to the first wearable extended reality appliance, display the virtual representation of the object to be from a perspective same as or similar to the perspective of the first wearable extended reality appliance. In some examples, the environment of the object (e.g., physical or virtual space surrounding the object) may be captured, and the information may be transmitted to the second wearable extended reality appliance. Based on receiving the information, the second wearable extended reality appliance may cause display of the virtual representation of the object to have a relationship, with the surrounding environment of the virtual representation, that may be same as or similar to the relationship of the object with the surrounding environment of the object (e.g., distances of the object to a nearby wall, nearby furniture, the floor, or other items in the environment).

Some disclosed embodiments may include receiving image data from an image sensor associated with the second wearable extended reality appliance, detecting in the image data a structure that prevents displaying the virtual representation of the object in the manner corresponding to the perspective of the first wearable extended reality appliance; and, upon detecting the structure, determining an alternative display of the virtual representation of the object, the alternative display presenting the virtual representation of the object from a perspective differing from the perspective of the first wearable extended reality appliance. The structure may include any item (physical or virtual) that may be in such a position and/or orientation that it may occupy (physically or virtually) the space (or a portion thereof) where the displayed virtual representation of the object may be located (e.g., when displayed from a perspective same as or similar to the perspective of the first wearable extended reality appliance). At least one processor may identify the structure, for example, based on analysis of the image data received from the image sensor. In some examples, the identification of the structure may be based on data captured by one or more of a distance sensor, a depth sensor, a range imaging sensor, or any other sensor. The at least one processor may determine the alternative display of the virtual representation of the object, for example, by identify a location, in the environment of the second wearable extended reality appliance, where there may not be such an obstructing structure, or by identify an orientation, of the virtual representation of the object, that may allow the virtual representation of the object to fit in at its current location. The alternative display may be implemented, for example, using the identified location or orientation. The alternative display may present the virtual representation of the object from a perspective differing from the perspective of the first wearable extended reality appliance.

Some disclosed embodiments may include adjusting a display of a virtual indicator to point to the specific portion of the object from the perspective associated with the alternative display. For example, at least one processor may adjust the location and/or orientation of the virtual indicator, in a similar manner as the virtual representation of the object. The adjusting of the virtual indicator may be such that the location and/or orientation of the virtual indicator relative to the virtual representation of the object may simulate the location and/or orientation of the at least one user interaction relative to the object.

In some embodiments, methods, systems, and non-transitory computer readable media for simulating visual pointers over shared content may be provided. In some examples, an indication that a first user and a second user are watching two replicas of the same computer window may be received. Further, an indication that the first user physically points to a first element of the computer window may be received. Further, a visual pointer pointing at the first element may be caused to be displayed to the second user. In one example, the first user may watch the replica of the computer window on a physical display and the second user may watch the replica of the computer window on a virtual display. In another example, the first user may watch the replica of the computer window on a virtual display and the second user may watch the replica of the computer window on a physical display. In yet another example, both users may watch the replica of the computer window on physical displays. In an additional example, both users may watch the replica of the computer window on virtual displays. In one example, such virtual display may be part of an augmented reality environment. In another example, such virtual display may be part of a virtual reality environment.

In some examples, the indication that the first user physically points to the first element of the computer window may be based on an analysis of an image of the first user (such as an image captured by a wearable system used by the first user, or an image captured by a fixed camera positioned in the room). In some examples, the indication that the first user physically points to the first element of the computer window may be an indication that the first user is using a gesture to point to the first element of the computer window. For example, the gesture may be using a finger to point at the first element. In some examples, the visual pointer pointing at the first element may be a two-dimensional overlay over the content of the computer window. In some examples, the visual pointer pointing at the first element may be a two-dimensional visual pointer displayed outside the computer window, for example, using an augmented reality system used by the second user, or using a virtual reality system used by the second user. In some examples, the visual pointer pointing at the first element may be a three-dimensional visual pointer displayed outside the computer window, for example, using an augmented reality system used by the second user, or using a virtual reality system used by the second user. For example, the three-dimensional visual pointer may be a representation of a hand or may be a representation of an arrow.

Allowing anyone to place virtual content anywhere in a shared extended reality environment may cause virtual content clutter and abuses such as placement of promotional content or undesirable content in inappropriate locations. Aspects of this disclosure that follows describe ways for applying location-based restrictions to manage content placement in extended reality environments.

Some disclosed embodiments may involve systems, methods, and non-transitory computer readable media configured for managing content placement in extended reality environments. The term "managing content placement" may refer to using one or more rules that govern where users may place content in an extended reality environment. These rules may include permissions as to where to place virtual content and may be based on a variety of different parameters, such as time, location, size, or virtual content type. In some embodiments, virtual content may include any two-dimensional or three-dimensional representation of data. The virtual content may be inanimate or animate, and/or may be public or private. Public content may be visible to all wearable extended reality appliance users registered to a certain a shared extended reality environment, whereas private content may only be visible to a limited number of users whose appliances are registered to the certain a shared extended reality environment.

In some embodiments, the managing of the content placement may involve applying rules that may vary between different types of users. For example, some rules may limit where an individual user may present virtual content. Other rules may enable expanded freedom to a user associated with a corporate entity to present virtual content in certain places, including office buildings, client offices, or public locations associated with or advertising the entity's services. The rules for managing content placement may also vary between public and private locations, i.e., there may be different rules for presenting virtual content in private places, such as user's home or office, compared to public places, such as a public park, a city street, a town square, a retail establishment, or any other public or semi-public space.

Some disclosed embodiments may involve receiving a request from an entity to place a virtual content at a specific geographic location in at least one shared extended reality environment that includes a plurality of virtual objects. The term "entity" may refer to an individual, artificial intelligence (AI) software, an organization, a professional office, a service provider, a company, a corporation, partnership, or other individual, group or mechanism capable of making a request. In one example, the entity associated with the request may be a single wearable extended reality appliance user. However, the entity may not be limited a user of a wearable extended reality appliance; it may include virtual entities such as an AI software, or human users of other types of computerized devices. In one embodiment, the request from the entity may be a signal sent from the at least one processor associated with a non-transitory computer readable medium as part of the wearable extended reality appliance. In another embodiment, the request signal may be sent from the at least one processor associated with the entity. In some examples, receiving the request may include at least one of reading the request from a memory unit, receiving the request from an external device, receiving the request from a user (for example, via a user interface), or determining the request by analyzing data (such as data captured using one or more sensors, data read from memory, and/or data received from an external device).

The specific geographic location identified in the request may be selected by the entity and may refer to a physical point or region on Earth identifiable utilizing any descriptor, metric or characteristic. For example, the geographic location may be represented as a combination of longitude/latitude, a street address, a room in an office, a conference hall, an area defined by a code, or any other identifiable place. The specific geographic location may include any surface on which virtual content may be presented. In some examples, the specific geographic location may include a screen, a billboard, a window, a wall, and/or other location that is conducive for displaying virtual content. The specific geographic location may be located in a myriad of different places. For example, a specific geographic area may host content in a town square, a wall or window in an office building, a public transmit area, or any other public or private place, subject to restrictions. The specific geographic location may be able to accommodate more than one virtual object at a time, depending on the virtual content display size. As described elsewhere in this specification, the specific geographic location may also vary in size depending on the type of the virtual content and where the virtual content is presented, such as in an office building conference room, a town square or park, or auditorium. For example, a specific geographic location in an office building conference room may only be able to accommodate one or two virtual objects at one time, but a specific geographic location in a public park may be able to accommodate more than three or four objects at the same time.

As mentioned, the specific geographic location may be either public or private. If public, most if not all users may be able to view and access the presented content. For example, a specific geographic location may be a public park, a town square, a public transit station, a billboard on a highway, supermarkets or grocery stores, and/or other locations that are open to the public. A specific geographic location may also be in private location, i.e., a location that is not open to the public. For example, such a specific geographic location may be a conference room in an office building, a shared working space, and/or a school or university.

Consistent with disclosed embodiments, the plurality of virtual objects may be viewable by a plurality of wearable extended reality appliances registered to the at least one shared extended reality environment. The term shared extended reality environment may refer to a common computer-generated perceptual surrounding. The shared extended reality environment may be a completely simulated virtual environment or a combined real-and-virtual environment wherein multiple users may perceive common content from different perspectives (or in some embodiments, from a common perspective). In one example, multiple shared extended reality environments may coexist in the same physical space, and a user of a wearable extended reality appliance may select which extended reality environments to view and interact with at the physical space by registering to the desired extended reality environments. In one example, multiple wearable extended reality appliance users registered to the extended reality environment may view the same content available in the extended reality environment. In some embodiments, the wearable extended reality appliance users may be all in a similar location, and thus their experiences may be shared. A wearable extended reality appliance user may register the appliance to multiple shared extended reality environments. Registering to a shared extended reality environment may refer to initially interacting with one or more shared extended reality environments, i.e., public or private shared extended reality environments. A user may register his or her appliance to one or more extended reality environments and may switch between the environments by adjusting settings on the wearable extended reality appliance. For example, a user may register to a public shared extended reality environment and may also register to multiple private shared extended reality environments. In one example, a single location, e.g., a room may be associated with content of multiple shared extended reality environments. Accordingly, a first wearable extended reality appliance may display a first set of virtual objects based on the shared extended reality environments to which the first wearable extended reality appliance is currently registered, and a second wearable extended reality appliance may display a second set of virtual objects (that may be different from the first set of virtual objects) based on the shared extended reality environments to which the second wearable extended reality appliance is currently registered. Registration may occur automatically when an extended reality appliance is in proximity to a location associated with an extended reality environment. Regardless of how registered, in some embodiments, returning to a location associated with an extended reality environment may cause an extended reality appliance to recognize the associated extended reality environment.

In one embodiment, a public shared extended reality environment may be an extended reality environment that is free and open to most if not all users. The public shared extended reality environment may be akin to a public communication network, where entities may place virtual content, such as personal posts or advertisements. However, a user may selectively turn off the public shared extended reality environment if the user wishes to access one or more private shared extended reality environments, such as an office environment, family home, and/or school or university environment (i.e., an education space-based shared extended reality environment). An extended reality appliance user may register and connect to one shared extended reality environment or may register to a plurality of shared extended reality environments. Specifically, in the office environment example, only colleagues in the workplace may be able to access the shared extended reality environment. In a family home example, only family members may be able to access the shared extended reality environment. In the education space example, only students, instructors, and associated staff may access the shared extended reality environment. Such restrictions may be implemented through permissions, such as permissions granted by an administrator of a particular shared extended reality environment.

In the previously described private shared extended reality space examples, the specified geographical location where virtual content may be presented may be a wall or window in an office conference room, a wall, TV screen, or window in a private home, a whiteboard, chalkboard, blackboard, or projector screen in a classroom, and/or other locations which are visible to users whose wearable extended reality appliances are registered to the private shared extended reality environment.

By way of example, FIG. 37A depicts a specific geographical location where virtual content may be displayed. FIG. 37A shows a location 3710, here, a conference room in an office building, where virtual content may be placed to be viewed by other wearable extended reality appliance users 3712. In FIG. 37A, one or more of the users may have not registered to the public extended reality environment, where virtual content may be presented by outside entities. In FIG. 37B, a user of wearable extended reality appliance 3714 in location 3710 may be registered to a public extended realty environment. Thus, virtual content, such as advertisements 3716, may be visible to the user of wearable extended reality appliance 3714 and other users 3712 in the conference room.

Some disclosed embodiments may further include using input from a wearable extended reality appliance used by the entity to determine the specific geographic location. In one example, the input from the wearable extended reality appliance may include positioning data captured using a positioning sensor included in the wearable extended reality environment (such as a global positioning sensor, an outdoor positioning sensor, an indoor positioning sensor, or any other positioning sensors as described above), and the specific geographic location may be immediately determined from the positioning data. In one example, image data captured using an image sensor included in the wearable extended reality appliance may be received. Further, the image data may be analyzed using at least one of an ego-positioning algorithm, an ego-motion algorithm or a visual odometry algorithm to determine the specific geographic location. In some examples, a user of the wearable extended reality appliance may provide information, for example through voice commands, gestures or physical input devices, and the specific geographic location may be determined based on the information provided by the user. For example, the information provided by a user may include textual information (for example, entered using a keyboard and/or determined by analyzing audio with speech recognition algorithms), and the textual information may be analyzed using a natural-language algorithm to determine the specific geographic location. In another example, the information provided by the user may include an indication of a location on a map (for example, through a hand gesture or a use of a virtual cursor), and the specific geographic location may be immediately determined from the location on the map.

Some disclosed embodiments may involve obtaining information associated with the request. The obtained information may include any data or information relevant to the request for placing a virtual content at a specific geographic location. For example, the obtained information may include information related to at least one of the entity, the virtual content, the specific geographic location, the at least one shared extended reality environment, one or more virtual objects of the plurality of virtual objects, or one or more appliances of the plurality of wearable extended reality appliances registered to the at least one shared extended reality environment. For example, the obtained information may include details on the virtual content, image data (e.g., an image of the specific geographic location), license information, ownership information, identity information, whether the specific geographic location is public or private, affiliation information between the specific geographic location and the entity, content type information, the entity's location information, time of day information, virtual space constraint information, and/or more details associated with the specific geographic location, the content to be displayed, and the entity making the request. In some examples, obtaining the information may include reading the information from memory, receiving the information from an external device, receiving the information from a user (for example, through a user interface), determining the information by analyzing data, and/or capturing the information using one or more sensors. In one embodiment, a first entity may request to present virtual content and a second entity may receive the presentation request from the requesting entity. The second entity may determine whether to permit presentation of virtual content. In some embodiments, the second entity request specific information from the first entity about the specific geographic location.

Some disclosed embodiments may involve accessing a plurality of content placement rules defining geographical restrictions on extended reality environment content placement. A content placement rule may be any definition that defines the appropriateness of information for placement in a particular location (or a category or type of location). The content placement rule may impose geographical restrictions, content type restrictions, time of day restrictions, and/or shared extended reality environment (i.e., public or private) restrictions. For example, a content placement rule may govern what time virtual content may be presented, size restrictions for presented virtual content, types of content that may be presented, and/or who may view the presented virtual content. Additional examples of content placement rules are described throughout this specification. In one embodiment, the content placement rules may be implemented throughout a shared extended reality space to regulate which content may be placed where, when, and/or for how long. Whether an entity's request to present content meets a content placement rule may be based on obtained information. In some examples, accessing the plurality of content placement rules may include accessing a data-structure including at least part of the plurality of content placement rules, accessing a database including at least part of the plurality of content placement rules, accessing a memory unit storing at least part of the plurality of content placement rules, and/or communicating with an external device maintaining at least part of the plurality of content placement rules.

Some disclosed embodiments may involve, based on the obtained information, determining that the request from the entity to place the virtual content at the specific geographic location corresponds to a specific content placement rule. The specific content placement rule may govern whether content may be displayed at the specific geographic location. The specific content rule may be associated with the content type, i.e., the character of the content, whether the content is inanimate or animate, whether the content is meant to be publicly or privately displayed, and/or whether the content is two-dimensional or three-dimensional. Other content placement rules may be based on what the substance of the content, i.e., content meaning, appropriateness of the content to a determined or expected audience, where the content may be placed, the size of the presented virtual content is, and/or what time the content is to be displayed. A specific content placement rule may also be based on the type of shared extended reality environment in which the content may be placed. For example, there may be different content placement rules for public shared extended reality environments and private shared extended reality environments. In this example, some content (e.g., advertisements) may be permitted in public environments but may not be permitted in private environments. In some examples, the plurality of content placement rules may be stored in a data-structure associating request-related-information with content placement rules, and the data-structure may be accessed based on the obtained information to determine the specific content placement rule. In some examples, a plurality of conditions may be used to select which content placement rule corresponds to which request-related-information, and the obtained information may be analyzed using the conditions to determine the specific content placement rule. In some examples, a machine learning model may be trained using training examples to determine content placement rules based on request-related-information records. An example of such training example may include a sample request-related-information, together with a label indicating a content placement rule corresponding to the sample request-related-information. The trained machine learning model may be used to analyze the obtained information and determine the specific content placement rule.

In some embodiments, the request for presenting the virtual content may correspond with a specific content placement rule. For example, there may be characteristics of the content presentation request that correspond with the content placement rule in a specific geographic location. Such characteristics may be content type, time of day restrictions, and/or display size restrictions. For example, an entity's virtual content request may involve presenting three-dimensional virtual content and the specific geographic location may have a content placement rule corresponding to three-dimensional virtual content, i.e., it is either permitted or not permitted.

Figure 37C:
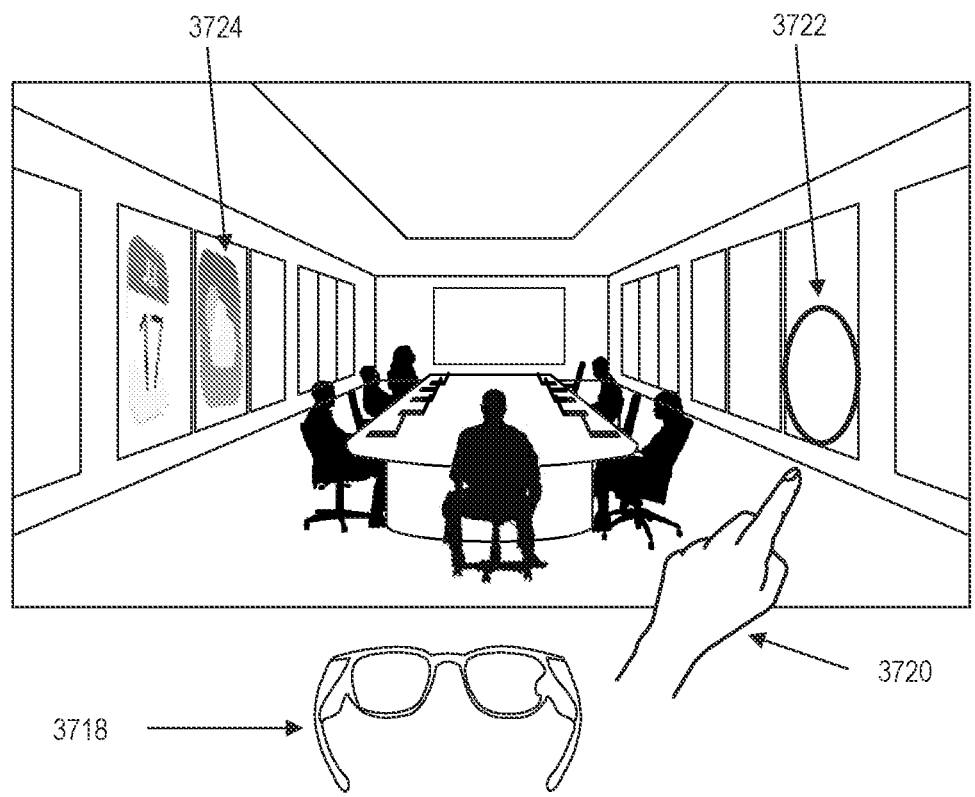
FIG. 37C illustrates the exemplary geographic location described in FIG. 37B in which virtual content is displayed in an extended reality environment, consistent with some embodiments of the present disclosure.
Figure 37D:
FIG. 37D illustrates the exemplary geographic location described in FIG. 37B wherein a user may gesture to a geographic location where virtual content is desired for display, consistent with some embodiments of the present disclosure.

By way of example, FIG. 37C illustrates choosing a specific geographic location based on obtained information. Here, a wearer of wearable extended reality appliance 3718 may gesture his or her hand 3720 to a specific location where he or she wishes to display content. In FIG. 37C, the user's wearable extended reality appliance 3718 is not registered to the public extended reality environment, rather, the appliance is registered to the private extended reality environment. Thus, only office and business-related virtual content 3724 is displayed and the advertisements 3716 shown in FIG. 37B are not displayed. FIG. 37D illustrates a virtual object 3726 being displayed after determining, based on the desired geographic location, that the specific conditions for content placement are met. In this example, a specific condition for content placement may be that the type of content is office or business related. Therefore, it may be determined that the request from the entity to place the virtual content at the specific geographic location corresponds to a specific content placement rule.

Some disclosed embodiments may further include determining whether the condition of the specific content placement rule is met based on the determined characteristic of the specific geographic location. A specific content placement rule may be based on a myriad of inputs and may be configured by the wearable extended reality appliance user receiving the presentation request. The determined characteristic may be any one of the characteristics described in this specification, such as whether the specific geographic location is public or private, whether there is enough space for the virtual object to be presented, and/or what type of content is permitted at the specific geographic location. For example, specific content placement rules may be content-based, i.e., based on whether the content is to be public, such as an advertisement, or private, such as content related to business or education. A specific content placement rule may also apply to a plurality of geographic locations. For example, a town or neighborhood may have content placement rules preventing the display of certain types of virtual content. These local content placement rules may be enforced by a local government or regulatory entity.

In some embodiments, a condition of the specific content placement rule may prevent placement of content in the specific geographical location in an absence of a license permitting content placement by the entity in the specific geographical location. While content sharing may be encouraged, if anyone is able to post content anywhere, the shared extended reality environment may become cluttered with content. As a result, the users of the shared extended reality environment may be indifferent to the content displayed in the shared wearable extended reality environment, damaging the effectiveness of targeted content placed by various entities throughout the shared extended reality environment. In order to reduce the crowding of virtual content items in certain locations throughout the shared wearable extended reality environment, it may be desirable to adopt a licensing system to reduce unwanted content. Such licenses may govern, for example, which content may be presented at a specific geographic location at a specific time, which types of content may be presented (i.e., public or private content, two-dimensional or three-dimensional content, and/or inanimate or animate content), and/or how many virtual objects may be presented at a specific time. This licensing system may also be adapted to the private shared extended reality environment. For example, a license may be utilized to prevent members of the general public from posting advertisements or presenting other content inside private areas such as homes, offices, shops, or other private businesses. The licensing scheme may be relaxed in public spaces, but time, place, and content-type restrictions may be implemented.

Entities may request or apply for a license to place content in private spaces, and the licenses may be evaluated based on the products the entities wish to advertise, the time and day that the content is to be presented, how many other virtual objects are present, and the type of business where the content is to be placed. In one example, a license to present in a specific geographic location may not be given for a private home because the value of the wearable extended reality appliance user's privacy may outweigh the benefit they may receive from the presenting entity. However, in another example, an owner of a specific geographic location such as a store or office may grant a license to display virtual content based on the benefit it receives from the requesting entity, which may be in the form of money payment.

In a public shared extended reality environment, licenses may be granted or denied based on the type of content that is requested to be presented. For example, a requesting entity may need a specific license to present content related to age-restricted products such as tobacco or alcohol. In another example, the license may be limited based on the time of day. In this example, a license may be required to present content outside of normal business hours, such as nighttime or even presenting content for a 24-hour period. Content placement restrictions may also be implemented more broadly. For example, an entire city or town, rather than a single wearable extended reality appliance user, may implement content placement restrictions that may be related to content type, i.e., public or private content, two-dimensional or three-dimensional content, and/or inanimate or animate content. Content placement restrictions may also be based on time of day, as described later in this specification.

In some embodiments, the plurality of content placement rules may govern a first extended reality environment and a second extended reality environment, and may further include preventing placement of the virtual content in the specific geographic location of the first extended reality environment and permitting placement of the virtual content in the specific geographic location of the second extended reality environment. As described elsewhere in this specification, wearable extended reality appliance users may register to a plurality of shared extended reality environments. A first extended reality environment may be a private shared extended reality environment and a second extended reality environment may be a public shared extended reality environment. As described elsewhere in this specification, private and public shared extended reality environments may have different content placement restrictions. In some embodiments, placement of the virtual content, such as an advertisement, may be prohibited in the first private shared extended reality environment, but may be permitted to be displayed in the second public shared extended reality environment. For example, advertisements may be prevented from being displayed in a private shared extended reality environment, such as an office, but may be permitted in a public shared extended reality environment, such as in a public park or public transit station.

In some embodiments, obtained information associated with the virtual content presentation request may include information about an identity of the entity, and may further include determining whether the condition of the specific content placement rule is met based on the information about the identity of the entity. Information about an identity of the requesting entity may include whether it is a private person or a corporation, what type of business the entity typically engages in, where the entity typically operates, for example, where does it typically display virtual content, and/or how many other virtual objects the entity is currently displaying. Whether the condition of the specific content placement rule is met may be based on the above identity information. For example, a large corporation may wish to advertise products in a smaller setting, such as a school or university. Based on the identity of the entity, and where the entity wishes to place the virtual content, such information may be instrumental in determining where the condition of the specific content placement rule is met. Thus, for example, a content presentation request may be denied if the information contains details that are not desirable to a recipient of the content. Such details may include, for example, the type of product that the company typically advertises or typical customers. For example, a company that sells unhealthy food products or tobacco products may not meet the specific content placement rule if it wishes to advertise at a school or university campus.

In some embodiments, obtained information associated with the request to present content may include information about a physical location of the entity, and the operations may further include determining whether the condition of the specific content placement rule is met based on the information about the physical location of the entity. A receiving wearable extended reality appliance user may accept or deny an entity's presentation request based on the entity's physical location. For example, if the requesting entity is located close to the specific geographic location, the request may be accepted. If the requesting entity is located remote from the specific geographic location, i.e., where the requesting entity wishes to present content, the presentation request may be denied.

Additionally, an entity's physical location may differ based on the time the request was made. An entity's location at different times may be useful for a receiving wearable extended reality appliance user in determining whether to grant the presentation request because the differing locations may show whether the requesting entity is moving closer to the requested specific geographic location, which may factor favorably into granting a presentation request, or moving further away from the requested specific geographic location, which may factor unfavorably into granting a presentation request. For example, the entity's physical location may be that at the receiving time of the request, a time period before the receiving time of the request, a physical location during a time leading up to the receiving time of the request, and/or a physical location during a time shortly after the receiving time of the request. Depending on where the entity's physical location is at these times, the request to present content may be denied.

In some embodiments, when the obtained information about the physical location of the entity indicates that at a time of making the request, the entity is located at a first location remote from the specific geographic location, the display of the virtual content may be prevented. Virtual content may be prevented from being displayed when an entity's physical location is remote from the geographic location where the virtual content is to be displayed. Display prevention may be a function of a distance of a requesting entity from the requested specific geographic location. Additionally, remoteness may be based on differences in time zone, elevation, and/or topography. The threshold distance, i.e., the distance where a presentation request may be granted or denied based on how remote the requesting entity is, may be configurable or may be a matter of design choice by the system designer.

For example, if the requesting entity is remote from a particular location, e.g., fifteen kilometers or more, it may be undesirable to permit such an entity to display content at the particular location because it may cause cluttering public shared extended reality spaces. For example, if remote entities were permitted to present virtual content in areas that are far away from their physical locations, these areas may become overloaded with virtual content.

Some disclosed embodiments may further include receiving updated information indicating that the entity is located at a second location proximate to the specific geographic location, for example after preventing the display of the virtual content based on the information about the physical location of the entity. Proximate may refer to how close the requesting entity is to the specific geographic location, and may be determined based on distance, time zone, and/or elevation. The processor may compare the proximate distance to the remote distance threshold to aid in determining whether the presentation request may be approved. This proximate distance threshold may be configured by the receiving wearable extended reality appliance user or may be designed into the system. The content the entity requested may be automatically displayed when the entity moves closer to the recipient of the request, i.e., within the proximate distance threshold. Whereas the remote threshold distance may govern whether requested content may be presented or not, the proximate distance threshold may govern the distance at which content may be automatically presented. For example, virtual content may be automatically presented when the requesting entity is within one to ten kilometers of the specific geographic location, and/or the requesting entity is within one kilometer and also at the same elevation as the specific geographic location.

Some disclosed embodiments may further include automatically enabling the display of the virtual content at the specific geographic location in the at least one shared extended reality environment by at least some of the plurality of wearable extended reality appliances in response to receiving updated information. When an entity is remote from the specific geographic location and requests to display content relevant to its location, presenting the virtual content may overload the virtual space in the requested area. Although the requested content may meet other content placement restrictions, the requesting entity may be too remote for the receiving wearable extended reality appliance to accept the entity's request. However, when the requesting entity moves closer to a recipient of the request, the requested content may be automatically displayed. This may enable entities to plan distribution of virtual content along a route. The distance at which content is automatically displayed may be configured by the wearable extended reality appliance user at the specific geographic location. For example, the proximate threshold distance may be within ten, five, or one kilometer(s) of the specific geographic location. The proximate threshold distance may also be based on elevation. For example, content may be automatically displayed when the requesting entity and the specific geographic location are within one kilometer of each other and are also located at the same elevation.

The obtained information associated with the request includes ownership information associated with the specific geographic location, and some disclosed embodiments may further include determining whether the condition of the specific content placement rule is met based on the ownership information. Ownership information associated with the specific geographic location may refer to whether the owner is a public or private user. If a private user, ownership information may include the entity's identity (e.g., personal name, company name, organization, and/or sponsor). In some embodiments, an entity may be permitted to display a specific virtual content in a specific geographic location that it owns and may be prohibited from displaying a specific virtual content in a specific geographic location that it does not own. In some cases, the specific geographic location in the request may be a private place or a public place. Private places may have more content placement rules than public places, even within the same shared extended reality environment. For example, a private place may be associated with restrictions as to what type of content may be displayed, what time the content may be placed, and where the content may be placed. In this example, an entity may only be able to post office or business-related content if the specific geographic location is in a private place such as an office building, owned by the entity. By contrast, an entity may be able to present a wider array of content if the ownership information indicates that the specific geographic location is in a public place, owned by the local town or city.

By way of example, the obtained information may include ownership information that the specific geographic location is in a public place, such as a park. The owner of the specific geographic location may be the local town, which may have more relaxed presentation rules. In one example, the entity may wish to present virtual content comprising an advertisement for a soft drink. In this public environment, a specific content placement rule may state that advertisements for soft drinks are permitted. Thus, in this example, the content placement rule was met, and the entity was permitted to display an advertisement for a soft drink. In another example, the ownership information may indicate that the specific geographic location is in a private place owned by a private wearable extended reality appliance user. As in the previous example, the entity may wish to present virtual content comprising an advertisement for a soft drink. However, unlike the previous example, a condition of the specific content placement rule may state that no outside advertisements are permitted. Thus, the request to present the virtual content may be denied because the specific content placement rule is not met. In another example, the requesting entity may be an employee of a company and the specific geographic location is the company building, owned and occupied by the company. Here, the content placement rule may be met because, based on obtained ownership information, the requesting entity's place of work is at the specific geographic location.

Consistent with one aspect, the obtained information associated with the virtual content presentation request may include affiliation information reflecting a connection of the entity with the specific geographic location, and some disclosed embodiments may further include determining whether the condition of the specific content placement rule is met based on the affiliation information. Affiliation information may refer to any connection that the requesting entity has with the specific geographic location. For example, a lobby of a building may be associated with the company located in the building. A sporting venue may be associated with the home sports team affiliated with the venue. A conference room may be affiliated with an office in which the conference room is located. The affiliation information may additionally or alternatively include information related to ownership interests between the requesting entity and the specific geographic location, prior instances where the entity presented virtual content at the specific geographic location, and/or whether the specific geographic location is public or private. Ownership interests may refer to whether the requesting entity owns the specific geographic location. For example, affiliation information reflecting a connection with the specific geographic location may be useful in determining whether a content placement rule is met because if the requesting entity is affiliated with the specific geographic location, the affiliation may suggest that the content placement rule is met. Additionally, the affiliation may suggest that the requesting entity has previously presented virtual content at the specific geographic location. An affiliation may be a franchisor-franchisee relationship, landlord-tenant relationship, employer-employee relationship, and/or any other business or otherwise working relationship that may suggest that the entity has previously engaged with the specific geographic location or has a measure of authority associated with the geographical location. For example, the requesting entity may be an employee of a store who wishes to present an advertisement in the store. Since the requesting entity is affiliated with the specific geographic location, the associated affiliation information may be used to determine whether the condition of the specific content placement rule is met.

In another example, affiliation information may refer to prior instances where the requesting entity was permitted to present virtual content. This affiliation information may be relevant in both the public and private space. Here, if the affiliation information reflects that the requesting entity previously presented virtual content at the specific geographic location, this may indicate that the specific content placement rule was previously met and may be met at the current time as well. For example, a not-for-profit entity may have been granted permission to post information in a public space and the permission granted in the past may determine an ability to place content in the future.

Consistent with one aspect, the obtained information associated with the virtual content presentation request may include information about a content type, and some disclosed embodiments may further include determining whether the condition of the specific content placement rule is met based on the information about the content type. A variety of different virtual content types may be presented. Content type may refer to one or more characteristics or properties of the virtual contents. Such characteristics or properties may include, for example, whether the virtual content is of a commercial or public informational nature, whether the content is of a public or private nature, whether the content is a document, video, or presentation, whether the content is two-dimensional or three-dimensional, and/or any other properties related to the subject matter or properties of the content (e.g., ownership or affiliation information associated with a presenter of the content or recipient of the content.) Public content may refer to content that is posted in the public extended reality environment. Public content may be visible to many or all wearable extended reality appliance users. Such public content may also include advertisements. Private content may refer to content that is posted in a private extended reality environment, i.e., a limited number of users may be able to view the presented virtual content. Private virtual content may be documents, videos, or presentations that are relevant to conducting business, education, or simply sharing between family members or friends. Determining the content type may be helpful in determining whether the content placement rule is met. For example, a content placement rule may limit presented content to private documents and other business-related content. Here, if a requesting entity wishes to present a public advertisement in a private environment, that request may be denied based on the content type-based content placement rule because the content placement rule is not met. In this example, the content placement rule may prevent the presentation of public content such as advertisements. However, if a requesting entity wishes to present a private document in a specific geographic location to a private user, that request may be approved because the content placement rule is met.

Consistent with one aspect, the obtained information associated with the virtual content presentation request may include information about a time of day, and some disclosed embodiments may further include determining whether the condition of the specific content placement rule is met based on the information about the time of day. Time of day information may include the time of day at which the request to present virtual content is received, and/or a time of day when the virtual content is to be displayed. For example, a content placement rule may limit receiving presentation requests to normal 9 AM to 5 PM business hours. Here, if a receiving wearable extended reality appliance user receives a presentation request outside of normal 9 AM to 5 PM business hours, the content placement rule may not be met, and thus the presentation request may be denied. The time of day that the virtual content is to be displayed is also relevant to determining whether the specific content placement rule is met. For example, a content placement rule may limit presenting virtual content to normal working hours of 9 AM to 5 PM. Here, the specific content placement rule may not be met if a request to display private virtual content is outside the working hours of 9 AM to 5 PM. In another example, a content placement rule may limit presenting content outside of the operating hours of a public space. Here, an entity may request to present virtual content in a public park, but the park is only open from dawn to dusk. If an entity requests to present virtual content outside of those hours, the specific content placement rule may not be met, and the request to present virtual content may be denied.

In some embodiments, there may be content placement rules based on the time of day that govern which type of content may be presented at which time. Here, one type of content may be presented at a first time of day, and a second type of content may be presented at a second time of day. For example, a specific rule may allow display of an advertisement related to coffee and breakfast in the morning, and soft drinks and lunch in the afternoon. In this example, the content placement rule may not be met if the requesting entity wishes to present content related to coffee and breakfast in the afternoon or late evening. Thus, the request to present virtual content may be denied.

Consistent with one aspect, the obtained information associated with the virtual content presentation request may include virtual space constraint information associated with the specific geographic location, and some disclosed embodiments may further include determining whether the condition of the specific content placement rule is met based on the virtual space constraint information. Virtual space constraint information may refer to the number of objects that may be placed at the specific geographic location, the size of the objects that may be placed at the specific geographic location, the total virtual real estate available for placement and/or the specific arrangement of the objects at the specific geographic location (i.e., if some virtual content may be presented before other virtual content). Virtual space constraint information may also refer to how many virtual objects are in the vicinity of the specific geographic location. Virtual space constraints may exist so that there are not too many virtual objects presented in one specific geographic location, or in the vicinity of one specific geographic location. Virtual space constraints may limit the number of virtual objects that may be presented in a single geographic location and may depend on the size of the virtual space. Virtual space constraints may also depend on the size of the objects presented and are also related to the size of the virtual space. Virtual space constraints may also refer to a specific arrangement of objects at the specific geographic location. Depending on the size of the virtual space, virtual objects may need to be organized in a certain way to either avoid overlapping or overloading the virtual space or to be more visible to passersby.

For example, a specific content placement rule may prevent more than four virtual objects from being presented in a virtual space. The content placement rule may be based on how many virtual objects are present in the virtual space and may also be based on the display size of the objects in the virtual space. If the display of one of the virtual objects is larger than another, fewer virtual objects may be able to be displayed. In this example, an entity may request to present virtual content in a specific geographic location. However, if the entity requests to present four large virtual objects, the request may be denied because even though the entity's request met the content placement rule regarding the number of virtual objects in the virtual space, it did not meet the size requirement, and thus the presentation request may be denied.

In another example, a specific content placement rule may prevent the display of virtual content unless it is arranged in a specific way, i.e., two small virtual objects located adjacent to two larger virtual objects. If a requesting entity wishes to present content that does not meet the virtual space constraint, e.g., the request involves three small virtual objects located adjacent to one larger virtual object, the content placement rule may not be met, and the presentation request may be denied.

Figure 38:
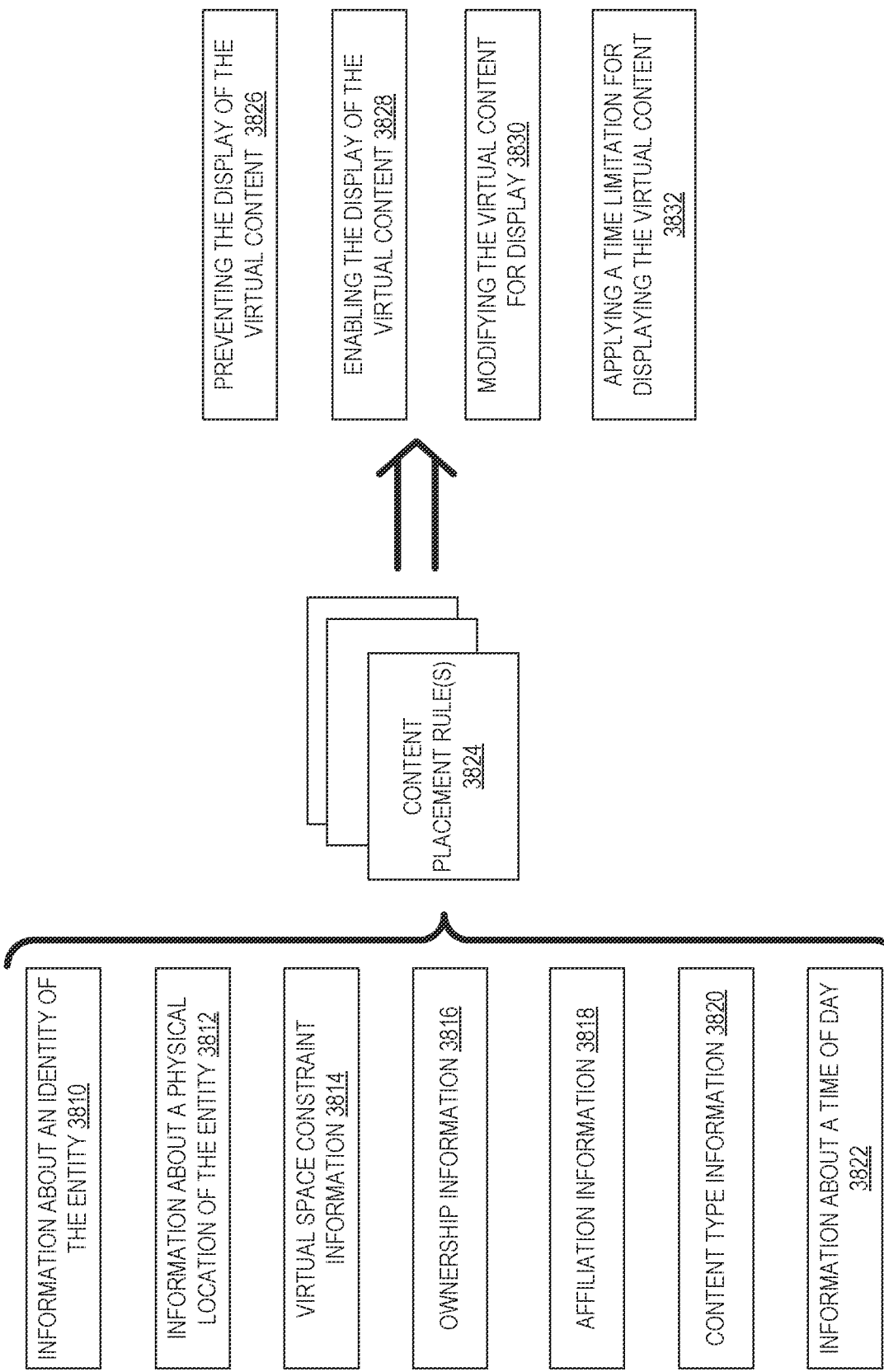
FIG. 38 is a diagram illustrating content placement rules, implemented based on various input parameters, consistent with some embodiments of the present disclosure.

By way of example, FIG. 38 is a diagram that illustrates content placement rules 3824 that are associated with multiple input parameters that include information about the requesting entity, the specific geographic location, and content type. The input parameters may refer to the information obtained by a processing device. The processing device may be included in remote processing unit 208 (e.g., processing device 560), included in XR unit 204 (e.g., processing device 460), included in input device 202 (e.g., processing device 360), or included in mobile communications device 206. Input parameter 3810 may represent information about an identity of the entity, input parameter 3812 may represent information about a physical location of the entity, input parameter 3814 may represent virtual space constraint information, input parameter 3816 may represent ownership information, input parameter 3818 may represent affiliation information, input parameter 3820 may represent content type information, and input parameter 3822 may represent information about a time of day. The content placement rules 3824 may be configurable and may include rules related to public or private content, time restrictions, content type restrictions, ownership restrictions, affiliation restrictions, physical location restrictions, display size restrictions, and/or virtual object number restrictions. Based on the input parameters and the content placement rules 3824, the processing device may execute one or more of the following operations: operation 3826 preventing the display of the virtual content, operation 3828 enabling the display of the virtual content, operation 3830 modifying the virtual content for display, and/or operation 3832 applying a time limitation for displaying the virtual content.

Related embodiments may include receiving image data captured from an area of the specific geographic location via an image sensor associated with the requesting entity's wearable extended reality appliance. The image data may be captured either continuously or periodically, i.e., every few seconds. For example, an image sensor that acquires the image data may be located on the lens, bridge, or any other location on the wearable extended reality appliance so as to capture accurate image data. Captured image data may include color, brightness, light, and/or texture information, location information, geographic information, and/or height or depth information about the specific geographic location.

Some disclosed embodiments may further include analyzing image data to determine a characteristic of the specific geographic location. For example, the characteristic of the specific geographic location may include indications of whether the location is inside or outside, i.e., an office, home, street, park, or other public or private location. In some examples, a characteristic of a geographic location may include the physical dimensions associated with the specific geographic location, i.e., the height, width, and depth of the surface where the content is to be presented. Another characteristic of a geographic location may include the number of people present at, or in the vicinity of, the specific geographic location. For example, the more people who are present at a specific geographic location, the more viewers of a presented virtual object, e.g., an advertisement, and thus there are more potential purchasers of the advertised product. A further characteristic of a geographic location may include the number of virtual objects present at, or in the vicinity of, the specific geographic location. For example, if an entity wishes to present virtual content so that it is visible to other wearable extended reality appliance users, one characteristic that the entity may analyze is how many virtual objects are already in that specific geographic location and if there is space to present another virtual object or a plurality of virtual objects. In this example, the specific geographic location may be a billboard on a highway, and two virtual objects may already be present on the billboard. Thus, the entity may not present virtual content there based on the presence of the other virtual objects. In another example, the requesting entity may opt to present virtual content at an area that is close to the billboard, but not so close as to confuse a viewer with cluttered content. In some examples, a machine learning model may be trained using training examples to determine characteristic of geographic locations from images and/or videos. An example of such training example may include a sample image and/or a sample video of a sample geographic location, together with a label indicating characteristic of the sample geographic location. The trained machine learning model may be used to analyze the image data to determine the characteristic of the specific geographic location. In some examples, the characteristic of geographic locations may be received from a user (for example through a user interface), may be read from memory, may be received from an external device, and/or may be obtained from a database.

Some disclosed embodiments may involve implementing the specific content placement rule to prevent a display of the virtual content at the specific geographic location in the at least one shared extended reality environment by at least some of the plurality of wearable extended reality appliances when a condition of the specific content placement rule is not met. Each wearable extended reality appliance (or its user) may be checked against rules. Those appliances or users who meet the rules may be permitted to post content; those who do not may be prohibited. A specific content placement rule may apply to multiple shared extended reality environments and may involve multiple parties. Depending on the purpose of presenting virtual content, there may be more than one shared extended reality environment. Many if not all users may have access to a public shared extended reality environment in which various types of virtual content may be displayed. However, there may also be a plurality of private shared extended reality environments in which virtual content may be shared only between a limited number of users. For example, in one private shared extended reality environment, content may only be shared between a limited number of users who may be friends or family. In another example, there may be a private shared extended reality environment where content may be shared between a limited number of users who are coworkers or students. In some examples, implementing the specific content placement rule to prevent a display of the virtual content at the specific geographic location in the at least one shared extended reality environment may comprise avoiding adding the virtual content to the at least one shared extended reality environment, at all or at least at the specific geographic location.

While specific types of content may be permitted in some shared extended reality environments, this content may not be permitted in other shared extended reality environments based on specific content placement rules at specific geographic locations. Content placement rules may be based on content type, time of day, virtual space constraints, and/or whether the specific geographic location is public or private. When a content placement rule is met, display of virtual content may be enabled. When a content placement rule is not met, display of virtual content may be prevented. For example, advertisements may be permitted in a public shared extended reality environment, but not in a private office environment or a private friends or family environment. Such a private environment may also be in a wearable extended reality appliance user's home, and it may be desirable to not have unwanted ads in one's home. The system may use the content placement rules to prevent unwanted content. In one example, users in home, office, and family environments, i.e., a plurality of users in different shared extended reality environments, may prevent the public content from being presented because it may interfere with their ability to present the content that they wanted, such as business-related content. In this example, presenting public advertisements in a private office setting may be distracting to employees. The group of users that may prevent the display of content may also be a local government or regulatory entity.

Some disclosed embodiments may involve implementing the specific content placement rule to enable the display of the virtual content at the specific geographic location in the at least one shared extended reality environment by at least some of the plurality of wearable extended reality appliances when the condition of the specific content placement rule is met. In some examples, implementing the specific content placement rule to enable the display of the virtual content at the specific geographic location in the at least one shared extended reality environment may comprise adding the virtual content to the at least one shared extended reality environment at the specific geographic location.

In some embodiments, content may be enabled to be presented, provided that a specific content placement rule is met. A content placement rule may be based on content type, time of day, virtual space constraints, and/or whether the specific geographic location is public or private. Content may be presented when the content placement rule is met, and the specific content placement rule may apply to more than one shared extended reality environment, i.e., both a public and private extended reality environment. In some embodiments, a plurality of wearable extended reality appliance users may implement a content placement rule, and that plurality of users may determine which content may be presented and which content may not be presented. Additionally, this plurality of users may determine whether virtual content may be presented in both private and public shared extended reality environments.

A content placement rule may apply to content that is useful and informative to all users and/or conveys emergency information. For example, a content placement rule may permit news and weather reports to be displayed in emergency situations, such as when severe weather is approaching the area. In one embodiment, this content placement rule may be met when the public content that is requested to be presented is informative to all users, i.e., it includes urgent weather-related information, and thus may be enabled to be presented.

A plurality of users, i.e., local government or regulatory entities, may determine which public content may be displayed in private shared extended reality environments. Additionally, permitting this content to be presented may meet the content placement rule described above, and thus may be presented by at least some private shared extended reality environments. Each unique content placement rule may be configured by an individual wearable extended reality appliance user or plurality of users.

In some embodiments, implementing the specific content placement rule to enable virtual content display may include presenting the virtual content in a manner overlaying a physical object at the specific geographic location. When overlaying virtual content at the specific geographic location, there may be at least one physical object and at least one virtual object. Overlaying virtual content may refer to presenting virtual content atop a physical object. The physical object may be a screen, sign, poster, wall, window, or any other physical object wherein virtual content may be displayed. For example, a specific content placement rule to enable virtual content display may require virtual content to be presented on a screen or other flat surface. If there is no screen or other flat surface available, the request to present virtual content may be denied. By way of another example, a presented virtual object may be docked with another virtual object before being overlaid over the physical object, i.e., two virtual objects are docked with one another before they are presented over a physical object such as a screen. For example, presented virtual content may involve a first virtual object such as video content. A second virtual object that may be docked with the video content may be a volume adjustment bar. The content placement rule at the specific geographic location may stipulate that a second virtual object, here, a volume adjustment bar, must be associated with the virtual content before the content may be overlaid over the physical object. The content placement rule may be met if the first virtual object (the video content) and the second virtual object (the volume bar) are docked to one another before the content is presented over the physical object. In this example, the content placement rule is met, and the presentation request may be granted. In another example, the same content placement rule applies, i.e., virtual objects must be docked to one another before content may be displayed over physical object. In this example, if the first virtual object (the video content) is not docked with the second virtual object (the volume adjustment bar), the content placement rule is not met, and the presentation request may be denied.

In some embodiments, implementing the specific content placement rule to enable virtual content display may include docking the virtual content to a physical object located in an area of the specific geographic location. Docking may refer to the action of linking, tethering, attaching, pairing, or in some way connecting a virtual object and a physical object. An example of a virtual object is a virtual screen (also referred to as a 'virtual display' or a 'virtual display screen' herein), and an example of a physical object may be a keyboard. When docked, the virtual object and the physical object may move together in tandem and change location and/or orientation. Virtual objects may also be docked with other virtual objects.

In one implementation, the physical object may be movable, and some disclosed embodiments may further include receiving an input indicative of a movement of the physical object to a new location and enabling the display of the virtual content at the new location. A movable physical object may be one that is possible to relocate based on its size, weight, orientation, and/or other characteristic. A movable object may be a keyboard, a mouse, a touchpad, a pointing device, a microphone, a pencil, a pen, a stylus, a joystick, a person, a robot, and/or any other object that a wearable extended reality appliance user may dock with a virtual object.

In some embodiments, input indicative of a movement of a physical object may be received from a sensor included in the physical object. Movement may also be detected based on position of the object. In one example, a sensor may be a motion sensor, image sensor, and/or a combination of a motion sensor and an image sensor. Other examples of using other sensors to determine movement of physical objects are discussed above. The captured motion or image data may be used in order to determine that the physical object has moved to a new location. The sensor(s) may be located on any part of the physical object so that a motion sensor may accurately capture changes in position and/or orientation, and the image sensor may capture changes in color, brightness, texture, and/or light so as to signal a change in location. A motion sensor may be associated with the physical object which sends a signal to the processor associated with the non-transitory computer readable medium that the keyboard has moved to a new location. Image data may also be used to determine that the movable physical object has moved to a new location, for example by analyzing the image data using an ego-motion algorithm. Once it is determined that the movable physical object has relocated, the virtual content may be displayed at the second location. The virtual content may be displayed at the second location because the virtual object is docked to the physical object.

Some disclosed embodiments may further include receiving an input indicative of a movement of the physical object to a new geographic location. The processor, for example, based on captured image or motion data received from the physical object, or based on other input data as described above, may determine that the physical object has moved to a new geographic location. For example, the image data may be analyzed using an ego-motion algorithm or an ego positioning algorithm to determine that the physical object has moved to a new geographic location. The processor may also determine a change in physical location based on GPS data. In this example, a GPS is included as part of the movable physical object.

Some disclosed embodiments may further include selecting a second content placement rule, based on the new geographic location. Content placement rules may change between two different geographic locations. A first geographic location may be private, and a second geographic location may be public. Content placement rules may also change between two public geographic locations. For example, for public locations, a first town may have different public content placement rules compared to a second town. In some embodiments, the movable physical object may be moved from a first location to a second location. Because the physical object is docked with a virtual object, the virtual object moves to the second location as well. Here, the second location may have a different content placement rule compared to the first location's content placement rule. For example, the first location may be a public location, and the second location may be private. The public location may have different content placement rules as compared to the private location. For example, advertisements may be permitted in the first public location, but not in the second private location.

Some disclosed embodiments may include implementing the second content placement rule to prevent a display of the virtual content at the new geographic location when a condition of the second content placement rule is not met. Other disclosed embodiments may also include implementing the second content placement rule to enable the display of the virtual content at the new geographic location when the condition of the second content placement rule is met.

In some embodiments, a content placement rule at a first specific geographic location may be met, enabling content to be presented. However, the content placement rule at a second specific geographic location may not be met, and the request to present content may be denied. The content placement rule may govern virtual content type, virtual space restrictions, time of day restrictions, and/or public or private shared extended reality space restrictions. The second specific geographic location may be in the same shared extended reality space (i.e., public or private), may be in a different shared extended reality space, and/or may be located close to or remote from the first specific geographic location. In other embodiments, a content placement rule at a first geographic location may not be met, and thus virtual content is prevented from being presented. However, a content placement rule at a second specific geographic location may be met, thus enabling virtual content to be presented.

For example, advertisements may be permitted in the first public location, but not in a second private location. Thus, a requesting entity may be prevented from presenting virtual content in a second private location because the second content placement rule has not been met. In the example described above, the requesting entity was unable to present virtual content in the second location because they did not meet the second content placement rules. In that example, presenting advertisements was permitted in the first public location but not the second private location. In another example, however, a presenting entity may be presenting content that is permitted in both a public first location and a private second location. For example, the presented content may be a weather report that is beneficial to both public users and private users. Local government or regulatory entities may determine what content is permitted to be displayed in both public and private shared extended reality environments. In this example, the content placement rule in the private specific geographic location permits news reports to be presented but prevents advertising content from being presented. Thus, because the content placement rule of the second location is met, the content may be presented. If a user does not wish to view this content, he or she may create another shared extended reality environment and filter out the content that he or she does not wish to view. This user may add other users to the new shared extended reality environment based on the new content placement restrictions the user created.

In some embodiments, implementing the specific content placement rule to enable virtual content display may include storing data associated with the virtual content and associating the data with the specific geographic location. Stored data may include content type of the displayed content, i.e., public or private content, inanimate or animate content, i.e., video or document content, two-dimensional or three-dimensional content, and/or the display size of the content. Data may be stored over time in the non-transitory computer readable medium. This data, over time, may be associated with a specific geographic location. The data may be placed in a record in a database or data structure, and/or the two items (i.e., the requested virtual content and the specific geographic location) may be linked in a database (such as a key-value database), data structure, or lookup table, in order to be associated with a specific geographic location. For example, an entity may present different types of virtual content at different specific geographic locations over a one-year period. The entity presents the same type of virtual content as the same location each time. Thus, over the one-year period, the processor associated with the non-transitory computer readable medium may preemptively associate certain virtual content with certain specific geographic locations and may preemptively determine that a specific content placement rule to enable content display is met or not met based on the stored data. In some embodiments, a machine learning algorithm may also be implemented to store test data over time, such that the processor may preemptively determine which virtual content may be permitted to be displayed, and which virtual content may be prevented from being displayed.

For example, an entity may present an advertisement at a particular specific geographic location in a public shared extended space three or four times consecutively. When the wearable extended reality appliance receives the fifth request, the processor may automatically determine that the content placement rule is met based on the entity's prior placement of the content.

In some embodiments, implementing the specific content placement rule to enable virtual content display may include determining a time limitation for displaying the virtual content at the specific geographic location. A time limitation may include a cap on how long specific virtual content may be displayed. A time limitation may be based on the content type of the displayed content, i.e., public or private content, inanimate or animate content, two-dimensional or three-dimensional content, and/or the display size of the content. Public content may be displayed for a longer time as compared to private content, depending on the content placement rule at a specific geographic location. Time limitations may also be tied to a specific time of day. Depending on the virtual content displayed, the time limitation may be a set time period, such as one hour or two hours, or may be based on the time of day, such as morning, afternoon, evening, or nighttime. The time limitation may also be based on normal 9 AM to 5 PM working hours. In this example, some virtual content may be time-limited to be displayed only during working hours, and some virtual content may be time-limited to only be displayed outside of working hours. In one example, displayed content may be public and in a high-trafficked area such as a town square or park. At peak times, such as when people are going to and from work, time limitations at that specific geographic location may be short. That is, virtual content may be displayed for a shorter time at peak traffic periods than at lower traffic periods.

Time limitations may also exist for the hours themselves. For example, content may be prevented from being displayed at a specific geographic location at night or during the earlier morning. In another example, content placement rules at specific geographic locations may be related to working hours. Here, content placement rules may permit some content outside of working hours and not permit that content during working hours. Virtual content that may lie within this rule may include public advertisements for bars, clubs, or other social gathering spaces. Presenting virtual content related to these spaces during working hours may hinder productivity, and thus may not be permitted in a shared extended realty environment.

In some embodiments, implementing the specific content placement may include modifying the virtual content for display at the specific geographic location. Modifying the display of content may refer to reducing certain display parameters and/or changing the subject matter of the displayed content and may occur in a myriad of ways. Modifying the display of content may include reducing brightness, intensity, or opacity of inanimate content, reducing the frame rate of animate content, changing the color scheme of displayed content, and/or reducing the display size of the virtual content. Modifying the display of content may also involve changing the content itself in order to meet the specific content placement restriction at the specific geographic location. For example, modifying the display of content may include modifying a gender of a character in an advertisement from a man to a woman.

For example, if there are virtual space constraints at the specific geographic location, an entity may modify the size of the presented virtual content. An entity may also change the colors of the presented virtual content to meet specific geographic location requirements. For example, an office or classroom may have a desired color scheme for presented content. The content itself may also be changed based on the restrictions associated with the location. For example, if a school or place of worship is nearby, an entity that wishes to present content may need to ensure that the presented content is not offending. In another example, animated content may need to be changed to inanimate content if the geographic restrictions require it. In yet another example, three-dimensional content may need to be reconfigured as two-dimensional content to meet virtual space constraints.

Figure 39:
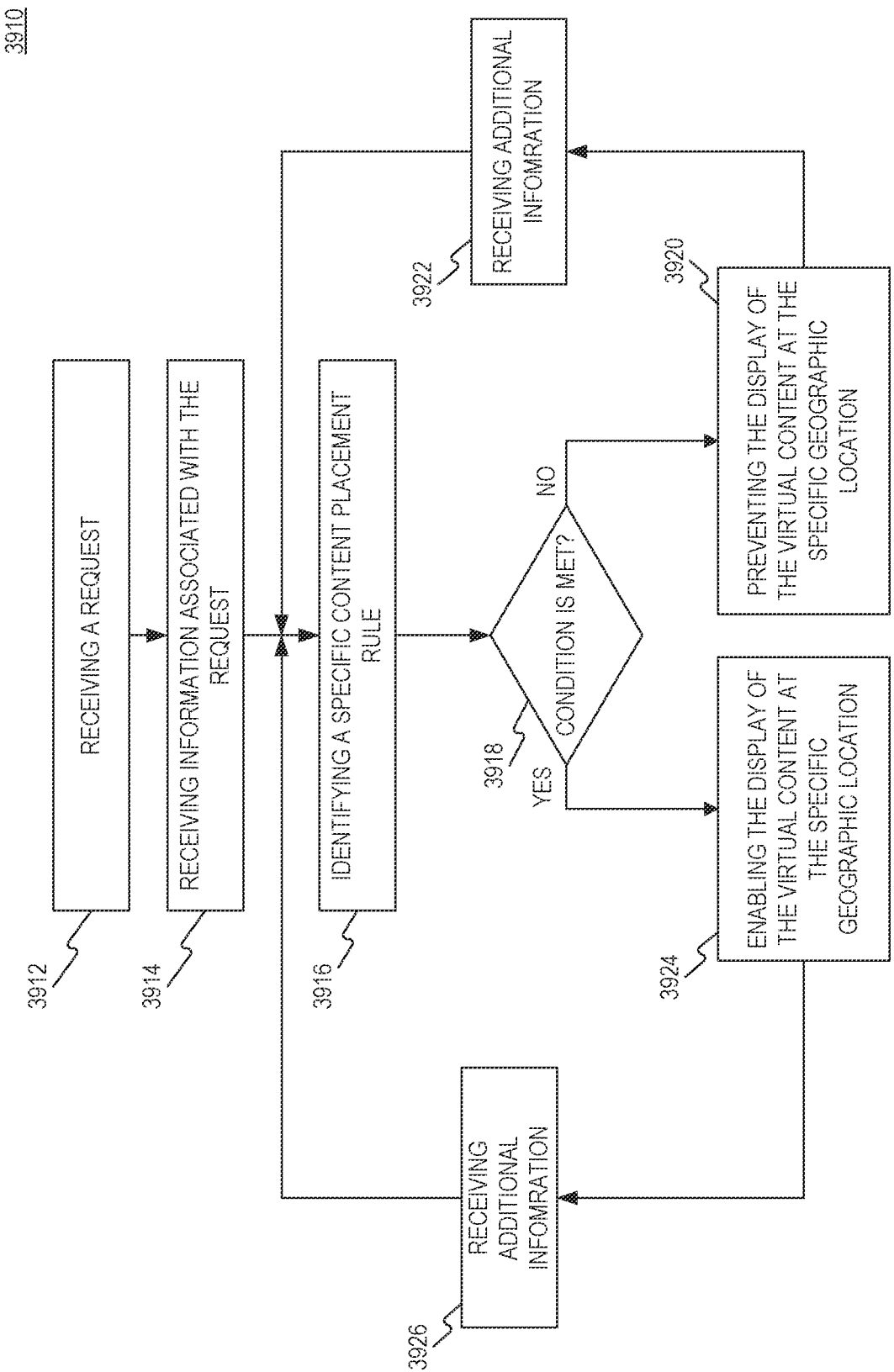
FIG. 39 is a flowchart of a process for determining whether to display content in a specific geographical location, consistent with some embodiments of the present disclosure.

By way of example, FIG. 39 depicts a flow chart 3910 illustrating method 3910 of determining whether to display content. Method 3910 may include step 3912 of receiving a request from an entity to display virtual content. Method 3910 may also include step 3914 of receiving information associated with the entity's request. Such information, as discussed in FIG. 38, may include information about an identity of the entity, information about a physical location of the entity, ownership information, affiliation information, and/or content type information. Method 3910 may also include step 3916 of identifying a specific content placement rule. Such a rule may be based on the type of content the entity wishes to present, and/or whether it is public or private. Method 3910 may also include step 3918 of determining whether the content placement rule is met. When the condition associated with the specific content placement rule is not met (Step 3918: NO), method 3910 may include step 3920, where virtual content may be prevented from being displayed at the specific geographic location. However, method 3910 may also include step 3922, where the processor may receive ongoing information, such as time of day information and virtual space constraint information and may reevaluate the requesting entity's query accordingly. When the condition associated with the specific content placement rule is met (Step 3918: YES), method 3910 may include step 3924, which may enable the display of the virtual content at the specific geographic location. Method 3910 may also include step 3926 of receiving additional information. Even though the content placement rule is met at one specific geographic location, the content placement rule may not be met at a second geographic location. Thus, processing device 360, 460, or 560 (see FIGS. 3, 4 and 5) may be configured to keep receiving information.

Figure 40:
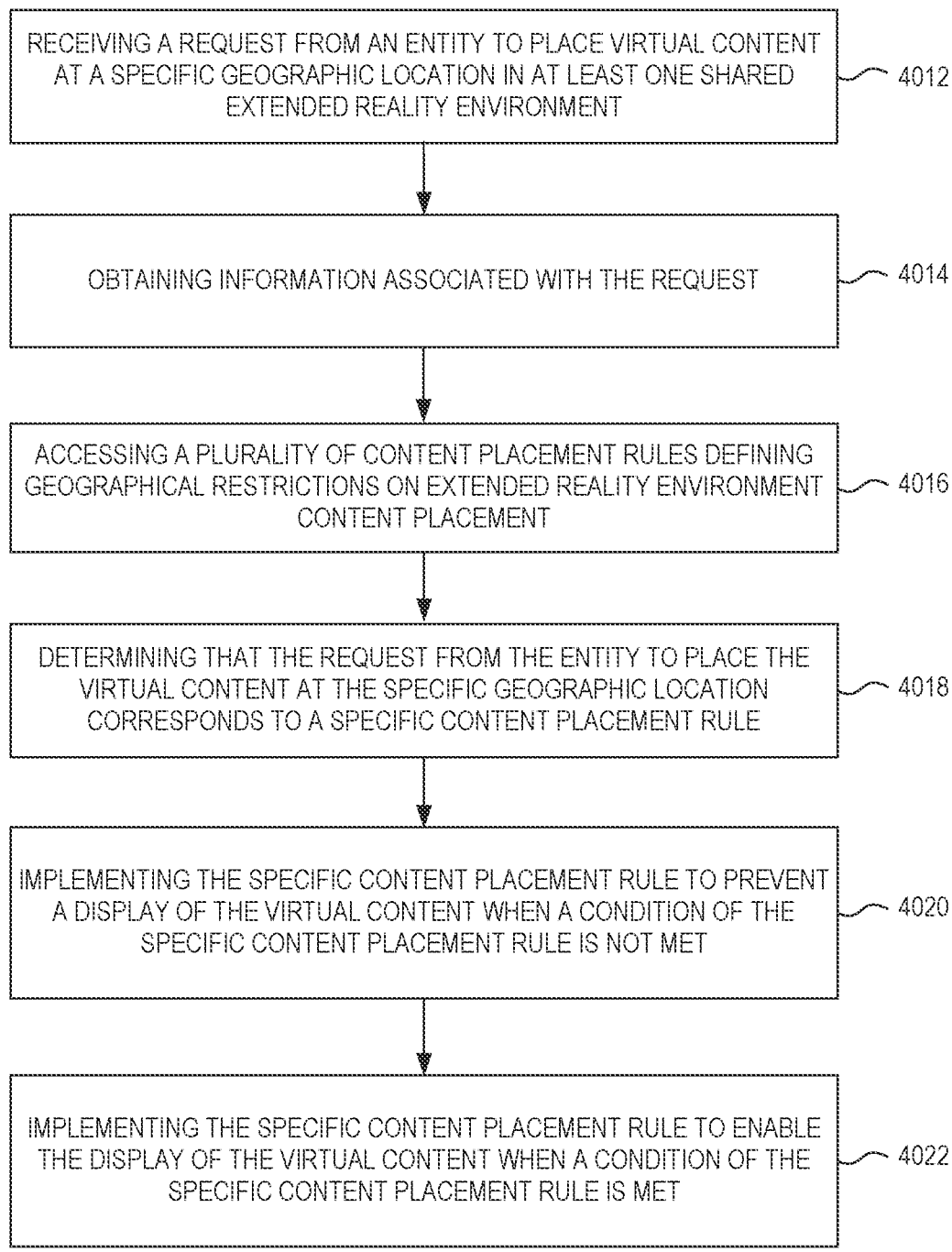
FIG. 40 is a flowchart illustrating an exemplary method of managing content placement in extended reality environments, consistent with some embodiments of the present disclosure.

By way of example, FIG. 40 is a flowchart illustrating an exemplary method 4010 for managing content placement in extended reality environments. Process 4010 may be performed by one or more processing devices (e.g., 360, 460, 560) associated with input unit 202 (as depicted in FIG. 3), XR unit 204 (as depicted in FIG. 4), and/or remote processing unit 208 (as depicted in FIG. 5). The steps of the disclosed method 4010 may be modified in any manner, including by reordering steps and/or inserting or deleting steps. Method 4010 may include a step 4012 of receiving a request from an entity to place virtual content at a specific geographic location in at least one shared extended reality environment. Method 4010 may also include a step 4014 of obtaining information associated with the request. The extended reality appliance receiving the virtual content placement request may access a plurality of content placement rules defining geographical restrictions on extended reality environment content placement 4016 (as depicted in FIG. 38). Method 4010 may also include step 4018 of determining that the request from the entity to place the virtual content at the specific geographic location corresponds to a specific content placement value. The extended reality appliance receiving the request may implement the specific content placement rule to prevent a display of the virtual content when a condition of the specific content placement rule is not met 4020 and may enable the display of the virtual content when a condition of the specific content placement rule is met.

Some disclosed embodiments may involve presenting virtual content to multiple viewers. Virtual content, as described more fully in other portions of this disclosure, may include any non-physical representation of information that may be displayed. Virtual content may include two-dimensional virtual objects, three-dimensional virtual objects, animated content, unanimated content, textual data, or other graphical representations. The virtual content may be shared in a physical room or a virtual room with physical viewers and/or virtual viewers. The position and/or orientation of the virtual content may be determined based on one or more viewer locations for optimal user experience. Multiple individuals wearing extended reality appliances may, for example, be presented with a virtual screen that may be displayed to each viewer at a single location to all viewers in a room, with each viewer being presented with the same content but from a different perspective.

Some disclosed embodiments may involve receiving sensor data indicative of a plurality of wearable extended reality appliances located in a room. Receiving sensor data may refer to collecting, acquiring, gathering, or getting any type of data that is output from a sensor or that is derived from signals output from a sensor. For example, receiving the sensor data may comprise at least one of reading the sensor data from memory, receiving the sensor data from an external device, receiving the sensor data from one or more sensors, capturing the sensor data using one or more sensors, and so forth. A sensor may refer to a device that detects and/or responds to an input from a physical or virtual environment. Non-limiting examples of sensors that may be used to provide sensor data indicative of a plurality of wearable extended reality appliances located in a room may include image sensors, audio sensors, motion sensors, temperature sensors, vibration sensors, infrared sensors, LIDAR sensors, or any other device capable of identifying the presence and/or the identity of wearable extended reality appliance. Other sensors that may be used to capture sensor data indicative of the plurality of wearable extended reality appliances being in the room, such as positioning sensor, are described above. For example, the sensor data may include sensor data captured using sensors included in wearable extended reality appliances, a processor within a server (e.g., server 210) may receive sensor data from different processors within the wearable extended reality appliances, or a processor included in one of the wearable extended reality appliances may receive the sensor data. In another example, the sensor data may include sensor data captured using a sensor not included in any wearable extended reality appliance, such as an image sensor positioned in the room.

A room may refer to an area, place, accommodation, or other similar space that may be occupied or where events may occur, such as a display of virtual content. The room may be a virtual room, a physical room, or a combination of a virtual and physical space. For example, data, for example in the form of multiple images captured at different times from an image sensor, may indicate, show, or portray that more than one wearable extended reality appliance are physically or virtually located in a physical or virtual room. For example, there may be two, three, four, or five wearable extended reality appliances in the room. In some examples, the room may be completely virtual, and, in other examples, the room may be completely physical.

Figure 41:
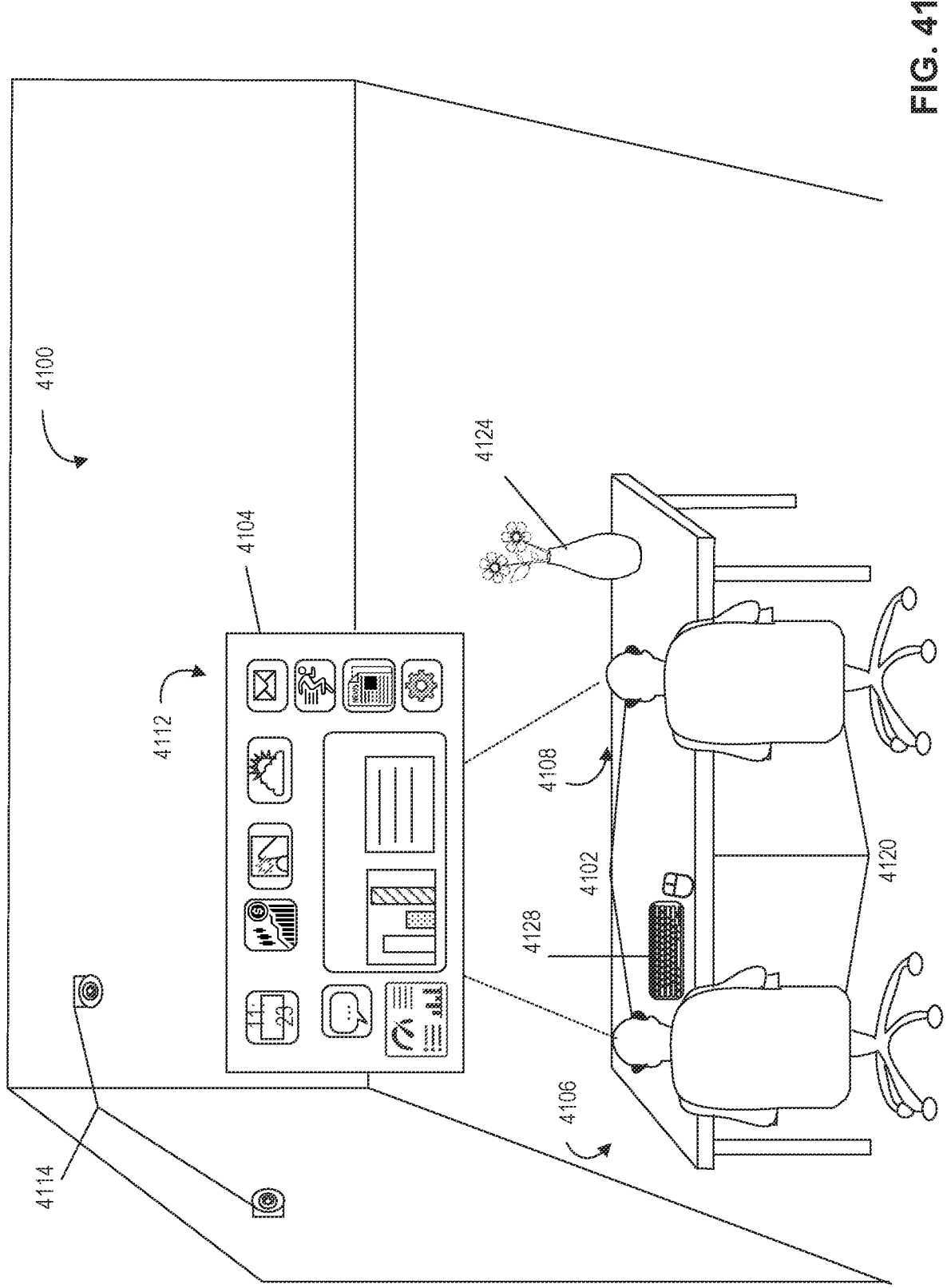
FIG. 41 illustrates a one exemplary presentation of virtual content to multiple viewers, consistent with some embodiments of the present disclosure.

By way of example, FIG. 41 illustrates a plurality of wearable extended reality appliances 4102 located in a room 4100. For example, the room 4100 may be a physical room and the plurality of wearable extended reality appliances 4102 may include two wearable extended reality appliances 4102. FIG. 41 also illustrates a virtual object 4104 at a position 4112 displayed for viewing via wearable extended reality appliances 4102. A first wearable extended reality appliance is located at a first location 4106 and a second wearable extended reality appliance is located at a second location 4108. Furniture 4120 and a physical object 4124 (e.g., a vase) is also present in this example. Sensor 4114 is also present in this example.

In some embodiments, the sensor data may be received from at least one of the first wearable extended reality appliance, the second wearable extended reality appliance, or the third wearable extended reality appliance. It should be apparent to one ordinarily skilled in the art that the disclosed embodiments, for example, may include at least one processor for providing the functionality described herein. In some embodiments, at least one processor may be associated with a wearable extended reality appliance. The wearable extended reality appliance may be configured to acquire sensor data from an environment (for example, using one or more sensors included in the wearable extended reality appliance) and transmit the sensor data (or a portion of the sensor data) to, for example, a remote server. In some embodiments, the at least one processor may be configured to collect sensor data from a sensor associated with one or more wearable extended reality appliances. For example, if three extended reality appliance are in proximity to each other, one or more of them may transmit data obtained from an on-board sensor. For example, the sensor in one appliance may detect other appliances in proximity and transmit data identifying their presence and/or information reflective of their specific identity. Each wearable extended reality appliance may identify one or more other appliances to provide a collective indication of the appliances located within the same room or common physical (or virtual) space. The transmission of sensor data may occur over one or more networks, which may or may not involve remote servers. At least one processor may receive sensor data from a sensor associated with the wearable extended reality appliance or from some other sensor. At least one processor may use one or more programs or sets of program instructions to analyze data received from one or more sensors. For example, sensor data may be received by a processor within a server (e.g., server 210) from a first wearable extended reality appliance, a second wearable extended reality appliance, or a third wearable extended reality appliance. Alternatively, sensor data may be received by the processor within the server (e.g., server 210) from the first wearable extended reality appliance, the second wearable extended reality appliance, and the third wearable extended reality appliance. Sensor data may also be received by the processor within the server (e.g., server 210) from a combination of a plurality of wearable extended reality appliances. For example, the sensor data may be in the form of images from an image sensor associated with a wearable extended reality appliance or may be in the form of values representing motion from a motion sensor associated with the wearable extended reality appliance.

In some embodiments, the sensor data may be received from a sensor separated from the first wearable extended reality appliance, the second wearable extended reality appliance, and the third wearable extended reality appliance. A sensor may be considered to be "separated" from a wearable extended reality appliance when it is divided, not linked, not connected, or otherwise distinct from the wearable extended reality appliance. Non-limiting examples of a sensor that may be separated from a wearable extended reality appliance may include an infrastructure sensor mounted in a room (e.g., a physical conference room may have installed image sensors) or a moveable sensor placed in a room. The moveable sensor placed in a room may be a dedicated sensor configured for use with embodiments disclosed herein, or may be a sensor that is temporarily in the room, such as the camera on a laptop, phone, or wearable device other than a wearable extended reality appliance.

Figure 42A:
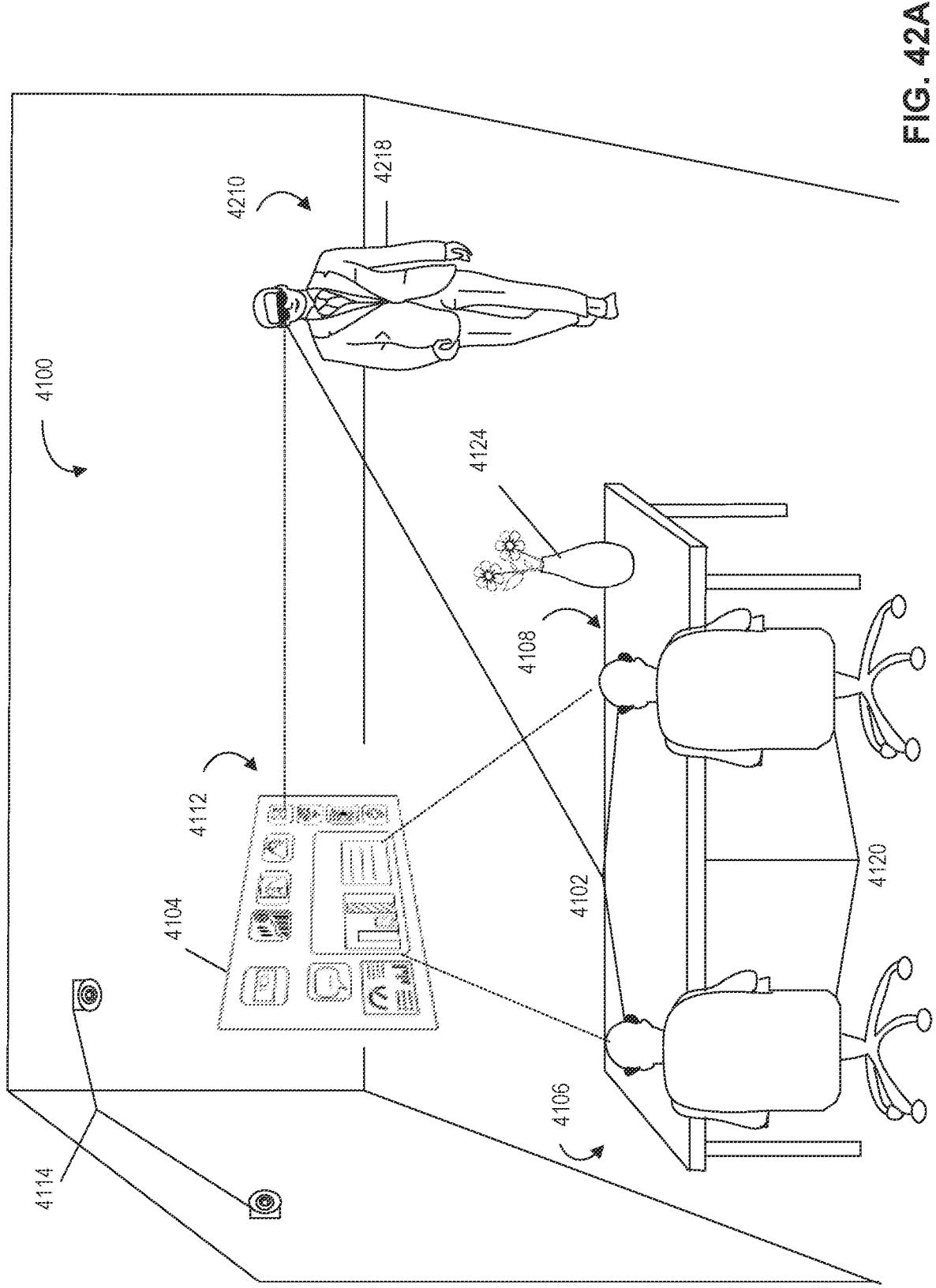
FIG. 42A illustrates another exemplary presentation of virtual content to multiple viewers, consistent with some embodiments of the present disclosure.

By way of example, FIG. 42A illustrates a sensor 4114 (e.g., two image sensors on two different walls) that is separate from a first wearable extended reality appliance, a second wearable extended reality appliance, and a third wearable extended reality appliance. For example, a physical conference room 4100 may have the sensor 4114 in the form of two images sensors 4114 installed on two different walls. As illustrated in this example, the third wearable extended reality appliance is at a third location 4210. The third wearable extended reality appliance in this example is associated with a user identity 4218.

In some embodiments, the sensor data may include image data captured by an image sensor. Further, the image data may be analyzed to determine that at least one of the first wearable extended reality appliance, the second wearable extended reality appliance, or the third wearable extended reality appliance may be physically located in the room. The analysis of the image data may involve a processor executing a sequence of stored instructions (e.g., a program) which takes inputs, process the inputs, and output the results to an output device. For example, at least one processor may receive the image data capture by the image sensor and may then execute a program in order to analyze the image data. For example, image data captured using an image sensor included in a particular wearable extended reality appliance (e.g., the first, second or third wearable extended reality appliance) may be analyzed using an ego-positioning algorithm, an ego-motion algorithm or a visual odometry algorithm to determine that the particular wearable extended reality appliance is in the room. In another example, image data captured using an image sensor not included in any wearable extended reality appliance may be analyzed using an object recognition algorithm to identify at least one of the first, second or third wearable extended reality appliance in the room.

Non-limiting examples of image data may include one or more images of a whole room, part of the room, of a wearable extended reality appliance, of more than one wearable extended reality appliance, or of other objects or people in the room. Alternatively, or additionally, the sensor data may include audio data (e.g., information derived from sound signals) from an audio sensor (e.g., a microphone). Audio data, may, for example, represent sound or may be derivatives of sound. Non-limiting examples of audio data may include files in wave format, mp3 format, or WMA format. Or audio data may be information derived from a sound file such as a pattern or sound signature. A microphone may refer to an instrument for converting sound waves into electrical energy variations which may then be amplified, transmitted, or recorded. Examples of microphones may include dynamic microphones, condenser microphones, and ribbon microphones. Either such a microphone or a processor that receives sound signals from the microphone may process the sound digitally. For example, the audio sensor may be configured to collect audio data which may then be analyzed by a processor associated with the audio sensor. The analysis of the audio data may be recognize voices and differentiate between the recognized voices to determine that at least one of the wearable extended reality appliances is physically located in the room.

By way of example, FIG. 42A illustrates sensor 4114 in the form of two image sensors 4114 on two different walls in a physical conference room 4100. For example, pixels of the images captured by the two image sensors 4114 may be compared against one another to determine that a plurality of wearable extended reality appliances 4102 (e.g., three wearable extended reality appliances) are physically located in the physical conference room 4100.

In some embodiments, the sensor data may be analyzed to determine that at least one of the first wearable extended reality appliance, the second wearable extended reality appliance, or the third wearable extended reality appliance may be virtually located in the room, wherein the determined location of the at least one wearable extended reality appliance virtually located in the room is reflective of a location of an avatar of at least one user. An appliance may be considered virtually located in a room if the appliance is not physically located in that room, but is participating (through information displayed) as if physically located in that room. The virtual presence may be represented by an avatar. An avatar may refer to a two-dimensional or three-dimensional virtual figure or virtual icon representative a user. A location that is "reflective" of a location of an avatar may refer to a location that is indicative, expressive, exhibitive, or similarly demonstrative of a location of that avatar. A user may refer to a person wearing an extended reality appliance. The determined location of the at least one wearable extended reality appliance may refer to a position or place within a coordinate system (e.g., a Cartesian coordinate system). For example, pixels of images captured by an image sensor may be compared to one another to determine that at least one of the wearable extended reality appliances may be virtually located in a room. For example, a user who is not physically located in a room will not be detected by image sensors in the room. This is one way of using image data to determine that a participant is virtually located in a room. In such an instance, an avatar may appear virtually in place of a participant while other participants are physically located in the room. The avatar may be a virtual copy of the user, a character, or any other virtual object representative of the user. For example, the avatar may be an extended reality display of Yoda. The determined location of the at least one wearable extended reality appliance may be a location of where the at least one user is in the different location.

By way of example, FIG. 43 illustrates a physical conference room 4100. FIG. 43 illustrates a position 4112 for displaying a virtual object 4104 may be changed based on the room 4100 containing four wearable extended reality appliances and a physical object 4124 blocking a view of the virtual object 4104 and the position 4112 changing. For example, pixels of the images captured by a sensor 4114 separated may be compared against one another to determine that a fourth wearable extended reality appliance 4326 is virtually located in the physical conference room 4100 and is reflective of a location of an avatar 4316 of at least one user.

Some disclosed embodiments may involve receiving a command to share a virtual object with the plurality of wearable extended reality appliances. A command may refer to a direction, an order, an act, or a similar request or an indication of an intent or a need. To share a virtual object may refer to distributing, bestowing, sending, providing, or a similar act of showing the virtual object. A virtual object may refer to any type of data representation that may be displayed by a wearable extended reality appliance to a user. Non-limiting examples of the virtual object may be an inanimate extended reality display, an animate extended reality display configured to change over time or in response to triggers, virtual two-dimensional content, virtual three-dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. In one embodiment, the virtual object may be a visual presentation rendered by a computer in a confined region and configured to represent an object of a particular type (such as an inanimate virtual object, an animate virtual object, virtual furniture, a virtual decorative object, virtual widget, or other virtual representation). The rendered visual object may change to reflect changes to a status object or changes in the viewing angle of the object, for example, in a way that mimics changes in the appearance of physical objects. In another embodiment, the virtual object may include a virtual computer screen configured to display information. For example, the command may be determined from an analysis of a sensor data or from an analysis of input from an input device. The sensor data may include image data captured using an image sensor and the pixels of the images may be analyzed by at least one processor to determine that text is present, or a user has gestured in a way corresponding to a signal. The text and/or signal may be associated with a predetermined text or image for comparison to determine an associated command. In some embodiments, a user may say "Share," press a key on a keyboard or a screen, blink one or both eyes in a certain recognizable pattern or move a head to send a command to share the virtual object (e.g., a virtual display screen) with a plurality of wearable extended reality appliances. Other examples of such commands for sharing virtual content are described in other portions of this disclosure.

By way of example, FIG. 41 illustrates an input device 4128 (e.g., a physical keyboard) from which a command may be received from. For example, a user may press one or more keys of the input device 4128 to indicate a command to share a virtual object 4104 with a plurality of wearable extended reality appliances 4102. The command may be received by any one of the plurality of wearable extended reality appliances 4102 and transmitted from the input device 4128 by at least one processor.

In some embodiments, the virtual object may be a virtual display (also referred to as a 'virtual screen' or a 'virtual display screen' herein) configured to present text entered using an input device, and determining the position for displaying the virtual display may be further based on at least one of a location of the input device or an orientation of the input device. As discussed more fully in other portions of this disclosure, an input device may include a button, key, keyboard, computer mouse, touchpad, touchscreen, joystick, or any other mechanism from which input may be received. For example, a position for displaying a virtual display may be based on at least one of a location of the input device (e.g., a keyboard) or an orientation of the input device so that a distance between the virtual display and the input device is within a selected distance range from the input device, or an angle between a selected axis of the input device and a normal of the virtual display is within a selected angular range. Non-limiting examples of the selected range of distances may be one meter, two meters, or five meters. In another example, the position for displaying the virtual display me be determined so that the input device will be between the user of the keyboard and the virtual display.

In some embodiments, the virtual object may be a virtual display (also referred to as a 'virtual screen' or a 'virtual display screen' herein) configured to present text entered using an input device, the input device may be positioned on a physical surface, and determining the position for displaying the virtual display may be further based on a characteristic of the physical surface. In some embodiments, the physical surface may include, for example, an exterior, top, side, external, outward, or an outside part or uppermost layer of a physical object. Some non-limiting examples of physical surfaces may include a table, a desk, a bed, a floor, a counter, a wall, and any other physical object having a surface. The characteristic of the physical may refer to a quality or trait that is distinctive, innate, unique, indicative, typical, or another feature or quality. Non-limiting examples of a characteristic of a physical surface may be a size of the physical surface, a location of an edge of the physical surface, a type of the physical surface, a texture of the physical surface, a shape of the physical surface, or any other identifying feature of the physical surface. Non-limiting examples of physical surfaces may include a surface of a dining table, a desk, a bar, a bed, a chair, a floor, a book, or a folding table. For example, a virtual object may be a virtual display (also referred to as a 'virtual screen' or a 'virtual display screen' herein) configured to present text (e.g., the texted typed by the user) when a user clicks on keys of a keyboard. For example, the input device may be positioned on a physical surface (e.g., a desk) and the determined position for displaying the virtual display me be based on the physical surface being a desk and not a bed. In some examples with the desk, a virtual display may be positioned at an end of the desk away from the user. In such an instance, the detected edge of the desk and/or sides of the desk may aid in determining the position of the virtual display. In other examples with a physical surface of a bed, the virtual display may be positioned above the bed so that the user may lay in the bed and see the virtual display by looking upward.

By way of example, FIG. 41 illustrates a virtual object 4104 as a virtual display configured to present text entered using an input device 4128 (e.g., a keyboard). A position 4112 for displaying the virtual object 4104 is based on at least one of a location of the input device 4128 or an orientation of the input device 4128 so that a distance between the virtual object 4104 and the input device 4128 is within a selected range of distances.

Some disclosed embodiments may include analyzing the sensor data to determine a first location in the room of a first wearable extended reality appliance, a second location in the room of a second wearable extended reality appliance, and a third location in the room of a third wearable extended reality appliance. Any number (such as three) wearable extended reality appliances may be co-located in the same room or common space. In order to present information to each from perspectives corresponding to their unique locations, or for other uses, their locations may be determined. To this end, sensor data from the types of sensors described earlier may be used to identify each location of each wearable extended reality appliance. A single sensor may detect information from which all appliance locations may be determined, or data from multiple sensors may be aggregated to determine the locations of each wearable extended reality appliance. In some cases, data from the sensor in one appliance may be used to determine a location of another appliance and vice versa. Physical attributes of the room may also be used in location determination. For example, sensor data may be used to identify corners of a room or other physical attributes of the room, and the wearable extended reality appliances may be located relative to those physical attributes. Non-limiting examples of other such physical attributes may include the placement of furniture or other objects. Thus, pixels of images from an image sensor may be analyzed, for example using a visual object localization algorithm, to determine a first location in the room of a first wearable extended reality appliance, a second location in the room of a second wearable extended reality appliance, and a third location in the room of a third wearable extended reality appliance. In another example, the locations of the first, second or third wearable extended reality appliances may be determined in a coordinate system, such as a global coordinate system, a coordinate system of an extended reality environment, and so forth.

For context, FIG. 42A includes a room 4100 and parts or the entirety of the room 4100 may be described in one or more examples to illustrate parts of the room 4100 in regard to a disclosed embodiment. Additionally, FIG. 42A illustrates the room 4100 with a sensor 4114 separated from a plurality of wearable extended reality devices 4102. Specifically, sensor 4114 separated includes two image sensors 4114 on two different walls in the room 4100. For example, pixels of images from the sensors 4114 separated may be analyzed to determine a first location 4106 in the room 4100 of a first wearable extended reality device, a second location 4108 in the room 4100 of a second wearable extended reality device, and a third location 4210 in the room 4100 of a third wearable extended reality device.

Some disclosed embodiments may include determining a position for displaying the virtual object in the room based on the determined first location, the determined second location, and the determined third location. A display position may be determined based on the locations of each wearable extended reality appliance. For example, if three appliances are arranged side by side at a conference room table, a processor may determine that the best position to display the screen is opposite the three appliances as opposed to on a perpendicular side end of the table. Such a determination may take into account the fields of view of each wearable extended reality appliance. In some instances, the determination may take into account articles in the room. For example, if an easel displaying a whiteboard is immediately opposite users of wearable extended reality appliances, the determined placement may be such so as not to block the white board on the easel. Non-limiting examples of a position for displaying a virtual object in a room based on the determined locations may include a position between the determined locations, a position of intersection between the determined locations, a position closer to one of the determined locations, a position closer to two of the determined locations, a position furthest away from the determined locations, or a position closest to the determined locations. For example, if the three determined locations form a triangle, the position for displaying the virtual object in the room may be in the middle of the triangle. In another example, when the three determined locations form a single line or row, the position for displaying the virtual object in the room may be parallel and in front of the line or row.

By way of example, FIG. 42A illustrates a determined position 4112 for displaying a virtual object 4104 in a room 4100 based on a determined first location 4106, a determined second location 4108, and a determined third location 4210. For example, the determined position 4112 is at a corner of the room 4100 between the determined first location 4106, the determined second location 4108, and the determined third location 4210.

In some embodiments, the determined position for displaying the virtual object may include a determined orientation of the virtual object in the room, and additional sensor data may be analyzed to determine that at least two of the first wearable extended reality appliance, the second wearable extended reality appliance, or the third wearable extended reality appliance changed orientation or location, and adjusting the determined orientation of the virtual object may be based on the orientation or location change. Orientation may refer to direction or the relative position of an object or individual. Individuals tend to change their orientations over time, by shifting their focus, turning their bodies, or changing their posture. When they do, the changes may impact a virtual presentation. Similarly, individuals may change their locations by moving from one spot to another. Sensor data may be used to determine that one or more of the wearable virtual reality appliances changed orientation or location, for example, if a user shifts in a chair so that the user's body position turns to the right, and another user's body position shifts to the left, the orientational movements may be detected, and a virtual display may shift to accommodate the new positions. Such orientational changes may be determined based on analysis of image data from one or more of the sensors described earlier, and the virtual object may be reoriented to accommodate the orientational changes of one or more users. Similar adjustments may be made for locational changes. For example, if two users were to move from one side of the room to another closer to a third user, a virtual display that was originally centered in the room may shift toward the center of the reoriented group. Or if a group encircles a virtual object, and some of the group members shift so that the center of the encirclement changes, the virtual object may move toward the new center Further, pixels from additional images from an image sensor may be analyzed to determine that at least two of a first wearable extended reality appliance, a second wearable extended reality appliance, or a third wearable extended reality appliance (which may include the individual wearing the appliance) changed orientation (e.g., from facing the center of the room to facing the door of the room). In some embodiments the determined orientation of the virtual object may be adjusted based on the orientation changes so that the virtual object also faces the door of the room.

By way of example, FIG. 41 illustrates a determined position 4112 for displaying a virtual object 4104 which may include a determined orientation (e.g., facing two users) of the virtual object 4104 in a room 4100. For example, pixels of images from additional images from sensors 4114 separated from wearable extended reality appliances may be analyzed by an at least one processor to determine that at least two of a first wearable extended reality appliance, a second wearable extended reality appliance, or a third wearable extended reality appliance changed orientation (e.g., from facing two users to facing three users). The determined orientation of the virtual object 4104 may be adjusted to facing three users in the room 4100 based on the orientation changes so that the virtual object 4104 still faces the users.

By way of example, FIG. 41 illustrates a determined position 4112 for displaying a virtual object 4104 that includes a determined location (e.g., a corner of the room 4100) of the virtual object 4104 in a room 4100. For example, pixels from additional images from a sensor 4114 separated from wearable extended reality appliances may be analyzed to determine that at least two of a first wearable extended reality appliance, a second wearable extended reality appliance, or a third wearable extended reality appliance changed location (e.g., a third user entered the room). The determined location of the virtual object 4104 may be adjusted in the room 4100 based on the location changes so that the virtual object 4104 is not occluded.

Some disclosed embodiments may include causing a first display of the virtual object at the determined position through the first wearable extended reality appliance, the first display being rendered from a first perspective. Additionally other disclosed embodiments may include causing a second display of the virtual object at the determined position through the second wearable extended reality appliance, the second display being rendered from a second perspective different from the first perspective. Still further, additional disclosed embodiments may include causing a third display of the virtual object at the determined position through the third wearable extended reality appliance, the third display being rendered from a third perspective different from the first perspective and the second perspective. A display that is rendered from a perspective may refer to a display delivered, depicted, or presented due to or because of an angle, aspect, context, viewpoint, or a similar point of view. In some embodiments, perspectives are simulated in the virtual world as they would appear in the real world. In the real world, three individuals sitting in different locations in the same room and viewing an object will each see the object somewhat differently, depending on their relative positions. In some disclosed embodiments, computer readable medium running on at least one processor collects data from sensors to determine differing locations or orientations of different wearers of extended reality appliances, and renders the view of each differently, to effectively simulate the perspectives they would see if viewing a real object from their respective orientations. Non-limiting examples of a display that is rendered from a perspective may include the display positioned to the left, the center, the right, higher up, or lower down from a user's focal point. A first display of the virtual object, a second display of the virtual object, and a third display of the virtual object rendered from their own perspective, respectively may be the same display. Alternatively, the first display of the virtual object, the second display of the virtual object, and the third display of the virtual object rendered from their own perspective, respectively may be different versions of the display. For example, the first display of the virtual object at a determined position through a first wearable extended reality appliance, rendered from the first perspective may be of the virtual object positioned lower in height in reference to the wearable extended reality appliance. As another example, the second display of the virtual object at a determined position through a second wearable extended reality appliance, rendered from the second perspective may be of the virtual object positioned higher in reference to the wearable extended reality appliance and straight in front of the wearable extended reality appliance. As yet another example, the third display of the virtual object at a determined position through a third wearable extended reality appliance, rendered from the third perspective may be of the virtual object positioned higher in reference to the wearable extended reality appliance and to the side of the wearable extended reality appliance. In some examples, the first perspective, second perspective and third perspective may be selected so that users of the first, second and third wearable extended reality appliances may all see a first portion of the virtual object at the same first position in the room, a second portion of the virtual object at the same second position in the room, and a third portion of the virtual object at the same third position in the room. For example, the first perspective, second perspective and third perspective may be selected so mimic the different projections of the objects when viewed from different positions in the room (for example, from the positions of the first, second and third wearable extended reality appliances, respectively).

By way of example, FIG. 42B illustrates a first display of a virtual object 4104 at a determined position 4112 through a first wearable extended reality appliance. In this example, the first display may be rendered from a first perspective of the virtual object 4104 positioned at an angle where the left side of the virtual object 4104 is closer to the first wearable extended reality appliance than the right side. By way of example, FIG. 42B also illustrates a second display of the virtual object 4104 at a determined position 4112 through a second wearable extended reality appliance. In this example, the second display may be rendered from a second perspective of the virtual object 4104 where the right side of the virtual object 4104 is almost as close as the left side of the virtual object 4104. By way of example, FIG. 42B illustrates a third display of the virtual object 4104 at a determined position 4112 through a third wearable extended reality appliance. In this example, the third display may be rendered from a third perspective of the virtual object 4104 positioned where the right side of the virtual object 4104 is closer to the third wearable extended reality appliance than the left side.

Some disclosed embodiments may include determining an identity of at least one of a user of the first wearable extended reality appliance, a user of the second wearable extended reality appliance, or a user of the third wearable extended reality appliance; and wherein determining the position for displaying the virtual object may be further based on the identity of the at least one user. Each user may have different physical characteristics and different preferences. A system may store information relating to those characteristics and preferences and alter the display based on them. For example, some users may prefer to sit farther from a screen. Other users may prefer to view two adjacent screens in an angled rather than linear arrangement. For example, by identifying particular users, a lookup may occur in a data structure of the user's characteristics/preferences, and the virtual display may be adjusted for each user accordingly.

By way of another example, the identity of the at least one user may refer to a status or title or other classification. Information displayed to individuals in the same virtual room may differ based on their class. Higher ups, for example, may be presented with financial data that may not be presented to others. Non-limiting examples of an identity may include a boss, a manager, an employee, a partner, an associate, an owner, a non-employee, an independent contractor, a licensee, a licensor, or a relative. The same data may be presented differently based on identity. For example, if the user's identity is that of a partner, the position for displaying the virtual object may be directly in front of or closer to the partner so that the partner has the best or most clear view of the virtual object.

By way of example, FIG. 42A illustrates an identity 4218 (e.g., a partner) of at least one of a user of a first wearable extended reality appliance, a user of a second wearable extended reality appliance, or a user of a third wearable extended reality appliance. For example, when the determined identity 4218 of the user is a partner, a position 4112 for displaying a virtual object 4104 may be in clear view for the partner.

Some disclosed embodiments may include determining a physical characteristic of at least one user of the first wearable extended reality appliance, the second wearable extended reality appliance, or the third wearable extended reality appliance; and wherein determining the position for displaying the virtual object may be further based on the physical characteristic of the at least one user. Non-limiting examples of physical characteristics may include the height of the at least one user or disabilities of the at least one user. For example, when a determined physical characteristic of a user is tall (which means that the user is used to looking at objects from a higher vantage point) virtual objects may be presented lower in the field of view on that tall user's wearable extended reality appliance. If the determined physical characteristic is that a user is near-sighted, the position for displaying the virtual object may be closer to that user so that the user may clearly see the virtual object. For example, if the determined physical characteristic is that the at least one user has hearing problems, the position for displaying the virtual object may be closer to the at least one user so that sounds associated with the virtual object are closer to the user.

Some disclosed embodiments may include determining a layout of the room that may involve one or more physical locations of furniture in the room, and wherein the position for displaying the virtual object may be further determined based on the layout of the room. A layout may refer to an arrangement, format, configuration, design, or way in which a room set up. An example of a layout may include four chairs, a desk, and a presentation board. Non-limiting examples of furniture may include one or more chairs, desks, plants, and a presentation board. A position of a virtual object (e.g., a virtual display screen) may be determined based on the layout of the room. If four chairs are detected (via sensors and processing described earlier) as arranged in a U-shape, a processor may determine that a virtual object such as a virtual screen should be positioned opposite the open end of the U. In one example, the position for displaying the virtual object may be strategically placed to avoid occlusion of at least part of the virtual object by furniture in the room. In another example, the position of the virtual object may on a surface of an object, such as a wall or a table. In yet another example, an egress such as door to the room may be taken into account when positioning a virtual object so that persons entering or leaving the room avoid colliding with the virtual object.

By way of example, FIG. 42A illustrates a layout of a room 4100 that may include one or more physical locations of furniture 4120 in the room 4100. For example, the layout of the room 4100 may include two chairs, a desk, and a vase of plants (that serves an example of a physical object 4124). Further, a position 4112 for displaying a virtual object 4104 may be further determined based on the layout of the room 4100 that may involve the one or more physical locations of furniture 4120. Advantageously, the position 4112 for displaying the virtual object 4104 may be in front of the one or more physical locations of furniture 4120 in the room 4100.

Some disclosed embodiments may include determining illumination conditions in the room, and the position for displaying the virtual object may further be determined based on the illumination conditions. An illumination condition may refer to the state of the room's brightness, radiance, glittering, glowing, or similar lighting level. Non-limiting examples of illumination conditions may include the lighting level of two overhead lights in a single room. For example, to avoid glare, a position for displaying a virtual object (e.g., a virtual display screen) may be based on illumination conditions so that the position for display avoids a direct light source with respect to a user. In another example, the determined illumination conditions in the room may be dim or dark so that the position for displaying the virtual object (e.g., a virtual movie screen) is based on the dimness or darkness and positioned in a darker area in the room. Alternatively, in another example, the determined illumination conditions in the room may be bright or well-lit so that the position for displaying the virtual object (e.g., a virtual object with a text document) is based on the bright conditions and positioned in a brighter area in the room for users to read the text easier. In yet another example, the determined illumination conditions may include locations of borders between shaded and non-shaded areas and the position for displaying the virtual object may be determined so that the virtual object is not across the border. Further, in another example, the determined illumination conditions may include an indication that the borders are about to move (for example, due to motion of the sun), and the position for displaying the virtual object may be determined so that the virtual object is not across the border during a selected time duration.

Figure 44:
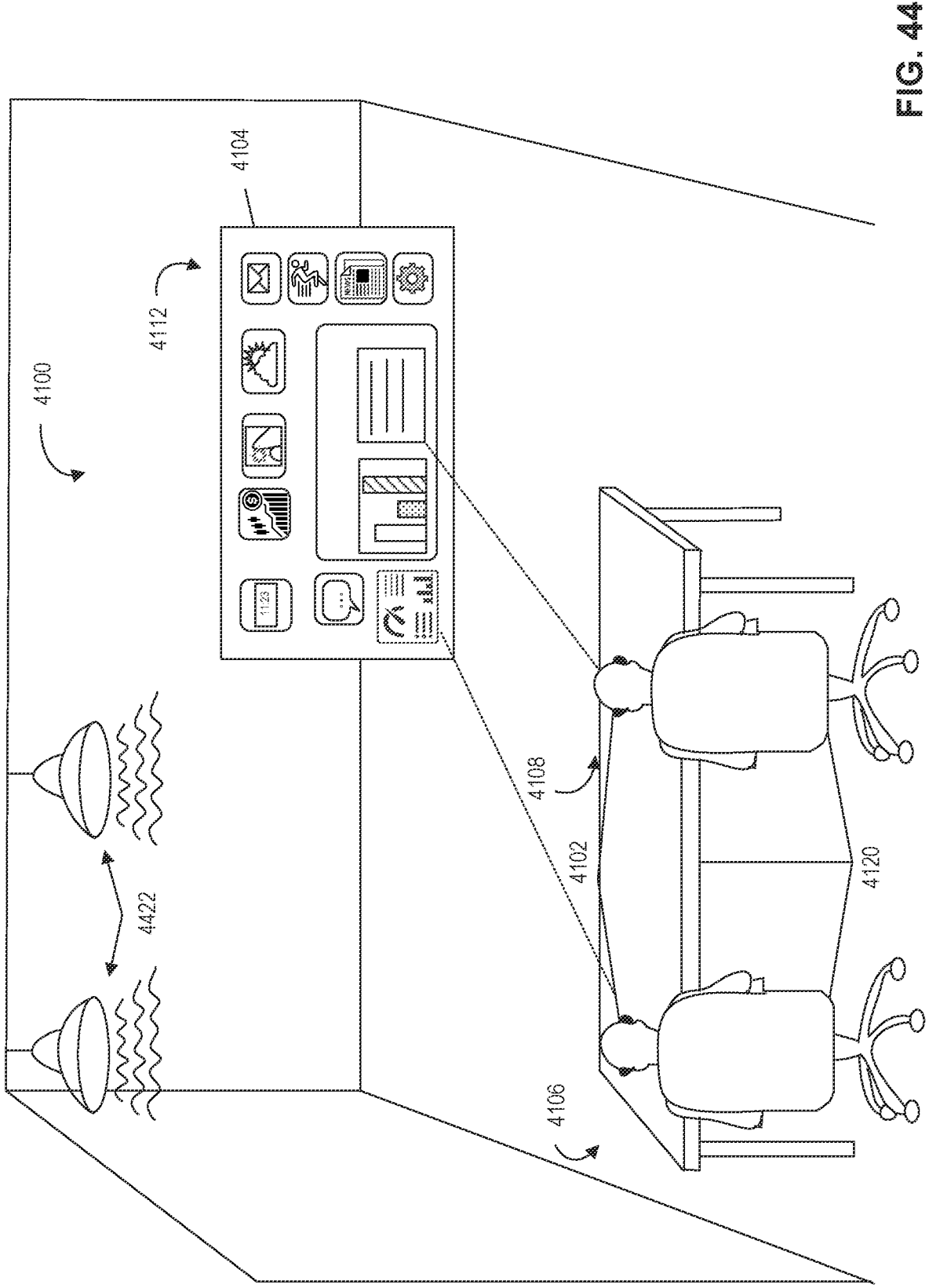
FIG. 44 illustrates yet another exemplary presentation of virtual content to multiple viewers, consistent with some embodiments of the present disclosure.

By way of example, FIG. 44 illustrates illumination conditions 4422 in a room 4100. The illumination conditions 4422 may be provided by two overhanging lights in the room 4100. For example, a position 4112 for displaying a virtual object 4104 may further be determined based on the illumination conditions 4422 so that the determined position 4112 avoids glare or a direct light source with respect to a user of a wearable extended reality appliance.

Some disclosed embodiments may include determining a type of the virtual object, and the position for displaying the virtual object may further be determined based on the type of the virtual object. Non-limiting examples of a type of a virtual object may include animate virtual objects, inanimate virtual objects, two-dimensional virtual objects, three-dimensional virtual objects, virtual characters, virtual environments, virtual documents, virtual display screens, virtual widgets, or virtual overlays of a portion or whole of a physical environment or physical object. For example, the determined type of virtual object may be a virtual display screen and a position for displaying the virtual display screen may be determined on a wall of a room, for example because the virtual object is a virtual two-dimensional virtual display screen. In another example, the determined type of virtual object may be a three-dimensional product and the position for displaying the virtual solar system may be determined in the middle of the room to permit three-dimensional virtual viewing. In yet another example, the determined type of virtual object may be virtual rain and the position for displaying the virtual rain may be determined as falling or originating from the top of the room and falling to the ground of the room, for example because the type of the virtual object is rain.

By way of example, FIG. 41 illustrates a type (e.g., a virtual display screen, a two-dimensional virtual object, a three-dimensional virtual object, etc.) of a virtual object 4104 and a position 4112 for displaying the virtual object 4104 may further be determined based on the type of the virtual object 4104. For example, the determined type of virtual object 4104 may be a virtual display screen and the position 4112 for displaying the virtual object 4104 may be determined in the corner of the room as a virtual two-dimensional object.

Some disclosed embodiments may include analyzing the sensor data to identify a physical object in the room and the position for displaying the virtual object may be determined so that none of the first display, the second display, and the third display may be occluded by the physical object. A ray casting algorithm may be used to determine the position in which none of the first display, the second display, and the third display are occluded by the physical object. Occluded may refer to blocked, prevented, or a similar obstruction. Non-limiting examples of physical objects may be a user, a piece of furniture (e.g., a chair, table, or door), a laptop, food, a drink, a presentation board. For example, pixels of images from an image sensor may be analyzed to identify a physical object (e.g., a row of chairs). Further, a position for displaying a virtual object (e.g., a virtual display screen) may be determined to be higher on a wall of a room so that none of a first display, a second display, and a third display may be occluded by the row of chairs. In another example, pixels of images from an image sensor may be analyzed to identify the physical object (e.g., a presentation board). Further, a position for displaying a virtual object may be determined to be moved slightly to the left so that none of the first display, the second display, and the third display may be occluded by the presentation board.

By way of example, FIG. 43 illustrates a room 4100 with a sensor 4114 separated and a physical object 4124. For example, pixels of images from the sensor 4114 separated may be analyzed to identify the physical object 4124. Further, a position 4112 for displaying the virtual object 4124 may be determined to be moved to the left of the physical object 4124 so that none of a first display, a second display, and a third display may be occluded by the physical object 4124.

Some disclosed embodiments may include analyzing the sensor data to identify a physical object in the room, and the position for displaying the virtual object may be determined so that none of the first display, the second display, and the third display occlude the physical object. For example, pixels of images from an image sensor may be analyzed to identify a physical object (e.g., a user, a plant, artwork, or furniture). Further, a position for displaying a virtual object (e.g., a virtual display screen) may be determined to shift or move away from the user so that none of a first display, a second display, and a third display occlude the user. A ray casting algorithm may be used to determine the position in which none of the first display, the second display, and the third display occlude the physical object.

By way of example, FIG. 43 illustrates a room 4100 with a sensor 4114 separated and a physical object 4124. For example, pixels of images from the sensor 4114 separated may be analyzed to identify the physical object 4124. Further, a position 4112 for displaying the virtual object 4124 may be determined to be moved to the left of the physical object 4124 so that none of a first display, a second display, and a third display may occlude the physical object 4124.

In some embodiments, the first display of the virtual object, the second display of the virtual object, and the third display of the virtual object may be associated with a single version of the virtual object. Additionally, a change, introduced by a user of the first wearable extended reality appliance to the virtual object may be detected. Further, the second display and the third display may be updated to reflect the change to the virtual object introduced by the user of the first wearable extended reality appliance. Displays may be associated with a single version if each display presents the same subject matter, even if viewed from differing perspectives. A user may introduce a change may adding material, virtually drawing on or coloring an object, rotating or translating the object, or otherwise modifying the object. When all users are presented with a single version and that single version is altered by one user, the alteration may be displayed to other users through each user's wearable extended reality appliance. For example, a first display of a virtual object (e.g., a virtual display screen), a second display of the virtual object, and a third display of the virtual object may be associated with a single version (e.g., a single view) of the virtual object so that each display is identical to each user, even after one user makes a change to the virtual object. Additionally, a user of a first wearable extended reality appliance may be advancing between virtual slides of a virtual slideshow on the virtual display screen and this change may be detected by a sensor connected to at least one of the first wearable extended reality appliance, a second wearable extended reality appliance, and a third wearable extended reality appliance. In another example, the virtual object may be a virtual display, and the change may include a presentation of text entered by the first user using a physical keyboard. In another example, the change may be introduced by a usage of a marking implement. Further, the second display and the third display may be updated to reflect the new virtual slide of the virtual presentation introduced by the user of the first wearable extended reality appliance.

In some embodiments, the first display of the virtual object, the second display of the virtual object, and the third display of the virtual object may be associated with different versions of the virtual object. Additionally, a profile associated with a user of the first wearable extended reality appliance, a profile associated with a user the second wearable extended reality appliance, and a profile associated with a user of the third wearable extended reality appliance may be obtained. Further, a personalized version of the virtual object based on the profile associated with each user may be determined. In the prior example discussed, a single version of a virtual object was presented to all users. In this example, each user may be presented with a unique version depending on the user's preferences. For example, some users may have color preferences and those preferences may be carried through to their unique presentations via a look up of those preferences in a data structure which then causes alteration of the display to correspond to those preferences. Other users may have disabilities that may cause their virtual content to be displayed differently from others. For example, blinking and flashing may be avoided on virtual displays of individuals who have epilepsy to avoid a risk of seizure. Word spacing may change on displays of individuals with dyslexia. These are just examples of profile information that may be stored in a data structure that is accessed to determine how virtual objects will be displayed.

Different versions may refer to different details of a virtual object. In other words, different versions may present different points of view of the virtual object. The display may thus be impacted by a profile which may include indications of permission level (e.g., top-secret), accessibility limitations (e.g., confidential information), or preferences to color scheme or disabilities (e.g., color blind). For example, a first display of a virtual object, a second display of the virtual object, and a third display of the virtual object may be associated with different versions of the virtual object. A profile for each user of a wearable extended reality appliance may be obtained. For example, the first profile may be a top-secret permission level, the second profile may be restricted to non-confidential information, and the third profile may indicate that the third user is color blind. For example, the personalized version of the virtual object may be based on the determined profiles associated with each user. Advantageously, the first profile may see all information presented since he or she has a top-secret permission level. The second profile may see only some or part of the information because he or she is restricted to non-confidential information. The third profile may see the virtual object differently because of a color-blind mode.

Some disclosed embodiments may include receiving additional sensor data indicating a change to a status of the third wearable extended reality appliance, while the virtual object is displayed at the determined position through the first wearable extended reality appliance and through the second wearable extended reality appliance. Further, the virtual object may be repositioned based on the determined first location of the first wearable extended reality appliance and the determined second location of the second wearable extended reality appliance. A change to a status may include leaving a room, switching off, switching to a different extended reality environment not including the virtual object, and similar changes to a wearable extended reality appliance. For example, while a virtual object may be displayed at a determined position through a first wearable extended reality appliance and through a second wearable extended reality appliance, additional pixels of images from an image sensor may be received indicating that the third wearable extended reality appliance has switched off. Further, the virtual object may be repositioned based on a determined first location of the first wearable extended reality appliance and a determined second location of the second wearable extended reality appliance. In another example, additional pixels of images from the image sensor may be received indicating that the third wearable extended reality appliance is no longer in the room because the user has left the room with third wearable extended reality appliance. In yet another example, additional pixels of images from the image sensor may be received indicating that the third wearable extended reality appliance is longer in the room because the virtual user (e.g., avatar) has left the room with the third wearable extended reality appliance.

By way of example, FIG. 41 illustrates a virtual object 4104 displayed at a determined position 4112 through a first wearable extended reality appliance and through a second wearable extended reality appliance. For example, while the virtual object 4104 is displayed, additional pixels of images from a sensor 4114 separated from a plurality of wearable extended reality appliances 4102 may be received indicating that a third wearable extended reality appliance is no longer in a room 4100. Further, the virtual object 4104 may be repositioned based on a determined first location 4106 of the first wearable extended reality appliance and the determined second location 4108 of the second wearable extended reality appliance.

Some disclosed embodiments may include receiving additional sensor data indicating that a fourth wearable extended reality appliance may be in the room, while the virtual object is displayed at the determined position. Further, other disclosed embodiments may include determining a fourth location of the fourth wearable extended reality appliance, while the virtual object is displayed at the determined position. Further, the virtual object may be repositioned based on the determined first location, the determined second location, the determined third location, and the determined fourth location. For example, while a virtual object is displayed at a determined position, additional pixels of images from an image sensor may be received and analyzed to determine that a fourth wearable extended reality appliance is in a room. Further, the fourth location of the fourth wearable extended reality appliance may be determined and the virtual object may be repositioned in the room based on the determined first location, the determined second location, the determined third location, and the determined fourth location so that the position is in the middle of all the determined locations for clear view.

By way of example, FIG. 43 illustrates a virtual object 4104 displayed at a determined position 4112. For example, while the virtual object 4104 is displayed, additional pixels of images from a sensor 4114 separated may be received and analyzed to determine that a fourth wearable extended reality appliance 4326 is in a room 4100. Further, the fourth location of the fourth wearable extended reality appliance 4326 may be determined and the virtual object 4104 may be repositioned in the room 4100 based on a determined first location 4106, a determined second location 4108, a determined third location 4210, and the determined fourth location so that the position 4112 is in the middle of all the determined locations for clear view.

Some disclosed embodiments may be executed by the first wearable extended reality appliance, wherein causing the first display may include generating display signals, causing the second display may include transmitting data reflecting the virtual object to the second wearable extended reality appliance, and causing the third display may include transmitting data reflecting the virtual object to the third wearable extended reality appliance. Display signals may include, for example, analog or digital electrical signals that may cause a display device to present content in the form of a virtual or digital representation. The virtual or digital representation may include, for example, one or more still or moving images, text, icons, video, or any combination thereof. The graphical display may be two-dimensional, three-dimensional, holographic, or may include various other types of visual characteristics. The first wearable extended reality appliance may cause one or more analog or digital signals to be generated or transmitted to a display device for presenting the graphical display for viewing by a user. Generate may refer to produce or cause something to arise or come about or any other production of a thing. To transmit may refer to cause something to pass on from one place or thing to another, to broadcast or send out something from one place or thing to another, or another way of sending something. In some embodiments, the display device may include a wearable extended reality appliance. For example, the at least one processor may cause one or more analog or digital signals to be generated and transmitted to the display device for presenting a movie, an emoji, a video, a text, or any combination thereof. While, some embodiments could rely on a central server to process image signals and update all extended wearable reality appliances sharing a common presentation, in other embodiments, display signal processing may be relegated to one of the extended reality appliances which may then transmit display signals to the other of the extended reality appliances. Alternatively, multiple wearable extended reality appliances may share image signal processing responsibility and distribute updated display signals to the other appliances.

According to another embodiment of the present disclosure, a method for presenting virtual content to multiple viewers may be provided. In some embodiments, the method may be implemented by at least one processor that executes program instructions. The method may include receiving sensor data indicative of a plurality of wearable extended reality appliances located in a room. The method may further include receiving a command to share a virtual object with the plurality of wearable extended reality appliances. The method may additionally include analyzing the sensor data to determine a first location in the room of a first wearable extended reality appliance, a second location in the room of a second wearable extended reality appliance, and a third location in the room of a third wearable extended reality appliance. The method may include determining a position for displaying the virtual object in the room based on the determined first location, the determined second location, and the determined third location. The method may also include causing a first display of the virtual object at the determined position through the first wearable extended reality appliance, the first display may be rendered from a first perspective. The method may include causing a second display of the virtual object at the determined position through the second wearable extended reality appliance, the second display may be rendered from a second perspective different from the first perspective. The method may also include causing a third display of the virtual object at the determined position through the third wearable extended reality appliance, the third display being rendered from a third perspective different from the first perspective and the second perspective.

Figure 45:
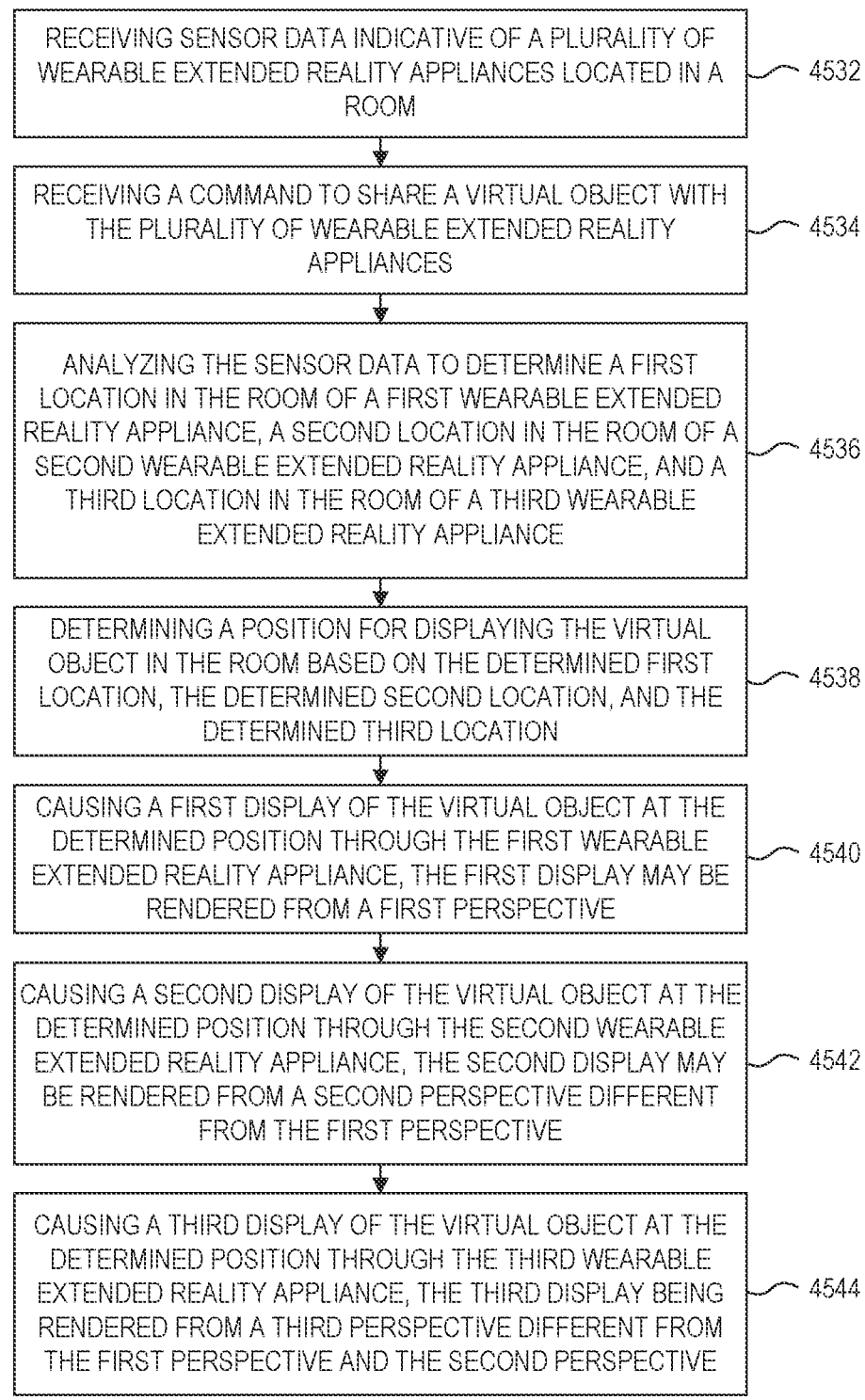
FIG. 45 illustrates an exemplary method, consistent with some embodiments of the present disclosure.

FIG. 45 illustrates an exemplary method 4530 for presenting virtual content to multiple viewers. Method 4530 may be performed by one or more or more processing devices (e.g., 360, 460, or 560) associated with input unit 202 (see FIG. 3), XR unit 204 (see FIG. 4), and/or remote processing unit 208 (see FIG. 5). The steps of the disclosed method 4530 may be modified in any manner, including by reordering steps and/or inserting or deleting steps.

Method 4530 may include a step 4532 of receiving sensor data indicative of a plurality of wearable extended reality appliances 4102 located in a room 4100. Method 4530 may include a step 4534 of receiving a command to share a virtual object 4104 with the plurality of wearable extended reality appliances 4102. Method 4530 may include a step 4536 of analyzing the sensor data to determine a first location 4106 in the room 4100 of a first wearable extended reality appliance, a second location 4108 in the room 4100 of a second wearable extended reality appliance, and a third location 4210 in the room 4100 of a third wearable extended reality appliance. Method 4530 may include a step 4538 of determining a position 4112 for displaying the virtual object 4104 in the room 4100 based on the determined first location 4106, the determined second location 4108, and the determined third location 4210. Method 4530 may include a step 4540 of causing a first display of the virtual object 4104 at the determined position 4112 through the first wearable extended reality appliance, the first display may be rendered from a first perspective. Method 4530 may include a step 4542 of causing a second display of the virtual object 4104 at the determined position 4112 through the second wearable extended reality appliance, the second display may be rendered from a second perspective different from the first perspective. Method 4530 may include a step 4544 of causing a third display of the virtual object 4104 at the determined position 4112 through the third wearable extended reality appliance, the third display being rendered from a third perspective different from the first perspective and the second perspective.

Figure 46:
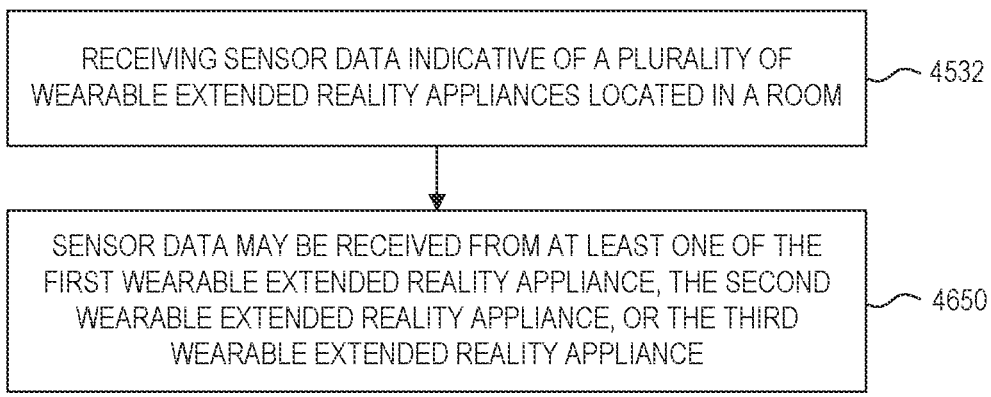
FIG. 46 illustrates an exemplary method, consistent with some embodiments of the present disclosure.

FIG. 46 illustrates another exemplary method 4630 for presenting virtual content to multiple viewers. Method 4630 may be performed by one or more or more processing devices (e.g., 360, 460, or 560) associated with input unit 202 (see FIG. 3), XR unit 204 (see FIG. 4), and/or remote processing unit 208 (see FIG. 5). The steps of the disclosed method 4630 may be modified in any manner, including by reordering steps and/or inserting or deleting steps. Method 4630 may include a step 4532 of receiving sensor data indicative of a plurality of wearable extended reality appliances 4102 located in a room 4100. Method 4630 may include a step 4650 where the sensor data may be received from at least one of a first wearable extended reality appliance, a second wearable extended reality appliance, or a third wearable extended reality appliance.

Figure 47:
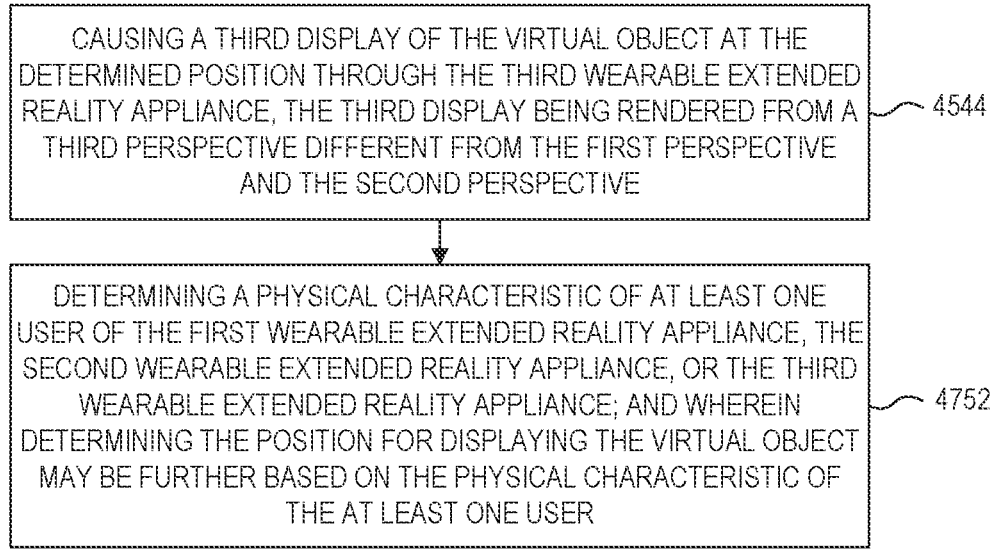
FIG. 47 illustrates an exemplary method, consistent with some embodiments of the present disclosure.

FIG. 47 illustrates another exemplary method 4730 for presenting virtual content to multiple viewers. Method 4730 may be performed by one or more or more processing devices (e.g., 360, 460, or 560) associated with input unit 202 (see FIG. 3), XR unit 204 (see FIG. 4), and/or remote processing unit 208 (see FIG. 5). The steps of the disclosed method 4730 may be modified in any manner, including by reordering steps and/or inserting or deleting steps. Method 4730 may include a step 4544 of causing a third display of the virtual object 4104 at the determined position 4112 through the third wearable extended reality appliance, the third display being rendered from a third perspective different from the first perspective and the second perspective. Method 4730 may include a step 4752 of determining a physical characteristic of at least one user of a first wearable extended reality appliance, a second wearable extended reality appliance, or a third wearable extended reality appliance; and wherein determining a position 4112 for displaying the virtual object 4104 may be further based on the physical characteristic of the at least one user.

Figure 48:
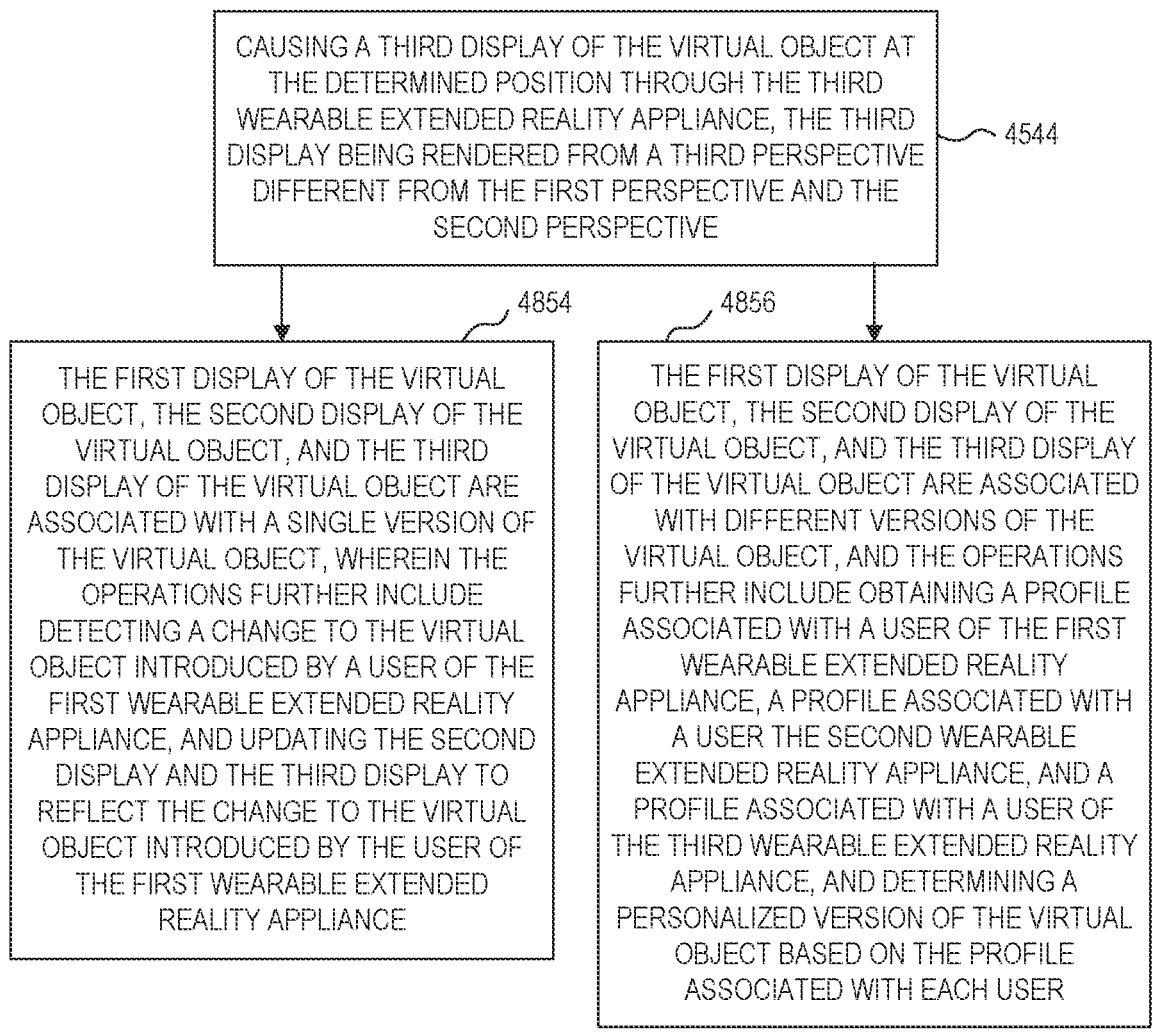
FIG. 48 illustrates an exemplary method, consistent with some embodiments of the present disclosure.

FIG. 48 illustrates another exemplary method 4830 for presenting virtual content to multiple viewers. Method 4830 may be performed by one or more or more processing devices (e.g., 360, 460, or 560) associated with input unit 202 (see FIG. 3), XR unit 204 (see FIG. 4), and/or remote processing unit 208 (see FIG. 5). The steps of the disclosed method 4830 may be modified in any manner, including by reordering steps and/or inserting or deleting steps. Method 4830 may include a step 4544 of causing a third display of a virtual object 4104 at the determined position 4112 through the third wearable extended reality appliance, the third display being rendered from a third perspective different from the first perspective and the second perspective. Method 4830 may include a step 4854 wherein a first display of the virtual object 4104, a second display of the virtual object 4104, a third display of the virtual object 4104 may be associated with a single version of the virtual object 4104. Further, step 4854 may include detecting a change to the virtual object 4104 introduced by a user of the first wearable extended reality appliance, and updating the second display and the third display to reflect the change to the virtual object 4104 introduced by the user of the first wearable extended reality appliance. Method 4830 may include a step 4856 wherein the first display of the virtual object 4104, the second display of the virtual object 4104, the third display of the virtual object 4104 may be associated with different versions of the virtual object 4104. Further, step 4856 may include obtaining a profile associated with a user of the first wearable extended reality appliance, a profile associated with a user of the second wearable extended reality appliance, and a profile associated with a user of the third wearable extended reality appliance, and determining a personalized version of the virtual object 4104 based on the profile associated with each user.

Some disclosed embodiments may involve systems, methods, and non-transitory computer readable media configured for making virtual colored markings on objects. Virtual markings may broadly include any visual representation simulating in an extended reality environment writing/coloring/painting implement markings that exist in the physical world. Examples of types of virtual markings may include textual markings (e.g., words, sentences), punctuation markings (e.g., dots, commas), format markings (e.g., underlines, highlights), emoji markings (e.g., smiley, symbols), drawing markings (e.g., free hand sketching such as lines, figures, symbols, or any other individual or set of visible traces such as would occur in the physical world with pens, pencils, markers, chalk, or any other writing implement), colorization (such as might occur in the physical world with crayons, markers or paint brushes), texturizations (such as the addition of surface treatments). The virtual markings may be associated with one or more colors which may be rendered by software on top of one or more objects. The objects on which the virtual markings are drawn may refer to any physical or virtual items having a form which may be observed. For instance, an object may be an extended reality display of a 2D item or 3D item (e.g., a document, an image, a video, a virtual model, a shape, or any other intangible object) or a physical item, (e.g., food, furniture, a wall, a landscape, or any other tangible object).

Some disclosed embodiments may include receiving an indication of an object. An indication of an object may refer to any data which may provide evidence of the existence of an object. The indication of the object may include type of data that enable identification of the object. The indication may include a location, form, color, size, distance to, material composition, and any other attribute which may describe the object. In some embodiments, the indication of the object may include one or more images of the object. The indication of the object may be received via a communications network, as described in greater detail herein. An indication of an object may be received, for example, via an image sensor that identifies an object in a field of view in the physical world. In another example, an indication of an object may be received from a rendering of an extended reality space that includes a virtual object, from a data-structure of virtual objects in an extended reality space, from an external device controlling the extended reality space, and so forth. By way of example, remote processing unit 208 of FIG. 5 may receive an indication of an object via communications network 214. An indication of object may be a signal created by remote processing unit 208, XR unit 204, or input unit 202 depicted in FIG. 2 to generate a virtual object or an identification of a physical object.

Figure 49:
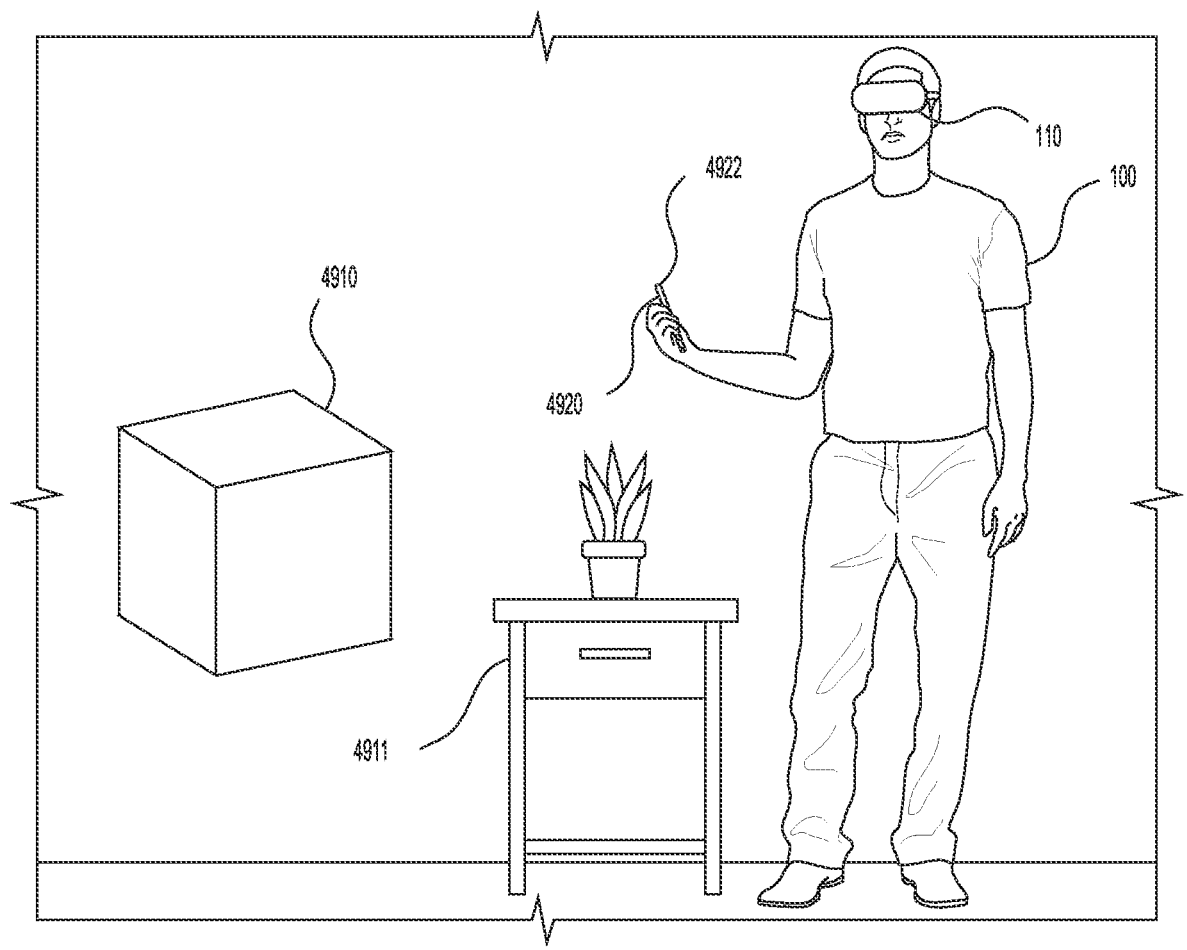
FIG. 49 is a schematic illustration of an individual using an example extended reality system to make virtual color markings on an object, consistent with some embodiments of the present disclosure.
Figure 50:
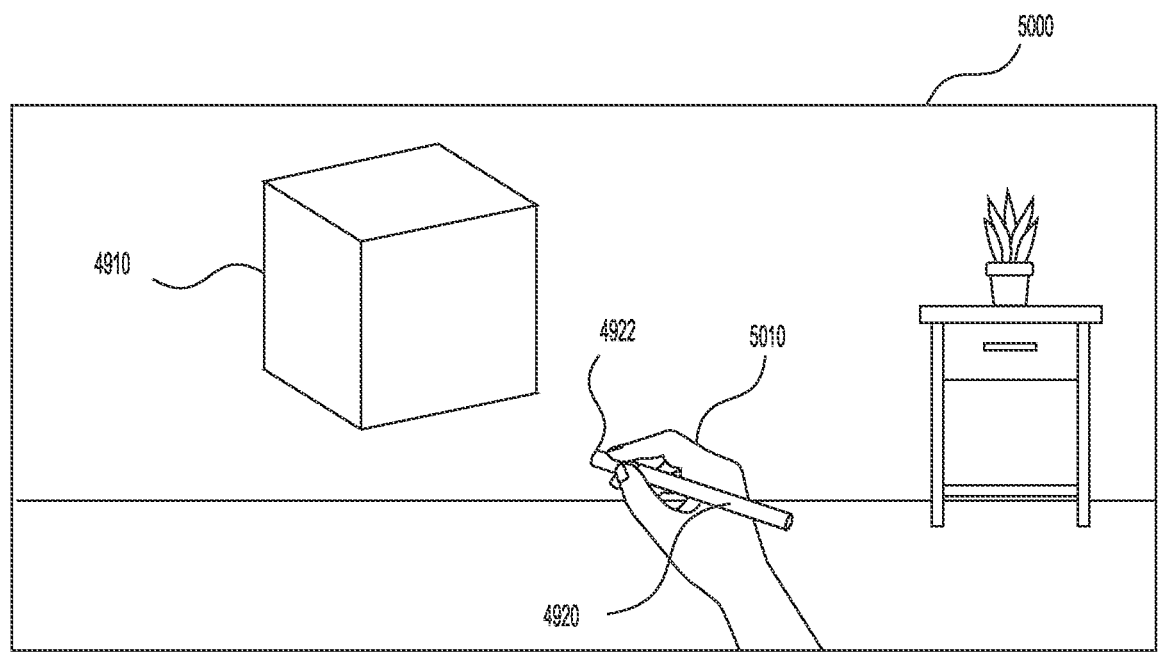
FIG. 50 is a schematic illustration depicting an object and a hand holding a physical marking implement, consistent with some embodiments of the present disclosure.

In some embodiments, the object may be a virtual object presented by a wearable extended reality appliance. Additionally or alternatively, the object may be a physical object detectable in an image captured from the physical environment, for example using an image sensor included in the wearable extended reality appliance. By way of example, FIG. 49 illustrates an example of a virtual object 4910 presented to user 100 through wearable extended reality appliance 110 and an example of a physical object 4911. User 100 may draw virtual markings on both objects. FIG. 50 illustrates a view of object 4910 as seen by user 100 through wearable extended reality appliance 110.

Some disclosed embodiments may include receiving from an image sensor an image of a hand of an individual holding a physical marking implement. An image sensor may include one or more sensors configured to capture visual information by converting light to image data, as described previously in this disclosure. A physical marking implement may refer to a tangible instrument that may be utilized by a user to provide inputs to make virtual colored markings on objects. A physical marking implement may take any form which may allow a user to make the virtual colored markings by performing movements with the physical marking implement. For instance, a physical marking implement may be or may resemble a stylus, pen, pencil, crayon, marker, chalk, paint brush, or any other instrument which a user may hold and move to make virtual colored markings on objects. Alternatively, a physical marking implement may take the form of an input device such as a mouse, a keyboard, a joystick, a touchpad or touch screen, or any other input device which may be used to provide an input to create virtual colored markings on objects. By way of example, a processing device may receive from image sensor 472 of XR unit 204 of FIG. 3 an image 5000. As shown in FIG. 50, image 5000 may include a hand 5010 holding a physical marking implement 4920 having a tip 4922, and an object 4910.

Figure 52:
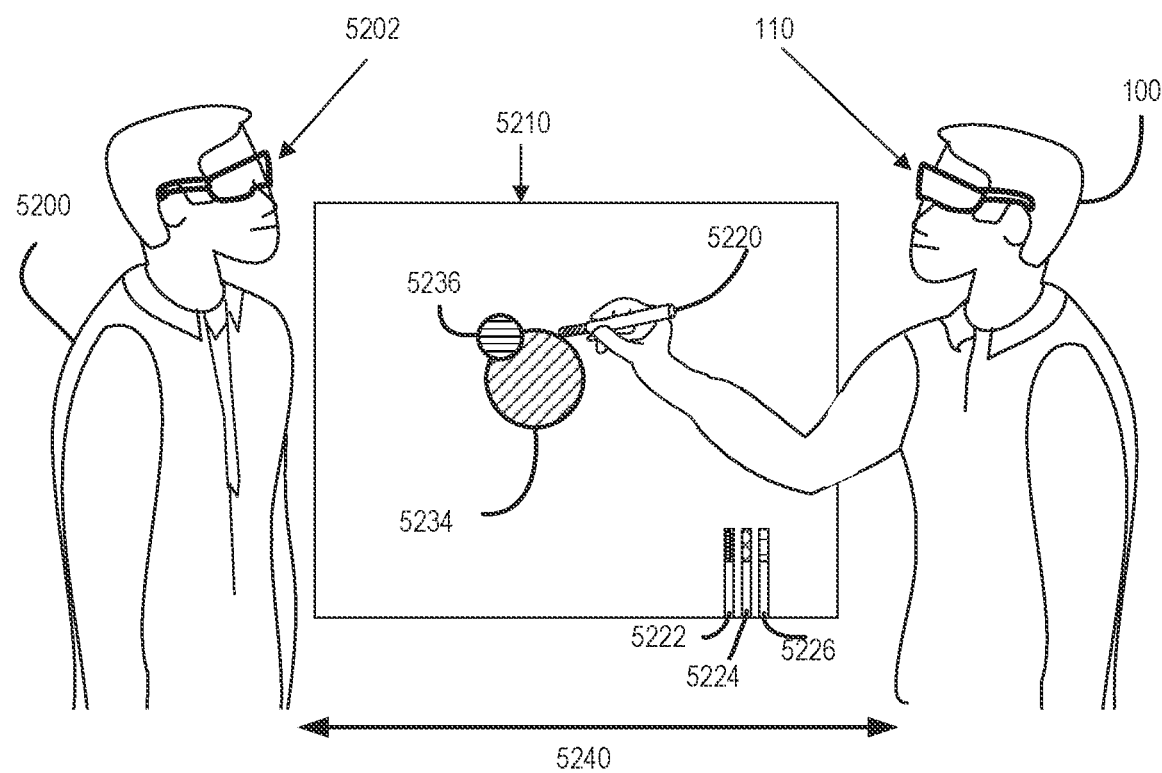
FIG. 52 is a schematic illustration of two individuals viewing and interacting with the same virtual color markings on the same object, consistent with some embodiments of the present disclosure.

Some disclosed embodiments may include detecting in the image a color associated with the marking implement. Detecting in the image a color associated with the marking implement may include analyzing image data received from an image sensor to identify a color of the at least part of a marking implement being held by a user. For example, if the user is holding a red pen (or an implement configured to resemble a red pen) a processor may detect the color red. In another example, the marking implement may have a colored tip (for example, a blue tip), the image may be analyzed to detect the marking implement using an object detection algorithm, the region of the marking implement corresponding to the tip may be identified in the image using a template matching algorithm, and the values of the pixels in the identified region may be analyzed, for example using a statistical function or a histogram, to determine the color of the tip (for example, blue), thereby detecting that the color associated with the marking implement is the color of the tip (for example, blue). Alternatively, the marking implement may have a unique shape or code there that identifies it as being associated with the color red, and that unique shape or code may be recognized through image processing and look up in a data structure associating such shapes or codes with colors. In one example, detecting the color associated with the marking implement may first involve identifying the marking implement, which may occur by detection of a human hand holding the physical marking implement, for example using a hand detection algorithm. In some examples, a machine learning model may be trained using training examples to detect color associated with marking implements from images and/or videos. An example of such training example may include a sample image and/or a sample video of a sample marking implement, together with a label indicating the color associated with the sample marking implement. The trained machine learning model may be used to analyze the image and determine the color associated with the marking implement. By way of example, a processing device may detect from image 5000 of FIG. 50, a color associated with marking implement 4920, e.g., red. Some examples of marking implements are shown in FIG. 52, represented as marking implements 5220, 5222, 5224, and 5226.

Some disclosed embodiments may include receiving from the image sensor image data indicative of movement of a tip of the marking implement and locations of the tip. Image data may refer to signals or information received from or derived from the output of an image sensor. Image data may include images, grayscale images, color images, 2D images, 3D images, videos, 2D videos, 3D videos, frames, footages, color identification and/or data derived from or associated with any of the forgoing. A tip of the marking implement may refer to a distal end of a marking implement, for example of a marking implement associated with forming markings (e.g., what is referred to in the physical world as a pen, pencil, or crayon tip, a marking element of a magic marker, or the bristles of a paint brush). Non-physically functional virtual marking implements (i.e., an object that cannot produce physical drawings) may be considered marking implements within this disclosure in the sense that they are capable of causing virtual markings. Thus, the tip of the marking implement may be the end of a marking implement, such as a stylus, which may be used by a user to interact with a location on an image. In some embodiments, the tip of the marking implement may be a separate element which may be selectively attached and detached to a marking implement. In this example, differing tips may have differing colors and may be interchangeable. Movement of a tip of the marking implement may refer to any motion of the tip of the marking implement through space. Such movements may be detected through analysis of the image data using a visual object tracking algorithm. Locations of the tip may refer to one or more positions of the tip in space (such as a physical space, an extended reality space, etc.) as the tip moves through space or when the tip is stationary.

In some embodiments, the tip of the marking implement may be detected as moving in 2D or 3D space. Data indicative of the movement or locations of the tip may refer to any data which may be analyzed to determine the movement or locations of the tip. For instance, the data indicative of the movement or locations of the tip may include positions, angles, distances, pixel locations, orientations, scales, speeds, accelerations, and any other property of the tip which may indicate a movement or location of the tip in 2D or 3D. In one example, the data indicative of the movement or locations of the tip may include a time series of locations or movement vectors associated with the tip. In another example, the data indicative of the movement or locations of the tip may include a group of locations or a group of movement vectors associated with the tip that are not sorted by time. In yet another example, the data indicative of the movement or locations of the tip may include a curved line associated with the movement or locations of the tip. By way of example, a processing device may receive from image sensor 472 of FIG. 3 image data indicative of movement of tip 4922 of marking implement 4920 and locations of tip 4922, as shown in FIGS. 51A to 51D. For instance, the processing device may receive a location 5102 of tip 4922 in image 5100, a location 5112 of tip 4922 in image 5110, a location 5122 of tip 4922 in image 5120, and a location 5132 of tip 4922 in image 5130. The processing device may also receive images from in between each of images 5100, 5110, 5120, and 5130 in the series of events. Additionally, the processing device may receive data indicating the movement of tip 4922 based on images 5100, 5110, 5120, and 5130.

Some disclosed embodiments may include determining from the image data when the locations of the tip correspond to locations on the object. In some examples, the locations of the tip may correspond to locations on the object when, while viewed from a particular distance and orientation, the tip of the physical marking implement may appear to hover directly over locations on the object or when the position of the tip of the physical marking implement overlaps or coincides with a position of a point on the object. For example, a virtual object may be presented in a field of view of a wearable extended virtual reality appliance, and the wearer may virtually color or mark-up the virtual object. A processor may detect the coincidence of the tip of the marking implement with a location on the virtual object. Similarly, in the case of a physical object, the processor may detect in a similar way a coincidence of the tip of the marking implement with the physical object. In some embodiments, determining from the image data when the locations of the tip correspond to locations on the object may include analyzing the image data using any of the method described above. By way of example, a processing device may determine from the image data when the locations of tip 4922 correspond to locations on object 4910. For instance, in FIGS. 51A to 51D, a processing device may determine from images 5100, 5110, 5120, and 5130 that locations 5102, 5112, and 5122 of tip 4922 correspond to locations on object 4910, whereas location 5132 of tip 4922 does not correspond to a location on object 4910. In some examples, a distance of the determined locations of the tip from the locations on the object may be determined, for example by measuring the distance in the image data, by projecting a location of the tip on a 3D model of the object, and so forth. Further, when the distance is below a selected threshold, it may be determined that the location of the tip corresponds to the locations on the object, and when the distance is above the selected threshold, it may be determined that the location of the tip does not correspond to the locations on the object. In some examples, a machine learning model may be trained using training examples to determine when locations of tips of marking implements correspond to locations on objects. An example of such training example may include a sample image and/or a sample video frame of a sample marking implement and a sample object, together with a label indicating whether the location of the tip of the sample marking implement corresponds to locations of the sample object. The trained machine learning model may be used to analyze the image data and determine when the locations of the tip correspond to locations on the object.

Some disclosed embodiments may include generating, in the detected color, virtual markings on the object at the corresponding locations. The virtual markings may be rendered on top of an object at one or more locations at which a user has performed a movement of a physical marking implement. In some embodiments generating the virtual markings in the detected color may include rendering the virtual markings in the color corresponding to the physical marking implement onto a virtual view of the object which may be observed by one or more users. By way of example, a processing device may generate, in the detected color, virtual markings on object 4910 at the corresponding locations. For instance, a processing device may generate, in red, the color associated with marking implement 4920. Virtual marking 5134 on object 4910 may correspond to locations 5102, 5112, and 5122 of tip 4922 on object 4910. In some examples, generating, in the detected color, virtual markings on the object at the corresponding locations may include adding the virtual markings to an extended reality environment or to a virtual object in the extended reality environment. In some examples, the virtual markings may be docked to the object in the extended reality environment, and may therefore move with the object when the object is moving.

Some disclosed embodiments may include presenting to the individual holding the marking implement, the virtual markings via a wearable extended reality appliance. A wearable extended reality appliance may be a wearable device, such as a head-mounted device, for example, smart glasses, smart contact lens, headsets or any other device worn by a human for purposes of presenting an extended reality to the human, as described elsewhere in this disclosure. Presenting to the individual holding the marking implement, the virtual markings via a wearable extended reality appliance may refer to displaying the virtual markings through the wearable extended reality appliance such that the individual, who is looking at the object through the wearable extended reality appliance, may see the virtual markings. Thus, a user may virtually color or annotate a virtual or physical object in the user's field of view. Colorization of a physical object may involve image manipulation to present to the user a colorized overlay corresponding to the movements of the tip of the marking implement on the physical object. By way of example, visual marking 5134 of FIGS. 51A to 51D may be presented to user 100 holding marking implement 4920 via wearable extended reality appliance 110 of FIG. 49. As another example, visual markings 5534 and 5536 may be displayed on extended reality display 5500 to user 100 holding marking implement 4920 via a wearable extended reality appliance such as wearable extended reality appliance 110.

Some disclosed embodiments may include presenting the virtual markings via a wearable extended reality appliance to a second individual located in proximity to the individual holding the marking implement. A second individual located in proximity may refer to two individuals being separated by a particular distance or a threshold distance. In one embodiment, the second individual is considered to be located in proximity to the individual holding the marking implement when their wearable extended reality appliances may communicate with each other. For example, an individual located in proximity to the individual holding the marking implement may be within 1 meter, 2 meters, 3 meters, 4 meters, 5 meters, 10 meters, 20 meters, 50 meters, or any other appropriate distance from the individual holding the marking implement. In other embodiments, the distances may be much greater, such that the individuals may be in two remote locations. Regardless, when wearable extended reality appliances are viewing the same space and one user marks-up a virtual or physical object, those markings detected by the image sensor of the virtual reality appliance associated with the individual doing the marking may be transmitted to the other individual, such that the same markings appear on the display of the other individual. By way of example, FIG. 52 illustrates individual 5200 and user 100 spaced apart by a distance 5240. Second individual 5200 may be in proximity to user 100 because distance 5240 may be less than the threshold distance (e.g., 1 meter). As an example, virtual markings 5234 and 5236 may be presented to user 100 via wearable extended reality appliance 110 and to and individual 5200 via wearable extended reality appliances 5202.

Some embodiments may include receiving a second indication that the second individual performed an action for modifying a virtual representation of the object. An indication of an action may include any notification that an action took place or is taking place, the action being a manipulation of the marking implement. For example, notification may be a mirror display of the marking implement on displays of individuals who are part of a group viewing an object that is in the process of modification. Or some other indicator such as an icon or notice may appear on others' displays indicating that a revision by the marking element is either in progress or has occurred. For instance, a second individual may point to locations on the object to create new virtual markings or may wave their hands to erase existing virtual markings on the object. Those indications might be presented to others. Some embodiments may involve causing additional virtual markings on the object that corresponds to the action in response to the received second indication. The additional virtual markings may be modifications to the virtual representation of the object that may affect only the virtual representation of the second individual, or may affect the virtual representations of some or all the individuals viewing the object. By way of example, as illustrated in FIG. 52, a virtual marking 5234 may be presented via wearable extended reality appliance 5202 to a second individual 5200 located in proximity to user 100 holding marking implement 4920. In some embodiments, second individual 5200 may perform an action for modifying the visual representation of object 4910 and send a second indication to rem a processing device via a network. In response to the second indication, the processing device may cause additional virtual markings to appear on object 4910 corresponding to the performed action. Additionally or alternatively, the action may cause the processing device to erase existing virtual markings such as virtual marking 5234 from the visual representation of object 4910.

Some disclosed embodiments may include presenting the virtual markings together with a virtual presentation of the object via wearable extended reality appliances to a plurality of individuals located remotely from the individual holding the marking implement. A plurality of individuals located remotely from the individual holding the marking implement may refer to two or more individuals being physically separated from the individual, for example, in different rooms, buildings, cities, countries, or in the same room but separated by a physical partition. For instance, a plurality of individuals may be presented the virtual markings and the virtual presentation of the object while being in a different location from the object and the individual holding the physical marking implement. As an example, the individual holding the physical marking implement and the plurality of individuals may be separated by a distance of 5 meters, 10 meters, 100 meters, 1 kilometer, 10 kilometers, 100 kilometers, 1000 kilometers, or any other distance which would mean the individual holding the marking implement and the plurality of individuals are physically separated. The plurality of individuals may each view the virtual markings and the virtual presentation of the object via a wearable extended reality appliance, or via a screen which the plurality of individuals may view together. As an example, a university professor may generate virtual markings on an object from an office or classroom, and students in their homes may be presented with the virtual markings together with a virtual presentation of the object. In one example, the object may be a virtual object, and the virtual presentation of the object may be based on a model of the virtual object. In another example, the object may be a physical object, and the virtual presentation of the object may be based on images of the object captured using the image sensor.

Some disclosed embodiments may include receiving a second indication that at least one of the plurality of individuals performed an action for modifying the virtual representation of the object. In some embodiments, one or more individuals of the plurality of individuals discussed above may use their own marking implements to make changes to the object or may otherwise take an action signaling that the virtual representation of the object is to be modified. For instance, the one or more individuals may wave their hands to erase existing virtual markings on the object or may use their own marking implements to augment, modify, or erase the markings already added to the object. Additionally or alternatively, the one or more individuals may perform gestures or use their own marking implements to create new virtual markings on the object. In one example, receiving the second indication may include at least one of reading the second indication from memory, receiving the second indication from an external device (for example, from an external device associated with the at least one of the plurality of individuals, from an external device controlling the extended reality environment, etc.), determining the second indication by analyzing sensor data (such as image data captured using an image sensor, gesture data captured using haptic glove, etc.), and so forth. Some embodiments may involve, causing removal of at least part of the virtual markings on the object in response to the received second indication. For example, the modifications to the virtual representation of the object may affect only the virtual representation associated with the individual performing the action, or may affect the virtual representations of a part or all of the individuals viewing the object, including the individual holding the physical marking implement.

By way of example, virtual marking 5134 of FIG. 53 may be presented via wearable extended reality appliance 5310 to a plurality of individuals 5300 located remotely from user 100 holding marking implement 4920. For instance, user 100 may be located in a room 5320 while plurality of individuals 5300 may be located in a different room 5330, which may be anywhere in the world where communications network 214 may still reach wearable extended reality appliances 5310. As an example, an individual 5302 from among individuals 5300 may perform an action for modifying the virtual representation of object 4910, and a second indication may be sent to a processing device via a network. In response to the second indication, the processing device may cause the removal of at least part of virtual marking 5134 on object 4910. In some embodiments, the modifications to the virtual representation of object 4910 may affect only the virtual representation associated with individual 5302, may affect the visual representation associated with some or all individuals 5300, may affect the visual representation associated with user 100, or may affect the visual representation associated with user 100 and the visual representation associated with some or all individuals 5300.

Some disclosed embodiments may include presenting the virtual markings via a wearable extended reality appliance to a second individual while the second individual is located in an environment of a physical object and the individual holding the marking implement is no longer in the environment of the object. In one example, an environment of the object may refer to a space in which the object may reside (e.g., a room, a building, an exterior, or any other area where the object may be located). In another example, an environment of the object may refer to all positions with a line-of-sight to at least part of the object. For instance, a view of the object may be partially obscured by a wall for an individual present in a different room than the room in which the may be located. However, the individual may still be considered to be in the environment of the object because they have a line-of-sight to at least part of the object. In some embodiments, a first individual holding a physical marking implement may make virtual markings on an object and then leave the environment of the object. Upon leaving the environment of the object, the first individual may no longer be in the same space as the object and/or may not have a line-of-sight to any portion of the object. A second individual may enter the environment of the object and may still view the virtual markings that were made by the first individual previously. By way of example, as illustrated in FIG. 54, an object may be a physical object, such as a table 5410. In this example, user 100 may make a virtual marking 5412 on table 5410 using marking implement 4920 and may leave room 5430 to go to room 5420, which is outside of the environment of table 5410. Then, a second individual 5400 may enter room 5430 (and thus the environment of table 5410) and may view virtual marking 5412 on table 5410 via wearable extended reality appliance 5440.

Some disclosed embodiments may include determining from the image data an intent of the individual to delete at least some of the virtual markings and removing the at least some of the virtual markings from the object. An intent to delete at least some of the virtual markings may be determined by analyzing received image data to determine that an individual is performing a gesture or the use of a marking implement associated with removing virtual markings. For instance, an individual may gesture in a certain way signaling a removal of markings (e.g. by virtually touching the markings to be deleted and either before or after pressing a physical or virtual button signaling deletion) or by use an opposite end of the marking implement as a virtual eraser. Image data may be analyzed to determine which end of the marking implement is in use—the tip or the eraser, and the functionality associated with the end in use may thereby be implemented. These are just a few examples. Other actions or combinations of actions may be recognized by at least one processor analyzing image data to cause deletions. By way of example, a processing device may determine from image 5130 of FIG. 51D an intent of user 100 to delete at least some of virtual marking 5134. The processing device may determine such intent when, for example, user 100 performs a predetermined action or utilizes an opposing end 5138 of marking implement 4920 to indicate portions of virtual marking 5134 that user 100 wishes to erase. The processing device may then remove the indicated portions and render only the remaining portions of virtual marking 5134.

Figure 55:
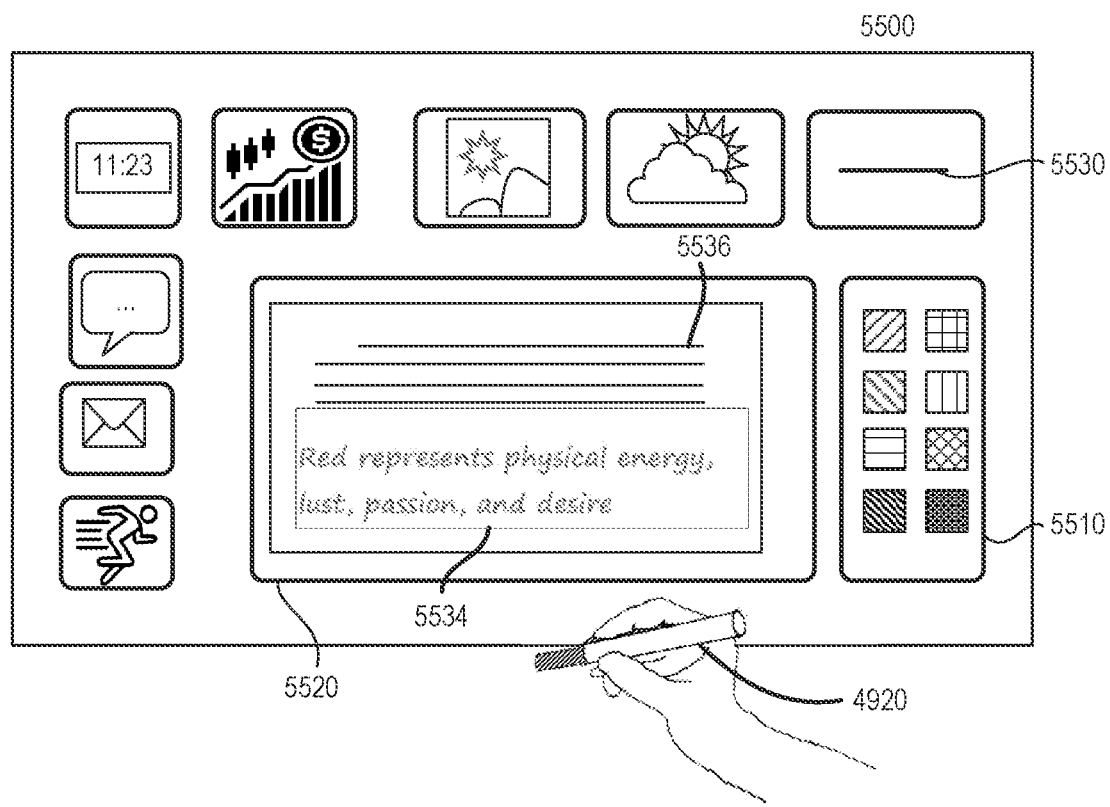
FIG. 55 is a schematic illustration depicting an extended reality display object adjacent a hand holding a physical marking implement and a virtual color palette, consistent with some embodiments of the present disclosure.

Some disclosed embodiments may include determining from the image data an intent of the individual to change the color of the virtual markings, presenting a virtual color palette via a wearable extended reality appliance to the individual holding the marking implement, determining a selection of a substitute color from the virtual color palette, and generating additional virtual markings on the object in the selected substitute color. Color changes may occur in a manner similar to deletions discussed above, through the use of a differing color marking implement detected in image data. Or, a virtual color palette may be provided, and an individual may gesture (e.g., point) to a new color which in response may change a color of a marking implement. Similarly, pointing toward a virtual eraser may change the function of the marking implement from a marker to an eraser. An individual may indicate an intent to change the color of the virtual markings by performing a gesture with a hand or with the physical marking implement. A gesture may include a conscious or unconscious movement of a hand of an individual which may be detected by a wearable extended reality appliance. For example, a gesture may include pointing, rotating, swiping, grabbing, tapping, or otherwise moving a hand or a finger with the intent to perform an action on a particular part of an extended reality display, an object, or the space visible through the wearable extended reality appliance. A virtual color palette may refer to a user interface enabling a selection of a variety of colors. The virtual color palette may be presented to the individual virtually via the wearable extended reality appliance. The virtual color palette may be virtually presented as a bounded area with smaller areas each representing a different range or shade of color. The virtual color palette may be presented to an individual as an overlay on top of objects visible through the wearable extended reality appliance or displayed via an extended reality display presented to the individual. The individual may perform a gesture with a body part or with the physical marking implement to indicate selection of a substitute color from the virtual color palette. For instance, a specific gesture such as swiping, tapping, double tapping, selecting, pointing, or other appropriate gesture may be recognized as a selection of a substitute color. Once the substitute color has been selected, any further virtual markings made on the object by the individual will be in the selected substitute color until the individual selects a new color. In some embodiments, the individual may select to have a part of or all of the existing virtual markings change color to a substitute color. By way of example, a processing device may determine from image data an intent of user 100 to change the color of the virtual markings. The processing device may then present a virtual color palette 5510 of FIG. 55 via wearable extended reality appliance 110 to user 100 holding marking implement 4920. Then, the processing device may determine a selection of a substitute color from virtual color palette 5510 when, for instance, user 100 may point to a substitute color. The processing device may generate additional virtual markings on object 5520 in the selected substitute color. In some embodiments, user 100 may perform an action (e.g., a movement of the marking implement or an appropriate gesture made by the second individual to signal that a virtual representation of the object is to be modified, as discussed above) such that existing virtual marking 5534 may change color to the substitute color.

Some disclosed embodiments may include detecting a type of the marking implement, accessing a repository of types of marking implements and corresponding mark characteristics associated therewith, and generating the virtual markings with a specific mark characteristic corresponding to the detected type of the marking implement. The type of the marking implement may be detected by analyzing the image data (i.e., data which may be used to represent graphic or pictorial data, as discussed above) by any of the methods described herein. For example, a data structure may hold characteristics of differing marking implements (e.g., pen, pencil, crayon, paint brush, magic marker, etc.) Image data may be compared with the characteristics stored in the data structure to identify the marking implement type (and, perhaps also an associated color.) When a match is determined, the marking characteristics associated with that marking implement may be retrieved from the data structure and applied. Thus, the visible characteristics of a virtual line (e.g., quality, consistency, shape) drawn by a pencil may differ in appearance from the characteristics of a line drawn by a paint brush, pen, crayon or magic marker. As another example, the type of the marking implement may be input by a user. A repository of types of marking implements and corresponding mark characteristics associated therewith may refer to a data store which may store information on different types of marking implements and their corresponding characteristics. In some embodiments, the types of marking implements may be associated with different widths of the virtual markings on the object. For example, a width of a pen stroke may be narrower than a width of a brush stroke. As other examples, the types of marking implements may be associated with different fonts, font styles, sizes, underline styles, and any other effects which may affect the appearance of a virtual marking. Some embodiments may include displaying a virtual representation of the detected type of the marking implement in virtual reality. For instance, an individual may be able to confirm that the detected type of the marking implement is indeed the marking implement they are holding. Generating the virtual markings with a specific mark characteristic corresponding to the detected type of the marking implement may include creating to be presented or otherwise displayed to an individual the virtual markings having properties associated with the marking implement used to create the virtual markings. For instance, a virtual marking created with a marking implement having a predetermined line width and color associated with it may be generated to have the predetermined line width and color. By way of example, three types of marking implements 5222, 5224, and 5226 are illustrated in FIG. 52. In some embodiments, marking implements 5222, 5224, and 5226 may generate virtual markings having different widths, fonts, font styles, sizes, underline styles, and any other effects which may affect the appearance of a virtual marking. For example, a processing device may detect marking implement 5222 from image 5200 by analyzing image 5200 by any of the methods discussed herein. In this example, the processing device may access a repository of types of marking implements and corresponding mark characteristics associated therewith to determine that the width of the virtual marks generated by marking implement 5222 are "thin." Accordingly, the processing device may generate the virtual markings with the specific mark characteristic (e.g., "thin") and/or color corresponding to marking implement 5222. In some embodiments, wearable extended reality appliance 110 may display a virtual representation 5530 of the detected type of the marking implement in virtual reality to user 100.

Some disclosed embodiments may include interpreting three-dimensional movements of the marking implement as two-dimensional inputs. While a user may move a marking implement in three-dimensional space, the out may be presented in two dimensions. In such an instance, the processor converts the three-dimensional detected movements of the marking implement into two-dimensional representations. In some embodiments, the two-dimensional virtual object may include a document, and the three-dimensional movements of the marking implement may be interpreted as handwriting virtual markings on the document in the detected color. By way of example, a processing device may interpret three-dimensional movements of marking implement 4920 of FIG. 55 as two-dimensional inputs to generate virtual marking 5534 including handwriting on object 5520.

Some disclosed embodiments may include interpreting three-dimensional movements of the marking implement as three-dimensional inputs. If a user is marking on a three-dimensional object, the processor may interpret the three-dimensional coordinates of the markings and translate them onto the corresponding three-dimensional representation of the object. For example, the three-dimensional virtual object may include a virtual representation of a physical object, and the virtual markings may include markings in the detected color on two traversed surfaces of the virtual representation of the physical object. The three-dimensional movements of the marking implement may be interpreted as three-dimensional inputs by interpreting the motion of the marking implement in a space with more than two coordinate axes. For instance, the two traversed surfaces of the virtual representation of the physical object may be on two planes which are at different angles to each other. That is, a three-dimensional virtual object may have numerous surfaces, some of which may be on different planes. A traversed surface may be one with which the tip of the marking implement overlaps. By way of example, object 4910 of FIGS. 51A to 51D may be a three-dimensional object and a processing device may interpret three-dimensional movements of marking implement 4920 as three-dimensional inputs to generate virtual markings 5134 and 5136, which may be on two different surfaces of the virtual representation of object 4910.

Some disclosed embodiments may include determining from the image data that the individual replaced the physical marking implement with a second physical marking implement associated with a second color, detecting in the image data the second color associated with the second marking implement, and generating additional virtual markings on the object in the second color. For instance, to change to a second color, an individual may simply switch to a second physical marking implement, which may be determined by analyzing the image data via any of the methods described herein. The color of second physical marking implement may be automatically detected such that the individual may not need to perform any additional actions. In one embodiment, a second physical marking implement may be associated with a second color via data stored in a repository which may be accessed once a specific physical marking implement is detected to determine which is the specific color associated with the specific physical marking implement. In some embodiments, the additional virtual markings in the second color may overlay the previous virtual markings associated with a first color. By way of example, instead of selecting a new color as discussed with respect to virtual color palette 5510 of FIG. 55, user 100 may simply switch to a second physical marking implement 5222, 5224, or 5226 as shown in image 5200 of FIG. 52. A processing device may detect the second color associated with second physical marking implement 5226 and generate additional virtual marking 5236 on object 5210 in the second color. In some embodiments, additional virtual marking 5236 in the second color may overlay virtual marking 5234 associated with the first color.

Some disclosed embodiments may include determining from the image data that the individual holds a second physical marking implement associated with a second color in addition to the physical marking implement, detecting in the image data the second color associated with the second marking implement, determining from the image data locations of a tip of the second marking implement, and generating additional virtual markings on the object in the second color based on the determined locations of the tip of the second marking implement. In some embodiments, any number of additional physical marking implements may be held by an individual and detected by analyzing the image data via any of the methods described herein such that the virtual markings made by each physical marking implement retain the characteristics of the physical marking implement which performed the action to make the virtual marking. By way of example, a processing device may determine that user 100 may hold an additional physical marking implement 5222, 5224, and/or 5226 associated with an additional color in addition to physical marking implement 5220, may detect the additional color associated with additional physical marking implement 5222, 5224, and/or 5226, may determine locations of a tip of additional marking implement 5222, 5224, and/or 5226, and may generate additional virtual markings on object 5210 in the additional color based on the determined locations of the tip of additional marking implement 5222, 5224, and/or 5226.

In some examples, contextual environmental data corresponding to a selected time period may be determined. For example, images and/or videos (such as the image data) may be analyzed using a person detection algorithm to determine the presence of one or more additional people (e.g., beside the individual holding the physical marking implement) at the selected time period, may be analyzed using a face recognition algorithm to determine the identity of the one or more additional people, may be analyzed using a visual action recognition algorithm to determine one or more actions performed by the one or more additional people at the selected time period, may be analyzed using a visual event detection algorithm to detect one or more events occurring at the selected time period, may be analyzed using a scene recognition algorithm to determine a type of the physical environment (such as outdoor, indoor, office, meeting room, home, etc.), and so forth. In one example, the contextual environmental data corresponding to the selected time period may include at least one of the one or more additional people, the identity of the one or more additional people, the one or more actions, the one or more events, or the type of the physical environment. In another example, audio captured from the environment of the individual holding the physical marking implement may be analyzed using speech recognition algorithm to determine a topic of a conversation taking place at the selected time period, may be analyzed using speaker diarization algorithm to identify contributors to the conversation at the selected time period, and so forth. In one example, the contextual environmental data corresponding to the selected time period may include at least one of the determined topic of the conversation or the identified contributors. Some disclosed embodiments may involve introducing changes or differentiators to different portions of the virtual markings that are associated with different time periods and/or different contextual environmental data. For example, portions of the virtual marking associated with different time periods corresponding to the creation of the portion of the virtual marking may have differing appearance (e.g., shading). In some examples, a data-structure may associate different portions of the virtual markings with determined contextual environmental data corresponding to the time period associated with the portions of the virtual markings. In one example, a user may provide (for example, via a user interface) an input indicative of a specific contextual environmental data or of a group of different contextual environmental data instances. In other examples, such input may be received from an external device, from a memory unit, from an automated process, and so forth. The data-structure may be searched based on the input to identify the portions of the virtual markings corresponding to the specific contextual environmental data or to the group of different contextual environmental data instances. The identified portions of the virtual markings may be provided, for example to the user that provided the input, to a different user, to an external device, to a memory unit, for presentation in an extended reality environment, and so forth.

Figure 56:
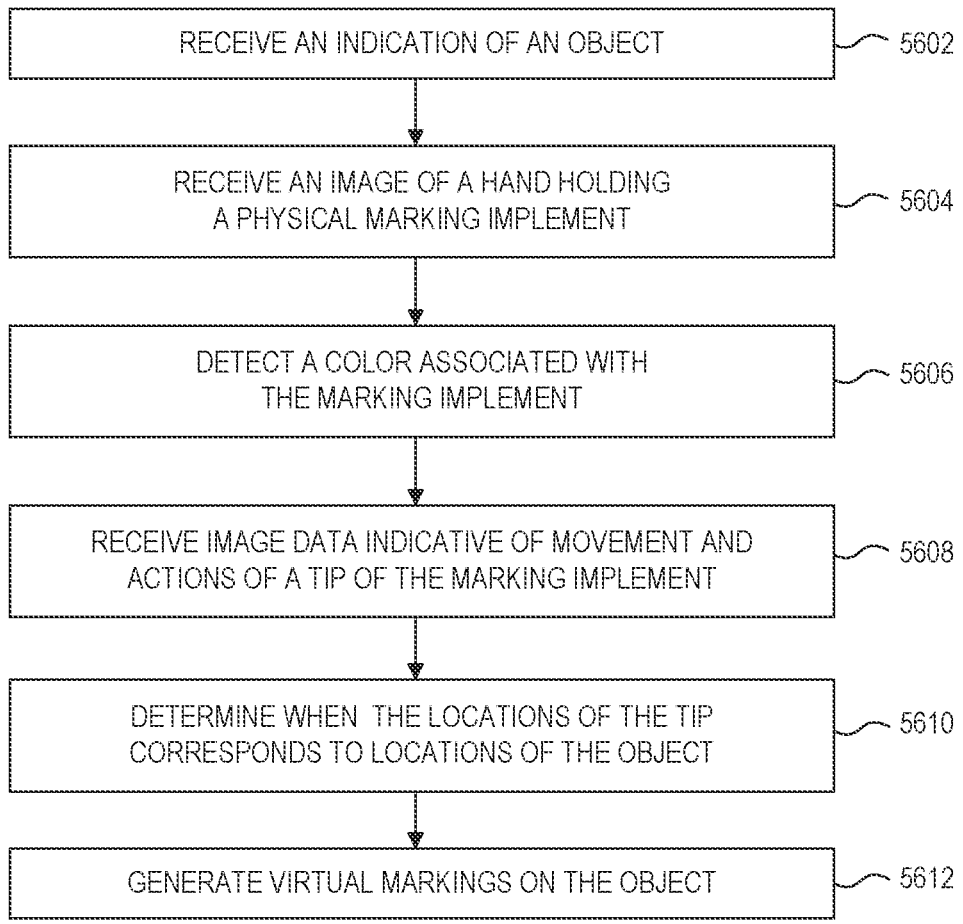
FIG. 56 is a flowchart of a process for making virtual colored markings on objects, consistent with some embodiments of the present disclosure.

FIG. 56 provides a flowchart of an example method 5600 for making virtual colored markings on objects executed by a processing device of system 200 as illustrated in FIG. 2. The processing device of system 200 may include a processor within a mobile communications device (e.g., a mobile communications device 206), a processor within a server (e.g., server 210), a processor within a wearable extended reality appliance (e.g., wearable extended reality appliance 110), or a processor within an input device associated with wearable extended reality appliance 110 (e.g., keyboard 104). It will be readily appreciated, that various implementations are possible and that any combination of components or devices may be utilized to implement the exemplary method. It will also be readily appreciated that the illustrated method can be altered to modify the order of steps, delete steps, or further include additional steps, such as steps directed to optional embodiments.

Method 5600 may include a step 5602 of receiving an indication of an object. Method 5600 may further include a step 5604 of receiving from an image sensor an image of a hand of an individual holding a physical marking implement. Method 5600 may further include a step 5606 of detecting in the image a color associated with the marking implement. Method 5600 may further include a step 5608 of receiving from the image sensor image data indicative of movement of a tip of the marking implement and locations of the tip. Method 5600 may further include a step 5610 of determining from the image data when the locations of the tip correspond to locations on the object. Method 5600 may further include a step 5612 of generating, in the detected color, virtual markings on the object at the corresponding locations. Details and examples on the different steps of method 5600 are described above.

In order for multiple users of wearable extended reality appliances to commonly view virtual objects, aspects of this disclosure describe how to develop an on-the-fly coordinate system that may be shared by users. The coordinate system may be created by displaying a code on a mobile device. When the extended reality appliances scan the code, the wearable extended reality appliances share a common reference point and may use that reference point to generate a shared common coordinate system. Additionally, when the mobile device moves, the displayed code may be changed accordingly.

Some disclosed embodiments may involve enabling wearable extended reality appliances to share virtual content. Sharing virtual content may refer to the distribution of text, photos, videos, links, or any other information across different displays of wearable extended reality appliances. For example, a wearable extended reality appliance may display virtual content in an extended reality environment. A second wearable extended reality appliance may not display any virtual content. The first wearable extended reality appliance may share its display of virtual content with the second wearable extended reality appliance in order for the second wearable extended reality appliance to display the same content as the first wearable extended reality appliance. In some examples, sharing virtual content may include the presentation of the same virtual content by a plurality of wearable extended reality appliances, for example in a same or similar position and orientation in an extended reality environment.

Some disclosed embodiments may involve generating a visual code reflecting a first physical position of a mobile device, the visual code being configured to be read by a plurality of wearable extended reality appliances. The term "visual code" may include, for example, a machine-readable code consisting of an array of black and white squares, typically used for storing the address of a webpage or other information. Additionally or alternatively, the visual code may include one or more of numbers, letters, shapes, images, colors, or any other identifier that may be detected by an image sensor. For example, the visual code may be a QR code, Data Matrix code, bar code, alphanumeric code, or any other type of code. The visual code may be read by a plurality of wearable extended reality appliances using a device for recording visual images that may be incorporated within or attached to the wearable extended reality appliances. The device for recording visual images may be a camera, scanner, recorder, or any other type of recording device. The visual code may be displayed on a mobile device, such as a cell phone, tablet, dedicated hardware, or any other physical device capable of code display. In some examples, the information contained in the visual code may represent a physical position of a mobile device in a physical space. A physical position may be the place where an item is located. In some examples, the information contained in the visual code may represent a physical position of a presentation of the visual code in a physical space. For example, for a first presentation of the visual code at a first position on a display screen of the mobile device and a second presentation of the visual code at a second position (different from the first position) on the display screen of the mobile device while the mobile device is at the same position and orientation in the physical space, the first presentation and the second presentation may have different physical positions in the physical space, and the visual code may include different information to represent that. In another example, different positions of the presentation of the visual code on the display screen may compensate for different positions and/or orientations of the mobile device, so that the physical position of the presentation of the visual code is the same, and the visual code may include the same information in the different presentations to represent that. In some examples, the information contained in the visual code may represent a physical orientation of a mobile device in a physical space. A physical orientation may be the direction of an item in a physical space. In some examples, the information contained in the visual code may represent a physical orientation of a presentation of the visual code in a physical space. For example, for a first presentation of the visual code at a first orientation on a display screen of the mobile device and a second presentation of the visual code at a second orientation (different from the first orientation) on the display screen of the mobile device while the mobile device is at the same position and orientation in the physical space, the first presentation and the second presentation may have different physical orientations in the physical space, and the visual code may include different information to represent that. In another example, different orientations of the presentation of the visual code on the display screen may compensate for different positions and/or orientations of the mobile device, so that the physical orientation of the presentation of the visual code is the same, and the visual code may include the same information in the different presentations to represent that. A mobile device may be located in many different environments. For example, a mobile device may be located in an office environment, home environment, public space, or any other location. In one exemplary use case, a mobile phone (for example on a conference table) may display the visual code, and a group of individuals, each wearing an extended reality device, may capture an image of the visual code, providing a common reference point for the group.

In some embodiments, the mobile device may be a smartphone paired with one of the plurality of wearable extended reality appliances. Pairing may involve creating a link between computing devices to allow communications between the devices. Paired devices may be able to transmit information between each other. For example, a smartphone may be paired with one of the plurality of wearable extended reality appliances so that information may be shared between the smartphone and the wearable extended reality appliance. In some embodiments, the mobile device may be paired with one of the plurality of wearable extended reality appliances. A wearable extended reality appliance may include smart glasses, head-mounted displays, head-up displays, virtual reality (VR) headset, or any other type of appliance.

Prior to generating the visual code, some of the disclosed embodiments may involve determining the first physical position of the mobile device based on data received from at least one location sensor within the mobile device. A location sensor may detect a physical position that may include absolute position (i.e. location) or relative position (i.e. displacement from a position). For example, a location sensor may use GPS technology, outdoor positioning system or an indoor positioning system to determine absolute or relative location. As another example, a location sensor may provide coordinate locations relative to a predetermined reference frame. As another example, the location sensor may provide angular positions of relative to a predetermined reference frame. Additionally, one or more hubs of a wireless network such as a WiFi network may be used to determine location. A mobile device may contain a location sensor configured for use in determining a physical position of the mobile device.

Some disclosed embodiments may involve presenting the visual code on a display of the mobile device for detection by the plurality of wearable extended reality appliances, to thereby enable the plurality of wearable extended reality appliances to share content in a common coordinate system upon the detection of the visual code. Detection of a visual code by a wearable extended reality appliance may include an appliance configured to identify the presence of a visual code. For example, as stated above, the wearable extended reality appliance may contain a recording, scanning, or imaging device. The recording, scanning, or imaging device may identify and scan the visual code. For example, the visual code may include a OR code, and image data captured using an image sensor included in a wearable extended reality appliance may be analyzed using a QR code detection algorithm to detect the visual code. In another example, the visual code may include a selected visual pattern, and the image data captured using an image sensor included in a wearable extended reality appliance may be analyzed using a visual pattern recognition algorithm (such as a template matching algorithm) to detect the visual code. Detecting the visual code may enable a plurality of wearable extended reality appliances to share content in a common coordinate system after the detection of the visual code. The term "coordinate system" refers to a common reference frame. A coordinate system may include, for example, an arrangement of reference lines or curves used to identify the locations of points in space. For example, in two dimensions, an x-y plane (that is, a Cartesian coordinates system with a specific origin point and specific directions for the axes) may be used to identify locations of points in space. As another example, in two dimensions, a polar coordinates system with a particular origin point and a specific reference direction may be used to identify locations of points in space. As another example, in three dimensions, an x-y-z plane (that is, a Cartesian coordinates system with a specific origin point and specific directions for the axes) or a spherical coordinates system with a specific origin point, a specific zenith direction and a specific reference plane may be used to identify locations of points in space. A physical space may contain an infinite number of coordinate systems. Prior to detecting the visual code, each wearable extended reality appliance may have its own coordinate system. After detecting the visual code, the plurality of wearable extended reality appliances may share a common coordinate system (which may replace their previous coordinate systems or may be used in addition to their previous coordinate systems). In one example, a common coordinate system may mean that each coordinate system of each extended reality appliance may be aligned and may have the same arrangements of reference lines or curves. In another example, a common coordinate system may enable different wearable extended reality appliances to present virtual content at the same physical location and/or physical orientation. Aligning coordinate systems may include ensuring that origins of the coordinate systems coincide and that the one or more coordinate axes associated with each coordinate system overlaps with or coincides with one or more coordinate axes of another coordinate system, or that other elements that define the coordinate systems coincide. In one example, aligning coordinate systems may include determining one or more transformation functions from one coordinate system to other coordinate systems and vice versa. By way of another example, the visual code, which may be generated and displayed by the mobile device, may define a common reference for a plurality of extended reality appliance wearers. Once they share the common reference, details of the shared coordinate system may be a matter of design choice.

The coordinate system may be imperceptible to appliance wearers. For example, they may not see any particular visualization of the coordinate system, aside from the fact that the perspective view of each appliance wearer may differ based on their orientations relative to the common reference point. In other embodiments where the coordinate system is perceptible, each wearable extended reality appliance may display the same arrangement of lines with a common reference point. A common reference point may be a point in space with respect to which the position of an object in space is expressed. For example, a mobile device may represent the point in space where the x and y axis cross each other. As another example, a mobile device may represent the point in space where the x, y, and z axis cross each other. A common coordinate system may be created when each wearable extended reality appliances' coordinate system shares a common reference point. For example, each wearable extended reality appliance may read the visual code, determine the physical location of the mobile device based on the location information stored in the visual code, and make the physical location of the mobile device the origin of each wearable extended reality appliances' coordinate system, creating a common coordinate system. Content may be shared in the common coordinate system in the same manner as described above.

In some embodiments, users of the plurality of wearable extended reality appliances may view a virtual object at a single location in a physical space. For example, prior to a common coordinate system, a wearable extended reality appliance may display a virtual object in its own coordinate system. And a second wearable extended reality appliance may display the same virtual object in its own different coordinate system, with the two coordinate systems unaligned. The virtual objects may appear in different locations in the two different coordinate systems. After scanning the visual code and forming a common coordinate system, the plurality of wearable extended reality appliances may display the virtual object in the same position in the common coordinate system.

Figure 57:
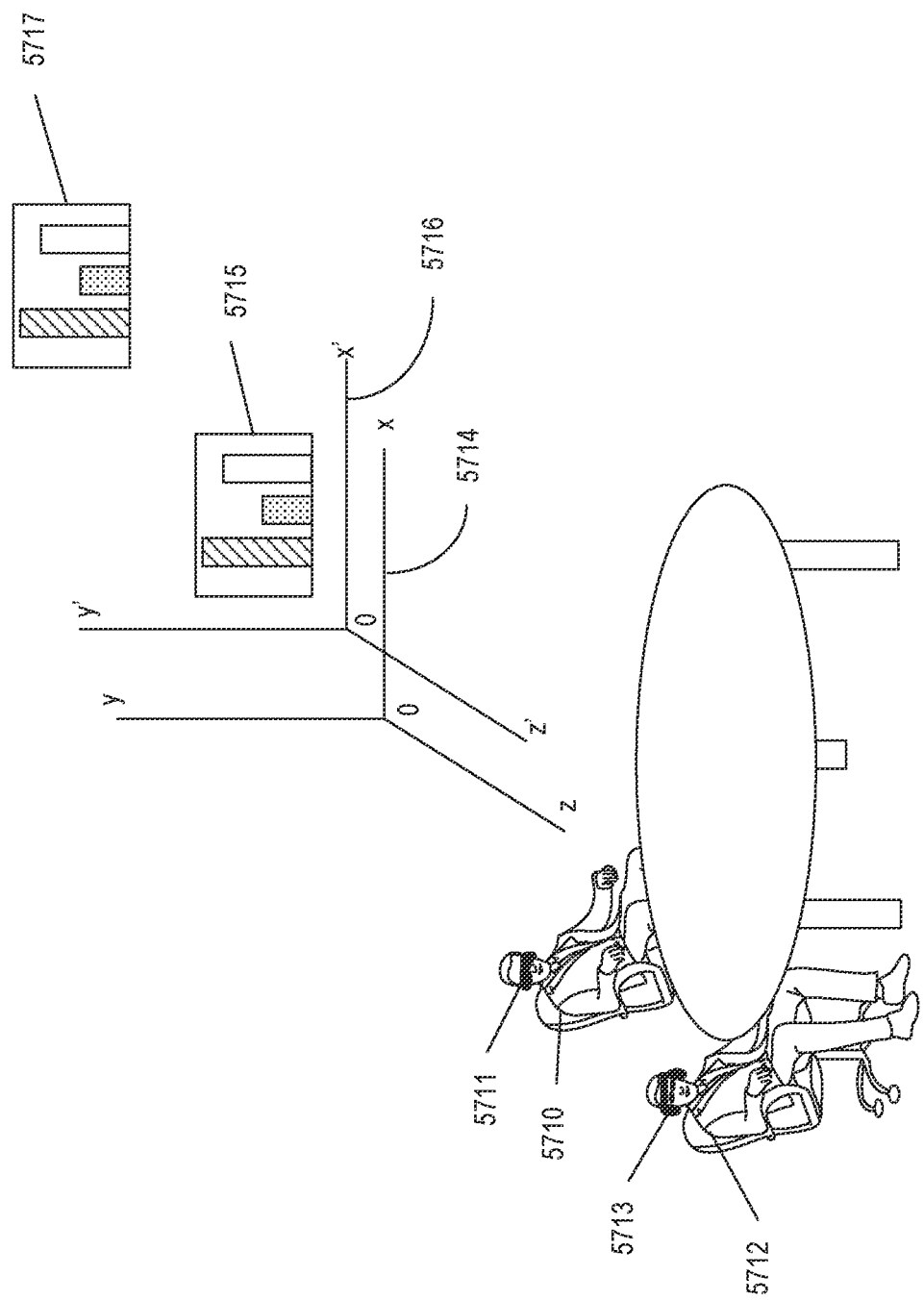
FIG. 57 illustrates an example of a plurality of wearable extended reality appliances with individual, unaligned coordinate systems, consistent with some embodiments of the present disclosure.

By way of example, FIG. 57 illustrates an example of a plurality of wearable extended reality appliances with their own coordinate systems not aligned. For example, as illustrated in FIG. 57, user 5710 and user 5712 may be in an office conference room. User 5710 may be wearing wearable extended reality appliance 5711. Wearable extended reality appliance 5711 may display virtual content 5715 in coordinate system 5714. User 5712 may be wearing wearable extended reality appliance 5713. Wearable extended reality appliance 5713 may display virtual content 5717 in coordinate system 5716. As illustrated in FIG. 57 coordinate system 5714 and 5716 may not be aligned, and as a result virtual content 5715 and virtual content 5717 may be displayed at different locations and/or orientations.

Figure 58:
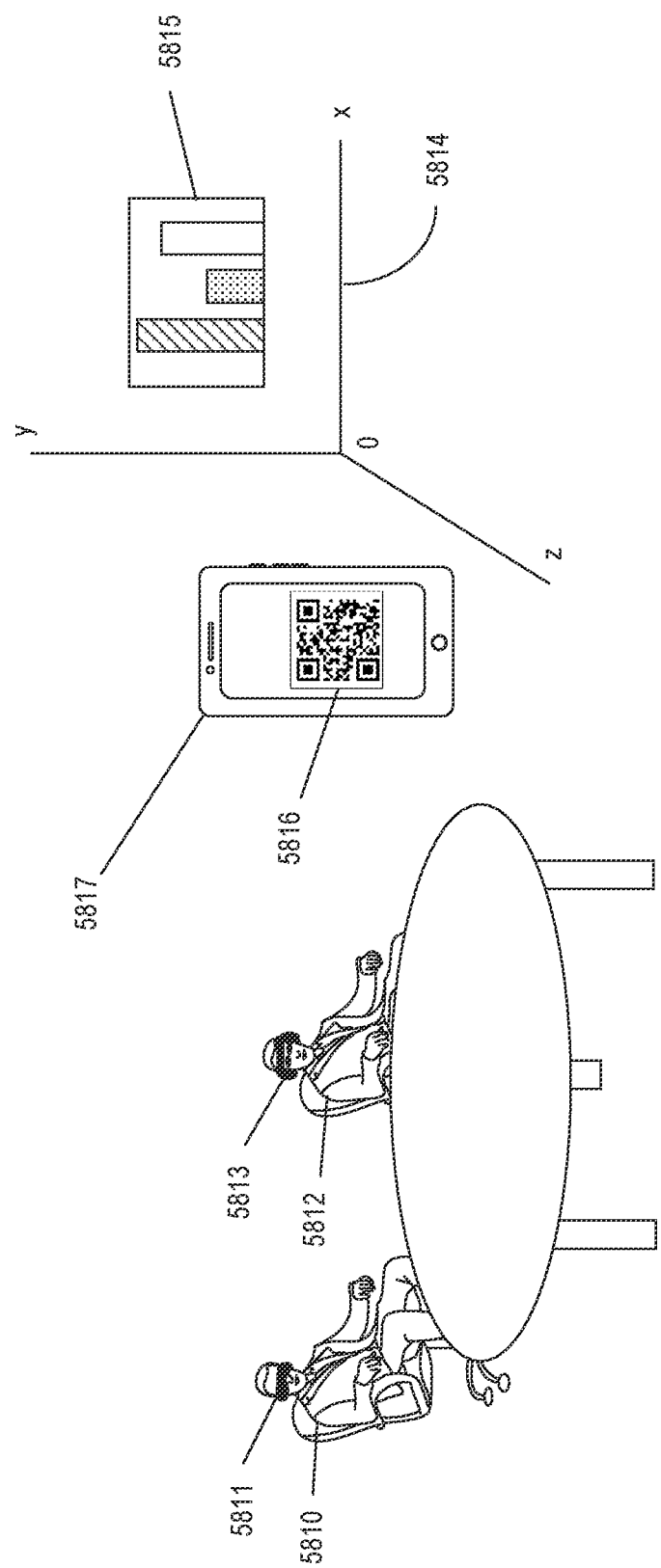
FIG. 58 illustrates an example of a plurality of wearable extended reality appliances with a common coordinate system, consistent with some embodiments of the present disclosure.

By way of example, FIG. 58 illustrates an example of a plurality of wearable extended reality appliances with a common coordinate system. For example, as illustrated in FIG. 58, user 5810 and user 5812 may be in an office conference room. User 5810 may be wearing wearable extended reality appliance 5811 and user 5812 may be wearing wearable extended reality appliance 5813. Visual code 5816, displayed on mobile device 5817, may be read by wearable extended reality appliances 5811 and 5813. After reading visual code 5816, wearable extended reality appliances 5811 and 5813 may display content 5815 in a common coordinate system 5814. Thereby, both wearable extended reality appliances 5811 and 5813 may present content 5815 at the same location and/or orientation.

Some disclosed embodiments may include identifying a trigger for causing the presentation of the visual code. The term "trigger" may mean an action that causes an event or situation to happen. For example, a visual code may only be presented based on an identification of an action. In one embodiment, the trigger may be associated with an input received from a wearable extended reality appliance paired with the mobile device. An input may include data that may be created based on an event. The input may cause a trigger for a visual code to be presented on the mobile device. For example, a mobile device and a wearable extended reality appliance may pair and create an input that may cause a visual code to appear on the mobile device. In one example, the wearable extended reality appliance may include an image sensor, image data captured using the image sensor may be analyzed using gesture recognition algorithm, and identifying the trigger may include detection of a particular gesture of a user of the wearable extended reality appliance in the image data. In another example, the wearable extended reality appliance may include an audio sensor, audio data captured using the audio sensor may be analyzed using speech recognition algorithm, and identifying the trigger may include detection of a particular voice command in the audio data. In yet another example, the wearable extended reality appliance may identify a proximity of another wearable extended reality appliance, and identifying the trigger may be based on the identification of the proximity of the other wearable extended reality appliance. In another embodiment, the trigger may be associated with an input from at least one sensor within the mobile device, the input being indicative of an additional wearable extended reality appliance approaching the mobile device. A sensor may be a device that detects and responds to some type of input. Examples of sensors may include position sensors, pressure sensors, temperature sensors, force sensors, or any other type of sensor. A sensor may detect that an additional wearable extended reality appliance is near the mobile device. The sensor may create an input that may generate a trigger for a visual code to be presented on the mobile device. For example, a wearable extended reality appliance may appear in the same room as a mobile device. The mobile device may detect the wearable extended reality appliance via a sensor. The detection may create an input that may cause a visual code to appear on the mobile device. In another embodiment, an input may be received from a user of the mobile device. For example, a user of a mobile device may manually prompt a sensor on the mobile device in order to cause a presentation of the visual code. The user may manually prompt a sensor by pushing a button, selecting an application, downloading a link, or any other manual means.

Figure 59:
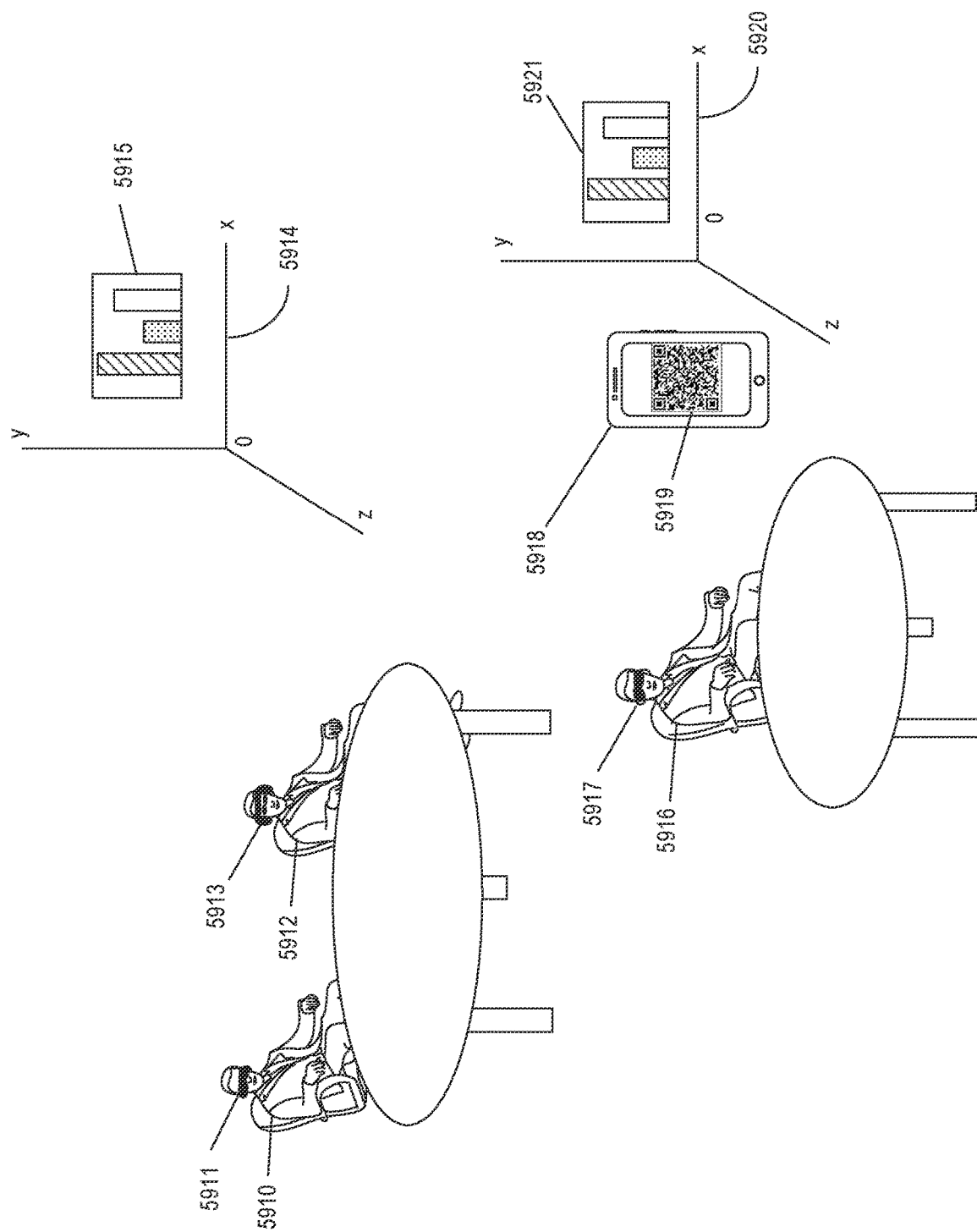
FIG. 59 illustrates an example of an additional wearable extended reality appliance joining a plurality of wearable extended reality appliances, where the additional appliance has a coordinate system not aligned with the common coordinate system, consistent with some embodiments of the present disclosure.

By way of example, FIG. 59 illustrates an example of an additional wearable extended reality appliance joining a plurality of wearable extended reality appliances, where the additional appliance has a coordinate system not aligned with the common coordinate system. For example, as illustrated in FIG. 59, user 5910, user 5912, and user 5916 may be in an office conference room. User 5910 may be wearing wearable extended reality appliance 5911 and user 5912 may be wearing wearable extended reality appliance 5913. Wearable extended reality appliances 5911 and 5913 may display content 5915 in a common coordinate system 5914. User 5916 may be wearing wearable extended reality appliance 5917. Wearable extended reality appliance 5917 may display content 5921 in coordinate system 5920 that may be different from coordinate system 5914. As also illustrated in FIG. 59, mobile device 5918 may present visual code 5919. Wearable extended reality appliance 5917 may read visual code 5919 and cause coordinate system 5920 to become aligned with coordinate system 5914, for example as will be explained further in connection with FIG. 60.

Figure 60:
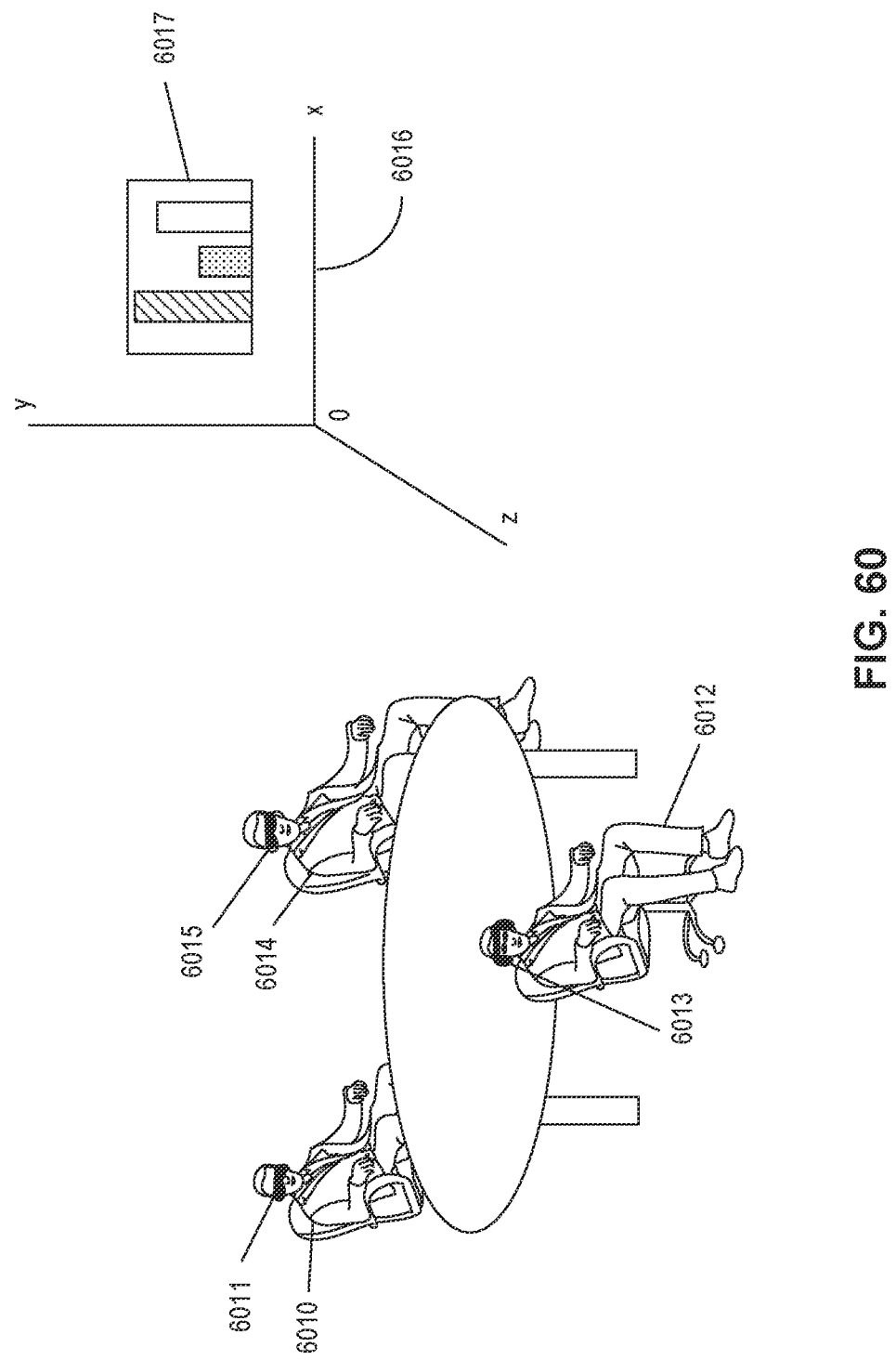
FIG. 60 illustrates an example of an additional wearable extended reality appliance having a common coordinate system with a plurality of wearable extended reality appliances, consistent with some embodiments of the present disclosure.

By way of example, FIG. 60 illustrates an example of an additional wearable extended reality appliance having a common coordinate system with a plurality of wearable extended reality appliances. For example, as illustrated in FIG. 60, user 6010, user 6012, and user 6014 may be in an office conference room. User 6010 may be wearing wearable extended reality appliance 6011, user 6012 may be wearing wearable extended reality appliance 6013, and user 6014 may be wearing wearable extended reality appliance 6015. Wearable extended reality appliances 6011, 6013, and 6015 may display content 6017 in a common coordinate system 6016 after wearable extended reality appliances read a visual code presented on a mobile device.

Upon the detection of the visual code, in some embodiments, the visual code may be configured to provide access to a private extended reality environment. A private extended reality environment may be an environment that may be accessible to a particular user or users and that may be inaccessible to other users. To gain access to a private extended reality environment, the one or more other users may need a password, permission, pin code, or another type of authentication information. For example, to gain access to a private extended reality environment, a wearable extended reality appliance may need to read a specific visual code. Reading the visual code may cause the wearable extended reality appliance to access the private extended reality environment.

Some disclosed embodiments may involve preventing access to the private extended reality environment following passage of a temporal limit. A temporal limit may be a limit that is based on a length of time. A temporal limit may be measured in seconds, minutes, hours, days, and/or any other length of time. An extended reality environment may only be accessible for a specific and/or limited amount of time, or a specific period of time. For example, a wearable extended reality appliance may detect and read a visual code that may provide access to a private extended reality environment. The private extended reality environment may be configured to deny access after a predetermined amount of time (e.g., 10 minutes, 15 minutes, or any other predetermined time period). After expiry of the predetermined amount of time, the wearable extended reality appliance may no longer be able to display the extended reality environment. In some examples, reading the visual code in the specific period of time may provide the wearable extended reality appliance access to the private extended reality environment, while reading the same visual code after the specific period of time has passed may not provide the wearable extended reality appliance access to the private extended reality environment. In one example, the provided access may be limited to the specific period of time, while in another example, once the access was provided in the specific period of time, the access may be preserved for at least a selected amount of time after the specific period of time has passed. In one example, the visual code may be valid for granting access to the private extended reality environment for a specific period of time, which may prevent abuse of the visual code (for example, the usage of a picture of the visual code after the presentation of the visual code by the mobile device stopped).

Some disclosed embodiments may involve preventing access to the private extended reality environment when the visual code is detected beyond a spatial limit. A spatial limit may be a limit that is based on an event existing or happening in a certain space. An extended reality environment may only be accessible when a wearable extended reality appliance detects a visual code within a certain defined space. For example, the spatial limit may require that the visual code must be detected in a certain room in an office. In another example, the spatial limit may require that the visual code must be detected within a certain distance of another wearable extended reality appliance. As another example, the spatial limit may be that the code must be detected in a certain room in a user's home. Access to the private extended reality environment may be denied if the visual code is not detected within the limit. For example, a wearable extended reality appliance may detect a code while in an office setting, and the wearable extended reality appliance may be provided access to the private extended reality environment. In another example, a wearable extended reality appliance may detect a code in a public setting (e.g., outside the office, in a park, in a public place), and the wearable extended reality appliance may be denied access to the private extended reality environment. In some examples, the spatial limit may require that the visual code must be detected within a certain distance of the mobile device presenting it, or in a specific space in which the mobile device presenting the visual code is located. This may prevent abuse of the visual code (for example, the usage of a picture of the visual code sent to a remote location away of the mobile device).

Some disclosed embodiments may involve generating a first visual code configured to grant access to a first private extended reality environment, and generating a second visual code configured to grant access to a second private extended reality environment. A wearable extended reality appliance may be granted access to multiple different private extended reality environments from a single location. Each different private extended reality environment may be associated with its own visual code. For example, a wearable extended reality appliance may detect a first visual code associated with a first private extended reality environment, and the appliance may be granted access to the first private environment. The wearable extended reality appliance may wish to join a different private environment. A second visual code associated with a second private extended reality environment may be generated. The wearable extended reality appliance may detect the second visual code and be granted access to the second private environment.

Some disclosed embodiments may involve detecting movement of the mobile device to a second physical position different from the first physical position. Detecting movement may include detecting a change in the position of an object relative to its surroundings. Movement may be detected by monitoring changes in sound waves, infrared light, visible light, radio frequency energy, or any other changes associated with a change in location.

In some embodiments, the detected movement may include a change in an orientation of the mobile device without a change in a location of the mobile device, the altering of the presentation may include changing an orientation of the presented visual code to compensate for the change in the orientation of the mobile device. The term "orientation" may include the determination of the relative direction of something. A change in orientation may include a change in the relative direction of something. For example, a mobile device may be presented in a specific direction relative to another direction in a common coordinate system or another object. A mobile device may change relative directions without changing locations in a common coordinate system. For example, a top portion of a mobile device may be facing north in a common coordinate system that may be using cardinal directions. The mobile device may be turned upside down so the top portion of the mobile device may be facing south in the common coordinate system. As another example, the mobile device may be turned left so the top portion of the mobile device may be facing west in the common coordinate system. As another example, the mobile device may be turned right so the top portion of the mobile device may be facing east in the common coordinate system. A visual code that may be presented on a mobile device may also change orientations with the mobile device. For example, a mobile device may be turned upside down so the top portion of the mobile device may be facing south in a common coordinate system. A visual code may also be rotated 180 degrees so the top portion of the visual code may be facing south in the common coordinate system.

In some embodiments, the detected movement may include a change in a location of the mobile device without a change in an orientation of the mobile device. When the change in the location of the mobile device is smaller than a selected threshold, the altering of the presentation may include changing a location of the presented visual code on the display of the mobile device to compensate for the change in the location of the mobile device. A selected threshold may be an amount that must be exceeded for a certain reaction, result, or condition to occur. A threshold may be based on distance, location, position, or any other measurement. In one examples, a threshold may be predetermined or selected by a user. In one example, the threshold may be selected based on a display size of the mobile device, based on a current location of the visual code on the display screen of the mobile device, and so forth. A threshold may be selected and when a change in location of a mobile device is smaller than the threshold, the display of the visual code on the mobile device may also be changed. In some embodiments, the display may be moved by a distance proportional to the change in location of the mobile device. For example, a threshold may be set to 5 feet. A change in a location of the mobile device may be 4 feet. The change may be smaller than the threshold and therefore a presentation of the visual code may also be moved 4 feet from the first physical position. In another embodiment, a threshold may be set to a specific location. For example, a threshold may be set to only the location of an office conference room. A first physical location of a mobile device may be in the office conference room and a second physical location of the mobile device may also be in the office conference room. The difference between the first and second physical location is below the threshold and therefore a presentation of the visual code may also be moved on the display of the mobile device to compensate for the change in the location of the mobile device. For example, the movement of the visual code on the display of the mobile device may cancel with the movement of the mobile device so that the position of the visual code in the physical environment stays the same. In this example, the threshold may be selected so that the display screen of the mobile device is large enough for relocating the visual code in a way that cancels the movement of the mobile device. In another example, each deviation of the visual code from a selected position on the display screen may encode a non-linear correction to the movement of the mobile device.

In some embodiments, the detected movement may include a change in a location of the mobile device and a change in an orientation of the mobile device. When the change in the location of the mobile device is smaller than a selected threshold, the altering of the presentation may include changing a location of the presented visual code on the display of the mobile device to compensate for the change in the location of the mobile device and changing an orientation of the presented visual code to compensate for the change in the orientation of the mobile device. A change in orientation may occur as described above. Additionally, a selected threshold may be determined as described above. For example, a threshold may be set to 5 feet. By way of an example, a change in location of the mobile device between the first physical position and the second physical position may be 4 feet and a mobile device may be rotated by four degrees. The change may be smaller than the threshold and therefore a presentation of the visual code may also be moved 4 feet from the first physical position and rotated by four degrees.

Some disclosed embodiments may involve, upon detecting movement of the mobile device, altering the presentation of the visual code so that the visual code is unavailable for use in content sharing. Altering the presentation of the visual code may include changing a visual property of the code. For example, the visual code may disappear, may be distorted, or may be changed in any way that makes it unreadable or invalid. For example, the visual code may disappear so a camera on a wearable extended reality appliance may no longer be able to read the visual code. Likewise, when the visual code is distorted or modified to make it unreadable, the camera on the wearable extended reality appliance may no longer be able to read the visual code. A wearable extended reality appliance may not be able to share content in a common coordinate system when the appliance can no longer read the visual code. In other embodiments, an amount of change in location or orientation beyond a threshold may result in generation of a new visual code, requiring wearable appliance users to detect the new visual code in order to participate in (or to continue participating in) a common virtual reality experience.

When the detected movement includes a change in an orientation of the mobile device without a change in a location of the mobile device, some of the disclosed embodiments may involve rendering the visual code unavailable for use in content sharing. As described above, the orientation of a mobile device may be changed. In such a situation, a prior visual code may become unreadable as described above. For example, a top portion of a mobile device may be facing north in a common coordinate system that may be using cardinal directions. The mobile device may be rotated so the top portion of the mobile device may be facing south in the common coordinate system. Based on the change in orientation, the visual code may be unreadable by the wearable extended reality appliance and the appliance may be unable to share content.

In one implementation, the detected movement may include a change in a location of the mobile device without a change in an orientation of the mobile device, and some disclosed embodiments may involve rendering the visual code unavailable for use in content sharing. As described above, when the orientation and location of a mobile device displaying the visual code changes, the visual code may become unreadable as described above. For example, a first physical position of a mobile device may be in an office conference room. A second physical position of a mobile device may be in an office hallway. The change in location may be the difference between the mobile device being in the office conference room and the mobile device being located in the office hallway. A visual code may disappear when the mobile device moves into the office hallway. Therefore, the visual code may not be available to be read by the wearable extended reality appliance, and the appliance may not be able to share content in the preexisting shared coordinate system.

In some embodiments, altering of the presentation may include removing the presentation of the visual code from the display of the mobile device. A mobile device may no longer display a visual code after moving positions in a physical space. In another embodiment, altering of the presentation may include shrinking the presentation of the visual code, enlarging the presentation of the visual code, changing intensity of the visual code, changing the color scheme of the visual code, adding a visual indicator indicative of the visual code being obsolete, distorting the presentation of the visual code, or any other alterations to the visual appearance of the visual code. For example, altering the presentation may make the visual code undetectable by one or more wearable extended reality appliances. As another example, altering the presentation may enable one or more wearable extended reality appliances to determine the visual code is obsolete.

In some embodiments, the altering of the presentation may include presenting an updated visual code on the display of the mobile device, the updated visual code being configured for detection by an additional wearable extended reality appliance, to thereby enable the additional wearable extended reality appliance to share content in the common coordinate system upon the detection of the updated visual code. In some embodiments, altering the presentation may include presenting a new visual code. A new visual code may include a different pattern, different type of code, different coloring, or any other type of difference compared to the original visual code. An additional wearable extended reality appliance may be present in a physical space and may read the updated visual in order to display the common coordinate system and the virtual objects located in the common coordinate system.

Some disclosed embodiments may involve generating the updated visual code to reflect the second physical position of the mobile device. In some examples, the second physical position may reflect a new common reference point for a common coordinate system. An updated visual code may contain information identifying the second physical position. For example, one or more wearable extended reality appliances may already be sharing a common coordinate system. The users of the one or more wearable extended reality appliances may want to share a common coordinate system with an additional wearable extended reality appliance. A mobile device may be moved to a different position in the physical space and display an updated visual code. The plurality of wearable extended reality appliances may scan the updated visual code to enable a common coordinate system with the second physical position of the mobile device as a common reference point. In some examples, since the second physical position is different from the first physical position, the updated visual code may include a correction factor for determining the common coordinate system. The correction factor may be based on a displacement between the first physical position and the second physical position, on a change in the direction of the mobile device, and so forth. In one example, the first physical position may be used as a reference point for the common coordinate system, and the updated visual code may be configured to enable a determination of the first physical position based on the second physical position, for example by encoding the displacement between the two physical positions.

In some embodiments, the second physical position of the mobile device may be determined based on an analysis of an image data depicting at least part of the visual code and captured by an image sensor included in a particular wearable extended reality appliance of the plurality of wearable extended reality appliances after the detection of the visual code by the plurality of wearable extended reality appliances. The image data captured by the image sensor may be analyzed using a visual pattern recognition algorithm to localize the visual code in the image data. The location of the visual code in the image data may be compared with the location of the visual code at the time of the detection of the visual code by the plurality of wearable extended reality appliances to determine that a mobile device may have moved positions. For example, a mobile device may be located in a first physical position in a space. The image sensor may capture the mobile device and a visual code being displayed on the mobile device at a first location. The mobile device may move in a left direction in the space to a second physical position. The image sensor may capture the visual code at a different location and determine that the mobile device has moved positions in the space.

In some embodiments, the movement of the mobile device may be detected based on a comparison of a position of the visual code in the image data and a position in the common coordinate system corresponding to the first physical position of the mobile device. In some examples, the position of the visual code in the image data may corresponds to a specific position in the common coordinate system. The image data may be analyzed using visual pattern recognition algorithm to identify the position of the visual code in the image data. The position of the visual code in the image data, the size of the visual code in the image data and/or the capturing parameters of the image data (such as a position of the image sensor, an orientation of the image sensor, zoom or other optical characteristics associated with the capturing of the image data, etc.) may be used to determine the specific position in the common coordinate system. The specific position in the common coordinate system may be compared with the position in the common coordinate system corresponding to the first physical position of the mobile device. A movement of the mobile device may be detected when the specific position in the common coordinate system is different from the position in the common coordinate system corresponding to the first physical position of the mobile device, or when the distance between the specific position in the common coordinate system and the position in the common coordinate system corresponding to the first physical position of the mobile device is longer than a selected threshold.

In one implementation, the visual code may include at least one dynamic marker indicative of detected movements of the mobile device, and some disclosed embodiments may involve changing the at least one dynamic marker when generating the updated visual code. A dynamic marker may include an indicator with characteristics that may change, or different indicators having differing characteristics. For example, a marker that is dynamic may have characteristics that vary over time in one or more of information presented, color saturation, color scheme, brightness, or any other change that is capable of conveying differing information as a result of the changes. Alternatively, a dynamic marker may be one that changes completely. For example, at a first position the marker may reflect a first bar code or OR code, and in a second position the marker may reflect an entirely different bar code or QR code. An updated visual code may include a change in the code based on a detected movement of a mobile device. For example, a mobile device may move in a physical space. The processor may detect the movement of the mobile device. Based on the movement, the dynamic marker of the visual code may change. For example, alphanumeric information may change, symbols, icons or other graphics, may change, and/or a change in color saturation, color scheme, or brightness may occur.

Figure 61:
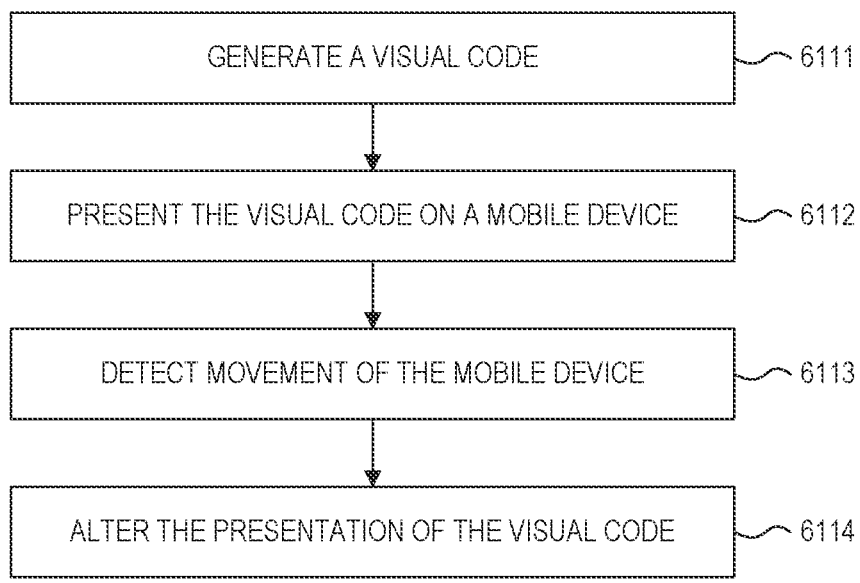
FIG. 61 illustrates a flow chart of an exemplary method that may be executed by a processor to perform operations for sharing virtual content.

FIG. 61 illustrates a flow chart of an exemplary method 6110 that may be executed by a processor to perform operations for sharing virtual content. Method 6110 may include a step 6111 of generating a visual code reflecting a first physical position of a mobile device. Method 6110 may also include a step 6112 of presenting the visual code on a display of the mobile device for detection by a plurality of wearable extended reality appliances, to enable the plurality of wearable extended reality appliances to share content in a common coordinate system. Further, method 6110 may include a step 6113 of detecting movement of the mobile device to a second physical position different from the first physical position. Method 6110 may include a step 6114 of altering the presentation of the visual code so that the visual code is unavailable for use in content sharing.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A non-transitory computer readable medium containing instructions that when executed by at least one processor cause the at least one processor to perform operations for managing content placement in extended reality environments, the operations comprising:

receiving a request from an entity to place a virtual content at a specific geographic location in at least one shared extended reality environment that includes a plurality of virtual objects, wherein the plurality of virtual objects are viewable by a plurality of wearable extended reality appliances registered to the at least one shared extended reality environment;

obtaining information associated with the request;

accessing a plurality of content placement rules defining geographical restrictions on extended reality environment content placement;

based on the obtained information, determining that the request from the entity to place the virtual content at the specific geographic location corresponds to a specific content placement rule;

implementing the specific content placement rule to prevent a display of the virtual content at the specific geographic location in the at least one shared extended reality environment by at least some of the plurality of wearable extended reality appliances when a condition of the specific content placement rule is not met; and implementing the specific content placement rule to enable the display of the virtual content at the specific geographic location in the at least one shared extended reality environment by at least some of the plurality of wearable extended reality appliances when the condition of the specific content placement rule is met, wherein implementing the specific content placement rule to enable the display includes docking the virtual content to a physical object located in an area of the specific geographic location;

receiving an input indicative of a movement of the physical object to a new geographic location;

based on the new geographic location, selecting a second content placement rule;

implementing the second content placement rule to prevent a display of the virtual content at the new geographic location when a condition of the second content placement rule is not met; and implementing the second content placement rule to enable the display of the virtual content at the new geographic location when the condition of the second placement rule is met.

2. The non-transitory computer readable medium of claim 1, wherein the operations further include using input from a wearable extended reality appliance used by the entity to determine the specific geographic location.

3. The non-transitory computer readable medium of claim 2, wherein the operations further include:

receiving image data captured from an area of the specific geographic location using an image sensor included in the wearable extended reality appliance used by the entity;

analyzing the image data to determine a characteristic of the specific geographic location; and determining whether the condition of the specific content placement rule is met based on the determined characteristic of the specific geographic location.

4. The non-transitory computer readable medium of claim 1, wherein the condition of the specific content placement rule is configured to prevent placement of content in the specific geographical location in an absence of a license permitting content placement by the entity in the specific geographical location.

5. The non-transitory computer readable medium of claim 1, wherein the plurality of content placement rules govern a first extended reality environment and a second extended reality environment, and the processor operations further include preventing placement of the virtual content in the specific geographic location of the first extended reality environment and permitting placement of the virtual content in the specific geographic location of the second extended reality environment.

6. The non-transitory computer readable medium of claim 1, wherein the obtained information associated with the request includes information about an identity of the entity, and wherein the operations further include determining whether the condition of the specific content placement rule is met based on the information about the identity of the entity.

7. The non-transitory computer readable medium of claim 1, wherein the obtained information associated with the request includes information about a physical location of the entity, and wherein the operations further include determining whether the condition of the specific content placement rule is met based on the information about the physical location of the entity.

8. The non-transitory computer readable medium of claim 7, wherein the information about the physical location of the entity indicates that at a time of making the request, the entity is located at a first location remote from the specific geographic location, and the operations further include:

based on the information about the physical location of the entity, preventing the display of the virtual content;

receiving updated information indicating that the entity is located at a second location proximate to the specific geographic location; and in response to the received updated information, automatically enable the display of the virtual content at the specific geographic location in the at least one shared extended reality environment by at least some of the plurality of wearable extended reality appliances.

9. The non-transitory computer readable medium of claim 1, wherein the obtained information associated with the request includes ownership information associated with the specific geographic location, and wherein the operations further include determining whether the condition of the specific content placement rule is met based on the ownership information.

10. The non-transitory computer readable medium of claim 1, wherein the obtained information associated with the request includes affiliation information reflecting a connection of the entity with the specific geographic location, and wherein the operations further include determining whether the condition of the specific content placement rule is met based on the affiliation information.

11. The non-transitory computer readable medium of claim 1, wherein the obtained information associated with the request includes information about a content type, and wherein the operations further include determining whether the condition of the specific content placement rule is met based on the information about the content type.

12. The non-transitory computer readable medium of claim 1, wherein the obtained information associated with the request includes virtual space constraint information associated with the specific geographic location, wherein the operations further include determining whether the condition of the specific content placement rule is met based on the virtual space constraint information.

13. The non-transitory computer readable medium of claim 1, wherein the physical object is movable and the operations further include receiving an input indicative of a movement of the physical object to a new location, and enabling the display of the virtual content at the new location.

14. The non-transitory computer readable medium of claim 1, wherein implementing the specific content placement rule to enable the display includes storing data associated with the virtual content and associating the data with the specific geographic location.

15. The non-transitory computer readable medium of claim 1, wherein implementing the specific content placement rule to enable the display includes determining a time limitation for displaying the virtual content at the specific geographic location.

16. The non-transitory computer readable medium of claim 1, wherein implementing the specific content placement rule to enable the display includes modifying the virtual content for display at the specific geographic location.

17. A method for managing content placement in extended reality environments, the method comprising:

receiving a request from an entity to place a virtual content at a specific geographic location in at least one shared extended reality environment that includes a plurality of virtual objects, wherein the plurality of virtual objects are viewable by a plurality of wearable extended reality appliances registered to the at least one shared extended reality environment;

obtaining information associated with the request;

accessing a plurality of content placement rules defining geographical restrictions on extended reality environment content placement;

based on the obtained information, determining that the request from the entity to place the virtual content at the specific geographic location corresponds to a specific content placement rule;

implementing the specific content placement rule to prevent a display of the virtual content at the specific geographic location in the at least one shared extended reality environment by at least some of the plurality of wearable extended reality appliances when a condition of the specific content placement rule is not met; and implementing the specific content placement rule to enable the display of the virtual content at the specific geographic location in the at least one shared extended reality environment by at least some of the plurality of wearable extended reality appliances when the condition of the specific content placement rule is met, wherein implementing the specific content placement rule to enable the display includes docking the virtual content to a physical object located in an area of the specific geographic location;

receiving an input indicative of a movement of the physical object to a new geographic location;

based on the new geographic location, selecting a second content placement rule:

implementing the second content placement rule to prevent a display of the virtual content at the new geographic location when a condition of the second content placement rule is not met; and implementing the second content placement rule to enable the display of the virtual content at the new geographic location when the condition of the second placement rule is met.

18. A system for managing content placement in extended reality environments, the system comprising:

at least one processor configured to:

receive a request from an entity to place a virtual content at a specific geographic location in at least one shared extended reality environment that includes a plurality of virtual objects, wherein the plurality of virtual objects are viewable by a plurality of wearable extended reality appliances registered to the at least one shared extended reality environment;

obtain information associated with the request;

access a plurality of content placement rules defining geographical restrictions on extended reality environment content placement;

based on the obtained information, determine that the request from the entity to place the virtual content at the specific geographic location corresponds to a specific content placement rule;

implement the specific content placement rule to prevent a display of the virtual content at the specific geographic location in the at least one shared extended reality environment by at least some of the plurality of wearable extended reality appliances when a condition of the specific content placement rule is not met; and implement the specific content placement rule to enable the display of the virtual content at the specific geographic location in the at least one shared extended reality environment by at least some of the plurality of wearable extended reality appliances when the condition of the specific content placement rule is met, wherein implementing the specific content placement rule to enable the display includes docking the virtual content to a physical object located in an area of the specific geographic location;

receive an input indicative of a movement of the physical object to a new geographic location;

based on the new geographic location, select a second content placement rule;

implement the second content placement rule to prevent a display of the virtual content at the new geographic location when a condition of the second content placement rule is not met; and implement the second content placement rule to enable the display of the virtual content at the new geographic location when the condition of the second placement rule is met.

19. A non-transitory computer readable medium containing instructions that when executed by at least one processor cause the at least one processor to perform operations for managing content placement in extended reality environments, the operations comprising:

receiving a request from an entity to place a virtual content at a specific geographic location in at least one shared extended reality environment that includes a plurality of virtual objects, wherein the plurality of virtual objects are viewable by a plurality of wearable extended reality appliances registered to the at least one shared extended reality environment;

obtaining information associated with the request, the obtained information including information about a physical location of the entity, the information indicating that at a time of making the request, the entity is located at a first location remote from the specific geographic location;

based on the information about the physical location of the entity, preventing the display of the virtual content;

receiving updated information indicating that the entity is located at a second location proximate to the specific geographic location; and in response to the received updated information, automatically enable the display of the virtual content at the specific geographic location in the at least one shared extended reality environment by at least some of the plurality of wearable extended reality appliances.

* * * * *

UNITED STATES PATENT AND TRADEMARK OFFICE
CERTIFICATE OF CORRECTION

PATENT NO. : 11,516,297 B2
APPLICATION NO. : 17/710189
DATED : November 29, 2022
INVENTOR(S) : Tamir Berliner et al.

Page 1 of 1

It is certified that error appears in the above-identified patent and that said Letters Patent is hereby corrected as shown below:

In the Claims

Claim 1, Column 210, Line 57, "rule is not met; and" should read --rule is not met;--.

Claim 17, Column 213, Line 10, "rule is not met; and" should read --rule is not met;--.

Claim 17, Column 213, Line 24, "rule:" should read --rule;--.

Claim 18, Column 214, Line 2, "rule is not met; and" should read --rule is not met;--.

Signed and Sealed this
Twenty-fourth Day of January, 2023

Katherine Kelly Vidal
*Director of the United States Patent and Trademark Office*